United States Patent
Coney et al.

(10) Patent No.: US 11,535,977 B2
(45) Date of Patent: Dec. 27, 2022

(54) AUTONOMOUS LAUNDRY WASHING AND DRYING DEVICES, SYSTEMS, AND METHODS OF USE

(71) Applicant: Monotony.ai, Inc., Newton, MA (US)

(72) Inventors: Susan Bachrach Coney, Watertown, MA (US); Noa M. Rensing, West Newton, MA (US); Madeline R. Hickman, Arlington, MA (US); Kayla M. Swiston, Chestnut Hill, MA (US); Benjamin Beckvold, Somerville, MA (US); Benjamin D. Bixby, Newton Highlands, MA (US); Jesse Sielaff, Newton, MA (US); Kevin M. LeBlanc, Medford, MA (US); Hannah S. Siemens, Jamaica Plain, MA (US)

(73) Assignee: MONOTONY.AI, INC., Allston, MA (US)

( * ) Notice: Subject to any disclaimer, the term of this patent is extended or adjusted under 35 U.S.C. 154(b) by 0 days.

(21) Appl. No.: 17/490,670

(22) Filed: Sep. 30, 2021

(65) Prior Publication Data

US 2022/0098779 A1    Mar. 31, 2022

Related U.S. Application Data

(60) Provisional application No. 63/086,041, filed on Sep. 30, 2020.

(51) Int. Cl.
*D06F 25/00* (2006.01)
*D06F 33/52* (2020.01)
(Continued)

(52) U.S. Cl.
CPC .............. *D06F 95/00* (2013.01); *D06F 25/00* (2013.01); *D06F 33/52* (2020.02); *D06F 34/14* (2020.02);
(Continued)

(58) Field of Classification Search
CPC ........ D06F 34/34; D06F 34/304; D06F 95/00; D06F 37/34; D06F 37/304
See application file for complete search history.

(56) References Cited

U.S. PATENT DOCUMENTS 504,246 A        8/1893   Reeve
1,886,916 A  *  11/1932   Storch ..................... D06F 95/00
                                                                    222/136
(Continued)

FOREIGN PATENT DOCUMENTS

DE              1642075 A1        5/1971
DE        102006055494 A1        7/2007
(Continued)

OTHER PUBLICATIONS

DE102012001830A1 Machine Translation (Year: 2012).*
(Continued)

*Primary Examiner* — Spencer E. Bell
(74) *Attorney, Agent, or Firm* — Myers Bigel, P.A.

(57) ABSTRACT

An autonomously actuated washing and drying device includes a rigid frame configured to pivot about a pivot shaft, a combined washing and drying tub and drum assembly suspended within the frame, and a controller in operable communication with a pivot motor for rotating the pivot shaft and a drive motor for spinning the drum. The pivot shaft is configured to rotate the frame from an upright orientation to an inverted orientation. The controller is configured to instruct the pivot motor to rotate the frame to the upright orientation for receiving at least one deformable article into an opening of the drum, and rotate the frame to a wash orientation between the upright orientation and inverted orientation. The controller is configured to execute
(Continued)

a washing and drying routine based on parameters including instructing the drive motor to spin the drum about a drive axis at the wash orientation.

29 Claims, 57 Drawing Sheets

(51) Int. Cl.
    *D06F 34/14*     (2020.01)
    *D06F 37/10*     (2006.01)
    *D06F 37/30*     (2020.01)
    *D06F 105/46*     (2020.01)
    *D06F 105/44*     (2020.01)
    *D06F 103/24*     (2020.01)
    *D06F 95/00*     (2006.01)

(52) U.S. Cl.
    CPC ............ *D06F 37/10* (2013.01); *D06F 37/304* (2013.01); *D06F 2103/24* (2020.02); *D06F 2105/44* (2020.02); *D06F 2105/46* (2020.02)

(56) References Cited

U.S. PATENT DOCUMENTS

| | | | |
|---|---|---|---|
| 2,165,487 A | 7/1939 | Johnson | |
| 2,572,265 A * | 10/1951 | Johnson | D06F 49/06 |
| | | | 210/368 |
| 3,116,903 A | 1/1964 | Grantham | |
| 3,328,984 A | 7/1967 | John | |
| 3,400,467 A | 9/1968 | Drace | |
| 3,548,509 A | 12/1970 | Chaknova | |
| 3,742,738 A | 7/1973 | Frotriede | |
| 4,835,993 A | 6/1989 | Dreher | |
| 5,357,772 A | 10/1994 | Hendren | |
| 9,822,475 B2 | 11/2017 | Thorpe | |
| 2003/0019254 A1 | 1/2003 | Shaw et al. | |
| 2006/0230543 A1 | 10/2006 | Cummings | |
| 2007/0113599 A1 | 5/2007 | Harfmann | |
| 2007/0137260 A1 | 6/2007 | Shikamori et al. | |
| 2007/0151042 A1 | 7/2007 | Bringewatt et al. | |
| 2007/0163093 A1 * | 7/2007 | Wright | D06F 29/00 |
| | | | 28/100 |
| 2008/0134727 A1 | 6/2008 | May | |
| 2008/0245112 A1 | 10/2008 | Sung | |
| 2008/0276656 A1 | 11/2008 | Kitamura et al. | |
| 2011/0076115 A1 * | 3/2011 | Page | D06F 95/00 |
| | | | 198/300 |
| 2012/0042697 A1 * | 2/2012 | Hong | D06F 95/00 |
| | | | 68/12.23 |
| 2012/0240342 A1 | 9/2012 | Bringewatt et al. | |
| 2012/0247158 A1 | 10/2012 | Ditze et al. | |
| 2012/0304704 A1 * | 12/2012 | Ponnaganti | D06F 37/40 |
| | | | 68/140 |
| 2015/0122967 A1 | 5/2015 | Kim | |
| 2016/0173318 A1 | 6/2016 | Ha et al. | |
| 2016/0258097 A1 | 9/2016 | Hake et al. | |
| 2016/0258098 A1 | 9/2016 | Hake et al. | |
| 2016/0258100 A1 | 9/2016 | Hake et al. | |
| 2016/0258101 A1 | 9/2016 | Hake et al. | |
| 2016/0258107 A1 | 9/2016 | Hake et al. | |
| 2017/0051450 A1 | 2/2017 | Schwartz et al. | |
| 2017/0121881 A1 * | 5/2017 | Yang | D06F 37/36 |
| 2017/0268145 A1 | 9/2017 | Jeong et al. | |
| 2018/0237973 A1 * | 8/2018 | Nakanishi | D06F 23/04 |
| 2018/0355541 A1 | 12/2018 | Sumer et al. | |
| 2019/0003106 A1 | 1/2019 | Lee et al. | |
| 2019/0093278 A1 | 3/2019 | Snook et al. | |
| 2019/0106832 A1 | 4/2019 | Cagliani | |
| 2019/0194850 A1 | 6/2019 | Hake et al. | |
| 2019/0264379 A1 | 8/2019 | Kim et al. | |
| 2019/0368112 A1 | 12/2019 | Seo et al. | |
| 2020/0087838 A1 | 3/2020 | White et al. | |

FOREIGN PATENT DOCUMENTS

| | | | | |
|---|---|---|---|---|
| DE | 102006051374 | B3 | | 6/2008 |
| DE | 102012001830 | A1 | | 8/2013 |
| DE | 102017211073 | B3 * | 11/2018 | |
| EP | 1380681 | A2 | | 1/2004 |
| EP | 1942223 | B1 | | 4/2012 |
| EP | 3034668 | A1 | | 6/2016 |
| EP | 3199692 | A1 | | 8/2017 |
| KR | 20160103888 | A | | 9/2016 |
| WO | 2016144794 | A2 | | 9/2016 |
| WO | WO-2018041593 | A1 * | 3/2018 | ............. D06F 95/00 |

OTHER PUBLICATIONS

DE102017211073B3 Machine Translation (Year: 2017).*
DE102006051374B3 Machine Translation (Year: 2006).*
"130kg Front & Back Tilt Washer Extractor—Buy 130kg Washer Extractor, Washer Extractor For Sale TiUe Washer Extractor Product on Alibaba.com", downloaded from 130kg Front & Back Tilt Washer Extractor—Buy 130kg Washer Extractor, Washer Extractor For Sale TiUe Washer Extractor Product on Alibaba.com, Jul. 15, 2020, 7 pages.
"Shanghai Xunduo Laundry Equipment Co., Ltd.—Industrial Washer, Industrial Dryer", downloaded from https://xunduo.en .alibaba .com/?spm=a2700.icbuShop.88.27 .efa 777b2UZ2J2t on Jul. 15, 2020, 8 pages.
Invitation to Pay Additional Fees for PCT application PCT/US2021/052899 dated Jan. 24, 2022, 19 pages.
International Search Report and Written Opinion for PCT/US2021/052899, dated Mar. 17, 2022, 27 pages.

* cited by examiner

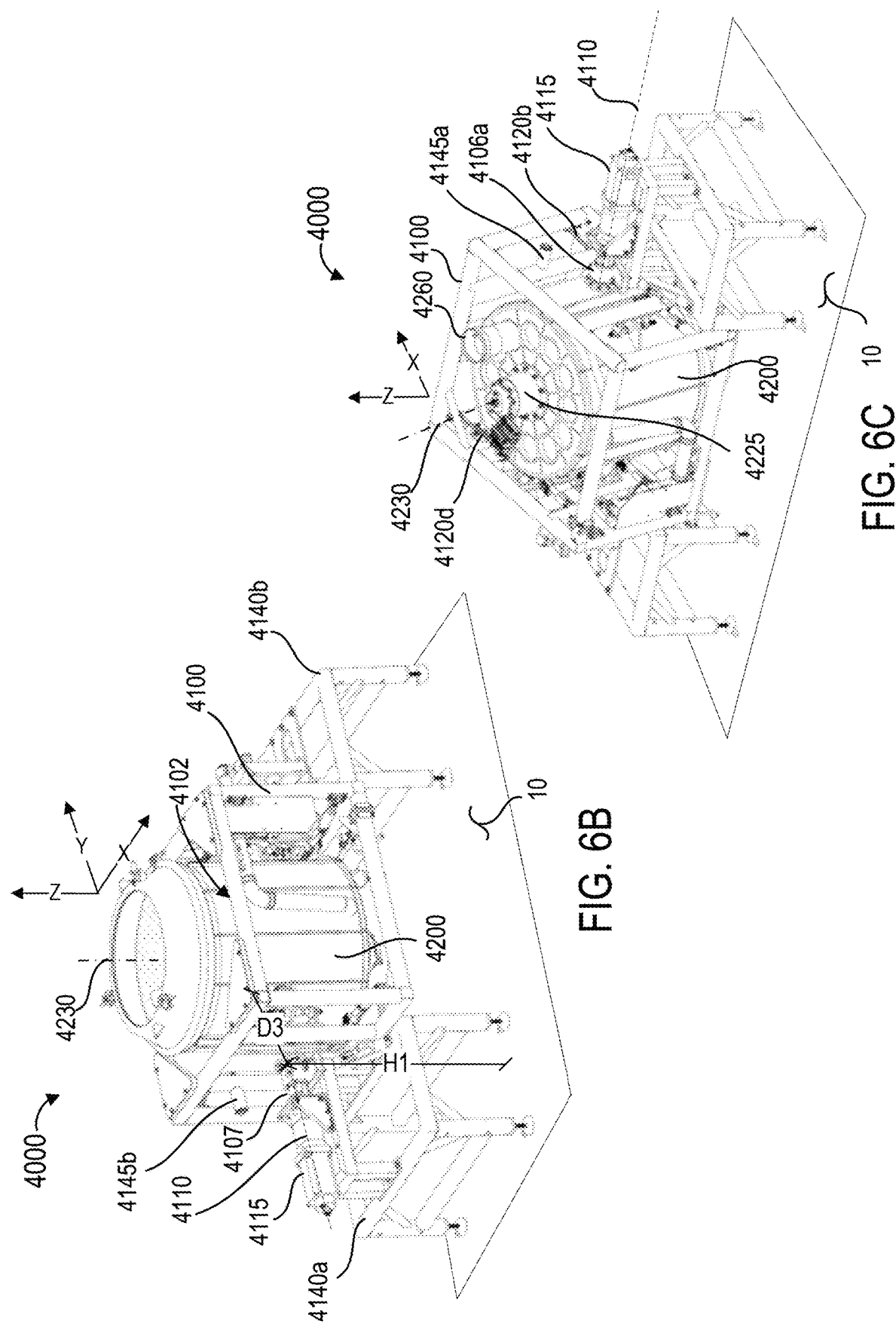

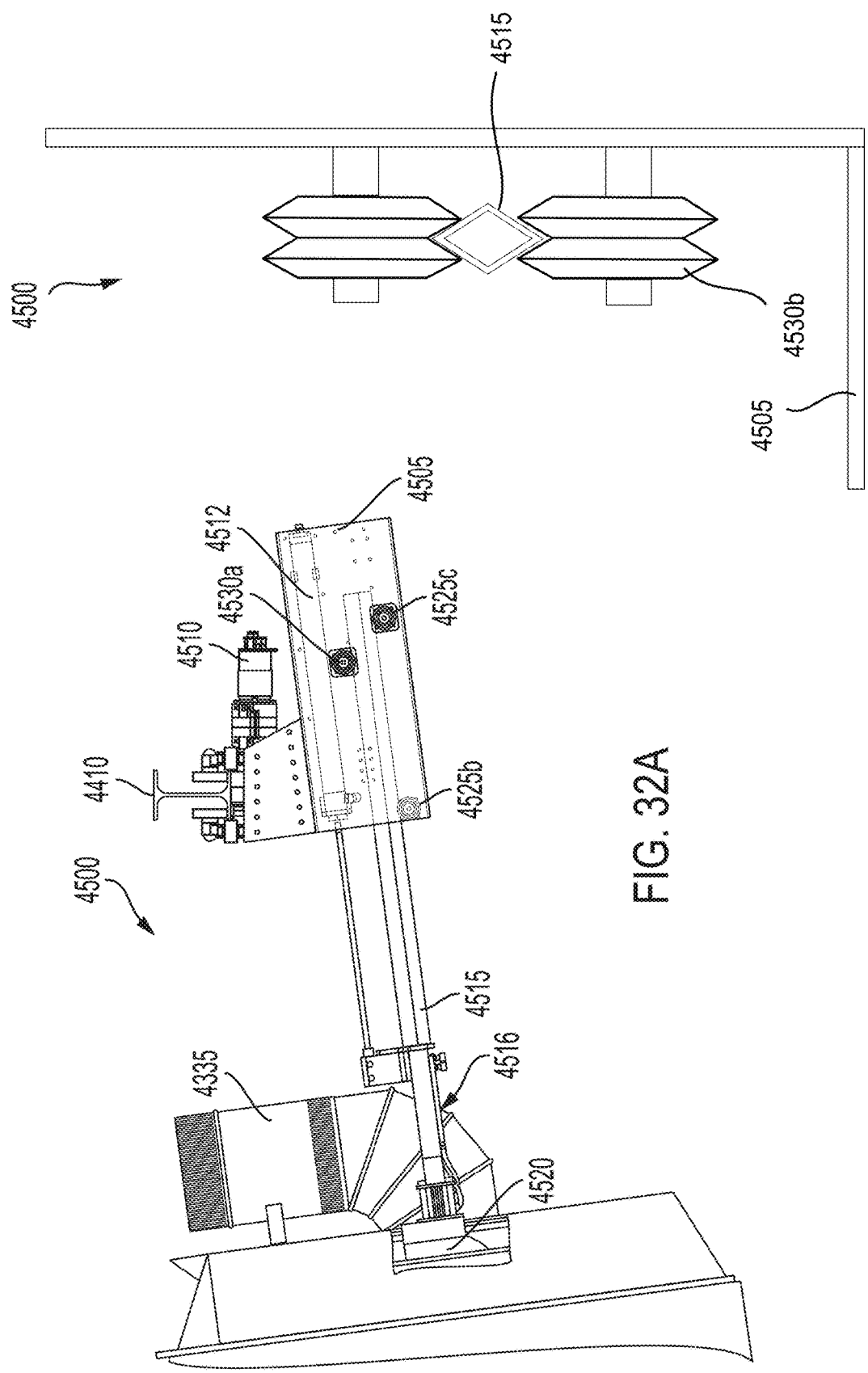

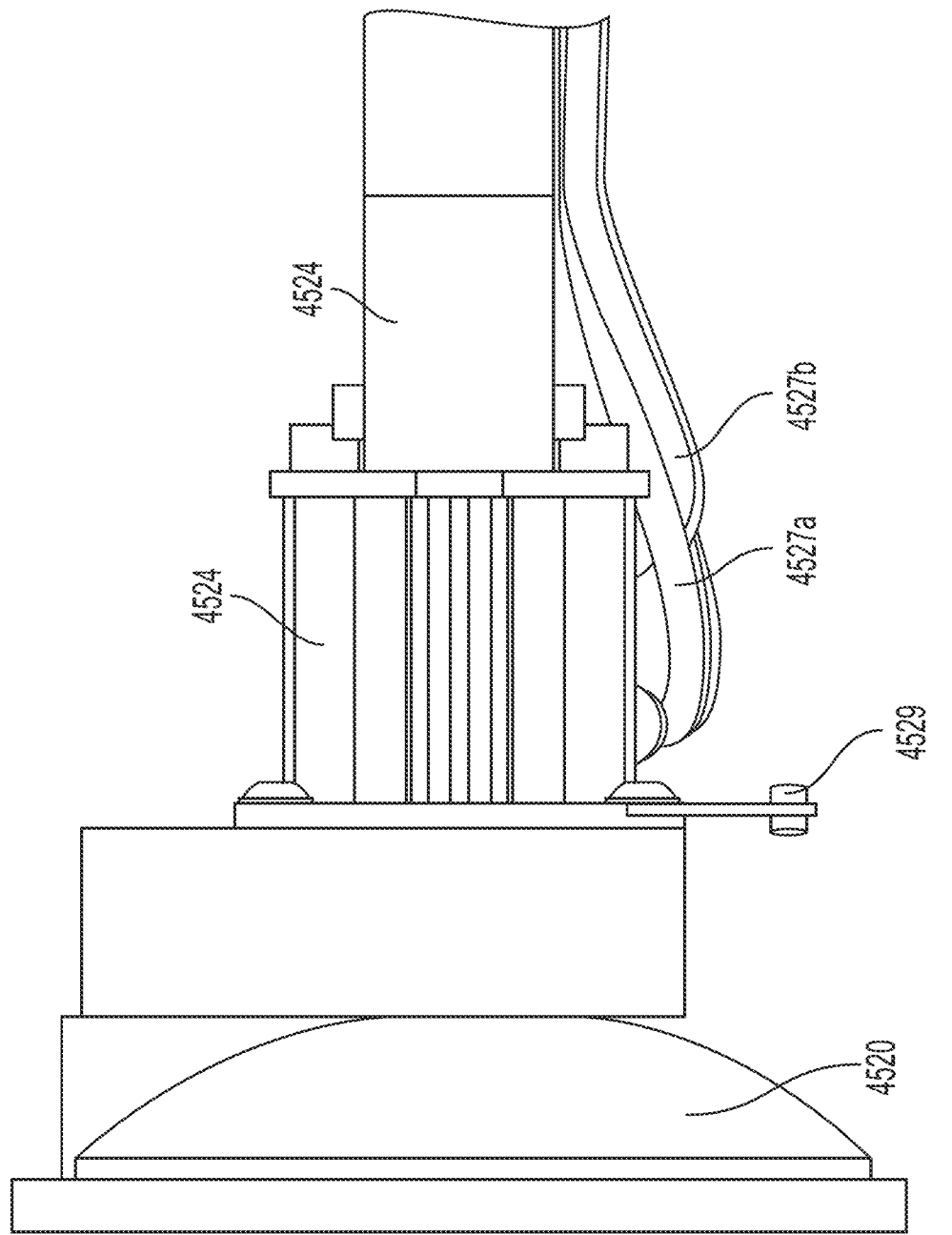

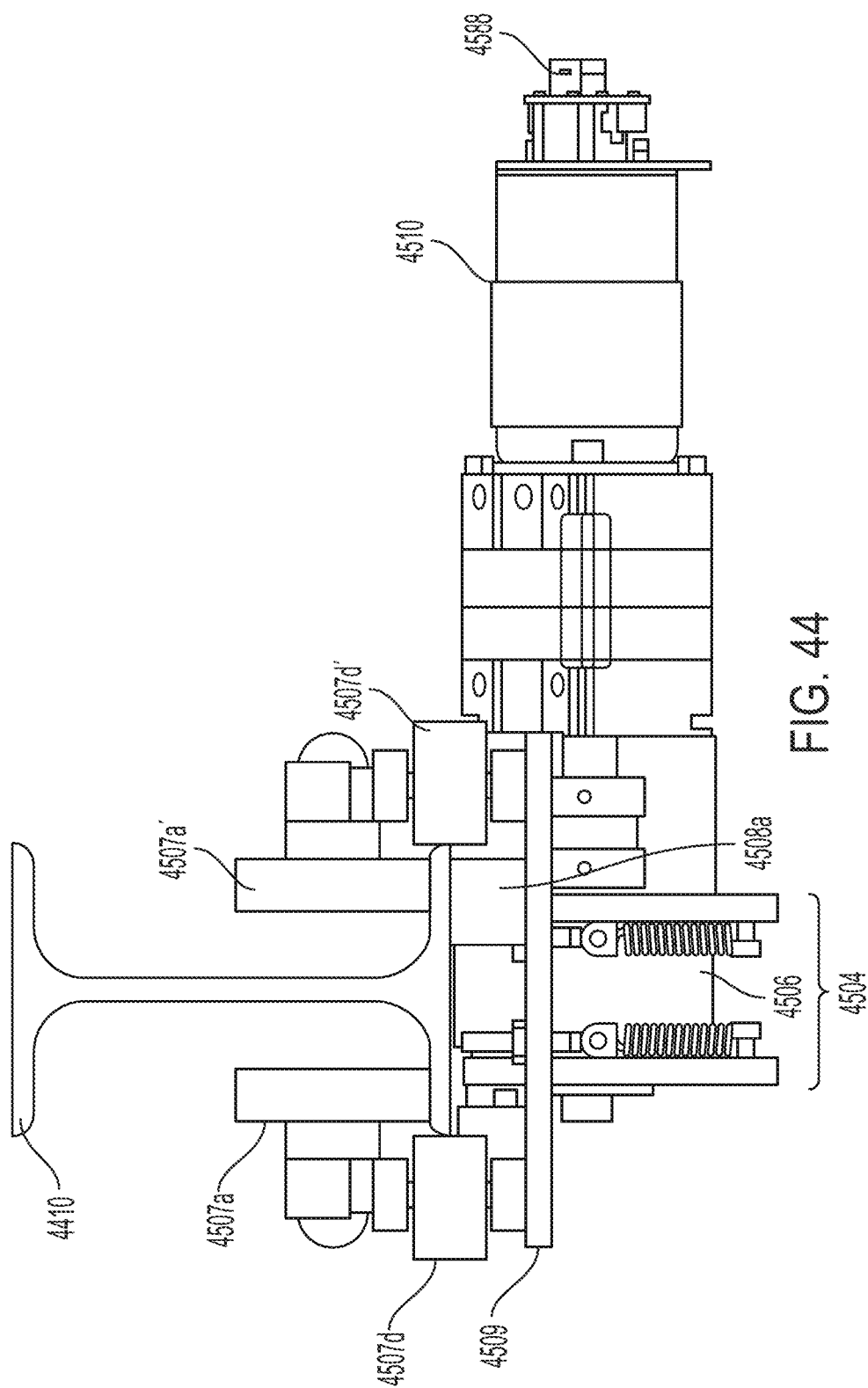

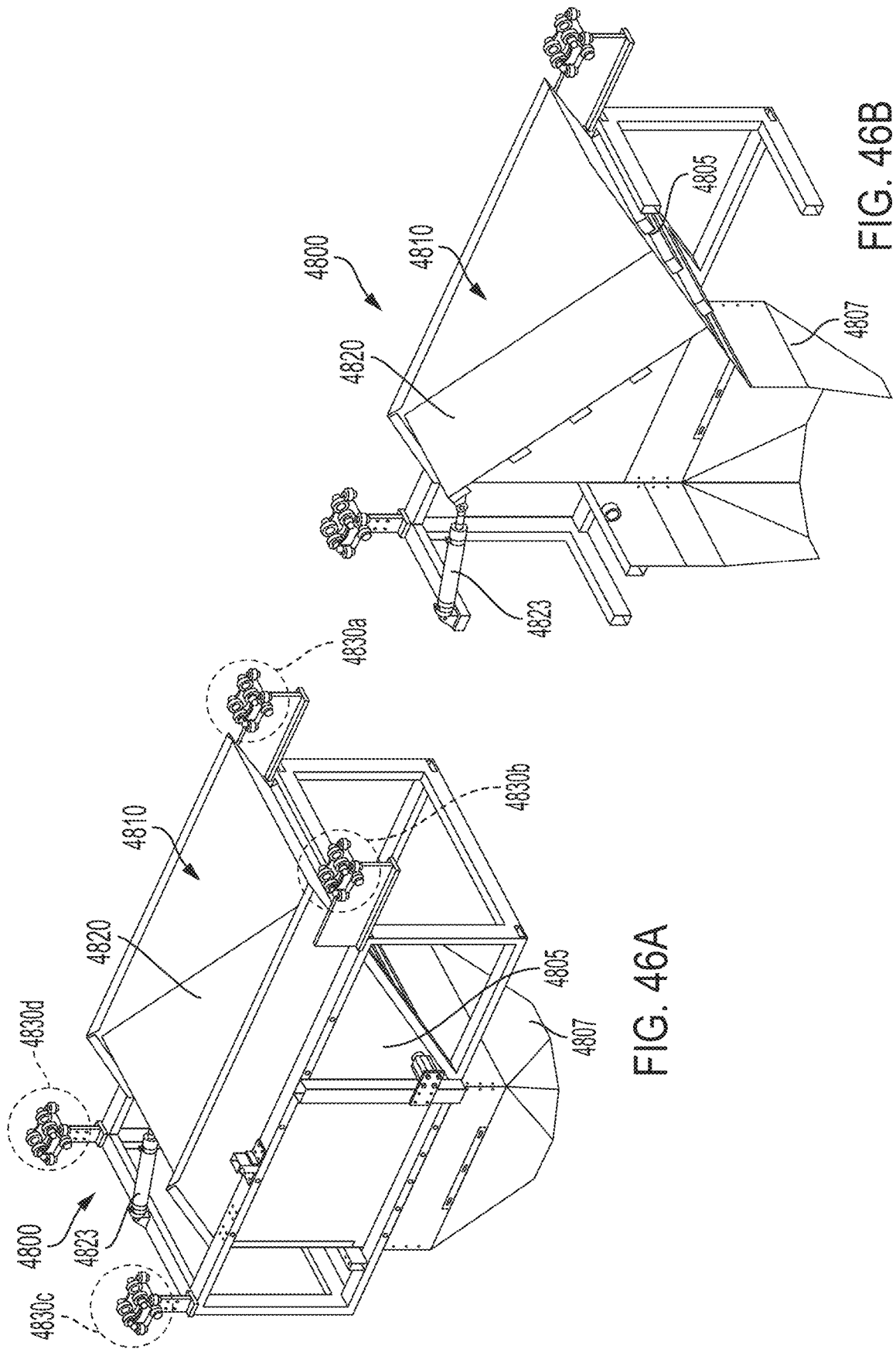

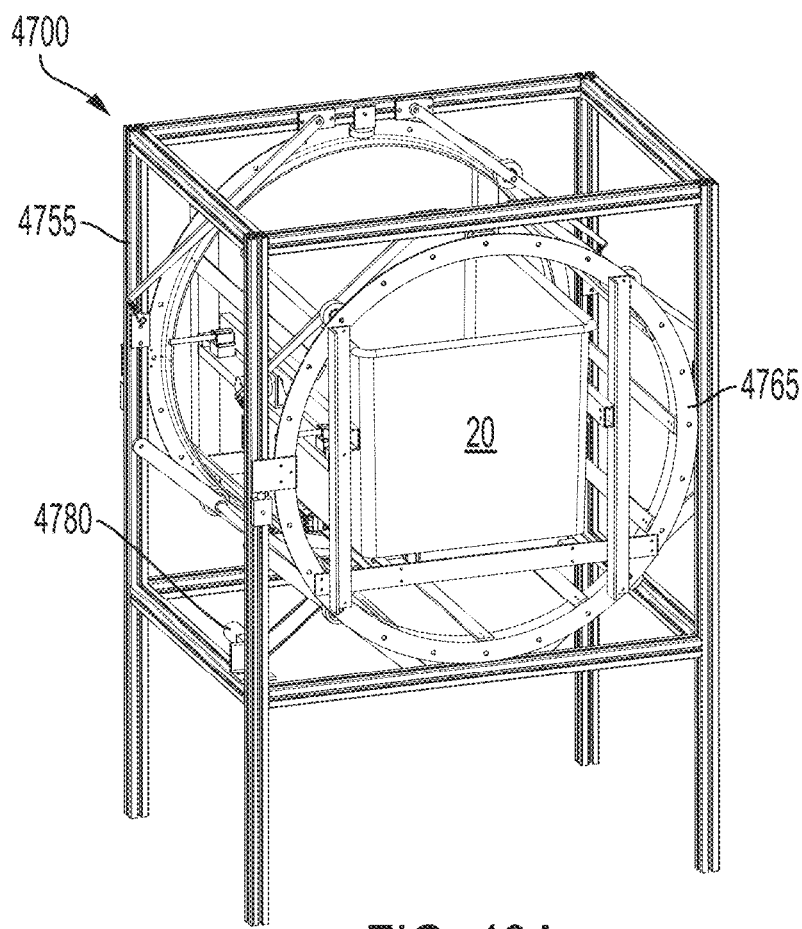
FIG. 49A
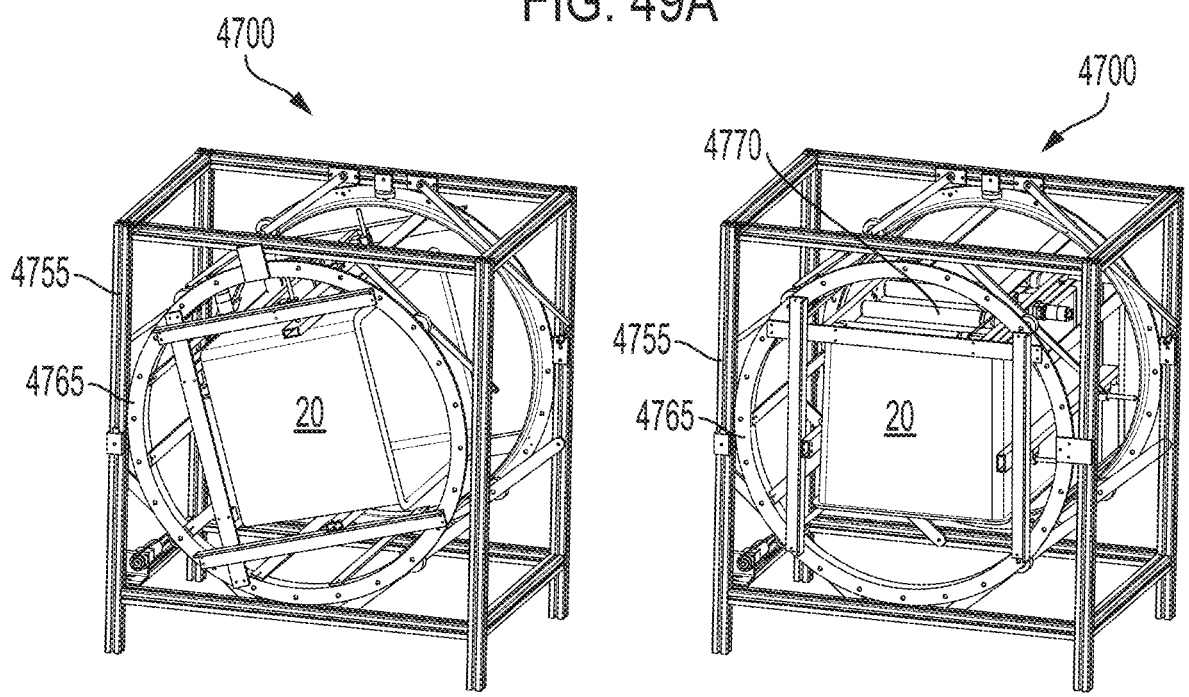
FIG. 49B
FIG. 49C

AUTONOMOUS LAUNDRY WASHING AND DRYING DEVICES, SYSTEMS, AND METHODS OF USE

CROSS-REFERENCE TO RELATED APPLICATIONS

This application claims priority under 35 U.S.C. § 119(e) to U.S. Provisional Patent Application Ser. No. 63/086,041 filed Sep. 30, 2020, titled "Autonomous Laundry Washing and Drying Devices, Systems, And Methods of Use," the entirety of which application is hereby incorporated by reference.

BACKGROUND

The present disclosure is directed to robotic laundry devices, systems, and methods.

Automating and outsourcing mundane, time-consuming household chores to robotic devices is increasingly common. Time saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel sheets and towels. Such industrial machines are tailor-made to accept one type of laundry item of one size or style. For example, unique folding machines exist to accept a dedicated one of washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles. As such, the devices need to be designed to be efficient and reliable for replacing the common, human-dependent chore of laundry.

SUMMARY

In one example, an autonomously operated washing and drying device includes a pair of pivot shafts affixed to opposite sides of a rigid frame in axial alignment with a pivot axis. The pair of pivot shafts are configured to suspend the rigid frame from a support structure, and the suspended rigid frame rotates about the pivot axis through a range of rotational angles from an upturned orientation to an inverted orientation. A drum is configured to receive therein at least one deformable article for washing and drying. The drum includes a plurality of perforations for air and liquid ingress into the drum, and an opening at a front end configured for receiving the at least one deformable article therethrough in the upturned orientation and a drive end opposite the front end configured to operably couple to a drive shaft. A tub is configured to receive the drum therein and is connect to a non-rotating housing disposed about the drive shaft at the drive end opposite the front end. Two or more springs are configured to extend between an outer surface of the tub and the rigid frame and suspend the connected tub and drum within the rigid frame. A bidirectional drive motor is configured to operably engage the drive shaft for spinning the drum about a spin axis extending from the drive end to the front end, and the spin axis is substantially orthogonal to the pivot axis. A pivot motor is configured to operably engage one of the pair of pivot shafts to rotate the rigid frame about the pivot axis such that the opening of the drum suspended therein moves bidirectionally through the range of rotational angles from the upturned orientation to the inverted orientation. A controller is in operable communication with the pivot motor and drive motor. The controller is configured to instruct the pivot motor to rotate the rigid frame to the upturned orientation for receiving the at least one deformable article into the opening of the suspended drum, to instruct the pivot motor to rotate the rigid frame to a wash orientation between the upturned orientation and the inverted orientation, to instruct the pivot motor to rotate the rigid frame to the inverted orientation, and to execute a washing routine and a drying routine based on wash and dry parameters, the wash and dry parameters comprising instructing the drive motor to spin the drum about the spin axis at the wash orientation.

Implementations of the device may include one or more of the following features.

In examples, the controller is configured to receive a signal from an encoder disposed on at least one of the pair of pivot shafts. In examples, signal is indicative of a detected rotational angle of the at least one of the pair of pivot shafts while the pivot motor is rotating the rigid frame about the pivot axis. In examples, the controller is configured to execute one or more instructions of the washing and drying routine based at least in part on receiving the signal from the encoder.

In examples, the device includes at least one accelerometer disposed on the tub. In examples, the accelerometer is in wired or wireless communication with the controller and is configured to detect a degree of rotation of the tub and drum about the pivot axis and an angular position of the spin axis relative to horizontal, and to output a signal indicative of the angular position to the controller.

In examples, a removable door is configured to selectively seal the opening.

In examples, the device includes a compressible O-ring disposed on a mating surface between the removable door and the opening of the drum.

In examples, the device includes a movable stage configured to hold and release the removable door for selective engagement with the opening, and a drive of the movable stage is in operable communication with the controller. In examples, the controller is further configured to instruct sealing and unsealing the opening with the removable door.

In examples, the movable stage is configured to at least one of remove and seat the removable door within the opening with the spin axis tilted at a door removal and seating angle.

In examples, the door removal and seating angle is at least one of at the wash orientation and at an angle above horizontal that is within 1 to 10 degrees of the wash orientation angle.

In examples, the movable stage is configured to seat the removable door in the opening prior to the controller executing the washing routine and remove the removable door from the opening following completion of the drying routine.

In examples, the movable stage includes one or more actuatable suctions for holding the door. In examples, the one or more actuatable suctions are in operable communication with an actuatable piston in operable communication with the controller. In examples, the actuatable piston is configured to mechanically pull up a middle of the one or more actuatable suctions to generate suction against the door.

In examples, the removable door includes an air outlet orifice through which air is drawn from the drum during the drying routine, and the air outlet orifice is configured to receive an external air vent hose.

In examples, the tub further comprises an air inlet orifice at the drive end of the tub such that heated air flows through the drum from the air inlet orifice to the air outlet orifice.

In examples, the air inlet orifice is positioned adjacent one of a top or a bottom of the tub and the air outlet orifice is positioned at least one of at the center of the door and adjacent another of the top or the bottom of the tub. In examples, the flow of heated air travels diagonally through the drum from the drive end to the front end.

In examples, the device includes one or more actuatable latches in operable communication with the controller. In examples, the one or more actuatable latches are configured to retain the removable door sealed with the opening of the drum.

In examples, the one or more latches includes at least one of a bistable latch, a pneumatic latch, a servo latch, an electromagnet, and a solenoid latch.

In examples, the pair of coaxially aligned pivot shafts engage two opposing sides of the rigid frame that extend between a front end of the frame substantially parallel to the front end of the tub and a back end of the rigid frame substantially parallel to the drive end of the tub.

In examples, each of the pair of coaxial pivot shafts is configured to be supported by radial bearings disposed on a corresponding support positioned astride the rigid frame, and the pivot motor is disposed on a corresponding support pillar of the engaged one of the pair of coaxially aligned pivot shafts.

In examples, the pivot shaft is configured to suspend the rigid frame above at least one of a support surface and a receiving container by a height greater than a distance from the pivot axis to either of a front end and a back end of the rigid frame, and the pivot axis is substantially aligned with a center of gravity of the washing and drying device.

In examples, the controller is further configured to rotate the drum about the pivot axis to the inverted orientation to drop the at least one deformable article from the drum. In examples, the drum is substantially cylindrical and includes a conical taper adjacent the front end for guiding the at least one deformable article out of the drum in the inverted orientation.

In examples, the upturned orientation includes a range of angles between 45 and 90 degrees up from horizontal and the inverted orientation includes a range of angles of between about 40 to 90 degrees down from horizontal.

In examples, the spin axis is substantially horizontal at the wash orientation.

In examples, the spin axis is inclined at an angle in a range of between about 1 to 20 degrees above horizontal at the wash orientation.

In examples, the controller is in at least one of wired and wireless communication with a communication network and is further configured to receive the wash and dry parameters via the communication network.

In examples, an autonomous separating and sorting robot in communication with a communication network is configured to provide the at least one deformable article to the washing and drying device. In examples, the autonomous separating and sorting robot determines one or more characteristics of the at least one deformable article, and the autonomous separating and sorting robot communicates the one or more characteristics of the at least one deformable article to the controller of the washing and drying device via the communication network, and the controller is further configured to determine the wash and dry parameters based on the communicated one or more characteristics.

In examples, the wash and dry parameters are stored in a look up table crossed referenced with the one or more characteristics, and the communicated one or more characteristics is at least one of a material composition, weight, color, and size of the at least one deformable article.

In examples, the tub includes a cleaning water inlet, a wastewater outlet, and an air inlet orifice configured to receive a heated air conduit. In examples, the heated air inlet orifice is disposed in a wall at the drive end of the tub, and the cleaning water inlet is disposed on an upper half of the tub and is configured to receive at least one of water and one or more laundry chemicals.

In examples, the controller is further in operable communication with an autonomously operated loader disposed above the rigid frame and is configured to instruct the autonomous loader to release the deformable article into the drum while the rigid frame is in the upturned orientation.

In examples, the autonomously operated loader is configured to drive on one or more rails to a stopping position above one of a plurality of washing and drying devices.

In examples, the autonomously operated loader includes a holding volume adjacent a downspout and an actuated wall disposed between the holding volume and the downspout for selectively releasing the at least one deformable article through the downspout into the opening of the upturned drum positioned therebeneath.

In examples, the device includes an autonomously operated bin tipper in operable communication with the controller. In examples, controller is configured to actuate at least one of a clamp for retaining an open topped bin received within the bin tipper and a spin motor configured to rotate the open topped bin above the loader to release the one or more deformable articles into the holding volume while retaining the clamped open topped bin.

In one example, an autonomously actuated washing and drying device includes a rigid frame configured to mount to a pivot shaft, the pivot shaft being configured to suspend the rigid frame and defining a pivot axis about which the rigid frame rotates from a vertically upright orientation to a substantially vertically inverted orientation. The device includes a drum configured to receive therein at least one deformable article for washing and drying, the drum including an opening at a front end configured for receiving the at least one deformable article therethrough. The device includes a tub configured to mate with the drum at a drive end opposite the front end, and two or more springs configured to extend between an outer surface of the tub and the rigid frame and suspend the tub and drum within the frame. The device includes a bidirectional drive motor configured to mount to a drive shaft at the drive end for spinning the drum about a spin axis extending from the drive end to the front end, the spin axis being substantially orthogonal to the pivot axis, and a pivot motor configured to drive the pivot shaft to rotate the frame such that the opening of the drum suspended therein moves bidirectionally through a range of angular orientations from a vertically upright orientation to a substantially inverted orientation. The device includes a controller in operable communication with the pivot motor and drive motor. The controller is configured to instruct the pivot motor to rotate the frame to the vertically upright orientation for receiving the at least one deformable article into the opening of the suspended drum, instruct the pivot motor to rotate the frame to a wash orientation between the vertically upright orientation and substantially vertically inverted orientation, instruct the pivot motor to rotate the frame to the substantially vertically inverted orientation opposite the upright orientation, and execute a washing and drying routine based on parameters. The parameters include instructing the drive motor to spin the drum about the spin axis at the wash orientation.

Implementations of the device may include one or more of the following features.

In examples, the device further includes an encoder disposed on the pivot shaft, the encoder being configured to detect a degree of rotation of the driven pivot shaft about the pivot axis. The controller is further configured to receive a signal from the encoder indicative of a rotational orientation of the pivot shaft while the pivot motor is driving the pivot shaft. The controller is further configured to execute one or more instructions of the washing and drying routine based at least in part on receiving the signal from the encoder. The controller is further configured to operate the pivot motor to rotate the frame at the start and finish of the washing and drying routine.

In examples, the device further includes an accelerometer disposed on the tub, the accelerometer being in wired or wireless communication with the controller and being configured to detect a degree of rotation of the tub and drum about the pivot axis.

In examples, the device further includes a removable door configured to selectively seal the opening. The device can further include a compressible O-ring disposed on a mating surface between the removable door and the opening of the drum.

In examples, the device further includes a movable stage configured to hold and release the removable door for selective engagement with the opening. A drive of the movable stage can be in operable communication with the controller, and the controller is further configured to instruct sealing and unsealing the opening with the removable door. The movable stage is configured to at least one of remove and seat the removable door with the opening with the spin axis being tilted at a door removal and seating angle. In examples, the door removal and seating angle is the same angle as the wash orientation angle. In examples, the door removal and seating angle is an angle above horizontal that is within 1 to 10 degrees of the wash orientation angle.

In examples, the movable stage is configured to seat the removable door in the opening prior to the controller executing the washing and drying routine. In examples, the movable stage is configured to remove the removable door from the opening following completion of the washing and drying routine.

In examples, the movable stage includes one or more actuatable suctions for holding the door. In examples, each one of the one or more actuatable suctions is in operable communication with an actuatable piston. In examples, the actuatable piston is in operable communication with the controller.

In examples, the removable door includes an air outlet orifice through which air is drawn from the drum during a drying segment of the washing and drying routine. In examples, the air outlet orifice is configured to receive an air vent hose. The air vent hose can include a lint filter disposed between the air outlet orifice and a blower. In examples, the device further includes a rigid conduit configured to engage the air outlet orifice for receiving the air vent hose. The rigid conduit can include an elbow pipe configured to route air from the drum outward and upward into the air vent hose.

In examples, the device further includes a screen extending across the air outlet orifice for entrapping at least one of lint and debris. In examples, the device can include an actuatable cleaner in communication with the controller, the actuatable cleaner including at least one of a wiper blade configured to swipe across the screen when the door is removed from the opening, car wash style brushes configured to engage the screen when the door is removed from the opening, an air curtain, and a water spray. In examples, the screen is removable for cleaning. In examples, the controller is further configured to run a lint removal cycle comprising at least one of blowing air and running water through the screen.

In examples, the tub further includes an air inlet orifice at the drive end of the tub such that air flows through the drum from the air inlet orifice to the air outlet orifice. The air inlet orifice can be positioned at least one of at the center of the door and adjacent one of the top or the bottom of the tub and the air outlet orifice is positioned adjacent another of the top or the bottom of the tub and flow of air travels diagonally through the drum from the drive end to the front end.

In examples, the device further includes one or more latches configured to retain the removable door sealed with the opening of the drum. The one or more latches can comprise at least one of a bistable latch, an electromagnet, a pneumatic latch, a servomotor latch, and a solenoid latch.

In examples, a mating face of the removable door includes a bevel configured to protrude into the opening of the drum. The bevel can include a depth in a range of between about 30 to 45 mm as measured from an inner surface of the removable door to an inner surface of a mating flange of the removable door. In implementations, the bevel can include a depth in a range of between about 5 to 10 percent of a diameter of the removable door. The bevel includes a slope in a range of between about 40 degrees to 65 degrees. The bevel is configured to accommodate a vertical shift of the opening of the drum in a range of about 5 to 10 mm in at least one of an upward and downward displacement. In examples, when the door mating surface is seated against a front surface of the tub, an inner surface of the door protrudes into the drum at a depth in a range of between about 5 mm to 45 mm past the opening of the drum lip.

In examples, the device further includes at least two dampers configured to connect to the tub and the frame, wherein one of the at least two dampers includes a displacement sensor. In examples, the displacement sensor is a spring return linear displacement sensor disposed in one or more of the at least two dampers.

In examples, the pivot shaft includes a pair of coaxial pivot shafts configured to operably engage two opposing sides of the rigid frame extending between a front end of the frame substantially parallel to the front end of the tub and a back end of the rigid frame substantially parallel to the drive end of the tub. Each of the pair of coaxial pivot shafts is configured to be supported by radial bearings disposed in a corresponding support pillar positioned astride the rigid frame. In examples, the pivot motor is configured to engage one of the pair of coaxial pivot shafts. In examples, the pivot motor is disposed on a corresponding support pillar of the engaged one of the pair of coaxial pivot shafts. In examples, the pivot shaft is configured to suspend the rigid frame above at least one of a support surface and a receiving container by a height greater than a distance from a pivot axis to either of a front end and a back end of the rigid frame. The pivot axis can be substantially aligned with a center of gravity of the washing and drying device. In examples, the device further includes two or more protrusions extending from the two opposing sides of the rigid frame and configured to abut the corresponding support pillars in at least one of the vertically upright orientation and substantially vertically inverted orientation.

In examples, the pivot axis is substantially aligned with a center of gravity of the washing and drying device.

In examples, the controller is further configured to rotate the drum about the pivot axis from the wash orientation to the substantially vertically inverted orientation to drop the at least one deformable article from the drum. The substantially vertically inverted orientation can include the spin axis being at an angle tilted down from horizontal in a range of between about 40 to 80 degrees. In examples, the substantially vertically inverted orientation includes the spin axis being at an angle tilted down from horizontal of about 70 degrees. In examples, the substantially vertically inverted orientation comprises the spin axis being tilted down from horizontal by 90 degrees.

In examples, the spin axis is substantially horizontal at the wash orientation.

In examples, the spin axis is inclined at an angle in a range of between about 1 to 20 degrees above horizontal at the wash orientation. The spin axis can be inclined at an angle of about 7.5 degrees above horizontal at the wash orientation.

In examples, the drum includes a plurality of perforations for air and liquid ingress from the tub into the drum.

In examples, the tub is watertight.

In examples, the device further includes two or more ribs disposed on an interior surface of the drum, the two or more ribs configured to agitate the at least one deformable article. The two or more ribs can include a plurality of perforations for air and liquid ingress from the tub into the drum.

In examples, the drum is substantially cylindrical and comprises a conical taper adjacent the front end for guiding the at least one deformable article out of the drum in the substantially inverted orientation.

In examples, the bidirectional drive motor comprises at least one of a variable frequency drive, s servomotor or induction motor, a BLDC motor, a brushed DC motor, and another rotary actuator configured to spin the drum in opposite spin directions. The drive motor is configured to spin the drum at a maximum speed in a range of between about 600 to 1400 RPM. The drive motor is configured to spin the drum with a centripetal acceleration in a range of between about 350 g to 450 g.

In examples, the device further includes two or more dampers configured to mount to an underside of the tub and extend between an outer surface of the tub and the rigid frame. The two or more dampers can be at least one of linear viscous dampers and frictional dampers.

In examples, the device further includes at least one rigid flange protruding from an outer surface of the tub, the at least one rigid flange configured to be received in a gap between a pair of bumpers disposed on the rigid frame. In examples, both faces of the at least one rigid flange are substantially parallel to the front end of the tub. The at least one rigid flange received in the gap does not contact the pair of bumpers in the wash orientation.

In examples, the device further includes the two or more pairs of bumpers disposed on and evenly distributed about the rigid frame, and the two or more pairs of bumpers configured to receive thereon the at least one rigid flange and support the weight of the tub and drum in at least one of the vertically upright orientation and substantially vertical orientation. In examples, the two or more pairs of bumpers includes three forward facing bumpers and three rear facing bumpers. In some examples each pair of the three forward facing bumpers and three rear facing bumpers are coaxially aligned. In other examples, the forward facing bumper and rear facing bumper of each pair are not directly opposed and are axially offset from each other.

In examples, the at least one rigid flange comprises a circular flange surrounding the tub. The at least one rigid flange can include three triangular flanges evenly spaced about the circumference of the tub. The three triangular flanges can form a triangle aligned through the center of gravity of the tub and drum. The two or more pairs of bumpers can include three pairs of bumpers configured to receive a corresponding one of the three triangular flanges.

In examples, the controller is in at least one of wired and wireless communication with a communication network and is further configured to receive the parameters via the communication network. In examples, the parameters can be determined by an autonomous separating and sorting robot in communication with the communication network, the autonomous separating and sorting robot being configured to provide the deformable article to the washing and drying device. In examples, the parameters are received by a remote terminal in communication with the communication network. A user of the remote terminal can provide the parameters and the parameters are stored in a memory in communication with the controller.

In examples, an autonomous separating and sorting robot in communication with the communication network is configured to provide the deformable article to the washing and drying device. The autonomous separating and sorting robot determines one or more characteristics of the at least one deformable article, and the autonomous separating and sorting robot communicates the one or more characteristics of the at least one deformable article to the controller of the washing and drying device via the communication network.

In examples, the controller is further configured to determine the wash parameters based on the received one or more characteristics. The wash parameters can be stored in a memory in communication with the controller. The wash parameters can be stored in a look up table cross referenced with the one or more characteristics. In examples, the received one or more characteristics is at least one of a material composition, weight, color, and size of the at least one deformable article. In examples, the wash parameters include at least one of wash cycle temperature, cleaning and rinse agent amounts and concentrations, wash cycle duration (e.g., one or more soak and agitation cycles), number and duration of rinse cycles, soak cycle duration, washing cycle agitation speed (e.g., for delicate, normal, and heavy loads), maximum spin speed during fluid (e.g., water and/or chemicals) extraction, wash detergent selection and concentration, number of rinse cycles, drying air temperature, drying airflow rate, and a minimum size device for receiving each load of at least one deformable article.

In examples, the tub includes a cleaning water inlet, a wastewater outlet, and an air inlet orifice configured to receive a heated air conduit. The heated air inlet orifice can be disposed in a wall at the drive end of the tub. The cleaning water inlet can be disposed on an upper half of the tub and is configured to receive at least one of water and one or more laundry chemicals. The one or more laundry chemicals include at least one of a detergent, a bleach, a fabric softener, bluing, a souring agent, boosters, and a rinse agent. In examples, the wastewater outlet is configured to be disposed in the bottom half of the tub. In examples, the controller is configured to pivot the frame to locate the wastewater outlet at the lowest point of the tub during draining.

In examples, the device further includes flexible conduits configured to mate with each of the air inlet orifice and the cleaning water inlet. The flexible conduits mated with at least the air outlet orifice is configured to be routed along a top of the rigid frame for moving with the frame during pivoting. The one or more of the flexible conduits can be expandable.

In examples, the device further comprises a pump in communication with the wastewater outlet configured to drain water from the drum and tub. In examples, the device further includes at least one of a pinch valve, a butterfly valve, a flap, a water reservoir, and a strainer disposed between the wastewater outlet and the pump. In examples, the device further includes a sump in communication with the wastewater outlet configured to receive wastewater from the drum and tub.

In examples, the controller is further in operable communication with an autonomous loader disposed above the drum and configured to instruct the autonomous loader to release the deformable article to the drum while the frame is in the vertically upright orientation. The autonomous loader can be a funnel comprising a holding volume adjacent a downspout and an actuated wall disposed between the holding volume and the downspout for selectively releasing the at least one deformable article through the downspout into the opening of the drum positioned therebeneath. In examples, the autonomous loader is configured to transit along rails to one of a plurality of devices in a cluster. In examples, the device further includes an autonomous bin tipper in operable communication with the controller, the controller being configured to actuate the bin tipper to release the one or more deformable articles into the holding volume. In examples, the device further includes a conveyor for porting a bin containing the at least one deformable article from an autonomous separating and sorting robot to the bin tipper.

In examples, the device further includes a clean bin disposed beneath the washing and drying device for receiving the at least one deformable article dropped from the drum in the substantially inverted orientation. The clean bin can be disposed beneath a movable cover and the controller can be configured to instruct opening the movable cover before dropping the at least one deformable article from the drum.

In examples, the at least one deformable article includes soiled laundry. The at least one deformable article can include presorted, household laundry. The at least one deformable article can be one of a plurality of deformable laundry articles including two or more article types of at least one of different sizes and different shapes.

In one example, a method of autonomously washing and drying at least one deformable article with a combination washer and dryer includes receiving, at a controller in communication with the combination washer and dryer, a request to begin a washing and drying cycle. The method includes instructing, in response to the request, the pivot motor to rotate the combination washer and dryer upward such that an opening of the combination washer and dryer faces upward, the pivoted opening being configured to receive the at least one deformable article therein. The method includes determining, based on an output signal of a position sensor in communication with the pivot motor, that the opening of the faces upward, instructing an autonomous loader disposed above the combination washer and dryer and in operable communication with the controller to release the at least one deformable article to the combination washer and dryer, instructing the pivot motor to pivot the combination washer and dryer to a washing and drying angle in a range of between about 0 degrees to 20 degrees from horizontal, instructing, in response to the output signal indicating the combination washer and dryer being pivoted to at least one of the washing and drying angle and a door seating angle, an autonomous door loader to seat a removable door in the opening, actuating one or more latches to a locked position attaching the door to the combination washer and dryer in a watertight mating, receiving a sensor signal indicative of the removable door being seated and latched, and executing, in response to detecting the removable door being seated and latched, a washing and drying routine based on parameters. In examples, the angles for washing, drying, and seating are at least one of identical or different. In examples, the angles for washing, drying, and seating all includes an angle in a range of between about 0 degrees to 20 degrees from horizontal. Upon detecting completion of the washing and drying routine, the method includes actuating the one or more latches to an unlocked position, instructing the door loader to remove the removable door from the opening, and instructing the pivot motor to invert the combination washer and dryer with the opening angled downward for dropping the washed and dried at least one deformable article from the combination washer and dryer.

Implementations of the method may include one or more of the following features.

In examples, the inverted opening is angled downward in a range of about 20 to 40 degrees from vertical.

In examples, the pivot motor is configured to rotate a pivot shaft aligned with a center of gravity of the combination washer and dryer. In examples, the pivot shaft is configured to engage a rigid frame in which the combination washer and dryer is suspended by at least two springs, wherein instructing the pivot drive to rotate the combination washer and dryer comprises rotating the rigid frame.

In examples, the combination washer and dryer is configured to rotate in a range between about 0 to 180 degrees from vertically upward to vertically downward. The position sensor output signal indicates rotational position. The sensor signal can be output by an encoder mounted in the pivot shaft, the encoder being in at least one of wired and wireless communication with the controller. The sensor signal can be output by a gyroscope disposed on the combination washer and dryer, the gyroscope being in at least one of wired and wireless communication with the controller. The sensor signal can be output by an IMU disposed on the combination washer and dryer, the IMU being in at least one of wired and wireless communication with the controller. The sensor signal can be output by an accelerometer disposed on the combination washer and dryer, the accelerometer being in wired or wireless communication with the controller and being configured to at least one of detect a degree of rotation of the combination washer and dryer about the pivot axis and an imbalance of the spinning tub and drum.

In examples, the method further includes determining one or more washing and drying parameters based on one or more characteristics of the at least one deformable article. The combination washer and dryer can include one or more sensors in at least one of wired and wireless communication with the controller, the one or more sensors outputting a signal indicative of at least one of air temperature, water flow, humidity, water level, and weight.

In examples, the one or more characteristics of the deformable article includes at least one of volume, material composition, color, and weight.

In examples, the one or more washing and drying parameters include at least one of water temperature, wash duration, agitation intensity, air temperature, and drying time.

In examples, the washing and drying routine includes drawing water and one or more laundry chemicals into the combination washer and dryer, spinning the combination washer and dryer about a spin axis substantially perpendicular to the opening, draining wastewater out of the combination washer and dryer, and drawing air into an interior volume of the combination washer and dryer.

In examples, the method further includes receiving an output signal from an alignment sensor wired or wireless communication with the controller, the output signal being indicative of alignment of the removable door to the opening during seating. The alignment sensor can include at least one of a camera, an optical break beam, a hall sensor, a proximity sensor, and an IR sensor.

In examples, the method further includes receiving a signal from at least one of a humidity sensor and a temperature sensor disposed within the air outlet conduit for measuring a temperature of the exhaust air prior to instructing the pivot motor to rotate the washer and dryer to an inverted position, the signal indicating that the at least one deformable article disposed within the drum is dry.

In examples, the method further includes receiving a signal from a camera comprising a field of view aimed through the opening of the combination washer and dryer during emptying. In examples, the method further includes processing the camera signal to determine the combination washer and dryer is empty. In examples, the method further includes determining the combination washer and dryer retains at least one deformable article. In examples, the method further includes rotating a drum of the combination washer and dryer to shake the at least one deformable article from the combination washer and dryer. The rotating can include alternating, bi-directional rotation.

In one example, autonomous system for washing and drying household laundry includes a plurality of autonomous combination washer and dryers and a controller. Each one of the plurality of autonomous combination washer and dryers includes a rigid frame mounted to a pivot axis, the pivot axis being configured to be driven by a pivot motor through a rotational arc of between about 0 to 180 degrees for receiving household laundry into the washer and dryer in an upright orientation and dropping household laundry from the washer and dryer in an inverted orientation. Each one of the plurality of autonomous combination washer and dryers includes a perforated drum disposed within a watertight tub and configured to be mated thereto at a drive end opposite an opening, the drive end comprising a drive motor configured to spin the drum about a spin axis extending between the drive end and the opening. The spin axis is perpendicular to the pivot axis, and the pivot axis is configured to be substantially aligned with a center of gravity of the combination washer and dryer. Each one of the plurality of autonomous combination washer and dryers includes a heated air orifice disposed in the drive end of the tub, and a detachable door comprising an air vent orifice configured to receive an air vent conduit such that air flows from the heated air orifice to the air vent orifice during a drying cycle while the detachable door seals the opening. The controller is in operable communication with the pivot motor and drive motor.

Implementations of the system may include one or more of the following features.

In examples, the system further includes a raised rail disposed adjacent the plurality autonomous combination washer and dryers, the raised rail configured to support thereon a driven carrier in operable communication with the controller and being configured to retrieve, hold, and reseat a removable door in an opening of one of the plurality of autonomous combination washer and dryers.

In examples, the system further includes a plurality of sensors disposed on the raised rail, the plurality of sensors configured to output a signal to the controller indicative of alignment of the driven carrier with one of the plurality of autonomous combination washer and dryers. The plurality of sensors disposed on the raised rail can include one or more limit switch sensors configured to output a signal to the controller to stop the driven carrier in front of each of the plurality of autonomous combination washer and dryers.

In examples, the system further includes an incremental linear encoder disposed on a drive motor of the driven carrier, the incremental linear encoder being configured to output a signal to the controller indicative of an absolute of position of the driven carrier on the raised rail.

In examples, the system further includes a plurality of autonomous loaders configured to be disposed above a corresponding one of the plurality of autonomous combination washer and dryers, each of the plurality of autonomous loaders being configured to drop dirty household laundry into the opening of the corresponding one of the plurality of autonomous combination washer and dryers.

In examples, the system further includes one or more heat pumps in fluid communication with the plurality of washer and dryers.

In examples, the system further includes one or more centralized services in fluid communication with the plurality of washer and dryers, the one or more centralized services providing at least one of air, water, heated water, wastewater reclamation, and one or more laundry chemicals.

In examples, the household laundry comprises at least one soiled deformable article includes. The at least one deformable article can include presorted, household laundry. The at least one deformable article can be one of a plurality of deformable laundry articles including two or more article types of at least one of different sizes and different shapes.

BRIEF DESCRIPTION OF THE DRAWINGS

FIG. 6B depicts a front perspective view of the autonomous washing and drying device of FIG. 6A in a vertically upright orientation for autonomous loading.

FIG. 6C depicts a front perspective view of the autonomous washing and drying device of FIG. 6A angled downward from horizontal for autonomous unloading.

FIG. 32A depicts a side view schematic of the door removal and replacement system of FIG. 30 with a partial cut away view showing a contact between an end effector and the door.

FIG. 32B depicts an end view schematic of a portion of a door removal and replacement system for a plurality of autonomous washing and drying devices.

FIG. 36 depicts a partial cross section side view of a suction of the door removal and replacement system of FIG. 35B.

FIG. 44 depicts an end view of the portion of the movable stage and rail of FIG. 42.

FIG. 46A depicts a side perspective view of an autonomous dirty laundry loader.

FIG. 46B depicts a cross section view of the autonomous loader of FIG. 46A.

FIG. 49A depicts an autonomous dirty laundry bin tipper for loading dirty laundry into an autonomous washing and drying device from a bin held therein.

FIG. 49B depicts the autonomous dirty laundry bin tipper of FIG. 49A in a partially overturned rotational position.

FIG. 49C depicts the autonomous dirty laundry bin tipper of FIG. 49A in a fully inverted rotational position.

DETAILED DESCRIPTION

This disclosure relates to autonomous robotic devices, systems, and methods for handling residential loads of laundry. The system includes one or more autonomous process lines comprising a plurality of autonomous robotic devices configured to work in concert to process one or more dirty loads of household laundry from a collection of dirty, non-uniform and potentially dissimilar articles (e.g., dissimilar size, shape, material, and/or type) to individually separated, cleaned, and folded laundry articles. The plurality of autonomous robotic devices operate without human intervention to efficiently and effectively launder a plurality of customers' dirty items. This disclosure relates to autonomous robotic devices configured to wash and dry loads of deformable laundry articles automatically introduced to a combined washer dryer and automatically removed from the combined washer dryer for introduction to a clean laundry separating robot. Laundry articles are collected from households and delivered to the process line for cleaning, packing, and returning to the households. The autonomous processes are time and cost efficient, eliminate human intervention-based delays, eliminate line workers and associated potential introduction of human contaminants introduced by line workers, and eliminate any concerns with having private personal items handled (e.g., directly touched) by strangers.

Figure 1:
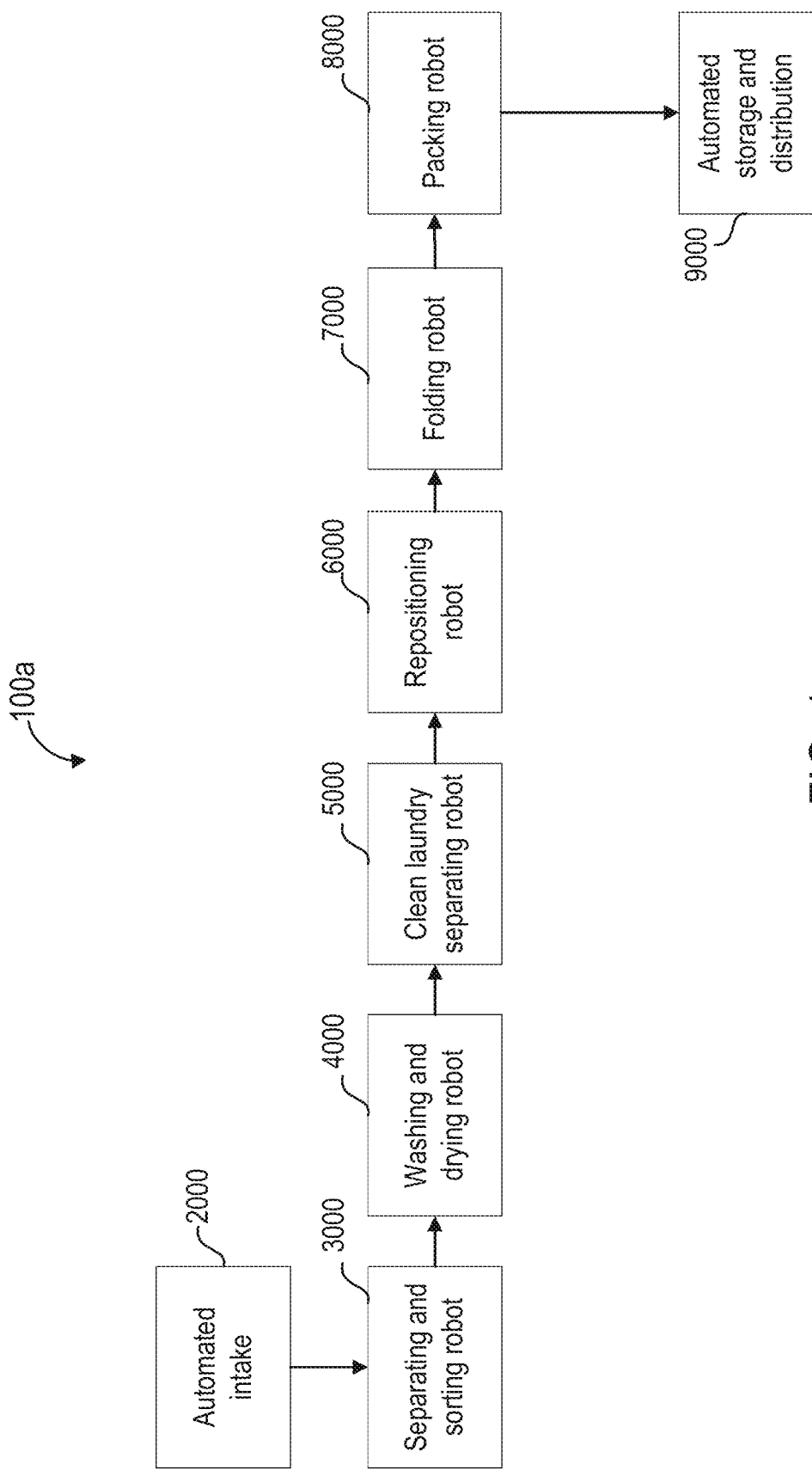
FIG. 1 depicts a schematic of an example autonomous robotic laundry process line.

As shown in FIG. 1, in implementations of the system, a process line 100a comprises a plurality of autonomous robots configured to operate in series without human intervention to process and transport dirty laundry through the cleaning process, and fold and repackage the clean laundry for return to a household. In one implementation, the process line 100a comprises an automated intake robot 2000 for receiving a load of dirty household laundry comprising a plurality of deformable laundry articles. The deformable laundry articles can be non-uniform in type, size, shape, color, and fabric. For example, the plurality of deformable laundry articles can include items commonly laundered in homes, such as sheets, towels, table cloths, and adult and children's garments, for example, tee shirts, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches, or loads, for washing. In implementations, the separating and sorting robot 3000 is configured to intelligently batch the separated each one of the deformable laundry articles according to a programmed sorting algorithm based, for example, on criteria including at least one of material color, material type, customer washing preference, water temperature requirements, and load size (e.g., weight and/or physical volume). In implementations, the separating and sorting robot 3000 is configured to identify and record the number and types of garments in the load of laundry and provide this information to one or more robots in the process line 100a.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for handing off to a repositioning robot 6000. In implementations, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles in a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Figure 2:
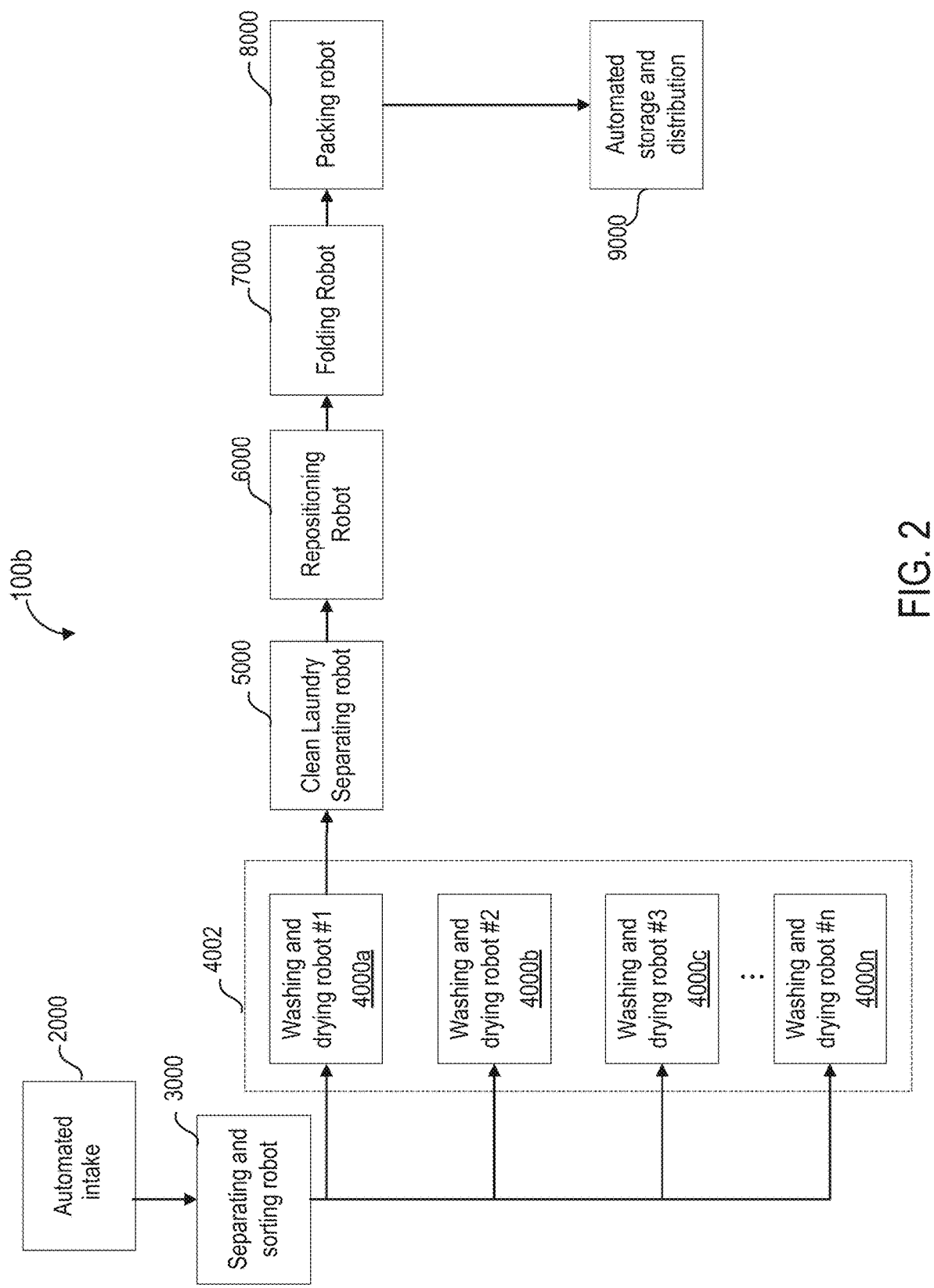
FIG. 2 depicts a schematic of an example autonomous robotic laundry process line including one intake and output and a plurality of washing and drying robots.

Implementations of the process line 100a of household laundry cleaning robots can comprise one or more of each of the robots depicted in FIG. 1. For example, as shown in FIG. 2, each autonomous process line 100b can include a bank, or cluster 4002, comprising a plurality of washing and drying robots 4000a-n, wherein "n" represents a total number of robots in the cluster 4002. In implementations, a cluster 4002 comprises a plurality of combination (e.g., dual purpose, single drum) washing and drying robots 4000a-n ranging between about 3 to 120 washing and drying robots 4000a-n. Each washing and drying robot 4000, 4000a-n comprises a single tub for sequential washing and drying of a single load of laundry disposed therein. Each washing and drying robot 4000 therefore is configured to sequentially wash and drying a load of deformable laundry articles 12 without requiring a transfer of wet articles from a wash drum to a separate dry drum. This protects the wet articles 12 from handling damage in their wet, more vulnerable state, prevents one or more articles from being accidentally dropped and lost from a customer's load of articles 12, and efficiently processes the load of deformable laundry articles 12 without the added time associated with transferring between a separate washing machine drum and dryer drum. In implementations, a cluster 4002 comprises between about 6 to 24 washing and drying robots 4000a-n.

Figure 3:
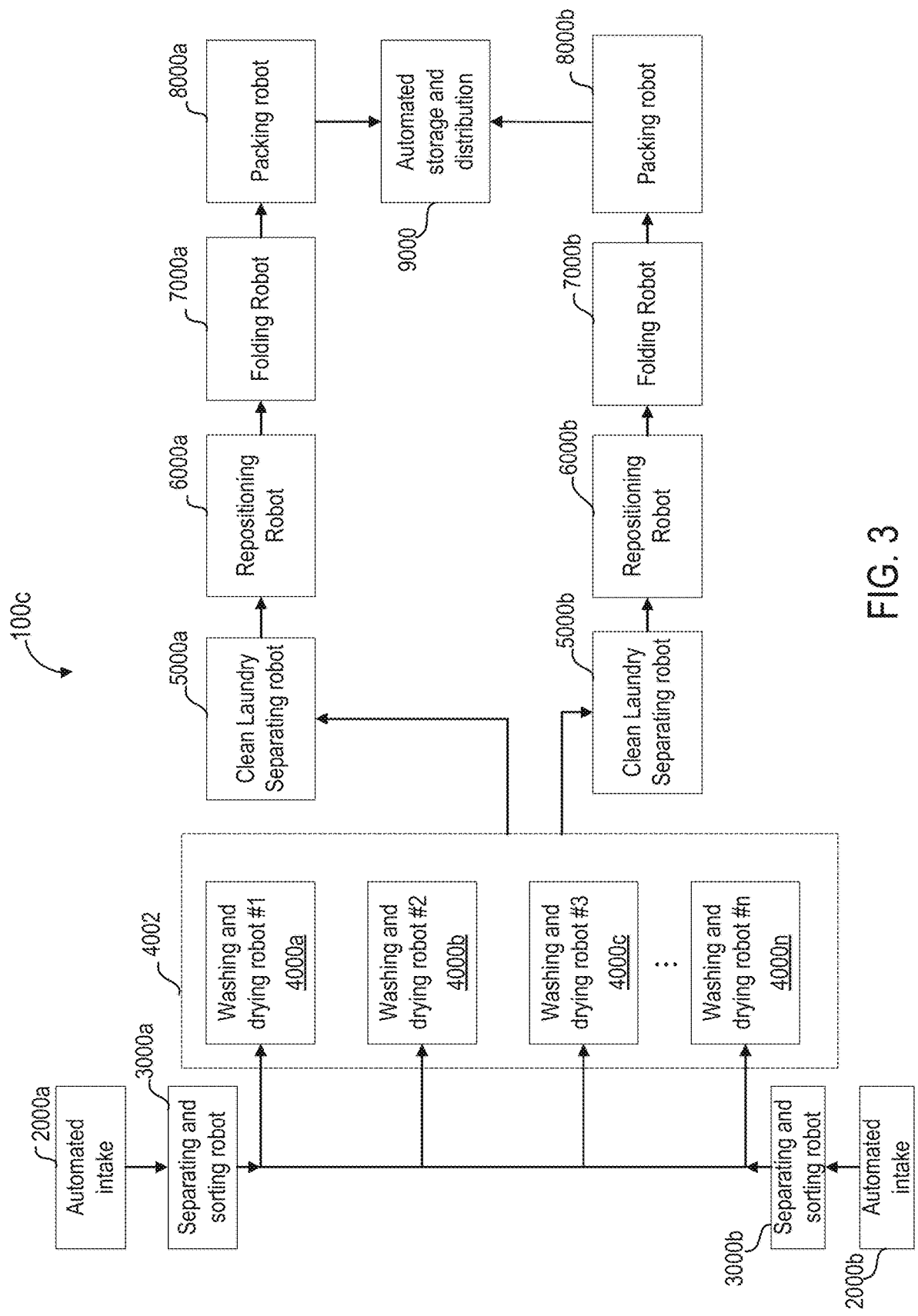
FIG. 3 depicts a schematic of a plurality of autonomous robotic laundry process lines including a plurality of intakes and outputs and a plurality of washing and drying robots.

In implementations, a cluster 4002 comprises around 12 washing and drying robots 4000a-n. In other implementations, as shown in FIG. 3, the autonomous process line 100c includes a cluster 4002 of combination washing and drying robots 4000a-n shared by two or more sets of automated intake robots 2000a-b and dirty laundry separating and sorting robots 3000a-b and two or more sets of clean laundry separating robots 5000a-b, repositioning robots 6000a-b, folding robots 7000a-b, and packing robots 8000a-b. In implementations, each washing and drying robot 4000, 4000a-n comprises a single tub for sequential washing and drying of a single load of laundry disposed therein. Additionally, two or more of the robots can be combined in a single module in alternate implementations. In implementations, one or more of the robots in the process line 100a-c are configured to communicate over wired connections or wireless communication protocols. For example, in implementations, one or more robots in the process line 100a-c can communicate with another one or more robots in the process line 100a-c over a wired BUS, LAN, WLAN, 4G, 5G, LTE, Ethernet, BLUETOOTH, or other IEEE 801.11 standard.

Figure 4:
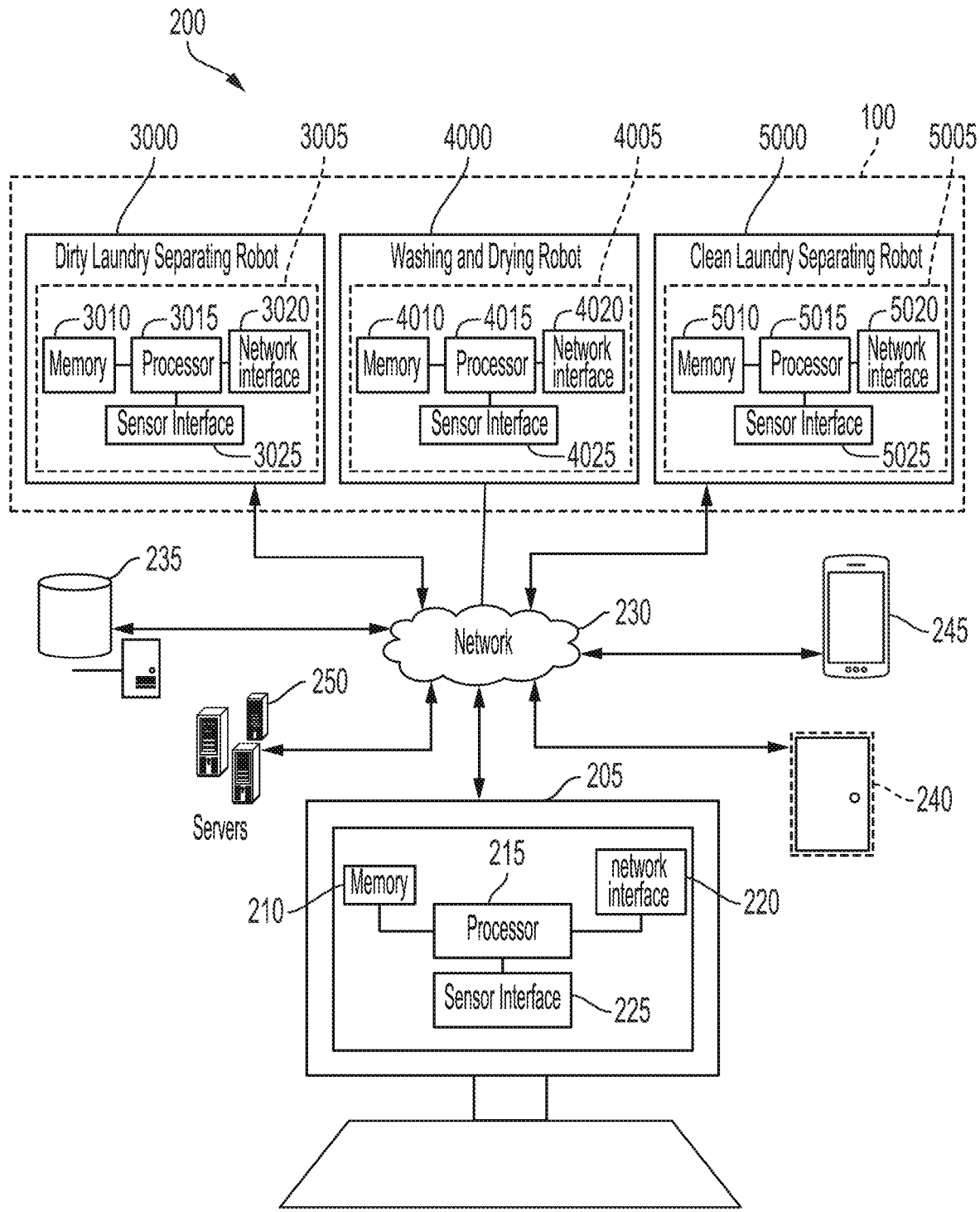
FIG. 4 depicts a schematic example of a system for controlling an autonomous robotic laundry process line.

Referring to FIG. 4, an example of a communication and interoperative control system 200 of operatively connected robots is shown. FIG. 4 depicts a schematic implementation of a portion of an autonomous robotic process line 100, 100a-c. A washing and drying robot 4000 is in operative communication with one or more dirty laundry separating and sorting robots 3000 configured to provide autonomously sorted and batched loads of dirty deformable laundry articles to the washing and drying robot 4000 for washing and drying. The washing and drying robot 4000 is in operative communication with one or more clean laundry separating robots 5000 and outputs a load of clean laundry for separation by a clean laundry separating robot 5000. Each robot 3000, 4000, 5000 includes a controller 3005, 4005, 5005 configured to operate the associated robot.

For example, in implementations, the washing and drying robot 4000 includes a controller 4005. The controller 4005 includes a processor 4015 in communication with a memory 4010, a network interface 4020, and a sensor interface 4025. The processor 4015 can be a single microprocessor, multiple microprocessors, a many-core processor, a microcontroller, and/or any other general purpose computing system that can be configured by software and/or firmware. In implementations, the memory 4010 contains any of a variety of software applications, data structures, files and/or databases. In one implementation, the controller 4005 includes dedicated hardware, such as single-board computers, application specific integrated circuits (ASICs), and field programmable gate arrays (FPGAs).

A network interface 4020 is configured to couple the controller 4005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 6020 is coupled to the network 230 via a networking device, such as a bridge, router, or hub. In other implementations, the network 230 may involve only two endpoints that each have a network connection directly with the other. In implementations, the network interface 4020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 4005 can transmit data via the network interface 4020 using a variety of security measures including, for example, TLS, SSL or VPN. In implementations, the network interface 4020 includes both a physical interface configured for wireless communication and a physical interface configured for wired communication. According to various embodiments, the network interface 4020 enables communication between the controller 4005 of the washing and drying robot 4000 and/or one or more clusters 4002 of washing and drying robots 4000 and at least one of the plurality of robots 2000, 3000, 5000, 6000, 7000, 8000, 9000 of the process line 100, 100a-c.

Additionally or alternatively, the network interface 4020 is configured to facilitate the communication of information between the processor 4015 and one or more other devices or entities over the network 230. For example, in implementations, the network interface 4020 is configured to communicate with a remote computing device such as a computing terminal 205 (alternatively referred to herein as "CPU 205"), database 235, server 240, smartphone 245, and server farm 250. In implementations, the network interface 4020 can include communications circuitry for at least one of receiving data from a database 235 and transmitting data to a remote server 240, 250. In some implementations, the network interface 4020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 4 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 4005 is described herein in particular, one or more of the plurality of robots 2000, 3000, 5000, 6000, 7000, 8000, 9000 of the process line 100 includes similar components having similar functionality.

Figure 5:
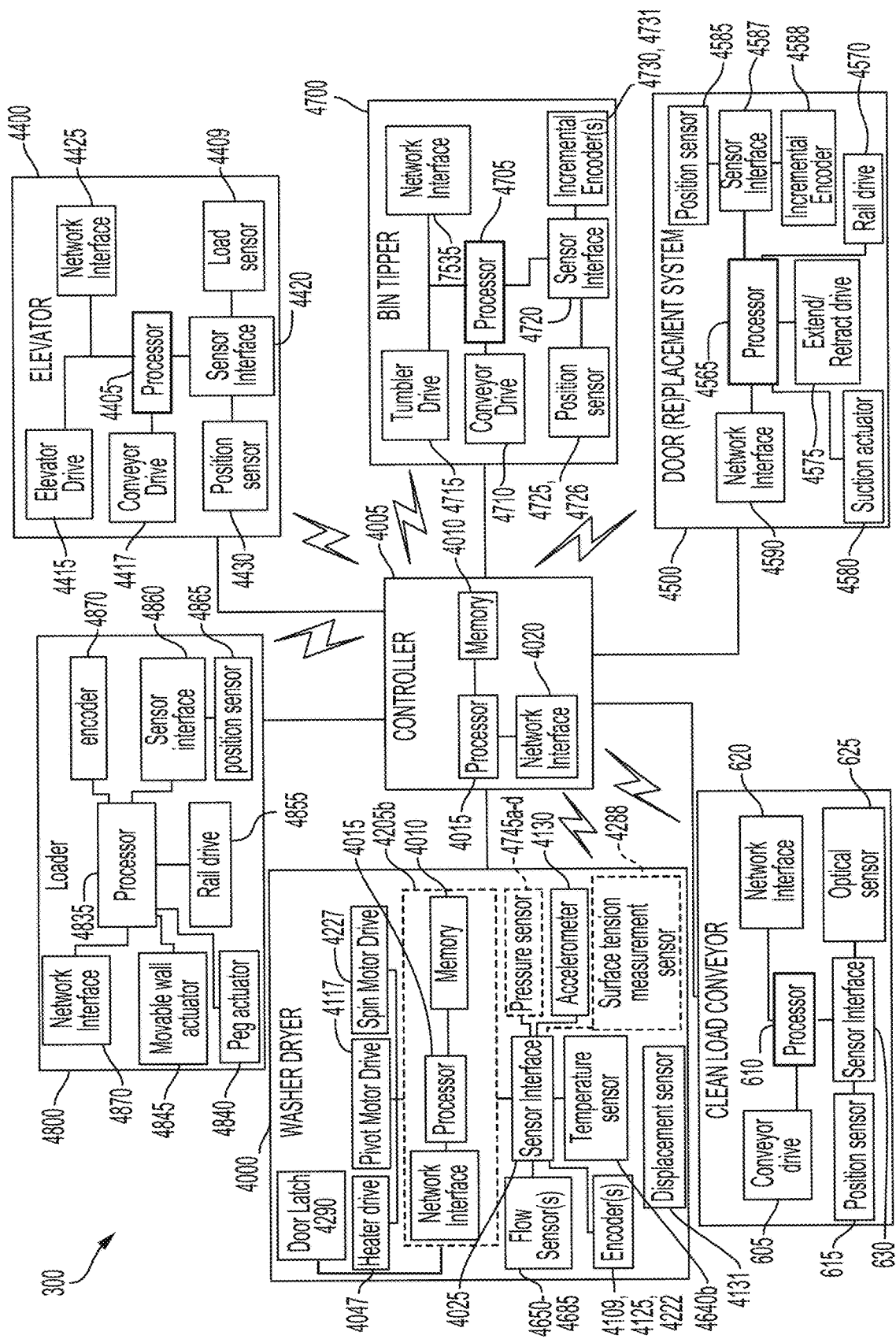
FIG. 5 depicts a schematic example of a system of autonomous devices configured to handle, wash, and dry household laundry articles.

Turning to FIG. 5, a schematic of an implementation of an autonomous washing and drying system 300 is shown. The system 300 includes one or more of the features and devices described with regard to the embodiments of FIGS. 1-4. In implementations, the washing and drying system 300 comprises a plurality of interactive autonomous robotic devices. In implementations the system 300 comprises at least two of a washing and drying robot 4000, an elevator 4400 for raising a bin of dirty articles to a height above the washing and drying robot 4000, a bin tipper for receiving the bin of dirty articles 12 from the elevator and overturning the bin, a funnel 4800 for receiving the tipped dirty laundry from the bin tipper and funneling the laundry into a washing and drying robot 4000, a door replacement system for removing and reseating a door on the washing and drying robot 4000, a clean load conveyor 600 for transiting a bin of clean laundry articles to a clean laundry separating robot 5000 for further autonomous processing, and a controller 4005 in operative configuration with processors and drives of all of the foregoing. Each autonomous device of the implementation of the system 300 of FIG. 5 will subsequently be described with regard to implementations.

Returning to FIGS. 1-3, implementations of a process line 100, 100a-c for washing and drying one or more loads of dirty laundry are shown. In implementations, a large-scale, autonomous laundry facility includes a plurality of process lines 100, 100a-c and a plurality of autonomously operating washing and drying robots 4000, 4000a-n, which intake process water, output grey water after washing loads of laundry, and output cool, humid air after drying loads of laundry with heated intake process air. In implementations, each washing and drying robot 4000, 4000a-n (alternatively referred to herein as an "autonomously actuated washing and drying device 4000," a "device 4000," and a "combination washer and dryer") comprises a combination washing and drying device with a single tub for sequential washing and drying of a single load of laundry. In implementations, the combination washing and drying device 4000 is solely electric powered and does not burn fuel during operation.

Figure 6A:
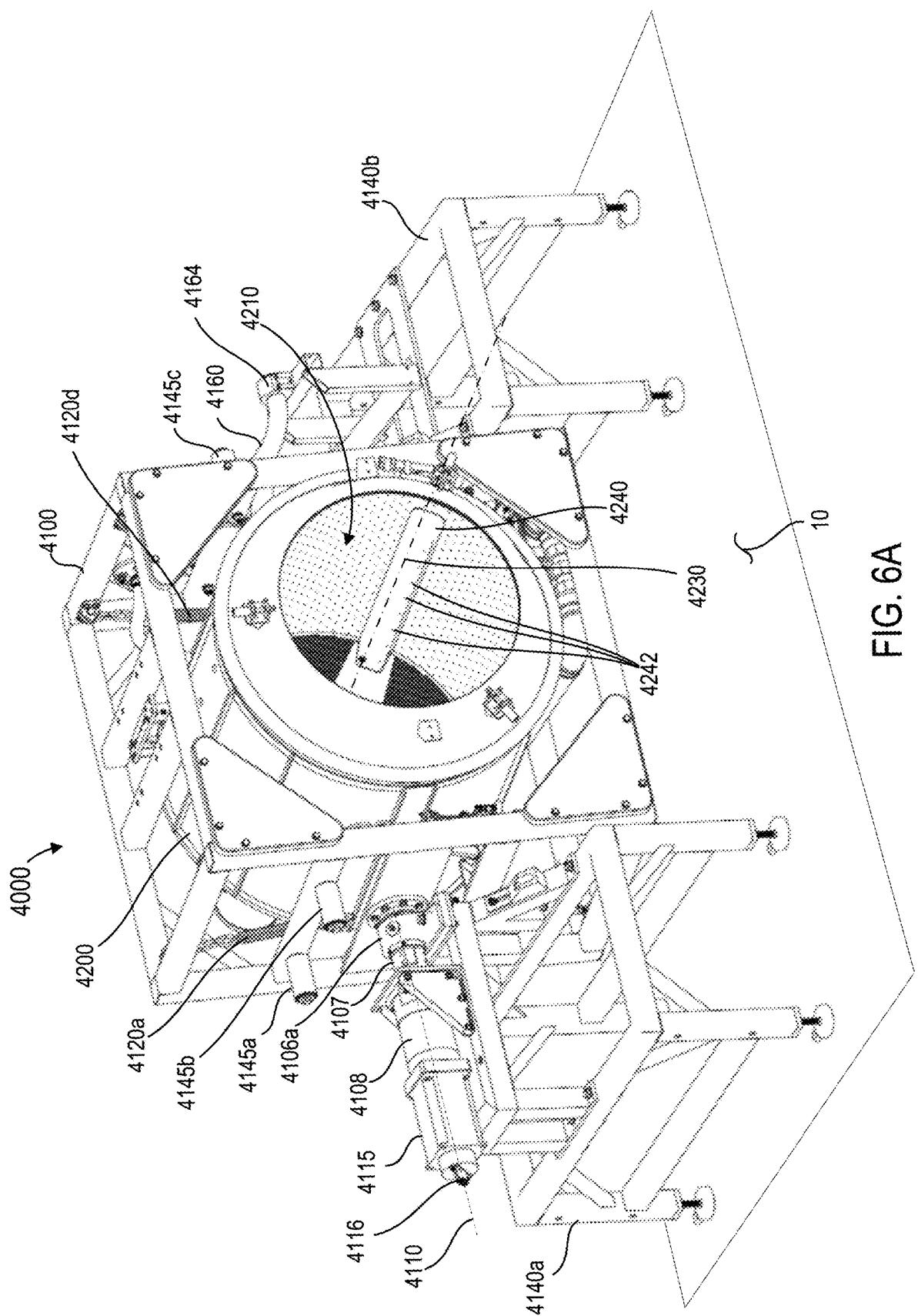
FIG. 6A depicts a front perspective view of an implementation of an autonomous washing and drying device angled upward from horizontal in a washing orientation.
Figure 21:
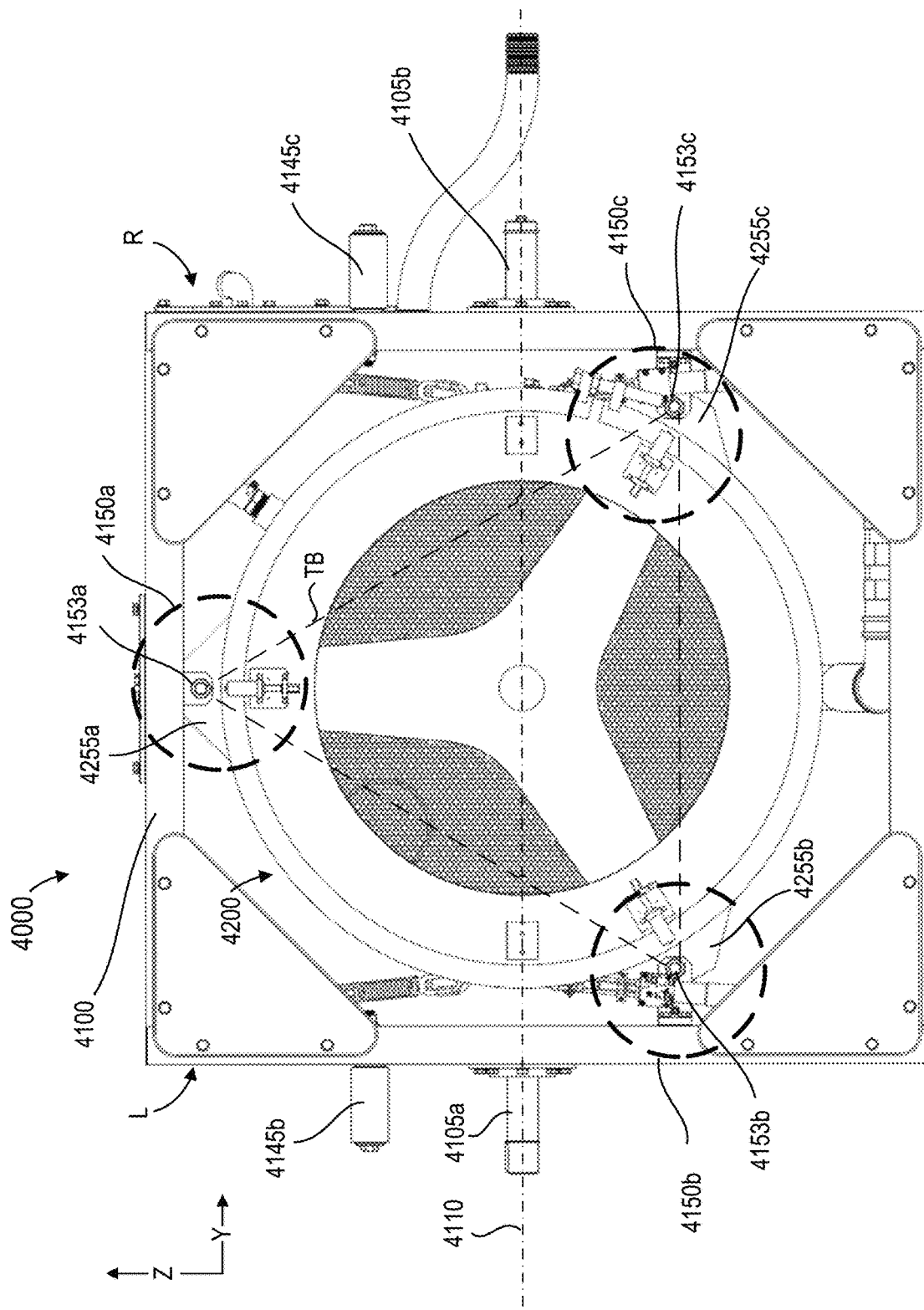
FIG. 21 depicts a front end view of an implementation of a tub and drum assembly of an autonomous washing and drying device comprising external flanges engaged with bumpers on a rigid frame.

Turning now to FIGS. 6A-C, an autonomously actuated washing and drying device 4000 includes a rigid frame 4100 and a tub and drum assembly 4200 comprising a central spin axis 4230 extending between a front end 4212 and drive end 4217 of the drum. In implementations, the rigid frame 4100 comprises one or more pivots shaft 4105, 4105a-b coaxially aligned with a pivot axis 4110. As will be explained subsequently with regard to implementations such as that shown in FIG. 21, the one or more pivot shafts 4105 comprises a pair of coaxially aligned pivot shafts 4105a-b configured to support the weight of the isolation frame 4100 and the tub and drum assembly 4200 from opposite sides.

The one or more pivot shafts 4105 are configured to suspend the rigid frame 4100 above a floor 10, which may be at ground level or which may be a raised platform. The one or more pivot shafts 4105 define a pivot axis 4110 about which the rigid frame 4100 rotates from an upturned orientation to an inverted orientation, with each of a washing orientation, drying orientation, door removal orientation, and door replacement orientation being at one or more rotational positions between the upturned loading orientation and the inverted unloading orientation as will be described subsequently with regard to implementations. In implementations, the front end 4212 of the tub and drum assembly 4200 is higher in elevation than the back end 4217 in an upturned orientation. In implementations, the front end 4212 of the tub and drum assembly 4200 is lower in elevation than the back end 4217 in a substantially inverted orientation. In implementations, the upturned orientation comprises a substantially vertically upright orientation such that the spin axis 4230 is positioned at an angle to horizontal, and the inverted orientation comprises a substantially vertically inverted orientation such that the spin axis 4230 is positioned at an angle to horizontal. For example, in implementations, the rigid frame 4100 can rotate from 0 to 180 degrees, where 0 degrees is a vertically upright position of the spin axis 4230 and 180 degrees is a vertically inverted position of the spin axis 4230. In implementations, the rigid frame can rotate to any rotational position and stop at that angle. For example, the substantially vertically upright position (e.g., FIG. 6B) of the rigid frame 4100 comprises the central spin axis 4230 being in a range of between about 80 to 90 degrees up from horizontal (e.g., 0 to 10 degrees from vertical) and the front end 4212 being at a higher elevation than the back end 4217. For example, the substantially vertically inverted position (e.g., FIG. 6C) comprises the central spin axis 4230 being in a range of between about 60 to 90 degrees down from horizontal (e.g., 150 to 170 degrees from vertically upright) and the front end 4212 being at a lower elevation than the back end 4217.

Figure 10:
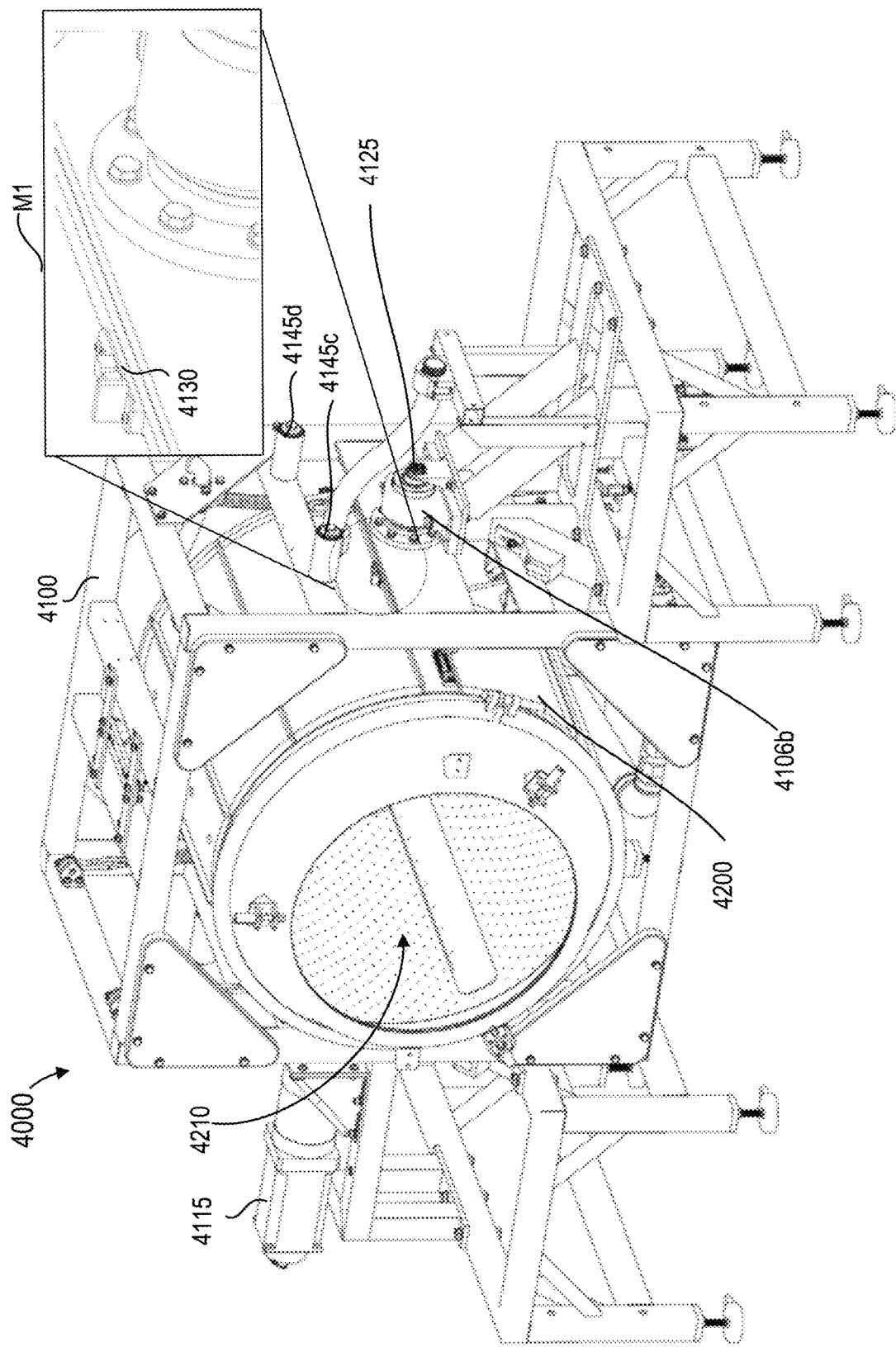
FIG. 10 depicts a front perspective view of an implementation of an autonomous washing and drying device including a portion of a suspension system.

In implementations, the one or more pivot shafts 4105 comprise a pair of coaxially aligned pivot shafts 4105*a-b*, each one of which extends from an opposing side of the rigid frame 4100. A pivot motor 4115 is configured to drive one pivot shaft 4105*a* of the pair of coaxially aligned pivot shafts 4105*a-b* about the pivot axis 4110. As shown in FIGS. 6A-6C, a motor side pivot shaft 4105*a* is configured to extend through a bearing holder 4106*a* for constrained rotation and mate with the pivot motor 4115. Additionally or alternatively, in implementations, the pivot shaft 4105*a* is configured to extend through the bearing holder 4106*a* and engage with a coupling 4107 configured to engage with the pivot motor 4115 to transfer rotational movement. In implementations, a gear box 4108 is configured to be disposed between the pivot motor 4115 and the coupling 4107. As shown in FIGS. 6C and 10, the second pivot shaft 4105*b* is configured to extend through a bearing holder 4106*a* in coaxial alignment with the pivot axis 4110. In implementations, the bearing holders 4106*a-b* are configured to be mounted to corresponding fixed supports 4140*a-b*. The bearing holders 4106*a-b* are configured to receive a respective one of the pair of pivot shafts 4105*a-b* and provide a bearing surface on which the shafts therein rotate. In implementations, the pivot motor 4115 comprises an encoder 4116 for measuring the rotational speed of the pivot shaft 4105 and outputting a signal to the controller 4005 for controlling motion of the pivoting rigid frame 4100. Additionally or alternatively, in implementations at least one absolute encoder 4125 (FIG. 10) disposed on the bearing holder 4106*b* for the non-motor side pivot shaft 4105*b*. The absolute encoder 4125 detects the rotary position (and rotation speed) of the rigid frame 4100 and outputs a signal indicative of the rotary position to the controller 4005. In implementations, the rotation speeds detected and communicated by the pivot shaft encoder 4116 and the absolute encoder 4125 will vary by the ratio of the gear box 4108.

Figure 7:
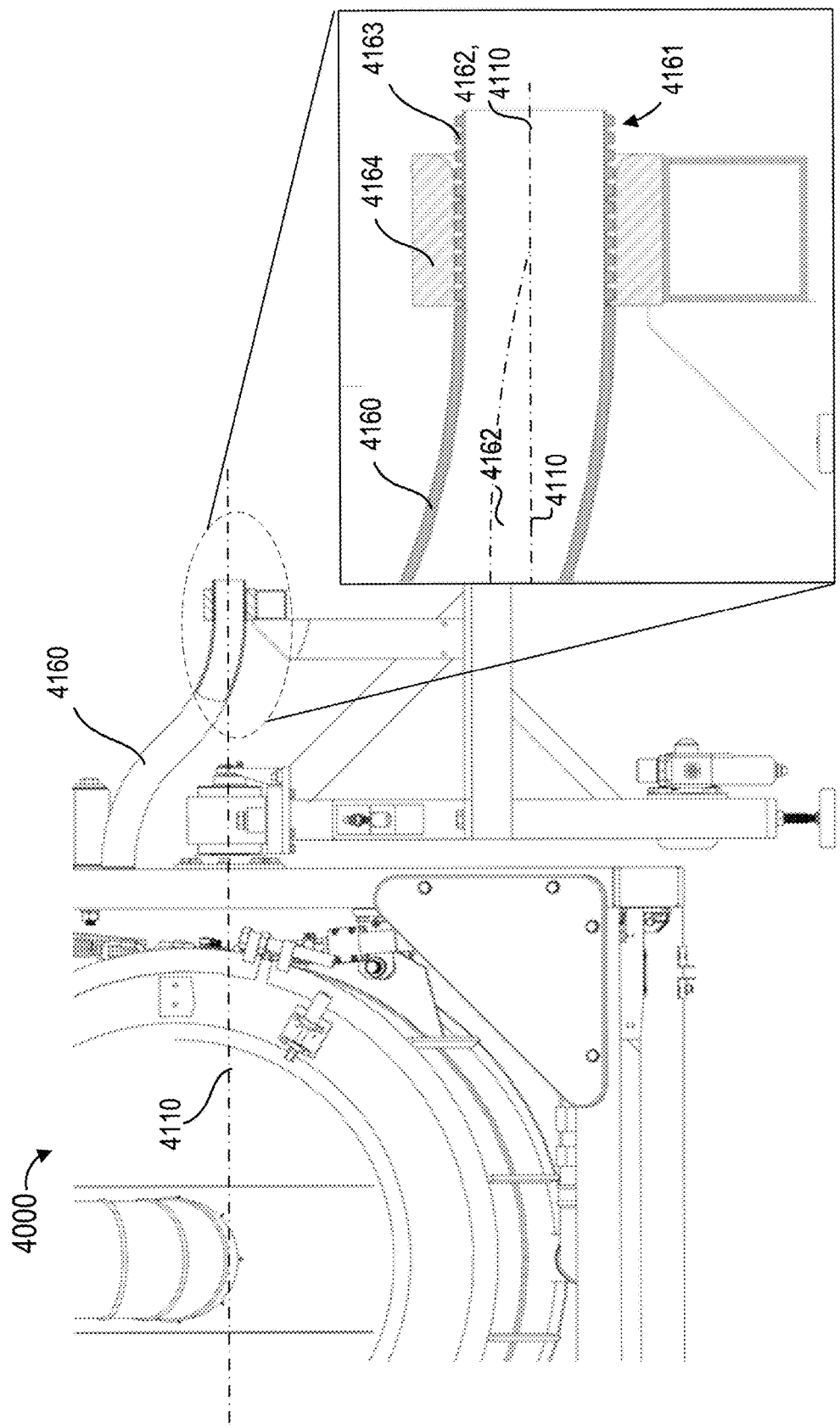
FIG. 7 depicts a magnified view of a rotating conduit portion of the autonomous washing and drying device of FIG. 6A.

While the pivot motor 4115 rotates the rigid frame 4100 and the tub and drum assembly 4200 suspended therein, all water, air, pneumatic, and electric lines running to the device 4000 also move, flex, or bend to accommodate the range of motion without dislodging from the tub and drum assembly 4200. As shown in FIG. 7, in implementations, the device 4000 can include a rotating cable conduit 4160 configured to receive therein at least one of one or more electrical cables and one or more pneumatic tubes controlling or powering items on the tub and drum assembly 4200 and frame 4100, such as door latches, one or more valves, sensors, and drive motors as will be subsequently described with regard to implementations. One end of the conduit 4160 is affixed to the rigid frame 4100 and the opposite, outer end 4161 is configured to be rotatably constrained off of the rigid frame 4100. In implementations, a clamp 4164 holds the outer conduit end 4161 to a stationary tub support 4140*b* on the opposite side of the rigid frame 4100 from the pivot motor 4115. In implementations, this clamp 4164 fixes the conduit end 4161 position so that a central axis 4162 of the conduit 4160 is co-aligned with the pivot axis 4110 to allow rotation of the conduit 4160 about the pivot axis 4110 without lateral displacement of the electrical cables and/or pneumatic tubes contained therein through a full range of motion from a vertically upturned drum filling orientation to an inverted tub emptying orientation. This reduces strain and thereby wear and tear on the contained cables and tubes, and eliminates the possibility of loose cables or tubes interfering with the rotary motion of the rigid frame 4100. In implementations, an outer surface of the conduit end 4161 comprises corrugations configured to engage retaining elements within the clamp 4164. The corrugations 4163 at the ends interlock with one or more corresponding raised retaining ridges on a receiving surface of the clamp interlock with the corrugations 4163 while allowing the conduit 4160 to rotate. The conduit 4160 thus constrained enables the electrical and/or pneumatic lines therein to rotate with the rigid frame without catching on stationary components aside the frame 4100. The conduit 4160 thus protects the electrical and/or pneumatic lines from potentially getting worn down to failure and/or dislodging from the tub and drum assembly 4200. In implementations, the electrical and/or pneumatic lines going into the tub end of the conduit 4160 are fixed to the rigid frame 4100 with clips, ties, tubes, or other fasteners or routing conduits or brackets. In implementations, the electrical and/or pneumatic lines are fixed to the rigid frame 4100 with slack to allow for vibration of the tub and drum assembly 4200 with respect to the frame 4100 during a washing and drying cycle (e.g., a sequential series of routines executed by the at least one controller 4005 for washing and drying at least one dirty deformable article 12 comprising a load of laundry disposed in a single drum 4205 before inverting and unloading the washed and dried clean deformable article from the drum 4205). Additionally, in implementations, the electrical and/or pneumatic lines coming out the outer end 4161 of the conduit 4160 are fixed to the stationary support 4140*b* and/or other external structure.

Figure 8:
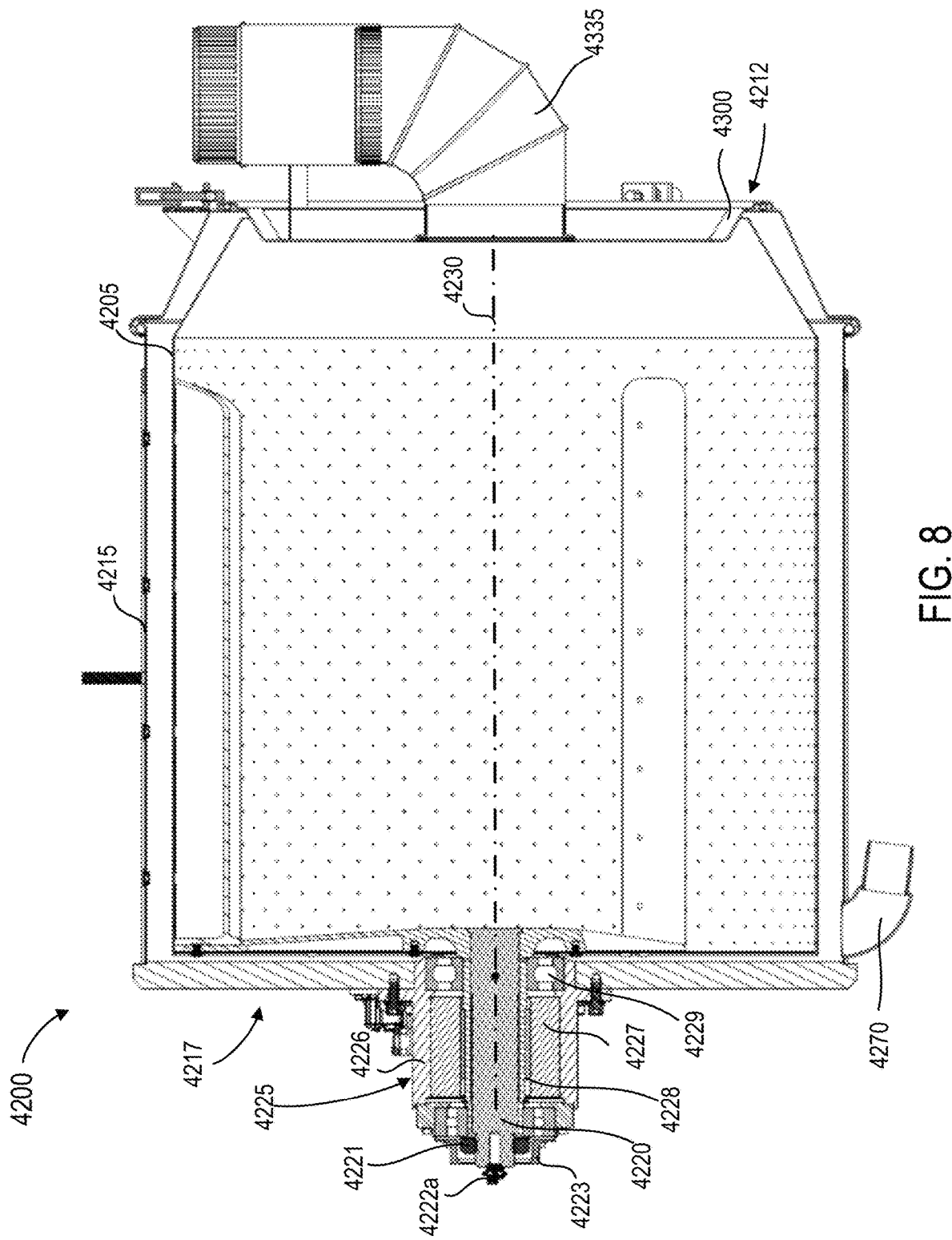
FIG. 8 depicts a schematic side a cross section of an implementation of a tub and drum assembly of an autonomous washing and drying device including a cross section of the drive end.
Figure 9:
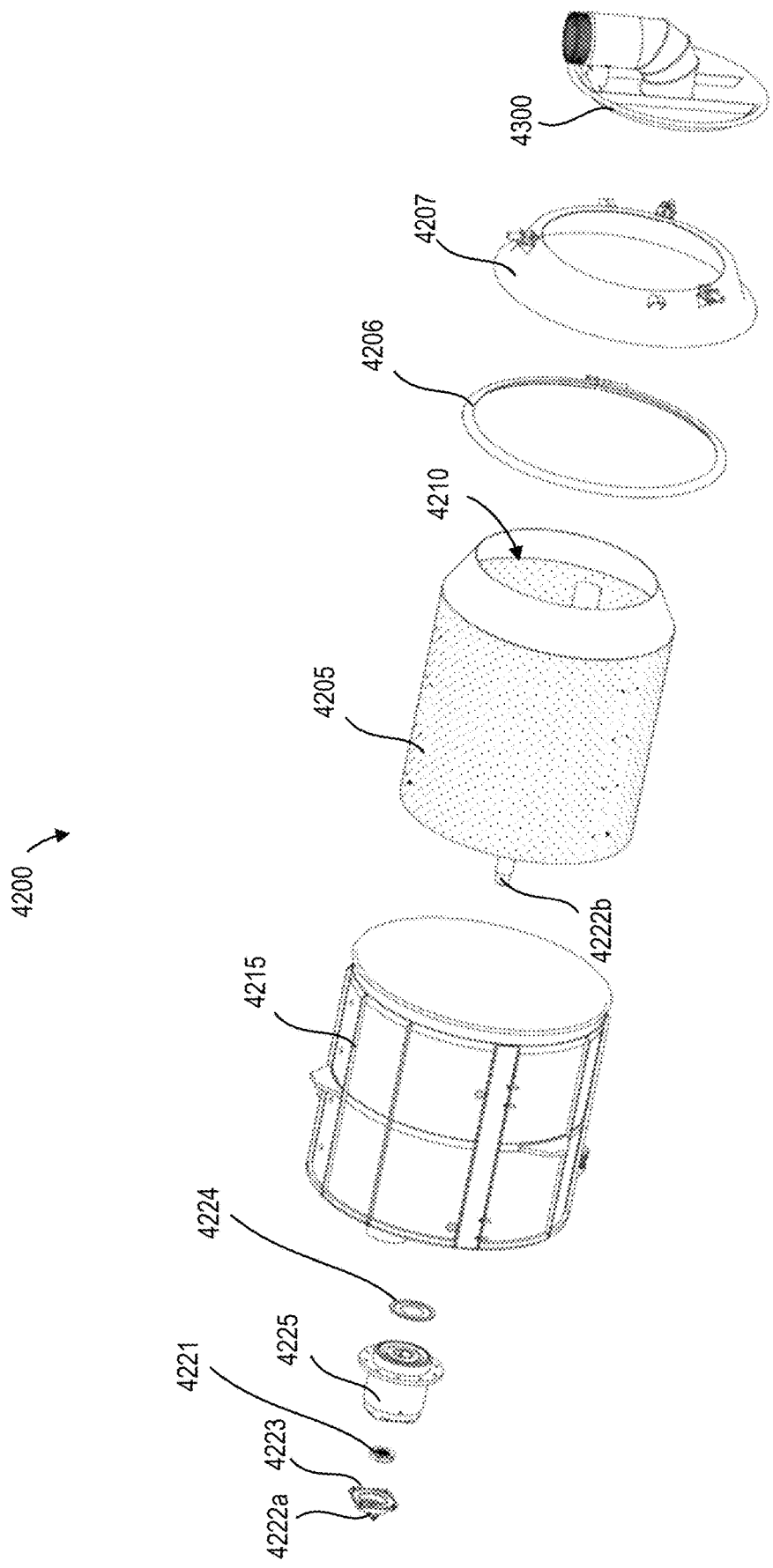
FIG. 9 depicts an exploded perspective view of the tub and drum assembly of FIG. 8.

Turning now to FIGS. 8 through 10, the tub and drum assembly 4200 includes a drum 4205 configured to receive therein at least one deformable article for washing and drying. The at least one deformable article comprises soiled laundry. In implementations, the at least one deformable article comprises presorted, household laundry. The at least one deformable article can be one of a plurality of deformable laundry articles comprising two or more article types of at least one of different sizes and different shapes. As shown in FIGS. 9 and 10, the drum 4205 comprises an opening 4210 at a front end 4212 configured for receiving the at least one deformable article therethrough. As shown in the cross section view of FIG. 8 and the exploded view of FIG. 9, the tub and drum assembly 4200 includes a tub 4215 configured to receive the drum 4105 therein and mate with the drum 4105 at a drive end 4217 opposite the front end 4212. In implementations, the drum 4205 is supported by rotary bearings 4229 and a shaft 4220 which is cantilevered from the drive end 4217 of the tub 4215.

In implementations, a bidirectional drive motor 4225 is configured to mount to the drive shaft 4220 at the drive end 4217 for spinning the drum 4205 about a spin axis 4230 extending from the drive end 4217 to the front end 4212. The spin axis 4230 is substantially orthogonal to the pivot axis 4110. In implementations, the drive motor 4225 comprises a motor housing 4226 configured to retain therein a stator 4227 and a shaft sleeve comprising magnets, the shaft sleeve being configured to receive therein the drive shaft 4220. The tub and drum assembly 4200 further comprises a bearing seal 4224 configured to seal the rotary bearings 4229 against fluid ingress. The outer end of the motor housing 4226 is configured to mate with a rear bearing shield 4223 for covering a drum retaining nut 4221. In implementations, a speed encoder 4222a is configured to be disposed on the outer surface of the rear bearing shield 4223 for detecting a speed of rotation of a rotary encoder 4222b disposed under the rear bearing shield 4223 and mounted to a back end of the shaft 4220. The speed encoder 4222a is configured to detect a rotational speed of the drive motor 4225 and output a signal indicative of the speed to the controller 4005.

In implementations, the bidirectional drive motor 4225 is configured to spin the drum 4205 in opposite spin directions during at least a portion of the washing cycle. In implementations, the drum is configured to receive a maximum weight of 12 kg of dry laundry comprised of one or more deformable articles 12. The drive motor 4225 is configured to provide sufficient peak torque to lift and tumble the one or more deformable articles 12 after they have been saturated with water. In implementations, the one or more deformable articles are lifted by two or more raised ribs 4240 on the interior surface of the drum. In implementations, the one or more articles are lifted by friction between the articles and the internal surface of the drum. In implementations, the drive motor 4225 is configured to spin the loaded drum 4205 at a maximum speed in a range of between about 800 to 1500 RPM. In implementations, the drive motor 4225 is configured to spin the drum 4205 with a centripetal acceleration in a range of between about 350 g to 500 g (e.g., where "350 g" is 350 times the gravitational acceleration of the earth). For example, in implementations, the drive motor 4225 is configured to spin the loaded drum 4205 at a speed of about 1130 RPM at 500 g. The drive motor 4225 can be hard mounted to the exterior of the drive end 4217 of the tub 4215, and can be, for example, a direct drive motor or a motor drive comprising an intermediate belt and pulley.

Figure 11:
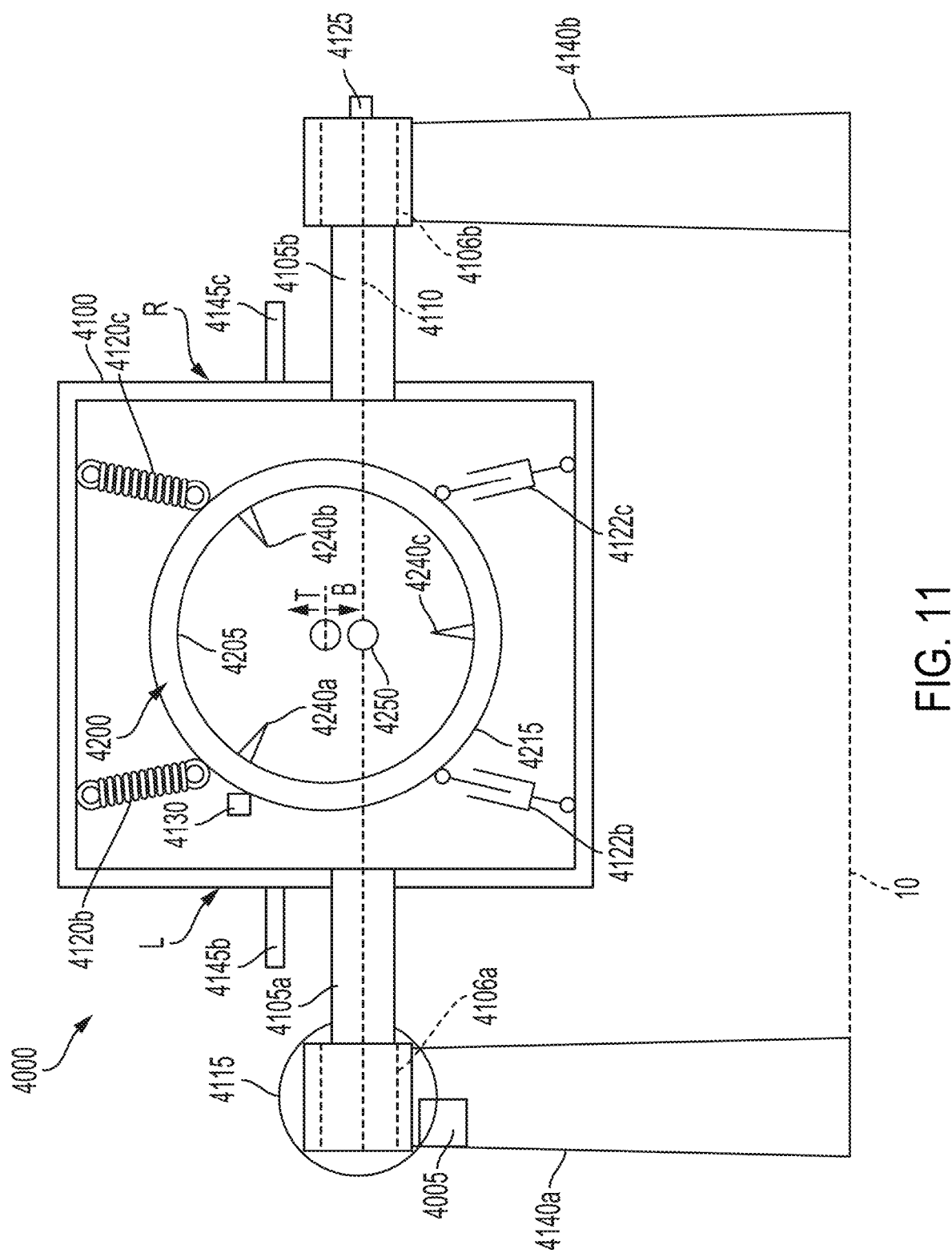
FIG. 11 depicts a front view schematic of an autonomous washing and drying device including an implementation of a pivot frame support.

As shown in the schematic of FIG. 11 and as previously described with regard to implementations, the tub and drum assembly 4200 is configured to be suspended from the rigid frame 4100 and pivot through and stop at any of a range of positions between vertically upright and vertically inverted along with the rigid frame 4100. In implementations, the rigid frame 4100 comprises at least one of a rigid metal, plastic, and polymer suitable for withstanding the stresses, strains, and vibrations of repeated pivoting and washing and drying cycles. In implementations, the rigid frame 4100 surrounds the tub and drum assembly 4200 suspended therein and thereby isolates vibrations and movements of the tub and drum assembly 4200 constrained therein from at least one of the floor 10, the pivot motor 4115, the pivot bearings 4106a-b, and one or more adjacent washing and drying devices 4000 in a cluster 4002. In implementations, the rigid fame 4100 mostly encapsulates the tub and drum assembly 4200 such that a front end 4212 of the tub and drum assembly 4200 protrudes from the bounds of the rigid frame 4100 for unobstructed access to the opening 4210 during loading and unloading of the at least one deformable article and during seating and detachment of a removable door 4300 configured to selectively seal the opening 4210.

Figure 15:
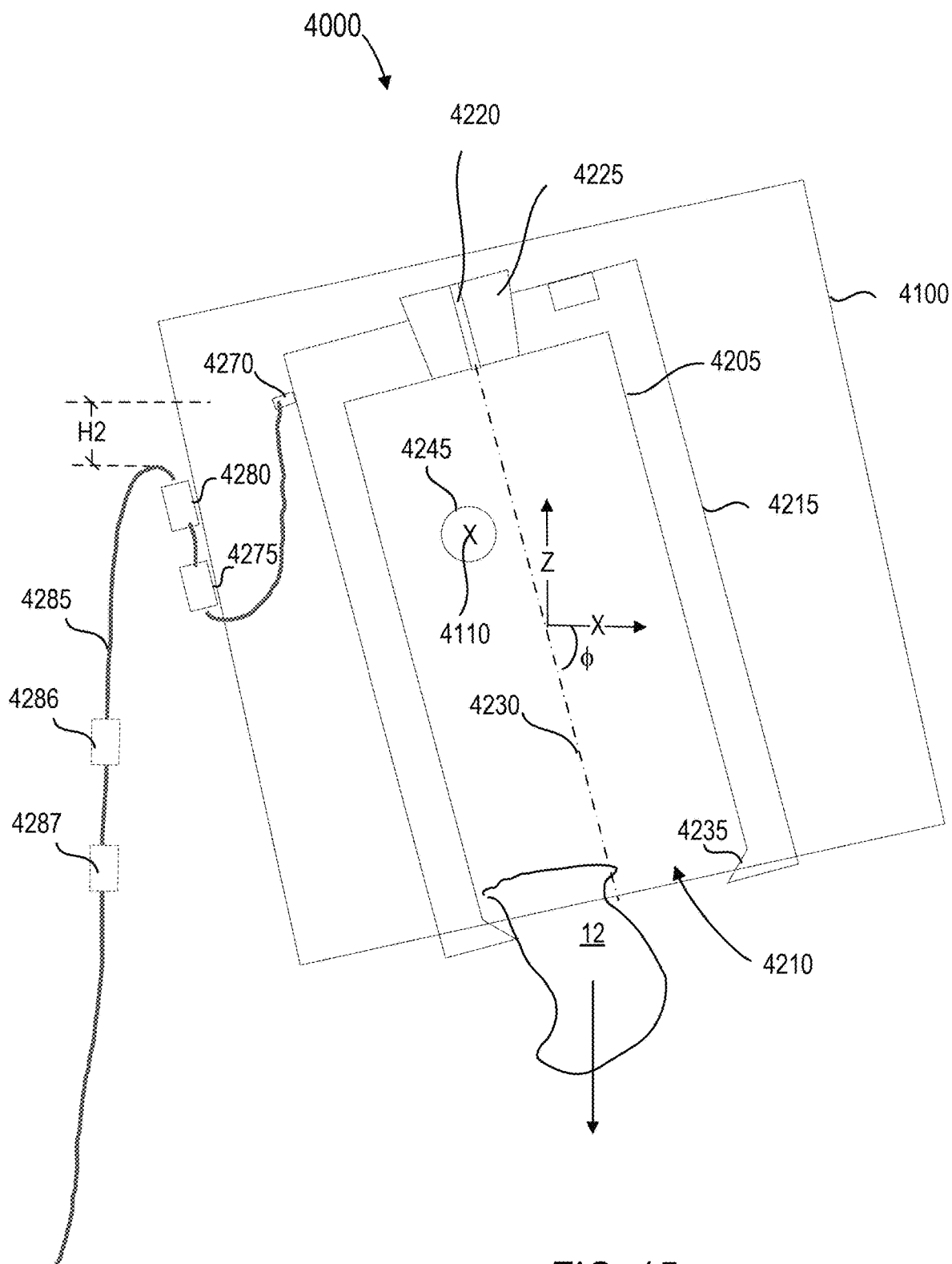
FIG. 15 depicts a schematic of a side cross section schematic of an autonomous washing and drying device of FIG. 12 angled downward from horizontal.

In implementations, the rigid frame 4100 and tub and drum assembly 4200 constrained therein pivot together during rotation of the pivot shaft 4105 about the pivot axis 4110. As shown in FIGS. 6A-C and 11, in implementations, two or more springs 4120a-d extend between an outer surface of the tub 4215 and the rigid frame 4100 and suspend the tub and drum assembly 4200 within the rigid frame 4100. In implementations, the two or more springs 4120a-d comprise four springs configured to extend between an upper portion of the tub and drum assembly 4200 (in the horizontal and/or wash orientation) and the isolation frame. Each one of the two or more springs 4120a-d is mounted adjacent a respective one of the four corners of the rigid frame 4100. In implementations, one pair of the four springs 4120 is disposed adjacent the front end 4212 and the other pair is disposed adjacent the drive end 4217, thereby enabling the tub and drum assembly 4200 to flexibly suspend from the rigid frame 4100 throughout a range of rotational angles. As previously described with regard to implementations, a pivot motor 4115 is configured to drive the pivot shaft 4105, here a pair of coaxial pivot shafts 4105a-b each one of which is fixedly, engaged with an opposing side of the rigid frame 4100, to rotate the frame 4100 such that the opening 4210 of the drum 4205 suspended therein moves bidirectionally through a range of angular orientations from a vertically upright orientation to a substantially inverted orientation, as shown in FIGS. 12, 13, and 15.

In addition to the two or more springs 4120a-d, in implementations, as shown in FIGS. 6A-C and 11, the device 4000 further comprises two or more dampers 4122a-d below the tub 4215, linking the tub 4215 to the rigid frame 4100 and dissipating kinetic energy during spin operation of the drum 4205 during washing and drying cycles. The two or more dampers 4122a-d can be, for example, viscous dampers and frictional dampers. At high frequencies, the two or more dampers 4122a-d are essentially rigid, allowing the tub and drum assembly 4200 to move left and right in a four bar linkage configuration, but not up and down. At lower frequencies the two or more dampers 4122a-d permit the tub and drum assembly 4200 to move up and down as the two or more springs 4120a-d extend and contract with load differences (e.g., when the tub 4215 is filled with water).

The autonomously actuated washing and drying device 4000 further includes a controller 4005 in operable communication with the pivot motor 4115 and drive motor 4225. As shown in the schematic depiction in FIG. 11, the controller 4005 can be collocated with and/or disposed on the autonomously actuated washing and drying device 4000 and in wired or wireless communication with actuators of the device 4000, including the pivot motor 4115 and drive motor 4225. Additionally or alternatively, the controller 4005 can comprise one or more controllers remotely located from the autonomously actuated washing and drying device 4000 and in wired or wireless communication via a communication network with actuators of the device 4000. The controller 4005 is configured to pivot the rigid frame 4100 and tub and drum assembly 4200 suspended therein through a rotation range, stopping at various rotational positions for autonomous execution of one or more routines comprising the washing and drying process.

Figure 12:
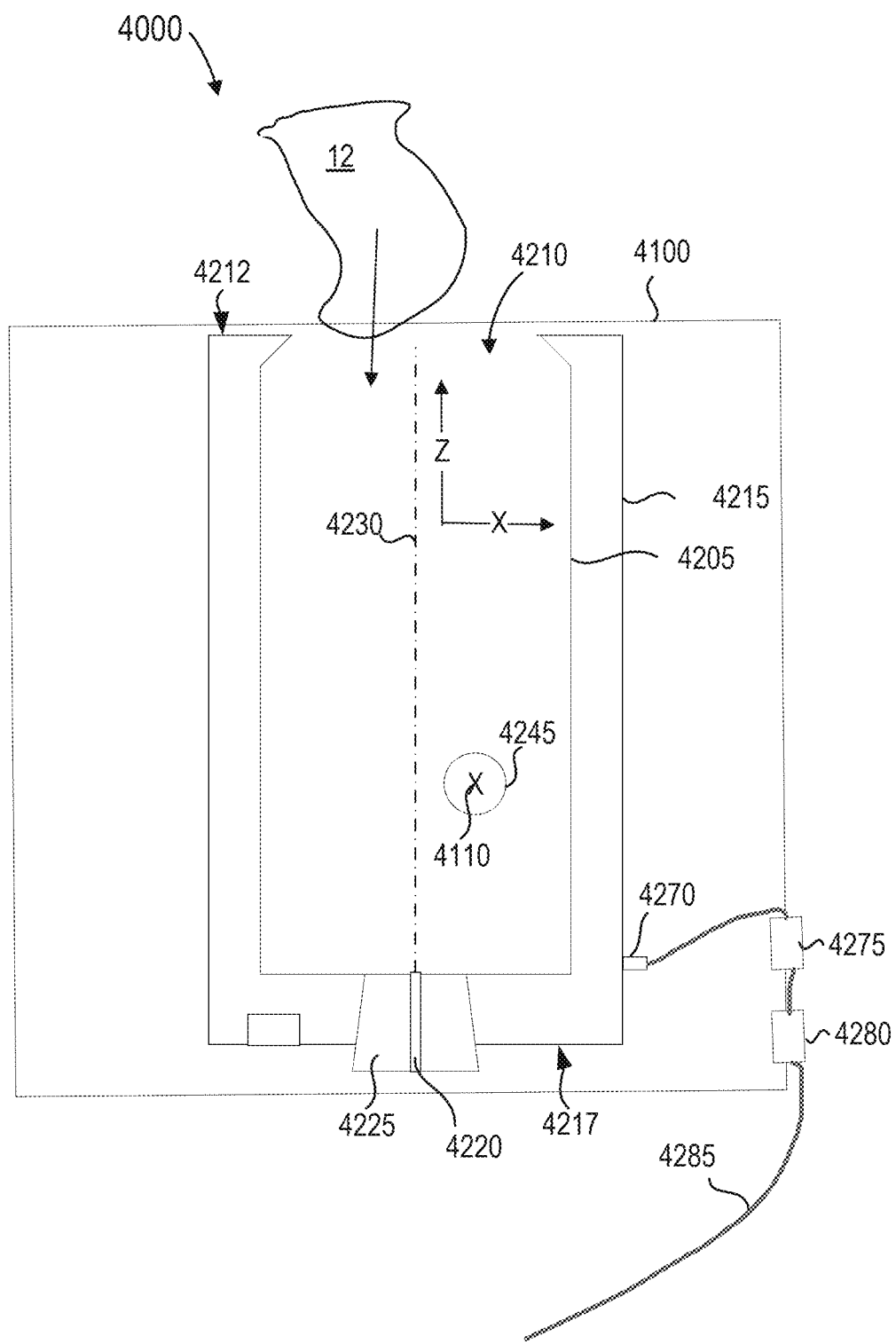
FIG. 12 depicts a side cross section schematic of an autonomous washing and drying device in an upturned orientation.
Figure 13:
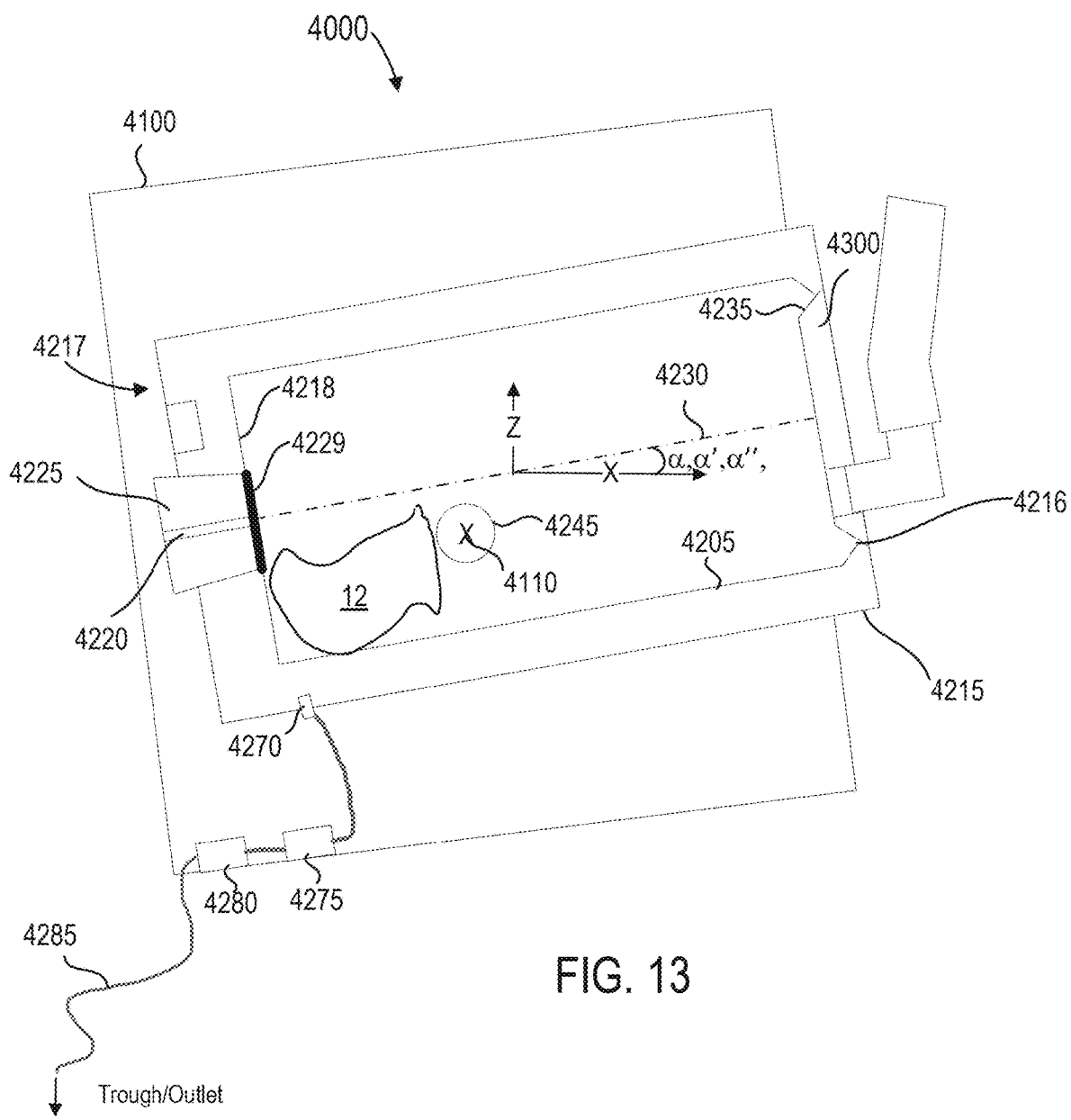
FIG. 13 depicts a side cross section schematic of an autonomous washing and drying device of FIG. 12 angled upward from horizontal in a washing orientation.

As shown in FIGS. 6B and 12, in implementations, the controller 4005 is configured to instruct, the pivot motor 4115 to rotate the rigid frame 4100 to the vertically upright orientation for receiving the at least one deformable article 12 into the opening 4110 of the suspended drum 4105 from a height above the device 4000. Dropping the at least one deformable article 12 into the opening 4110 under the force of gravity precludes a requirement for human intervention, facilitating the autonomous and energy efficient loading of the drum 4205. As depicted in FIG. 12, in implementations the vertically upright orientation comprises the spin axis 4230 being parallel to a coordinate space Z axis as shown, with the opening 4210 at the front end 4212 of the drum 4205 being above the drive end 4217. In implementations, as described previously, the upturned orientation comprises a substantially vertically upright position in a range of between about 80 to 90 degrees up from horizontal (e.g., 0 to 10 degrees tilted down from vertical). In implementations that will be subsequently described with regard to loading the drum 4205, the spin axis 4230 need not be exactly vertical for the at least one deformable article 12 to successfully pass through the opening 4110 thereby adding to the reliability of the autonomous system 300. In implementations, the inverted orientation comprises a substantially vertically inverted position in a range of between about 60 to 90 degrees down from horizontal (e.g., 150 to 180 degrees down from vertically upright). By orienting the opening 4210 of the drum 4205 upward, the controller 4005 autonomously positions the autonomous washing and drying device 4000 for receiving a gravity fed load of laundry comprising at least one deformable article 12. In implementations, the drive motor 4225 can slowly spin (e.g., 1 to 15 rpm) the drum 4205 while in the substantially vertically upright position and receiving the load of laundry comprising a plurality of deformable articles. Spinning the drum 4205 during loading prevents the plurality of deformable articles 12 from piling up in the center of the drum and potentially protruding past the opening 4210. Additionally, in implementations, the drive motor 4225 can slowly spin the drum 4205 in a substantially inverted orientation to ensure all clean laundry articles exit the opening into a clean bin. In some implementations, the tub and drum assembly 4200 can execute a wash cycle at the vertically upright position.

Once the drum 4205 is loaded with the at least one soiled deformable article 12 comprising a load of laundry, the controller 4005 pivots the device 4000 to a washing position for washing and drying the soiled at least one deformable article 12 disposed within the tub and drum assembly 4200. As shown in FIGS. 6A and 13, in implementations, the controller 4005 is configured to instruct the pivot motor 4115 to rotate the frame 4100 to a wash orientation between the vertically uptight orientation and substantially vertically inverted orientation. In implementations, the wash orientation can be one in which the spin axis 4230, about which the drum 4205 spins during a washing and drying cycle, is parallel to horizontal, represented by the coordinate space X axis. In implementations, the wash orientation can be one in which the tub and drum assembly 4200 is pivoted up from horizontal, for example orienting the spin axis 4230 at a wash angle $\alpha$ above horizontal in a range of between about 0 and 45 degrees. In implementations, the wash orientation is at an angle $\alpha$ of between about 5 to 15 degrees between the spin axis 4230 and horizontal. In implementations, the wash angle $\alpha$ is low enough that a front lip 4216 of the drum is parallel to or lower than a bottom point of the circumference of a spin motor bearing 4229 of the drive motor 4225 disposed in the back surface of the tub 4215. This preserves the bearing seal 4224 (FIG. 8) and protects the bearing from contacting water and/or detergent.

In implementations, the wash angle $\alpha$ is the same as at least one of a spin extraction angle $\alpha'$ and a drying angle $\alpha''$. In implementations, the controller 4005 is configured to adjust the orientation of the spin axis 4230 to an angle at or between the wash angle $\alpha$ and vertically upright for at least one of the spin extraction cycle for extracting fluid from the one or more articles 12 disposed with in the tub and the drying cycle for removing moisture from the fabric of the one or more articles 12. In implementations, the controller 4005 is configured to tilt the spin axis 4230 upward from the wash angle in a range of between about 15 and 25 degrees from horizontal to better drain fluid from the tub and drum assembly 4200. Tilting the spin axis upward during a drying cycle also prevents plastering of wet articles 12 therein to the interior surface of the door 4300 air outlet orifice 4315 because gravity assists with drawing wet articles down into the drum 4205, away from the door 4300. In implementations, the controller is configured to tilt the tub and drum assembly 4200 up from the wash angle $\alpha$ for spin extraction of rinse water and then back down for the dry cycle (e.g., moisture extraction) so that damp clothing is not plastered to the back wall 4218 of the drum 4205 at the drive end 4217.

Tilting the wash orientation at a wash angle $\alpha$ reduces bending stress on the drive shaft 4220 and radial stress on the drum bearing(s) 4229 during high speeds of rotation (e.g., speeds greater than 500 RPM). This prolongs bearing life as extraction speeds can reach about 1000 RPM. As subsequently described in greater detail herein, the tilted wash orientation a also assists with gravity draining the tub 4215 in implementations in which the wastewater outlet is disposed adjacent the drive end 4217 of the tub and drum assembly 4200. Additionally, in implementations, tilting the wash orientation at an angle $\alpha$ reduces or eliminates water pressure on a lower portion of a seal between the tub 4215 and a removable door 4300 seated in the opening 4210. Tilting the tub and drum assembly 4200 to a wash orientation of angle $\alpha$ prevents small deformable articles 12 (e.g., socks, undergarments, gloves, etc.) from migrating toward the opening 4210 where the small deformable articles 12 could be caught between the drum 4205 and a door 4300 or in a joint between the drum 4205 and the tub 4215.

Figure 14:
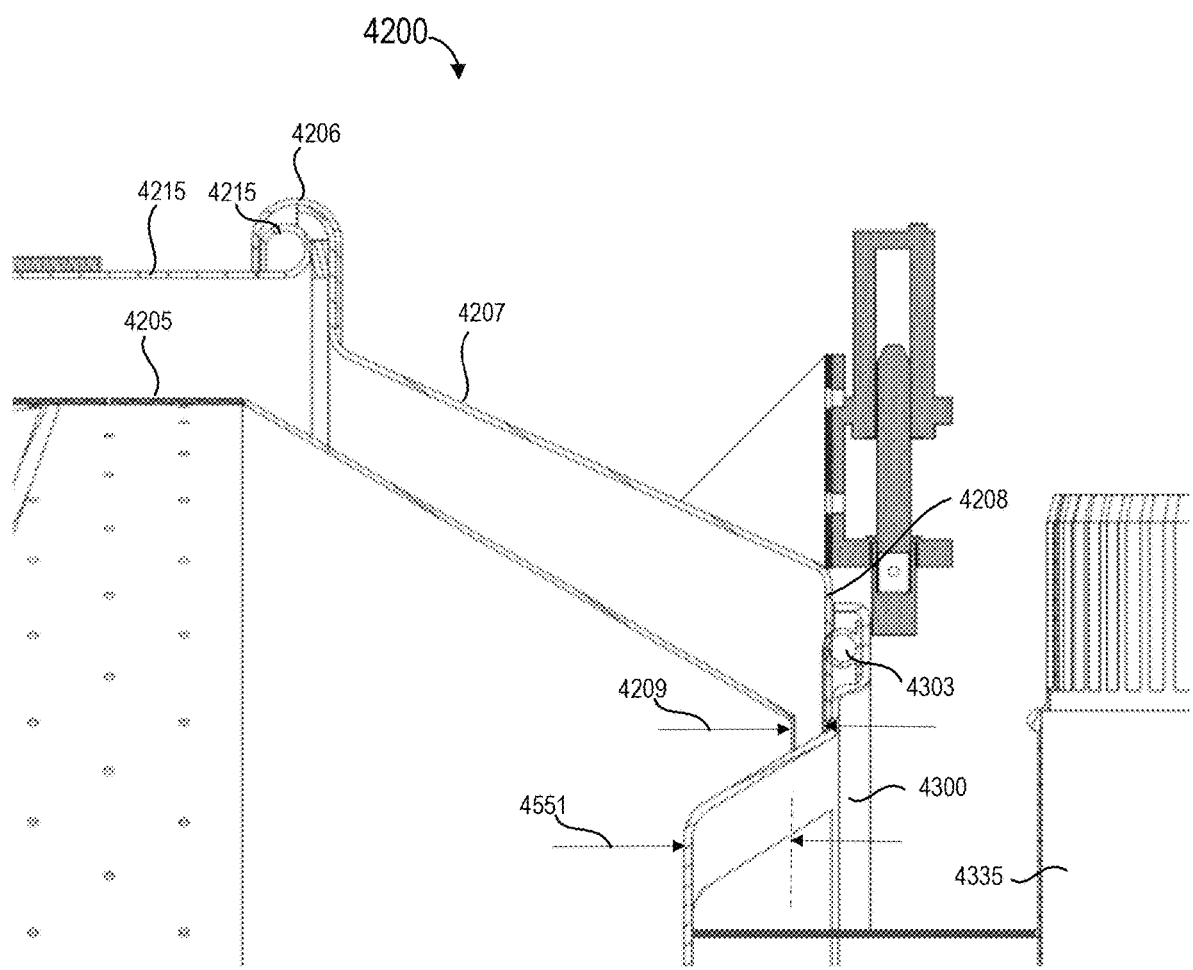
FIG. 14 depicts a schematic of cross section and magnified view of a sealed opening of an implementation of a tub and drum assembly of an autonomous washing and drying device.

In implementations, a seal between the tub 4215 and drum 4205 at the front end 4212 of the tub and drum assembly 4200 can include a brush seal (not shown) for blocking small items from falling between the drum 4205 and tub 4215. In other implementations, as shown in FIGS. 9 and 14, the tub and drum assembly 4200 comprises a tub cap 4207 secured to the tub 4215 with a bolt ring 4206 configured to be tightened to a compressed state to affix the tub cap 4207 to a protruding rim 4214 of the tub 4215. In implementations, the tub cap 4207 comprises a front end flange 4208 about the circumference, angled inward toward the opening to block a gap 4209 between the tub 4215 and drum 4205 at the opening. Additionally, in implementations, a door 4300 configured to seal the opening 4210 comprises an O-ring seal 4303 for sealing the opening between the door 4300 and the tub 4215. The O-ring seal can be compressed against the front end flange 4208 of the tub cap 4208 to prevent liquid and air leaks during the washing and drying cycles.

Returning to FIG. 13, with the rigid frame 4100 and tub and drum assembly 4200 pivoted to and held at the wash orientation, e.g., wash angle α, the controller 4005 is configured to execute a washing and drying routine based on washing and drying parameters associated with one or more detected characteristics of the at least one deformable article. In implementations, the washing and drying parameters are stored locally in a memory 4010 and cross referenced with one or more detectable characteristics of deformable laundry articles. Because each load of one or more deformable articles may vary in article type, size, color, material, and volume within and among loads, the controller 4005 is configured to analyze detected characteristics of each load of one or more deformable articles to determine washing and drying parameters specific to that load. Additionally or alternatively, in implementations, the controller 4005 is in at least one of wired and wireless communication with a communication network 230 and is further configured to receive pre-determined washing and drying parameters via the communication network 230 from a preceding autonomous device. In implementations, the washing and drying parameters are predetermined by an autonomous separating and sorting robot 3000 in communication with the communication network.

The autonomous separating and sorting robot 3000 is configured to provide the at least one deformable article 12 to the washing and drying device 4000, and in implementations the autonomous separating and sorting robot 3000 comprises sensors configured to determine one or more characteristics of the at least one deformable article 12. The one or more characteristics can be, for example, material composition, weight, color, size, volume, article type, and degree of dirtiness. In implementations, the autonomous separating and sorting robot 3000 communicates these characteristics to the controller 4005 for determining parameters for a washing and drying cycle, parameters such as wash cycle temperature, cleaning and rinse agent amounts and concentrations, wash cycle duration (e.g., one or more soak and agitation cycles), number and duration of rinse cycles, soak cycle duration, washing cycle agitation speed (e.g., for delicate, normal, and heavy loads), maximum spin speed during fluid (e.g., water and/or chemicals) extraction, wash detergent selection and concentration, number of rinse cycles, drying air temperature, drying airflow rate, and a minimum size device 4000 in a cluster 4002 for receiving each load of at least one deformable article 12. Additionally or alternatively, in implementations, the autonomous separating and sorting robot 300 is configured to estimate cycle duration and wash water requirements (for plant load balancing purposes) but the length of the wash cycle and amount of water will be determined based on sensors in the tub and drum assembly 4200 configured to measure cycle parameters and output signals to the controller 4005 for monitoring the washing and drying processes, including drying cycle duration. Additionally, in implementations, the washing and drying parameters comprise instructing the drive motor 4225 to spin the drum 4205 about the spin axis 4230 at the wash orientation angle α.

As will be discussed subsequently with regard to implementations, the at least one deformable article 12 is provided to the washing and drying device 4000 in one or more containers, such as one or more open top bins. In implementations, the one or more bins can be individually identified by a dedicated identifier (e.g., RFID, bar code, etc.) and cataloged in a central database (e.g., database 235, server 240, or server farm 250) along with an assigned customer number, load type (e.g., material composition, article weight, color) and load size (e.g., load weight and/or volume). In implementations one or more controllers 4005, 3005 can electronically and/or physically tag the one or more bins with this information, for example by setting a switch or flag, or by manipulating a readable display disposed on each bin and the one or more controllers 4005, 3005 can assign the tagged one or more bins to at least one of predetermined washing and drying parameters and associated characteristics of the one or more articles therein in a memory store 4010 or database 235.

In implementations, the wash parameters associated with the identified one or more characteristics are stored in a memory in communication with the controller 4005. The memory can be a memory 4010 of the washing and drying device 4010 and additionally or alternatively can be a memory storage or database 235, 250, 240 in remote communication with the controller 4005 via the communication network 230. Because each load of household laundry contains articles of various types, sizes, materials, stains, and related wash requirements, each load may comprise more than one associated wash parameter. The wash parameters can be stored in a look up table cross referenced with one or more characteristics along with a default hierarchy for selecting washing and drying parameters based on two or more characteristics. For example, water temperature and agitation cycle duration associated with material type can trump parameters associated with load volume or weight. For example, a large load of laundry comprising several heavy cotton towels can be washed on warm water with vigorous agitation while a large load of thing cotton undergarments can be washed at more slow, gentle agitation speeds. The controller 4005 thus is configured to determine wash parameters for each individual load of laundry based on the characteristics of the one or more deformable articles 12 in each individual load. Additionally or alternatively to the autonomous separating and sorting robot 3000 determining one or more characteristics of the at least one deformable article 12 for cross referencing with associated wash parameters, the wash parameters can be communicated to and received by a remote terminal 205 in communication with the communication network 230. A user of the remote terminal, e.g., the customer owning the one or more deformable articles, can provide predetermined wash parameters associated with a tagged (e.g., RFID label, bar code, QR code, etc.) container of dirty laundry on an input screen of the remote terminal 205 or handheld device 245, and the provided predetermined parameters can be communicated to and stored in the memory 4010, 235, 240, 255 in communication with the controller 4005.

Once the at least one deformable article 12 is washed and dried, the controller 4005 is configured to instruct the pivot motor 4115 to rotate the frame 4100 to the substantially vertically inverted orientation opposite the upright orientation, as depicted in FIGS. 6C and 15. The controller 4005 is configured to rotate the drum 4205 about the pivot axis 4110, 4110a-b from the wash orientation, e.g., wash angle α, or the drying angle α" to the substantially vertically inverted orientation, e.g., angle φ, to drop the at least one deformable article 12 from the drum 4205. In implementations the substantially vertically inverted orientation comprises the spin axis 4230 being at an angle φ tilted down from horizontal X in a range of between about 40 to 80 degrees. In implementations, the substantially vertically inverted orientation comprises the spin axis 4230 being at an angle φ of about 70 degrees tilted down from horizontal X. In implementations, the substantially vertically inverted orientation comprises the spin axis 4230 being fully vertical, e.g., at an angle φ of 90 degrees tilted down from horizontal X.

Figure 16A:
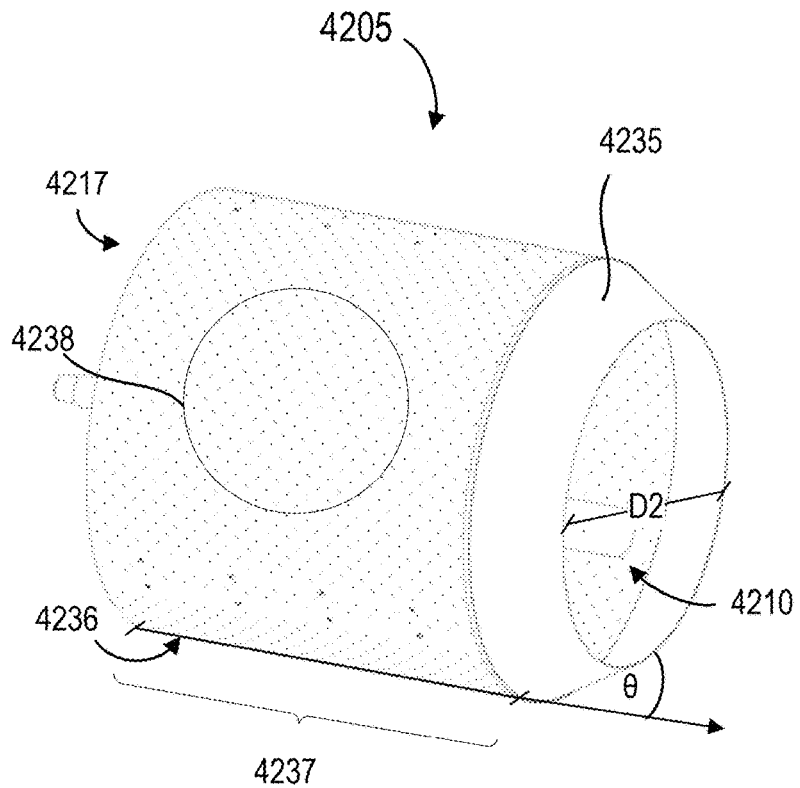
FIG. 16A depicts a front perspective view of an implementation of a drum of an autonomous washing and drying device.
Figure 16B:
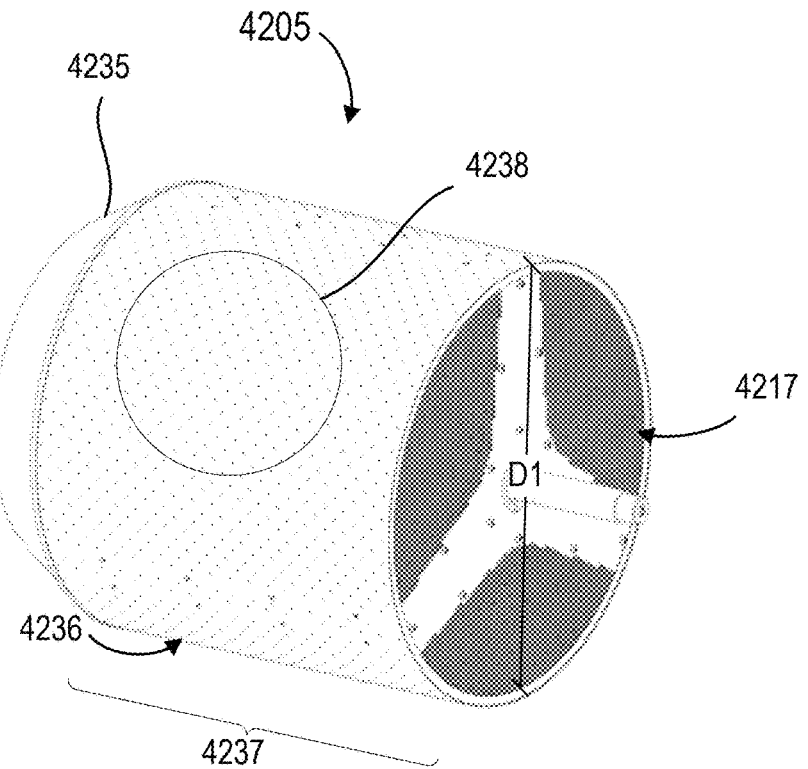
FIG. 16B depicts a rear perspective view of the drum of FIG. 16A.

As shown in FIGS. 16A-B, the drum 4205 is substantially cylindrical and comprises a conical taper 4235 adjacent the front end 4212 for guiding the at least one deformable article 12 out of the drum 4205 in the substantially inverted orientation. The interior surfaces of the drum 4205 are shaped so that there are no shelves or crevices which can entrap small items, preventing them from tumbling out as the spin axis 4230 is pivoted downward for unloading. Particularly, the transition from the full diameter D1 of the drum to the smaller entrance D2 diameter comprises the conical taper 4235. In implementations, the conical taper 4235 is at an angle θ in a range of between about 20 and 40 degrees from the outside edge 4236 of the cylindrical portion 4237 of the drum 4205. In implementations, the conical taper 4235 is at an angle θ of about 30 degrees from the outside edge 4236 of the cylindrical portion 4237 of the drum 4205.

In implementations, the drum 4205 is manufactured from stainless steel and comprises a plurality of perforations 4238 for air and liquid ingress from the tub 4215 into the drum 4205. In implementations, the drum 4205 includes a coating for at least one of improving drainage, improving sanitation, preventing corrosion, preventing adhesion, and providing a germicidal barrier. For example, the coating can include at least one of an applied hydrophobic spray coating (e.g., NEVERWET), enameling, a powder coating, a chemical vapor deposition coating, a physical vapor deposition coating, anodization, and electroplating. In implementations, the drum 4205 includes a corrosion resistant nanostructured electroplate metal. Further, in implementations, the tub 4215 is watertight. As shown for example in at least FIGS. 6A and 10, in implementations, the drum 4205 comprises two or more ribs 4240a-c disposed on an interior surface of the drum 4205, the two or more ribs 4240a-c are configured to agitate the at least one deformable article 12. In implementations, the two or more raised ribs can be manufactured from at least one of stainless steel, CPVC, and polypropylene for withstanding the agitation forces, water temperature variations, heated air temperatures, detergents, and sanitizing agents (e.g., chemical sanitizers, steam, and UV light) introduced to the drum 4205 during a washing and drying cycle.

Additionally, in implementations, the two or more raised ribs 4240a-c comprise a plurality of perforations 4242 for air and liquid ingress from the tub 4215 into the drum 4205. In implementations in which the two or more raised ribs 4240a-c comprise a plurality of perforations 4242, the drum 4205 can include corresponding features for enabling water ingress into the two or more raised ribs 4240a-c. For example, in implementations, an outer wall of the drum 4205 includes grooves or holes larger than the plurality of perforations on the drum 4205. The groves and holes are disposed in alignment with each of the two or more raised ribs 4240a-c disposed on the interior surface of the drum 4205 thereby allowing the two or more raised ribs 4240a-c to fill up with water while contacting the pool of water at the lowest portion of the tub 4215 while tilted at the wash angle α. The water filling the two or more raised ribs 4240a-c from behind exits into the drum 4205 via the plurality of perforations 4242.

In implementations, the grooves in the drum 4205 may also be shaped asymmetrically to impede the water from draining out of each of the two or more raised ribs 4240a-c toward the outside of the drum 4205 as it spins up and out of the pool of water. In implementations, the groove can include an overhang (not shown) on one or both sides to contain the water within the rib 4240. If the drum 4205 always spins in a single direction during the washing portion of the washing and drying cycle, the overhang could be more significant on the leading edge in the direction of rotation. Additionally or alternatively, in implementations, the two or more ribs 4240a-c are asymmetric about a longitudinal bisector. For example, the side of a rib 4240 facing a washing spin direction can be curved to scoop up water at the lowest portion of rotation from the pool of water in the tub 4215 and funnel the scooped water onto the one or more deformable articles in the drum 4205 as the drum rotates. The side of the rib 4240 facing the washing spin direction can be curved to minimize motor torque required to lift the wet at least one deformable article 12. The other side of the rib 4240 could be shaped in a gradually angled incline for creating more lift to expose more surface area of the at least one deformable article 12 tumbling through warm air for optimized drying while the drum 4205 spins in a direction opposite the wash spin direction during a drying cycle.

As described previously, the tub and drum assembly 4200 is suspended from the rigid frame 4100 and pivots through and stops at any of a range of positions between vertically upright and vertically inverted along with the rigid frame 4100. In implementations, the washing and drying device 4000 comprises one or more sensors configured to detect an angle of the spin axis 4230 relative to one or both of horizontal and vertical orientations and output a signal indicating the detected angle. In implementations, as previously described with regard to FIG. 10 and as shown in the schematic of FIG. 11, the device 4000 comprises an encoder 4125 disposed on the pivot shaft 4105 for detecting a degree of rotation of the driven pivot shaft 4105 about the pivot axis 4110. In implementations, the controller 4005 is configured to receive a signal from the encoder 4125 indicative of a rotational orientation of the pivot shaft 4105 while the pivot motor 4115 is driving the pivot shaft 4105. In implementations, pivot actuation is executed by a pivot motor 4115 (with or without reduction gearing) paired with an absolute rotary position encoder 4125. In implementations, the pivot motor 4115 comprises at least one of a servomotor or induction motor, a BLDC motor, a brushed DC motor, and another rotary actuator. This permits rotation of the tub and drum assembly 4200 over an extended range (up to almost +/−90° from horizontal), with an ability to stop at any desired angle within the tolerance of the rotary encoder 4125. In implementations, the resolution of the rotary encoder 4125 is fractions of a degree of rotation. This accuracy enables the device 4000 to align the opening 4210 of the tub and drum assembly 4200 accurately for autonomous loading and unloading without one or more deformable articles falling astray, onto the floor 10 or clean bin conveyor. The autonomous device 4000 therefore is able to control handling and treatment of the one or more deformable articles 12 for complete receipt, cleaning, and return to a customer without requiring human intervention.

The controller 4005 is further configured to execute one or more instructions of the washing and drying routine based at least in part on receiving the signal from the encoder 4125.

For example, the controller 4005 is further configured to operate the pivot motor 4115 to rotate the frame 4100 at the start and following completion (e.g., the finish) of the washing and drying routine. Additionally or alternatively, the washing and drying device can include one or more sensors configured to detect motion and/or movement of the tub and drum assembly 4200. For example, as shown in FIG. 10, in implementations, at least one accelerometer 4130 can be disposed on the tub 4215. In implementations, the accelerometer 4130 is a 3-axis accelerometer. The accelerometer 4130 can be in wired or wireless communication with the controller 4005 and can be configured to detect a degree of rotation of the tub and drum 4200 about the pivot axis 4110. Additionally, the at least one accelerometer 4130 can be configured to detect lateral vibrations. Additionally, in implementations, the device 4000 comprises at least two accelerometers (e.g., 3-axis, 6 axis) disposed along the length of the tub and the controller receiving signals from the at least two accelerometers can detect rotational vibration of the tub and drum assembly 4200 about any axis normal to the spin axis 4230. In implementations, the at least two accelerometers can be disposed along a shared longitude of the exterior of the tub 4215, one of each being closer to one of the front end 4212 and back end 4217 for detecting the rotational movement of the tub and drum assembly 4200. Excessive lateral or rotational vibrations can be indicative of an unbalanced load of laundry (e.g., an offset load of the at least one deformable article 12 loaded into the drum). If the magnitude of lateral and/or rotational vibrations exceeds a corresponding threshold magnitude, the controller 4005 can be configured to operate the drive motor 4225 halt or reduce speed of the spin motion, and to execute a routine comprising one or more partial or full rotations of the drum 4205 in either or both rotational directions to redistribute the at least one deformable article within the drum 4205 before resuming the cycle. Additionally or alternatively, the controller 4005 is configured to instruct the pivot motor 4115 to pivot the tub and drum assembly 4200 one or more times to redistribute the at least on deformable article within the drum 4205 before resuming the cycle. In cases where repeated attempts at redistribution of the at least deformable article do not succeed in reducing the load imbalance, the detected magnitude of the lateral vibrations can be used to limit the maximum spin speed for extraction to a level at which the magnitude of lateral vibrations does not exceed a threshold magnitude. The controller 4005 therefore is configured to limit the maximum spin speed of the drum 4205 during an extraction cycle based on a signal output from the accelerometer 4130 indicative of undesired motion or vibration of the tub and drum assembly 4200 that could impart excessive wear and tear on the device 4000 while reducing the efficiency of the extraction cycle.

Additionally or alternatively in implementations, the controller 4005 is configured to receive the signal output by the at least one accelerometer and compare that received signal to that of the absolute encoder 4125 for initial or periodic calibration. Additionally or alternatively in implementations, the controller 4005 is configured to receive the signal output by the at least one accelerometer and report an error if the discrepancy between the tilt reading from the absolute encoder 4125 and the tilt reading from the accelerometer is greater than a threshold level of acceptable discrepancy.

Returning to FIG. 11, in implementations, the device 4000 comprises a pair of pivot shafts 4105*a-b*. The pair of pivot shafts 4105*a-b* are coaxial along the pivot axis 4110 so that they rotate simultaneously about the pivot axis 4110. The pair of pivot shafts 4105*a-b* (also shown in FIGS. 19 and 21) operably engage two opposing sides L, R of the rigid frame 4110. In implementations, the pair of pivot shafts 4105*a-b* is substantially aligned with a center of gravity 4250 of the tub and drum assembly 4200. The two opposing sides L, R extend between a front end of the frame 4100 that is substantially parallel to the front end 4212 of the tub and drum assembly 4200 and a back end of the rigid frame 4100 that is substantially parallel to the drive end 4217 of the tub and drum assembly 4200. As previously described, the tub and drum assembly 4200 is supported within a rigid frame 4100. In implementations, the rigid frame 4100 is a rectangular prismatic isolation frame that anchors the two or more springs 4120*a-d* and two or more dampers 4122*a-d* connected to the tub 4215. In implementations, the two or more springs are anchored to a top half T of the tub 4215 (e.g., the upper half in a spin axis 4230 horizontal position) and the two or more dampers 4122*a-d* are connected to a bottom half B of the tub 4215 (e.g., the upper half in a spin axis 4230 horizontal position). The tub and drum assembly 4200 is centered or approximately centered within the frame 4100, and the coaxial pivot shafts 4105*a-b* are hard-mounted (e.g., affixed with at least one of bolts, welds, screws, rivets, and other fasteners capable of withstanding the rotational strain and stress without yielding) on either side of the frame 4100, thereby defining the pivot axis 4110. The tub 4215 is positioned so that its center of gravity 4250 is approximately located on the pivot axis 4110. This serves to minimize the required torque output of the pivot motor 4115. The center of gravity 4250, however, will shift position when the tub and drum assembly 4200 receives a load of one or more deformable articles 12 and/or water. Additionally, the center of gravity 4250 will shift along the spin axis 4230 as the isolation frame 4100 pivots. In implementations, the tub and drum assembly 4200 can be intentionally constructed with the nominal center of gravity 4250 shifted slightly away (e.g., 0.1 mm-25 mm) from the pivot axis 4110 in a known direction at the wash angle α in order to preload the drive mechanism of the pivot motor 4115.

In addition to being hard mounted to the frame 4100, each of the pair of coaxial pivot shafts 4105*a-b* is configured to be supported by a corresponding one of a pair of radial bearings 4106*a-b* disposed on a corresponding support pillar 4140*a-b* positioned astride the rigid frame 4100, adjacent the two opposing sides L, R. The support pillars 4140*a-b* can be rigid columns and/or beams affixed to the ground 10 or a platform beneath the rigid frame 4100 and tub and drum assembly 4200 therein. The pivot motor 4115 can be disposed on one of the pair of support pillars 4140*a-b* and is configured to operably engage one of the pair of coaxial pivot shafts 4105*a-b* collocated on a support pillar with the pivot motor 4115 for rotation. Alternatively, in implementations, the pair of radial bearings 4106*a-b* can be disposed on beams which are at least one of connected laterally to structural building framework (e.g., a factory building in which the device 4000 is located) and connected to an alternate support structure external to the rigid frame 4100.

With reference to FIG. 6B, the at least one pivot shaft 4105 (e.g., the pair of pivot shafts 4105*a-b*) is configured to suspend the rigid frame 4100 from at least one of a support surface (e.g., the floor 10 or a raised platform) or beams connected to building framework by a height H1 greater than a distance D3 from the pivot axis 4110 to a front end bottom edge 4102 of the rigid frame 4100. By providing a clearance (e.g., height H1) greater than the distance D3 between the pivot axis and the front end bottom edge 4102, the rigid frame 4100 can rotate without hitting the floor 10 and/or a receiving container (e.g., clean bin) positioned therebeneath for receiving the washed and dried at least one deformable article 12. As shown in FIGS. 6A-C and 11, the pair of support pillars 4140a-b is anchored to the ground 10.

Figure 17:
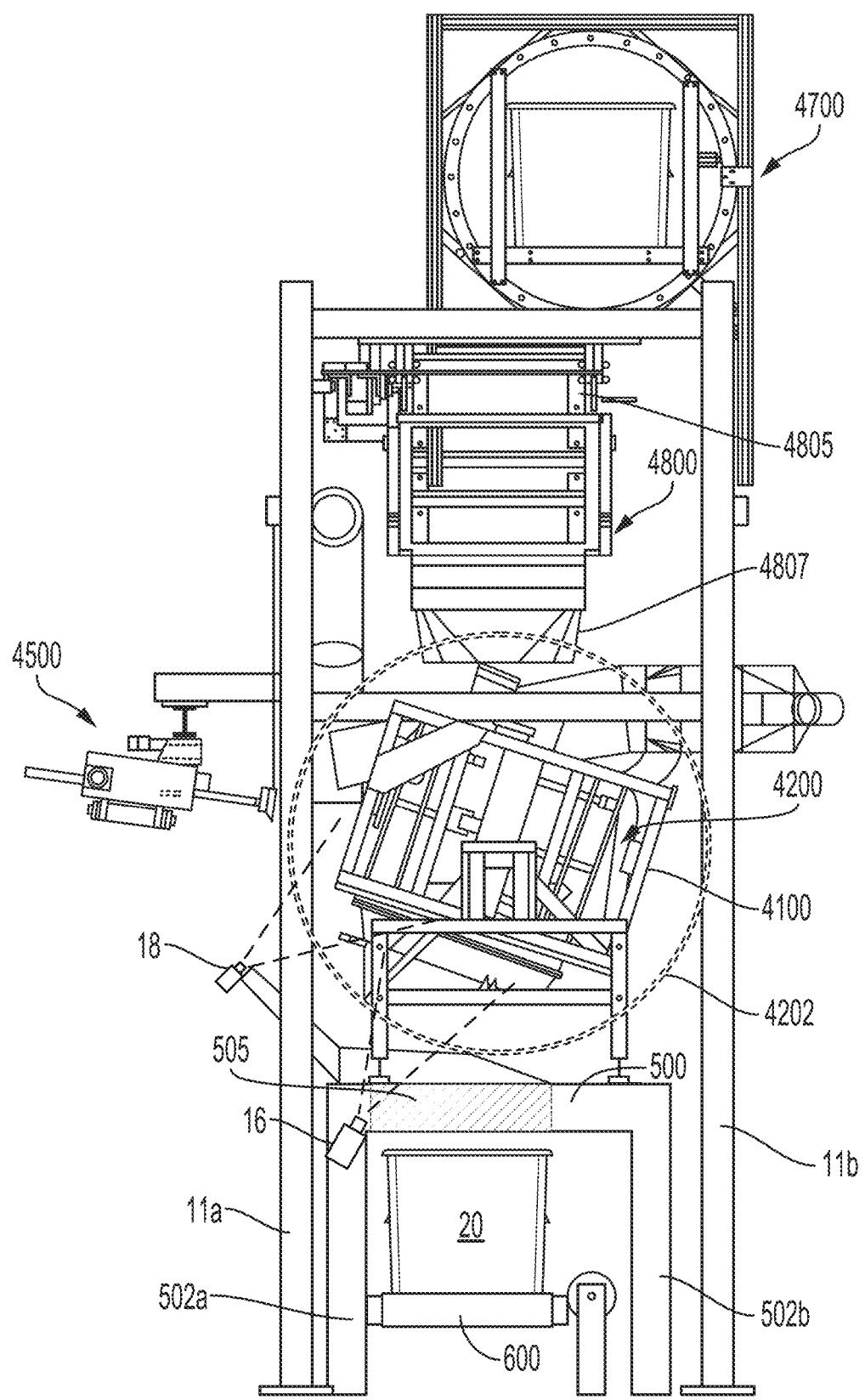
FIG. 17 depicts an end view of an implementation of an autonomous washing and drying device disposed above a clean laundry collection bin.

Additionally or alternatively, as shown in FIG. 17, the floor 10 comprises a mezzanine or a top surface of a raised platform 500 configured to receive thereon the support pillars 4140a-b. In implementations, the mezzanine floor or platform 500 comprises an opening 505 through which the washed and dried at least one deformable article 12 is dropped from the drum 4205 into a clean bin 20 for collection. As subsequently described with regard to implementations, the opening 505 comprises a clean chute for directing falling articles into a clean collection bin 20. In implementations, the pair of support pillars 4140a-b can be anchored to the floor 10 beneath the raised platform 500 or anchored to the platform 500 disposed above the clean bin 20. In implementations, the floor 10 comprises a mezzanine and the clean bin is configured to be disposed opening 505 in the floor of the mezzanine, on a floor disposed beneath the mezzanine.

As shown in FIGS. 6A-C and 10, in implementations, the washing and drying device 4000 comprises two or more fixed posts 4145a-d disposed on the upper half of the two opposing sides L, R of the rigid frame 4100 and oriented parallel to the pivot axis 4110. The two or more fixed posts 4145a-d interfere with the pair of support pillars 4140a-b to prevent the frame 4100 from rotating beyond the vertically upright and vertically inverted orientations, thereby preventing damage to the pivot motor 4115 and other parts of the device 4000. In implementations, the two or more fixed posts 4145a-d prevent the frame from rotating beyond the upper limit of the upturned loading orientation (e.g., spin axis oriented between about 80 and 90 degrees up from horizontal) and the two or more fixed posts 4145a-d prevent the frame from rotating beyond the upper limit of the inverted unloading orientation (e.g., spin axis oriented between about 65 and 75 degrees down from horizontal). This interference with the pair of support pillars 4140a-b prevents damage to the device 4000 caused by the loss of load on the isolation springs 4120a-b. In implementations, the support pillars 4140a-b can be I-beam shaped. In implementations, the support pillars comprise horizontal I-beams (not shown) extending between and affixed to structural beams, such as vertical beams 11a, 11b of FIG. 17. In implementations, such as that depicted in FIGS. 6A-C and 9, the support pillars 4140a-b comprise a wide base spanning at least the front to back length of the left and right L, R sides of the rigid frame and one or more angled braces for added strength. The wide base provides added strength and stability for counteracting vibrational forces during operation of the device 4000 and torsional forces during pivoting of the frame 4100 and tub and drum assembly 4200.

As described previously, and as shown in at least FIGS. 6A-C and 11, the tub and drum assembly 4200 is connected through a combination of two or more springs 4120a-d and two or more dampers 4122a-d to a stiff outer frame 4100. In implementations, the rigid frame 4100 surrounds the tub and drum assembly 4200, encapsulating the suspended tub and drum assembly 4200 and thereby isolating components of the device 4000, such as the pair of pivot shafts 4105a-b and corresponding radial bearings 4106a-b, from the vibrations and forces of the operating tub and drum assembly 4200 therein. The two or more springs 4120a-d and two or more dampers 4122a-d provide a suspension system that creates an intentional harmonic mode at a low frequency having a corresponding drum speed below that which produces enough centripetal acceleration to adhere the at least one deformable article to the inner surface of the drum 4205. For example, in one implementation, the internal harmonic mode comprises a frequency in a range of around about 0.78 Hz and the speed at which centripetal acceleration plasters the at least one deformable article to the inner surface of the drum 4205 is approximately 50.5 RPM at a frequency of around about 0.84 Hz. In other implementations, the plastering speed and resonant frequency will change accordingly if the mass of the tub and drum assembly 4200 and/or length of the springs 4120a-d and/or dampers 4122a-d changes. The two or more springs 4120a-d and two or more dampers 4122a-d create a linkage so that the lowest natural frequency of the tub and drum assembly 4200 lies in a plane approximately parallel to earth's surface, and the rigid frame 4100 provides sufficient sway space for the resultant lateral motion. Most of the vibration energy is dissipated by this motion so that large forces are not transmitted into the rigid frame 4100. The rigid frame 4100 from which the tub and drum assembly 4200 is suspended therefore isolates the pair of pivot shafts 4105a-b and corresponding radial bearings 4135a-b from vibrations.

Because the rigid frame 4100 pivots about the pivot axis 4110, gravity pulls the tub and drum assembly 4200 away from its nominal position along the spin axis 4230 whenever the pivot angle is moved away from substantially horizontal. In implementations, the device 4000, therefore, further comprises a one or more bumper systems 4150, 4150a-c each comprising a flange 4255 disposed between a pair of front and rear bumpers 4152, 4153 for preventing excessive displacement of the tub and drum assembly 4200 in the direction of the spin axis 4230. As depicted in FIGS. 18-24, in implementations, the device 4000 comprises at least one flange 4255, 4255a-c protruding from an outer surface of the tub 4215. In implementations, the at least one flange 4255, 4225a-c comprises a rigid plate affixed to and/or monolithically formed with the tub 4215 and extending perpendicularly therefrom. As shown in the magnified portion M2 of a bumper system 4150b in the bottom-up view of the tub and drum assembly 4200 of FIG. 19 the at least one flange 4255b is configured to be received in a gap G between a pair of front and rear bumpers 4152, 4153 disposed on the rigid frame 4100. The bottom up view of the tub and drum assembly of FIG. 18 and the side view of the tub and drum assembly 4200 of FIG. 20 both depict the assembly 4200 being tilted at the washing angle α. In the magnified portion M2 of FIG. 19 and the magnified portion M3 of FIG. 19, the flange 4255a-b is disposed between the front and rear bumpers 4152, 4153 in a neutral position and not in contact with either of the front and rear bumper 4152, 4153.

Figure 18:
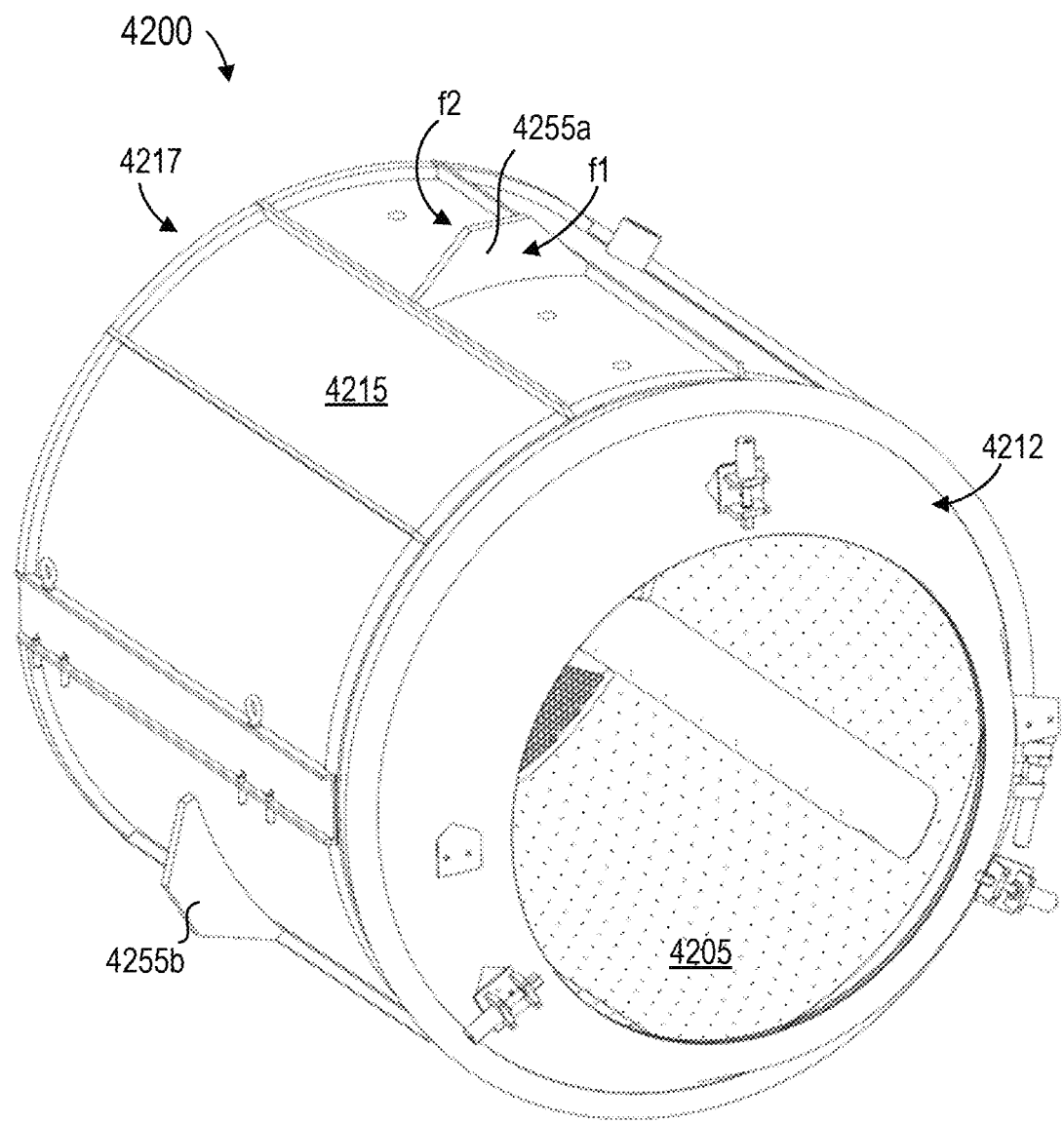
FIG. 18 depicts a side perspective view of an implementation of a tub and drum assembly of an autonomous washing and drying device comprising external flanges.
Figure 19:
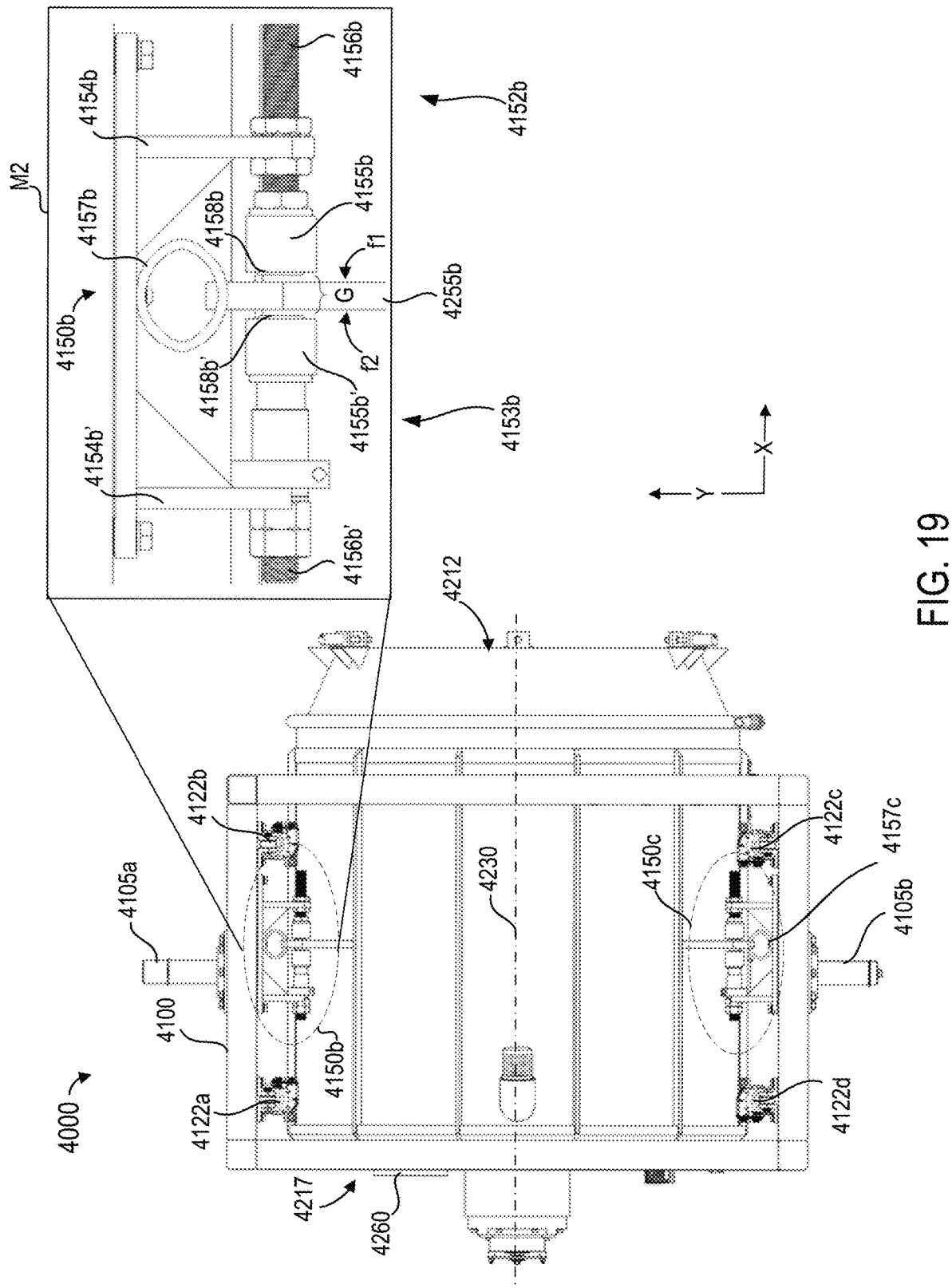
FIG. 19 depicts a bottom view of an implementation of an autonomous washing and drying device comprising a flange and bumper system with the tub flanges centered between the bumpers.
Figure 20:
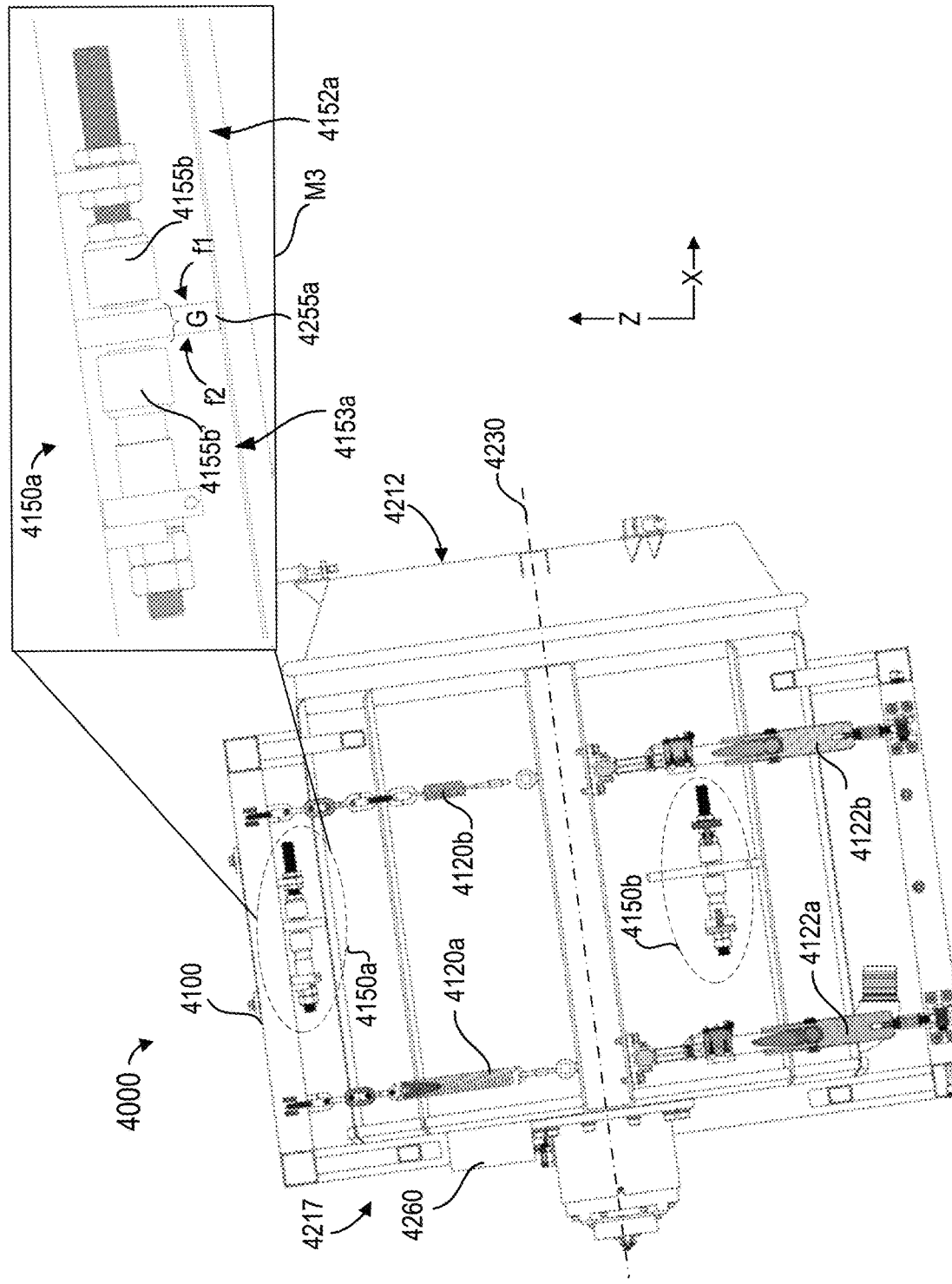
FIG. 20 depicts a side view of the autonomous washing and drying device and flange and bumper system of FIG. 19 in a near-horizontal wash angle orientation.

As shown in FIG. 18 and the magnified portions M2, M3 of FIGS. 19 and 20, in implementations, both faces f1, f2 of the at least one flange 4255, 4255a-c are substantially parallel to the front end 4212 of the tub 4215. In implementations, as shown in the front view of the device 4000 in FIG. 21, the at least one flange 4255, 4255a-c comprises three triangular flanges 4255a-c evenly spaced about the circumference of the outer surface of the tub 4215 at 120 degree intervals, and the front and rear bumpers 4152, 4153 comprises three pairs of bumpers 4152a-c, 4153a-c configured to receive a corresponding one of the three flanges 4255a-c. In implementations, such as that shown in magnified portion M2 of FIG. 19, one or more of the one or more bumper systems 4150, 4150a-c can include a side-load elastomeric spring 4157, 4157b-c configured to absorb energy from up-and-down and side-to-side vibrations of the tub and drum assembly 4200 during operation.

Returning to FIG. 21, in implementations, three pairs of bumpers 4152a-c, 4153a-c are arranged around the circumference of the tub 4215 so that the center of gravity of the tub and drum assembly 4200 (which is on or near the spin axis 4230) falls somewhere within the triangle TB formed by the three pairs of bumpers 4152a-c, 4153a-c. In other implementations, the at least one flange 4255 comprises a continuous circular plate (e.g., a disk-shaped flange) surrounding the entire circumference of the tub 4215 and the two or more pairs of bumpers comprises at least three pairs of bumpers configured to receive the continuous circular plate. Additionally or alternatively, the at least one flange 4255, 4255a-c can be disposed at a mid-point along the outer surface of the tub 4215, halfway between the front end 4212 and drive end 4217. In other implementations, the at least one flange 4255, 4255a-c can be disposed at a point substantially aligned with the center of gravity 4250 of the tub. In implementations, the at least one flange 4255, 4255a-c can comprise at least two rigid flanges, one of each being disposed at a distinct latitude adjacent a corresponding one of the front end 4212 and drive end 4217 of the tub and drum assembly 4200.

Figure 22:
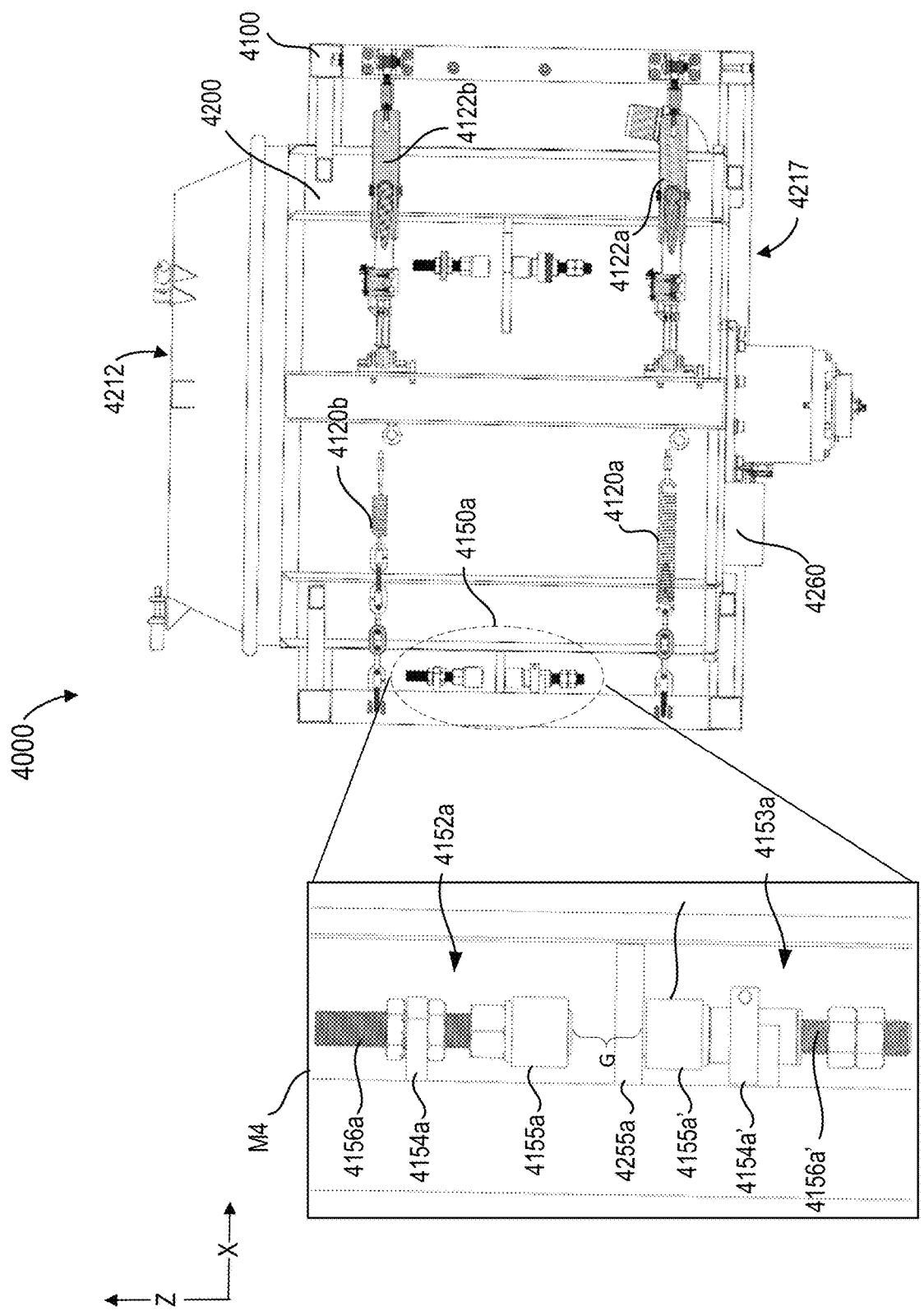
FIG. 22 depicts a side view of a flange and bumper system of an autonomous washing and drying device in an upturned orientation for loading including a magnified portion of a flange and associated bumpers.
Figure 23:
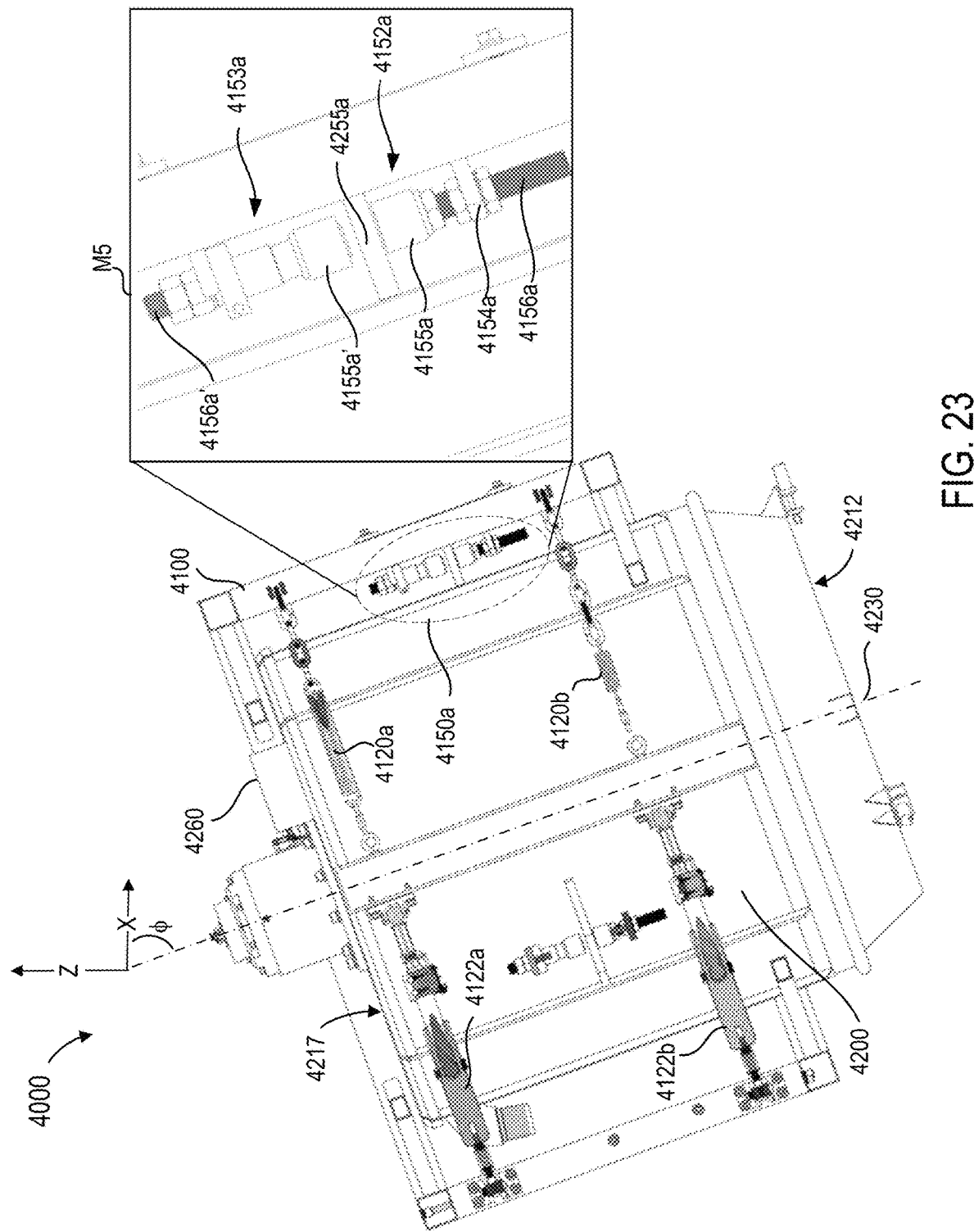
FIG. 23 depicts a side view of a flange and bumper system of an autonomous washing and drying device in an inverted orientation for unloading, including a magnified portion of a flange and associated bumpers.
Figure 24:
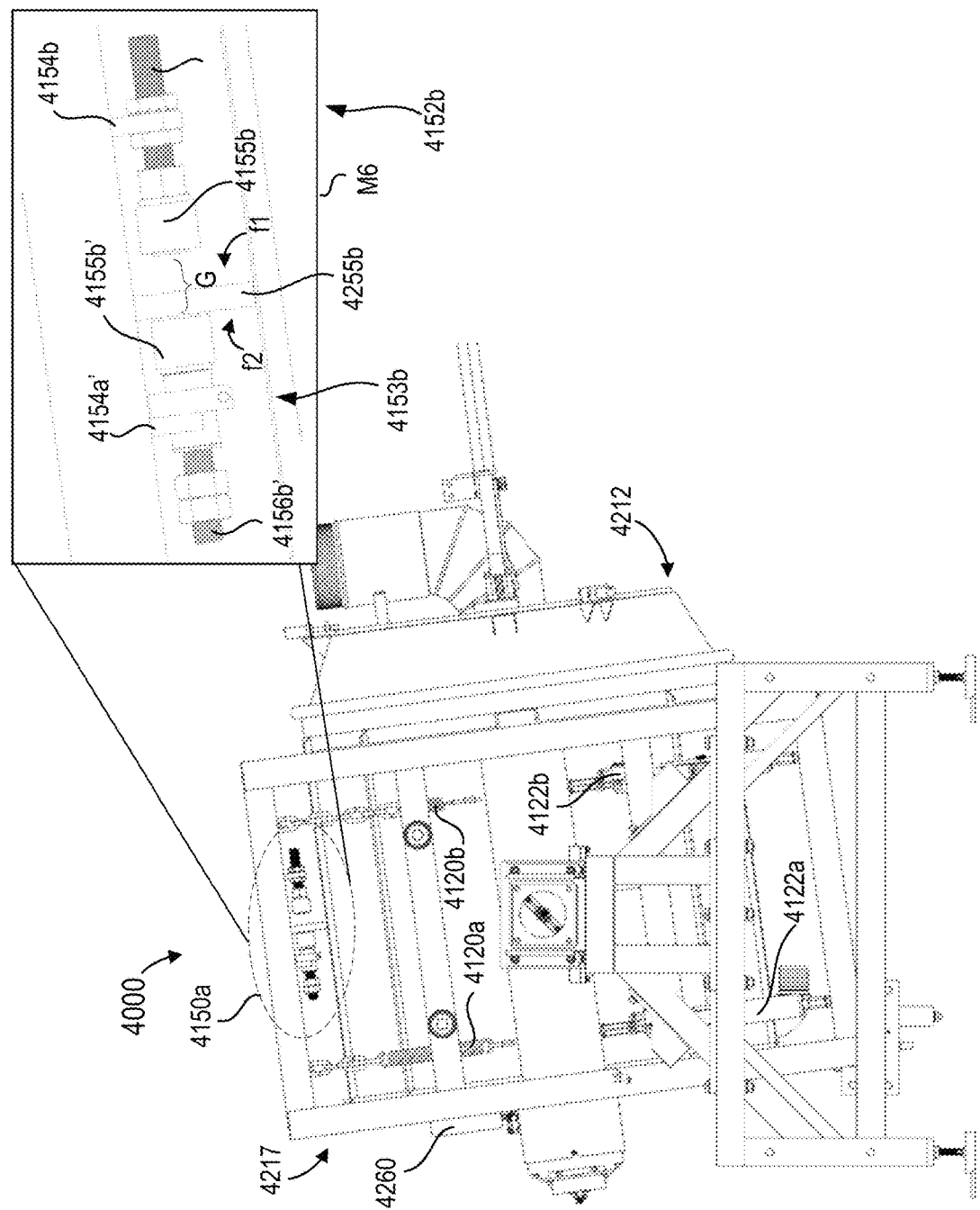
FIG. 24 depicts a side view of the autonomous washing and drying device and flange and bumper system of FIG. 19 in a near-horizontal door seating orientation under the application of force from a door removal and replacement system.

In implementations, one or more bumper systems 4150 comprises three bumper systems 4150a-c each comprising a pair of front and rear bumpers 4152, 4153 disposed on and evenly distributed about the rigid frame 4100 for receiving the at least one flange 4255 formed with or affixed to the tub 4215. While FIGS. 19-20, depict two flanges 4255a-b of the at least one flange in a neutral position and not contacting either of the front or rear bumper 4152a-b, 4153a-b, FIGS. 22 and 23 depict the at least one flange contacting one of the front and rear bumpers as the spin axis 4230 is tilted upright to a drum loading position and downward to a drum emptying position. As shown in the vertically upright drum loading position of FIG. 22 and the downwardly tilted tub emptying position of FIG. 23, when the tub and drum assembly 4200 translates downward under the pull of gravitational force, the at least one flange 4255 contacts at least one bumper of the two or more pairs of bumpers 4152a-b, 4153a-b and the at least one bumper supports the weight of the tub and drum assembly 4200.

For example, as shown in the magnified portion M4 of FIG. 22, the at least one flange 4255a contacts the bottom (e.g., rear) bumper 4152a closest to the drive end 4217 as gravity pulls the tub and drum assembly 4200 down along the spin axis 4230 when the tub and drum assembly 4200 is in a substantially vertically upright orientation for loading at least one deformable article into the drum 4205 for washing and drying. In implementations, the two or more pairs of bumpers 4152, 4153 comprise three pairs of bumpers 4152a-c, 4153a-c, and the three flanges 4255a-c each contact a corresponding bottom (e.g., rear) bumper 4152a-c in the drum loading position. The corresponding bottom bumpers 4153a-c collectively support the weight of the tub and drum assembly 4200 in a substantially vertically upright orientation.

Similarly, as shown the magnified view M5 in FIG. 23, the at least one flange 4255a contacts the top (e.g., front) bumper 4152a closest to the front end 4212 as gravity pulls the tub and drum assembly 4200 down along the spin axis 4230 when the tub and drum assembly 4200 is in a substantially vertically inverted orientation. In implementations, the three rigid flanges 4255a-c each contact a corresponding top (e.g., front) bumper 4152a-c and the corresponding top bumpers 4153a-c collectively support the weight of the tub and drum assembly 4200 in a substantially, vertically inverted orientation. As shown in FIG. 23, the at least one rigid flange 4255a contacts the top (e.g. front) bumper 4153a as gravity pulls the tub and drum assembly 4200 down along the spin axis 4230 when the tub and drum assembly 4200 is angled downward from horizontal, for example at an unload angle (e.g., angle ϕ as previously described with regard to FIGS. 6C and 13). In implementations, the three rigid flanges 4255a-c each contact a corresponding top (e.g., front) bumper 4153a-c and the corresponding top bumpers 4153a-c collectively support the weight of the tub and drum assembly 4200 in a downwardly tilted orientation.

As the tub and drum assembly 4200 rotates through a range of tilt angles at and between upturned and inverted positions, the tub and drum assembly 4200 hangs from the springs 4120a-d attached to the rigid frame 4100. The at least one bumper system 4150, 4150a-c prevents the tub and drum assembly 4200 from shifting significantly in the direction of the spin axis 4230 as the device 4000 pivots to the upturned and inverted orientations. If there were no rigid flanges 4255a-c configured to contact the top and bottom corresponding bumpers 4152 a-c, 4153a-c, the springs 4120a-d would continue to hang vertically as the frame 4100 is tilted and the tub and drum assembly 4200 would move very far forward or back in the frame 4100. This would greatly increase the clearance circle 4202 required to prevent collisions between the pivoting device and the floor thereebeneath, for example. Additionally, the center of gravity of the tub and drum assembly 4200 would move significantly away from the pivot axis 4110, so that the pivot motor 4115 would not have enough torque to return the rigid frame 4100 and tub and drum assembly 4200 therein to the horizontal orientation. The at least one bumper system 4150, 4150a-c therefore securely isolates the tub and drum assembly 4200 within the frame 4100 throughout the range orientation angles to prevent interference between the frame 4100 and system element adjacent the frame and to prevent pivot motor 4115 failure.

In implementations, as shown in the magnified portions of FIGS. 19-20 and 22-23, the pairs of bumpers 4152a-c, 4153a-c each comprise a high durometer elastomer stops 4155a-c, 4155a'-c' disposed over a rigid stalk 4156a-c, 4156a'-c', such as a threaded screw held by reversibly tightened nuts. The stiff elastomer stops 4155a-c, 4155a'-c' support the mass of tub and drum assembly 4200 and absorb impact as the pivot angle of the tub and drum assembly 4200 changes. Additionally, in implementations, for example as shown in magnified portion M2 of FIG. 19, the pairs of bumpers 4152a-c, 4153a-c each comprise low friction bumper ends 4158a-c, 4158a'-c' disposed on the high durometer elastomer stops 4155a-c, 4155a'-c' allow the flanges disposed between the pairs of bumpers 4152a-c, 4153a-c to slide, eliminating shear on the elastomer stops 4155a-c, 4155a'-c'.

The two or more pairs of bumpers 4152a-c, 4153a-c can be mounted via brackets 4154 from the tub frame to sandwich the rigid flange(s) 4255, 4225a-c on the tub. When the outer frame 4100 is pivoted so that the spin axis 4230 is at the spin extraction angle α' for water extraction, the bumpers 4152a-c, 4153a-c are axially aligned with a small air gap G between both bumpers of each pair of bumpers 4152a-c, 4153a-c. A corresponding rigid flange 4255, 4255a-c is configured to be disposed in the air gap G between the corresponding one of the pairs of bumpers 4152a-c, 4153a-c.

Figure 25A:
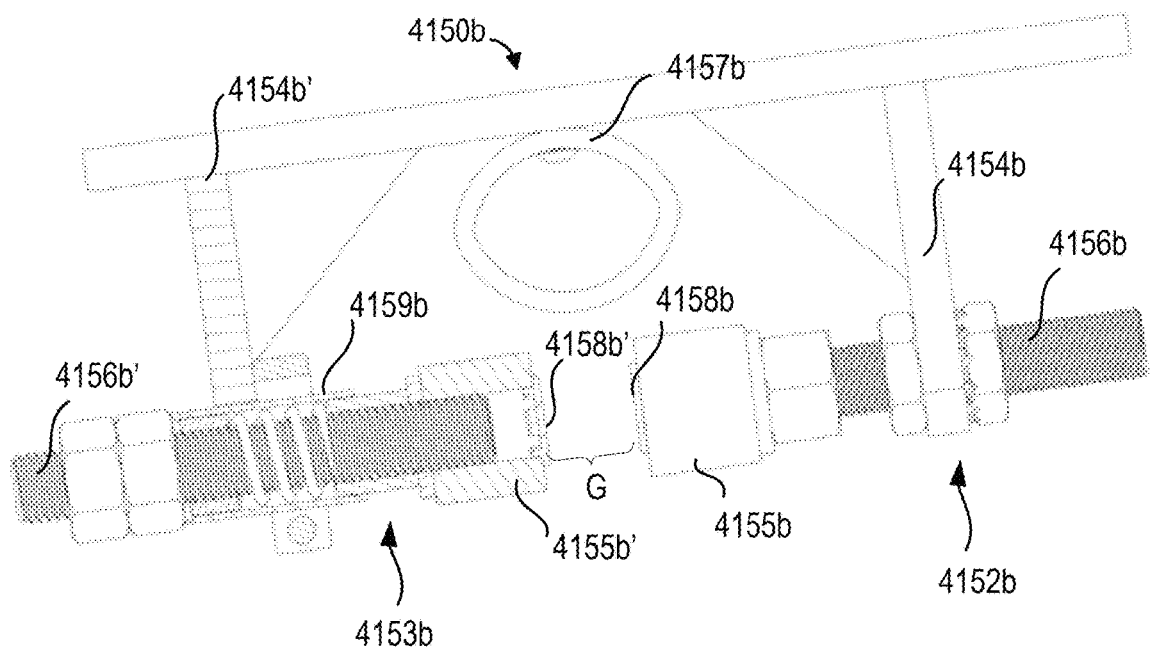
FIG. 25A depicts an enlarged view of a rear compression bumper in an extended state.
Figure 25B:
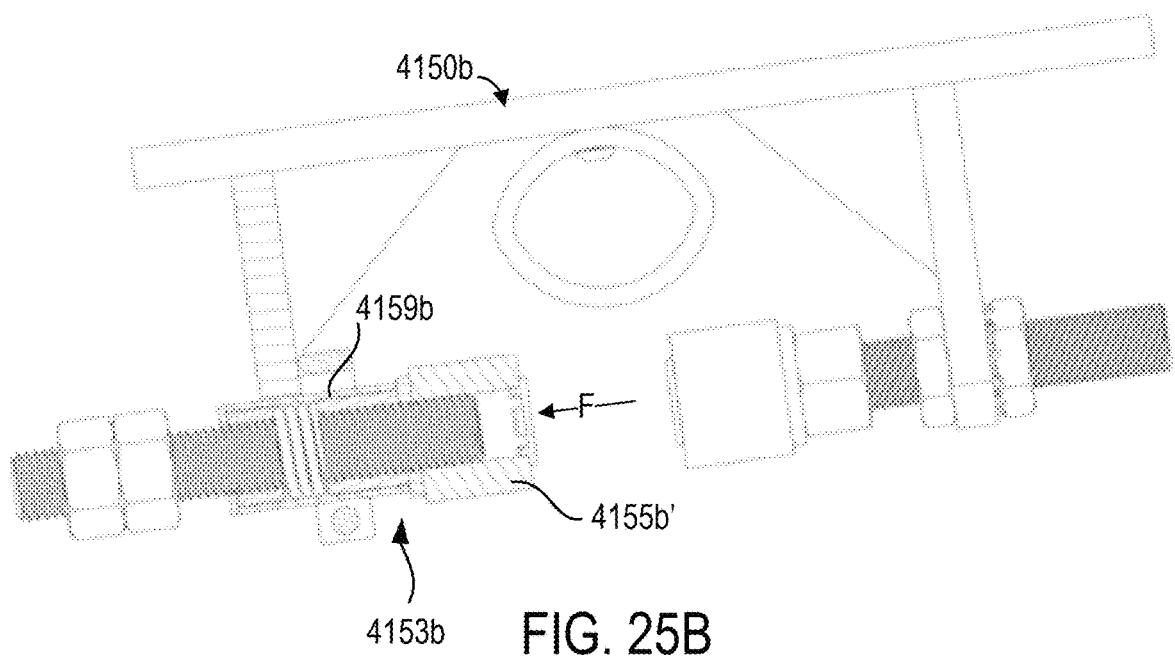
FIG. 25B depicts the rear compression bumper of FIG. 25A in a compressed state under the application of force.

In implementations, the gap G is in a range of the gap G is in a range of between about 2 mm to 10 mm greater than the thickness of the rigid flange 4255 disposed therein thereby allowing between about 1 mm to 5 mm clearance on each side of the rigid flange during spin extraction. For example, for a rigid flange 4255 comprising a thickness of 13 mm, the gap G can be between about 15 mm to 23 mm. In implementations, each bracket 4154, 4154*a-c*, 4154*a'-c'* is configured to support therein or thereon a rigid stalk 4156, 4156*a-a'*-4156*c-c'* so that the gap G is adjustable. For example, in implementations, the rigid stalks 4156 comprise threaded rods held reversibly affixed to the brackets 4154, 4154*a-c*, 4154 *a'-c* by two or more adjustable nuts disposed on opposite sides of each bracket. In implementations, as will be described in detail with regard to FIGS. 24 and 25A-B, at least one bumper of each of the two or more pairs of bumpers 4152*a-c*, 4153*a-c* comprises a compressible bumper configured to compress and compensates for small misalignments of the door 4300 with the opening 4210 of the tub and drum assembly 4200 during mating to the tub cap 4207.

As the rigid frame 4100 pivots up or down from the wash orientation (e.g., spin axis 4230 oriented at the wash, or spin extraction, angle α), the tub and drum assembly 4200 shifts axially by the amount of the gap G, minus the thickness of the rigid flange 4255, plus the compression of the elastomeric bumper material under load. The bumpers 4152*a-c*, 4153*a-c* and bumper mount brackets 4154*a-c, a'-c'* are configured to support the entire mass of the tub and drum assembly 4200 plus the at least one deformable article 12 loaded within the drum 4205 because the spring and damper suspension provides no support when the spin axis 4230 is vertical. When the spin axis 4230 is tilted at least one of the wash angle α and the spin extraction angle α', the gap G eliminates friction between the bumpers 4152*a-c*, 4153*a-c* and rigid flanges 4255, 4255*a-c* during vibration thereby preventing wear on the bumpers. The gap G also allows a small amount of axial or twist motion of the tub and drum assembly 4200 during the washing and drying cycle.

In addition to being the angle for the washing cycle, and, in implementations, also being the angle for one or both of the spin extraction cycle and drying cycle, the wash angle α can be the angle at which a removable door 4300 is seated and unseated in the opening 4210 of the drum 4200 before and after a washing and drying cycle. In implementations, the wash angle α can be distinct from the angle at which the removable door 4300 is seated and unseated in the opening 4210 of the drum 4200. In implementations, the controller 4005 is configured to rotate the isolation frame 4100 about the pivot axis 4110 to adjust the tilt angle of the spin axis 4230 to a door removal and seating angle α" or to within a range of angles for door removal and seating. As shown in the magnified portions M6 of FIG. 24 and the partial cutaway sequential side view of FIGS. 25A-B, a rear bumper 4153*a-c* (e.g., the one of each pair of the two or more bumpers 4152*a-c*, 4153*a-c* closest to the drive end 4217 of the tub and drum assembly 4200) is compressible. In implementations, the compressible rear bumper 4153, 4153*a-c* comprises a two piece plunger 4159 configured to contract under an application of force F from a flange (not show) disposed between the elastomer stops 4155*a-c*, 4155*a'-c'* pressing on the rear bumper while a door 4300 is being pressed into and onto the opening 4210 of the tub and drum assembly. The compressible rear bumper 4153, 4153*a-c* compresses to allow additional movement of the tub and drum assembly past what would otherwise be a hard stop. This enables slight shifts that accommodate any small misalignments if the door 4300 is not perfectly parallel to the front outer surface of the tub cap on which it is seating. As will be described subsequently with regard to seating the door in the opening, at least one end effector (e.g., one or more of grippers, hooks, electromagnets, and suctions (e.g., suction cups)) holding the door 4300 during seating will push against the tub and drum assembly 4200 causing it to deflect under pushing force from a piston until the door 4300 aligns with the opening 4210. The door 4300 comprises an angled inner surface for self-centering within the opening 4210 during the application of force and the deflection of the tub and drum assembly 4200.

Figure 26:
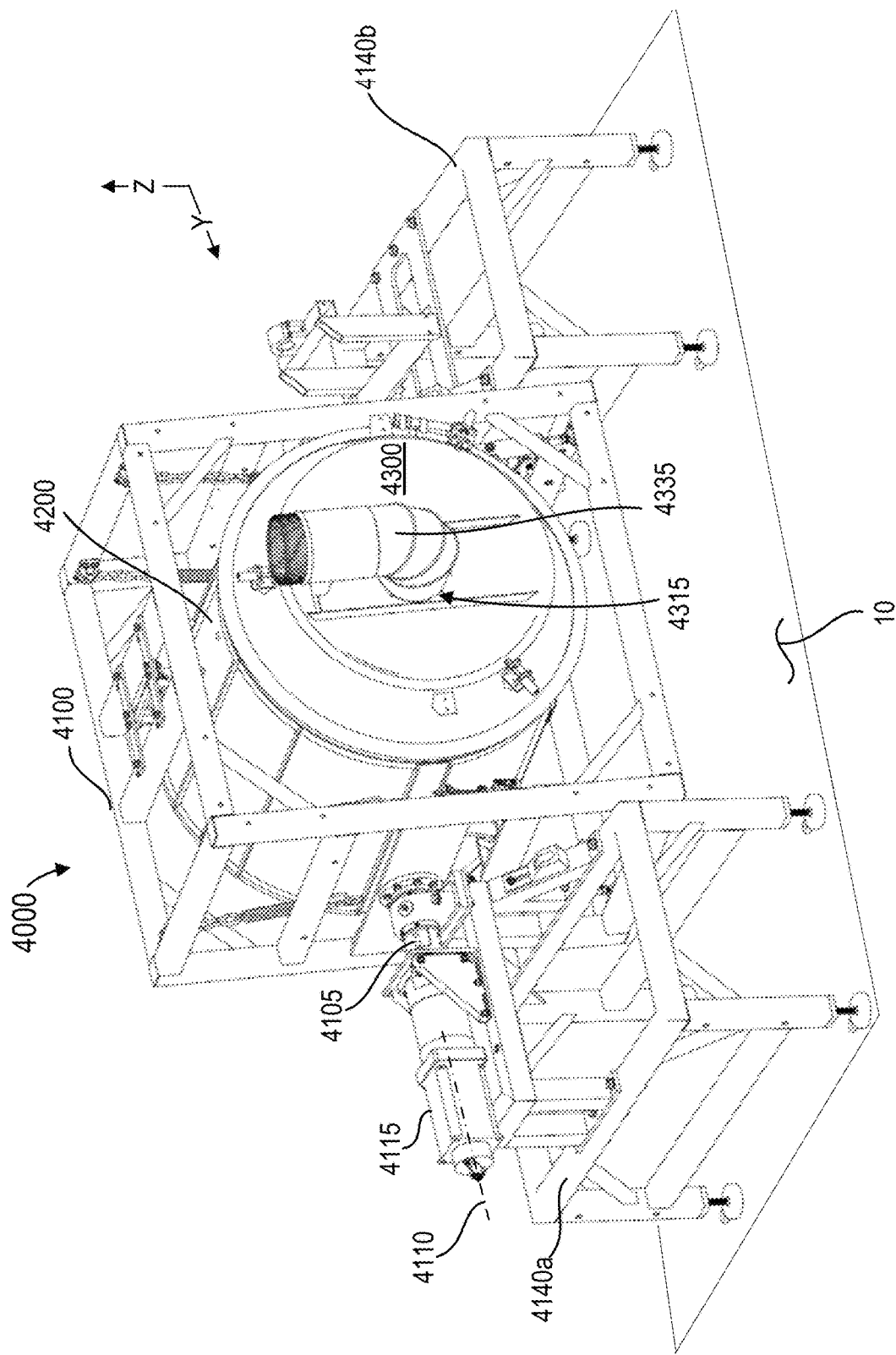
FIG. 26 depicts an implementation of an autonomous washing and drying device with a vented door installed.
Figure 27A:
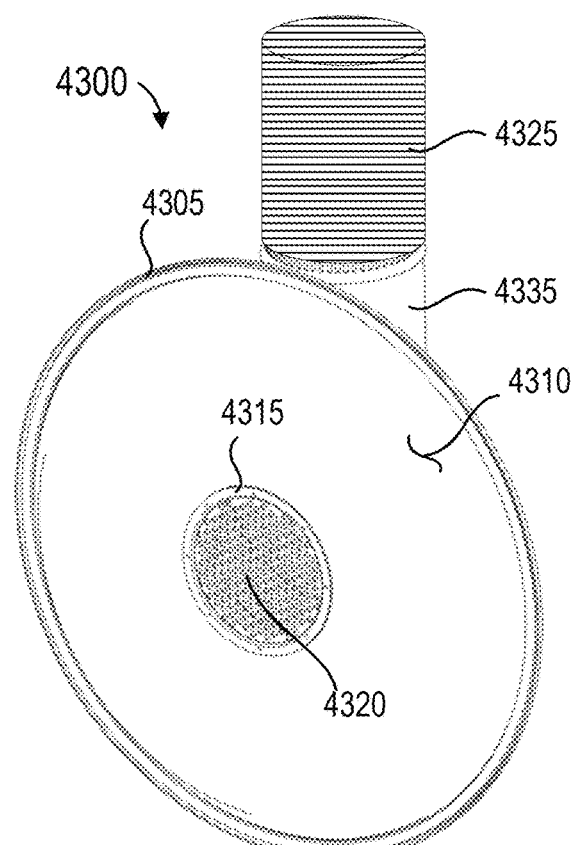
FIG. 27A depicts a rear view of an implementation of a vented door of an autonomous washing and drying device.
Figure 27B:
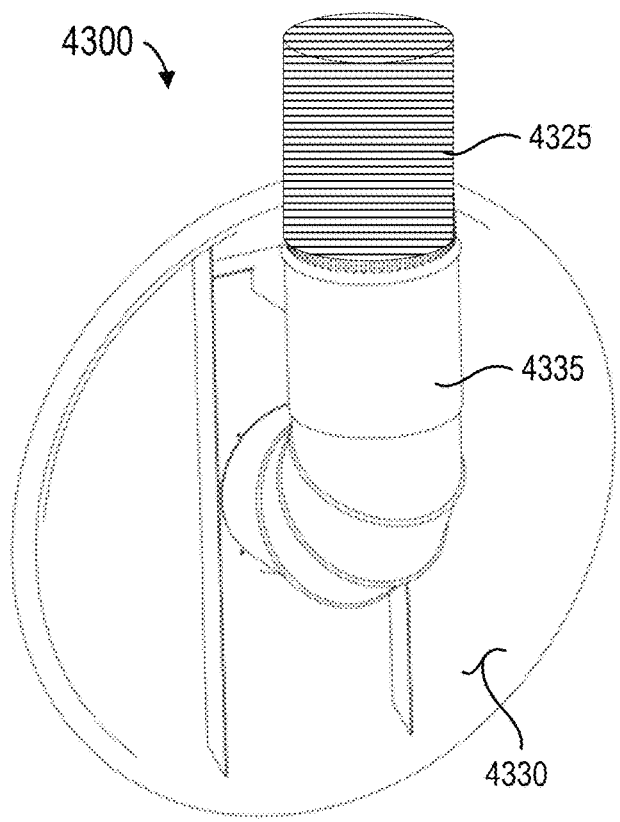
FIG. 27B depicts an example of a front view of the vented door of FIG. 27A.
Figure 28:
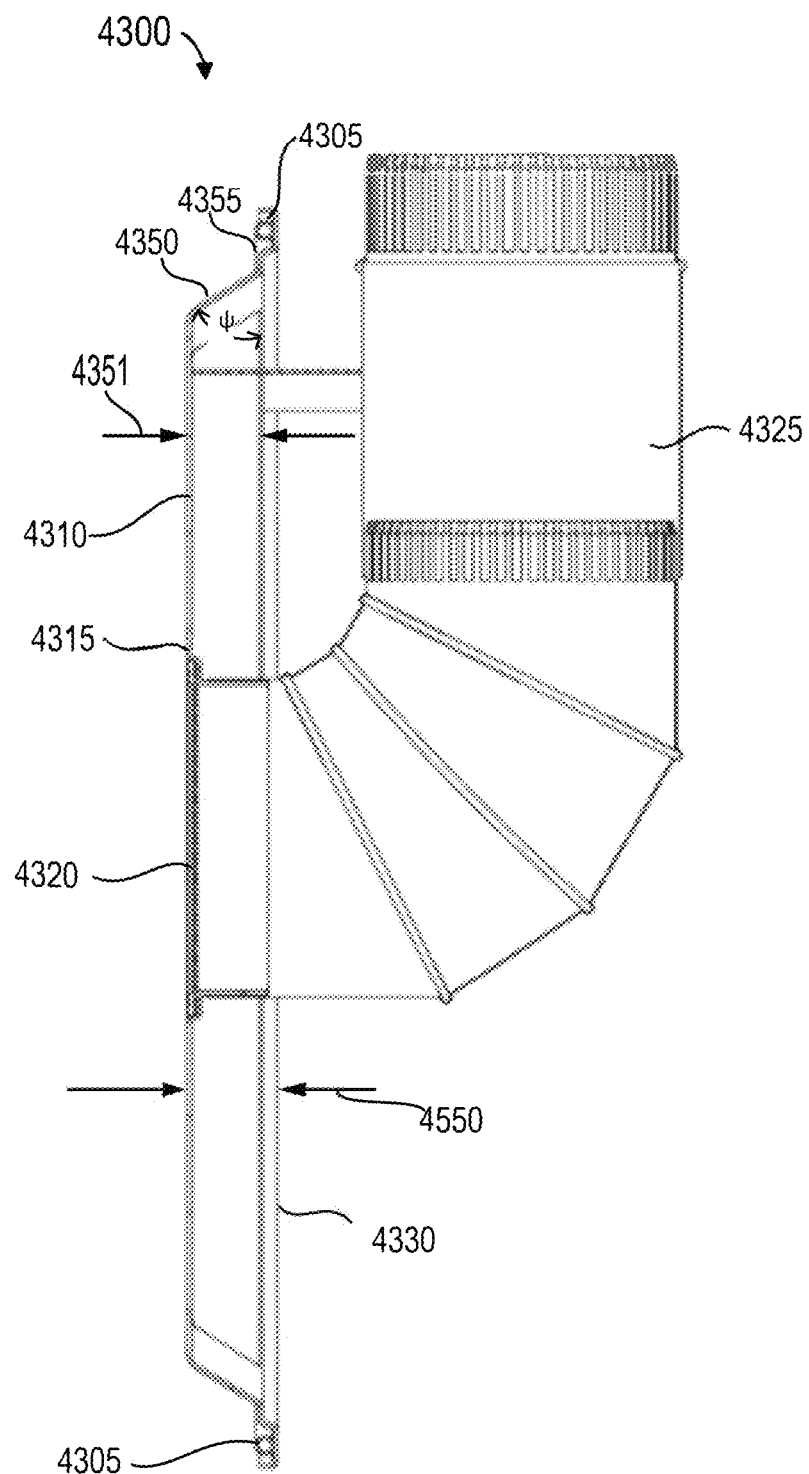
FIG. 28 depicts a cross section side view of the vented door of FIGS. 27A-B.
Figure 29:
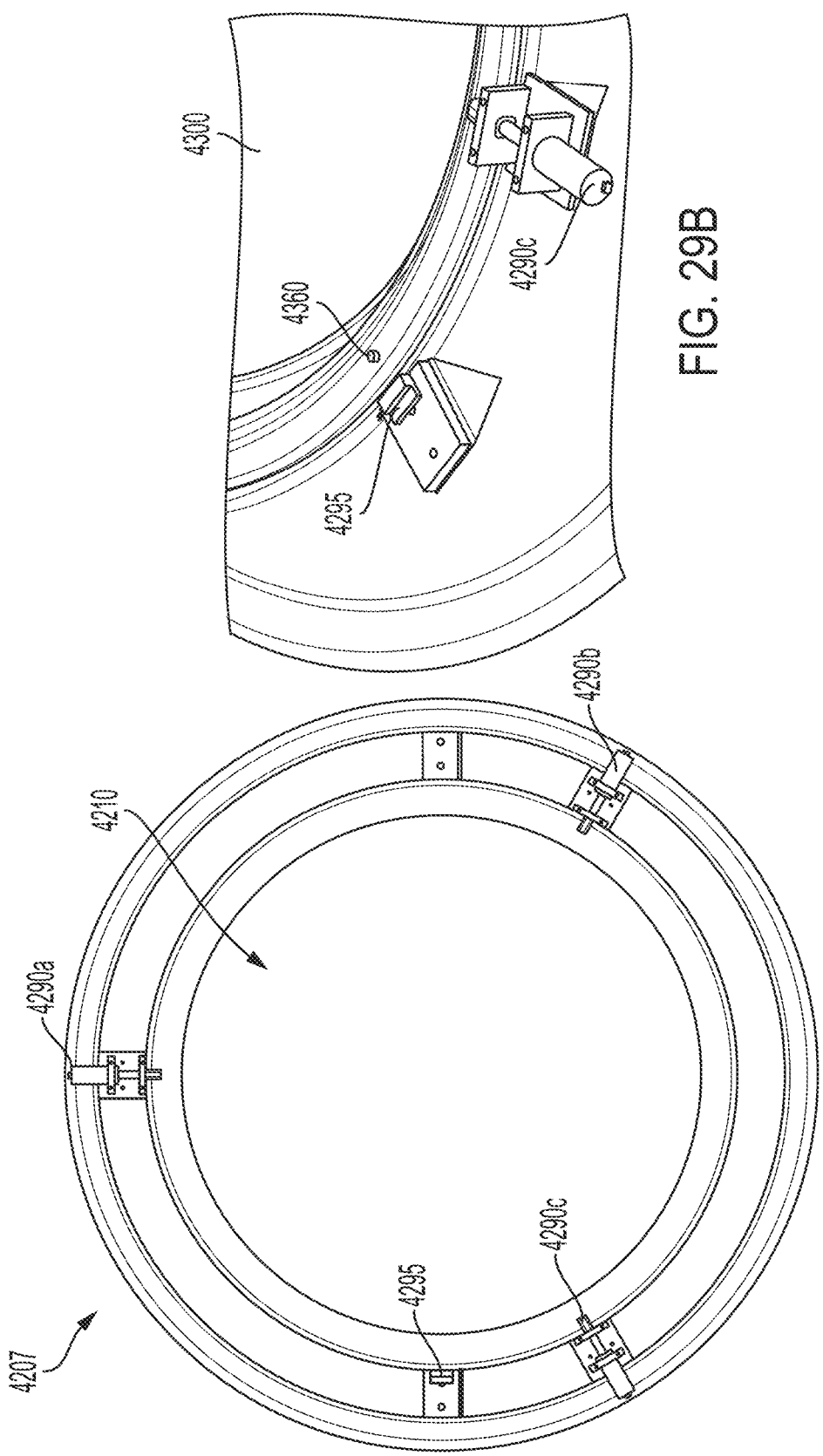
FIG. 29A depicts a front view of a tub cap of the tub and drum assembly including a sensor for detecting insertion of a door.
FIG. 29B depicts the sensor of FIG. 29A in alignment with a magnet disposed on an inserted door.

As shown in FIGS. 26-28, the removable door 4300 is configured to selectively seal the opening 4210 of the tub and drum assembly 4200. The door 4300 seals water into the tub 4215 during washing and spin extraction and controls the air path during hot air/tumble drying. In implementations, the door 4300 is configured to be completely removed from the tub and drum assembly 4200 before the rigid frame 4100 pivots for automated loading and unloading. Once removed, the door 4300 does not interfere with loading and/or unloading the at least one deformable article 12 from the drum 4205. Additionally, removing the door 4300 prior to pivoting the device 4100 upward and downward reduces the mass being moved and therefore reduces the mechanical effort required by the pivot motor 4115. The door 4300 therefore accommodates connection of air and, optionally in implementations, water ducting or piping thereto without those ducts or pipes needing to accommodate the full rotational motion of the tub and drum assembly. This simplifies the supply line management and routing, and removes the need for complicated and potentially failure prone connections of at least the air vent hose 4325 routing to the pivoting tub and drum assembly 4200, which executes sequential loading, sealing, washing, extracting, drying, unsealing, and unloading routines within a single drum 4205 of a single device 4000 at various spin axis angles oriented between upright and inverted. Removing the door 4300 completely from the tub and drum assembly 4200 also enables unimpeded access to portions of the door 4300 requiring cleaning between uses. For example, the completely separated door can be cleaned to remove lint from one or more surfaces and filters. Additionally, removing the door 4300 enables fluid connections to be made without those connections experiencing the forces associated with full rotational motion of the tub and drum assembly 4200 from the washing angle to the upturned and inverted loading and unloading pivot positions. Removing the door 4300 also prevents the door from closing during rotation upward or downward, potentially blocking the opening 4210 and preventing either or both of the unloading and loading processes.

As shown in FIG. 27A, in implementations, the removable door 4300 comprises a compressible O-ring 4305 disposed on an inner surface 4310 of the door 4300. For example, the O-ring 4305 can be disposed on a portion of the inner surface 4310 that mates with the tub and drum assembly 4200. Additionally, in implementations, the removable door 4300 comprises an air outlet orifice 4315 through which air is drawn from the drum 4205 during a drying segment of the washing and drying routine. In implementations, a door screen 4320 can be disposed in the air outlet orifice 4315 for preventing small items (e.g., buttons, hair ties, embellishments, ribbons, etc.) from being drawn into an air vent hose 4325 as air is drawn from the drum 4205. In implementations, the door screen 4320 is a large mesh having apertures in a range of between about 3 mm to 8 mm at a widest opening. In implementations, the door screen is a large mesh having apertures of about 6 mm at a widest opening. Additionally, in implementations, the door screen 4320 is removable for cleaning and/or replacement. In implementations, the device 4000 comprises an actuatable lint remover in communication with the controller 4005. The actuatable lint remover comprises at least one of a wiper blade configured to swipe across the door screen 4320 when the door 4300 is removed from the opening 4210, car wash style brushes configured to engage the door screen 4320 when the door 4300 is removed from the opening 4210, an air curtain, vacuum, screen, and a water spray. Additionally or alternatively, in implementations, the controller 4005 is configured to run a lint removal cycle comprising at least one of blowing air and running water through or over the door screen 4320. As will be described subsequently, in implementations, the door screen 4320 can precede a lint filter 4608 (FIG. 45) in along an airflow path A exiting the drum 4205.

In addition to supporting the door screen 4320 therein, the air outlet orifice 4315 is configured to receive an air vent hose 4325 inserted through an outer surface 4330 of the door 4300. In implementations, such as that shown in FIG. 26-28, a rigid conduit 4335 is configured to engage the air outlet orifice 4315 at one end and receive the air vent hose 4325 at the other end. In implementations, the rigid conduit 4335 comprises a pipe configured to route air outward and away from the drum 4205. In implementations, the rigid conduit 4335 comprises an elbow pipe and is configured to route air from the sealed drum 4305 outward and upward into the air vent hose 4325. In implementations, the rigid conduit 4335 comprises an elbow pipe and is configured to route air from the sealed drum 4305 outward and at least one of upward, downward, sideways, and some combination of these directions into the air vent hose 4325. The air vent hose 4325 is flexible to accommodate movement of the door 4300 during attachment and removal to the drum 4205 and to accommodate motion and vibration of the tub and drum assembly 4200 and the door 4300 and hose 4325 attached thereto during the washing and drying cycle. In implementations, the air vent hose 4325 is an accordion style, collapsible lightweight hose. The hose 4325 can comprise at least one of aluminum, stainless steel, PVC, polyester, polyamide, or other material for routing warm humid air from the device 4000. In implementations, the air vent hose is insulated and configured to be affixed to the rigid conduit 4335 by one or more clamps.

Figure 31:
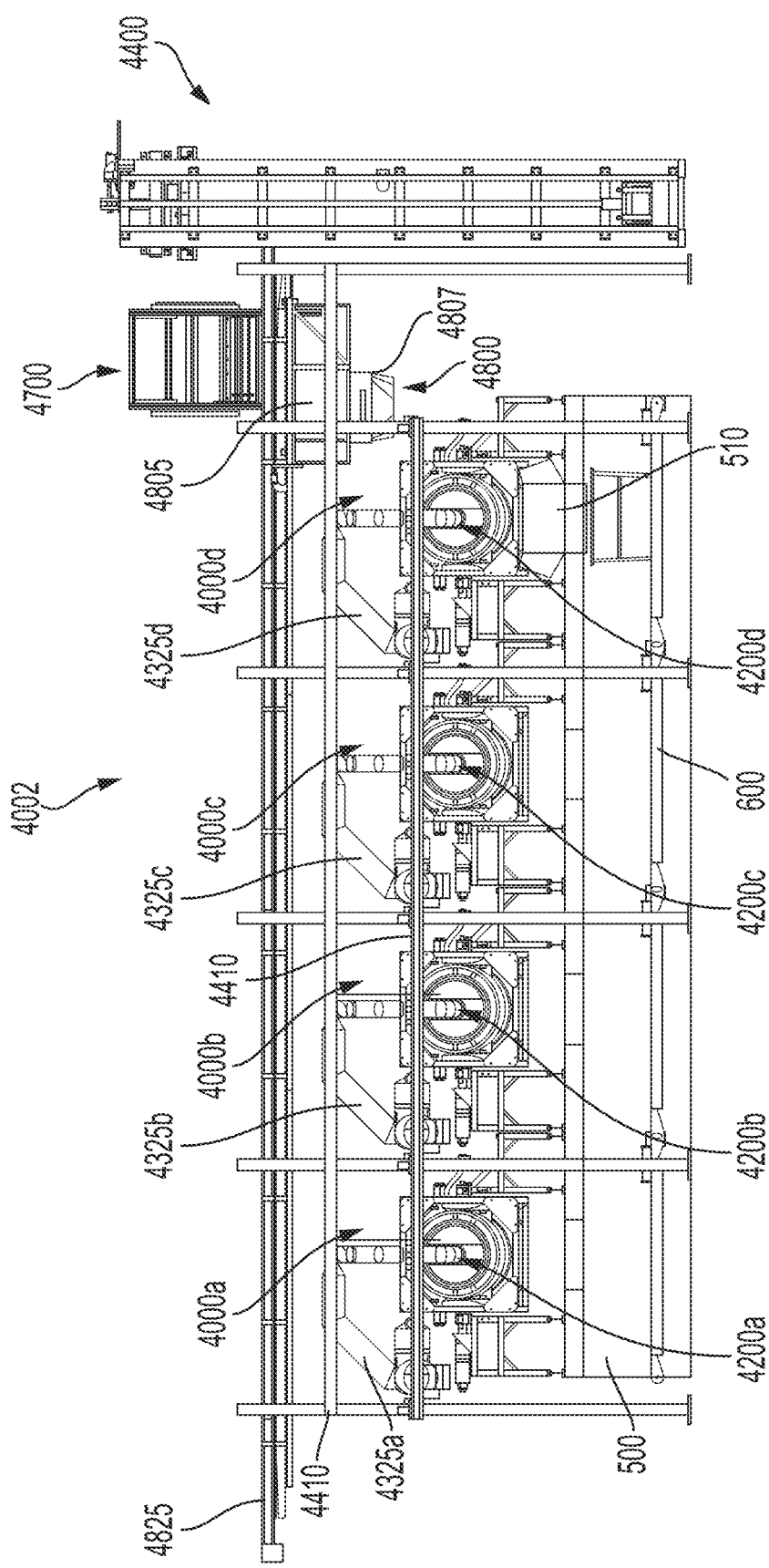
FIG. 31 depicts a schematic front view of a plurality of autonomous washing and drying devices with a solid portion shown as transparent for viewing an enclosed clean bin conveyor disposed beneath the plurality of devices.

As shown in FIG. 31, in implementations, the air vent hose 4325 is relatively long compared to the rigid conduit 4335 and can be routed up and away from the rigid frame 4100 along a ceiling or other structural support. By attaching the air vent hose 4325 (e.g., exhaust duct) to the removable door 4300, the tub and drum assembly 4200 can pivot with the door 4300 detached and therefore avoid pulling the hose 4325 through a range of angles, which could potentially overstretch, damage, or dislodge the hose 4325 from the door 4300 or otherwise cause wear and tear on the flexile hose 4325. The angle and distance that the air vent hose 4325 traverses is eliminated or minimized such that the hose 4325 sees no moment forces and therefore remains securely attached to the door 4300. Heated air can be drawn from the drum 4205 during a drying cycle without any losses caused by gaps that would occur if the hose 4325 were pulled from the door 4300 and/or extended to a point of failure (e.g., rupture) along its length.

As previously described, in implementations, the air vent hose 4325 (e.g., exhaust duct) comprises a lint filter 4608 (FIG. 45) attached thereto for filtering air vented from the tub and drum assembly 4200 through the hose 4325. The lint filter 4608 will be upstream of (e.g., ahead of) an exhaust blower 4610, in order to remove lint from the airflow A and prevent damage to the blower 4610. Because the lint filter 4608 is mounted downstream from (e.g., after) the door 4300, a door removal and replacement system 4500 does not need to accommodate the mass of the lint filter 4608, and the lint filter 4608 is not subjected to extreme vibration during the washing and drying cycle.

In implementations, the lint filter 4608 comprises a fine mesh screen with apertures in a range of between about 500-2000 micron for blocking passage of lint. In implementations, the lint filter 4608 comprises a fine mesh screen with apertures in a range of between about 800-1200 micron for blocking passage of lint. Additionally or alternatively, in implementations, the lint filter 4608 is actively cooled (e.g., with a thermoelectric cooler) to condense water from the airflow A, effectively reducing the open pores of the screen mesh of the lint filter 4608 as the drying cycle progresses. In implementations, a continuous or pulsing water jet or aerosol spray in operable communication with the controller 4005 can direct water jet or spray onto the filter screen so that lint is continuously or periodically cleared during the drying process. In implementations, the lint filter 4608 comprises a rotating wheel with solid or mesh fins in the exhaust air path, which is partially submerged in a pool or circulating bath of cooled water. Lint adheres to the fins and is rinsed off in the pool. In implementations, the lint filter 4608 comprises a mesh engaged with a conveyor assembly in operable communication with the controller 4005 for actuating the conveyor assembly and running the mesh through a water cleaning bath or spray.

Turning now to FIGS. 29-44B, the device 4000 comprises a door removal and replacement system 4500 for completely removing the door 4300 from the tub and drum assembly 4200 and holding it outside an outer clearance circle 4202 of the pivoting tub and drum assembly 4200 during pivoting to upright and inverted loading and unloading orientations. The door removal and replacement system 4500 is configured to attach the door 4300 to the tub and drum assembly 4200 before a washing and drying cycle, thereby sealing the tub and drum assembly 4200 to prevent fluid egress. In implementations, the door removal and replacement system 4500 is mounted apart from the rigid frame and the tub and drum assembly 4200 such that the combined weight of the door 4300 and the door removal and replacement system 4500 are not disposed on the tub and drum assembly 4200 during pivoting between the upright and inverted orientations. As shown in FIGS. 17 and 34, in implementations, the door removal and replacement system 4500 includes a movable stage 4505 (e.g., a carrier) configured to hold and release the removable door 4300 for selective engagement with the front of the tub and drum assembly 4200 for sealing the opening 4210. As shown in the system schematic of FIG. 5, a drive 4570 of the movable stage 4505 is in operable communication with the controller 4005 for operating a drive motor 4510 of the movable stage 4505 to move along one or more rails 4410, and an extend drive 4575 is in communication with the controller for operating an extend cylinder 4512 of the movable stage 4505. The controller 4005 is configured to instruct sealing and unsealing the opening 4210 with the removable door 4300.

As shown in FIGS. 31 and 33A to 34, in implementations, to further reduce and/or eliminate rotational movement of the door 4300 and air vent hose 4325 and/or rigid conduit 4335, the door removal and replacement system 4500 is configured to at least one of remove and seat the removable door 4300 with the spin axis 4230 of the tub and drum assembly 4200 being pivoted to an angle at or within 10 degrees of the wash orientation angle α. The separable door 4300 enables the door removal and replacement system 4500 to seal and unseal the opening 4210 of the tub and drum assembly 4200 without being connected to the tub 4215. The door removal and replacement system 4500 thus bears no additional weight on the pivot motor 4115 thereby improving the efficacy and lifespan of the pivot motor 4115 configured to pivot the device 4000. This configuration also reduces clearance requirements around the device 4000 as the frame 4100 and tub and drum assembly 4200 pivot upward and downward. In implementations, each device 4000 is paired with a dedicated door removal and replacement system 4500. Additionally, as will be described subsequently with regard to implementations, a door removal and replacement system 4500 is shared by two or more washing and drying devices 4000 in a cluster 4002.

Figure 30:
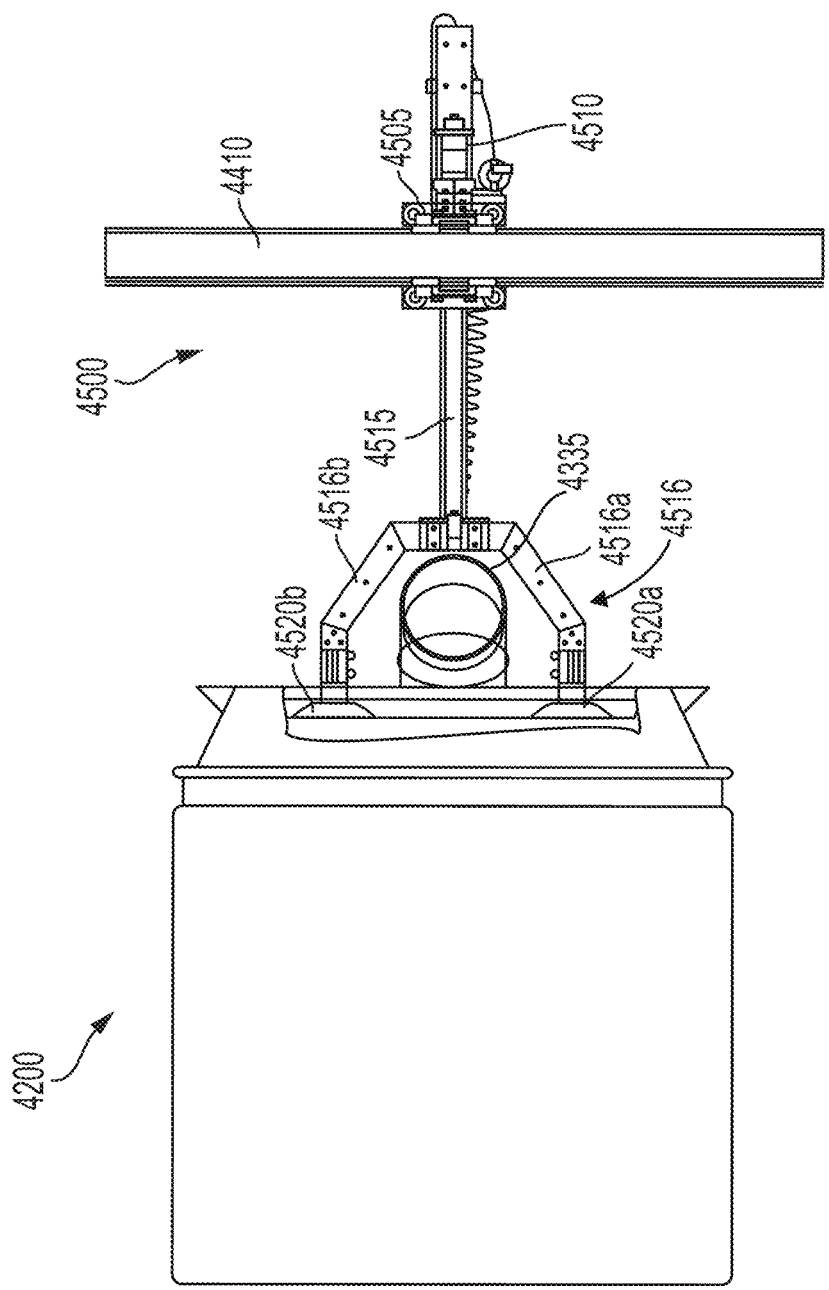
FIG. 30 depicts a top view of an implementation of a door removal and replacement system for an autonomous washing and drying device with a partial cut away view showing a contact between an end effector and the door.
Figure 34:
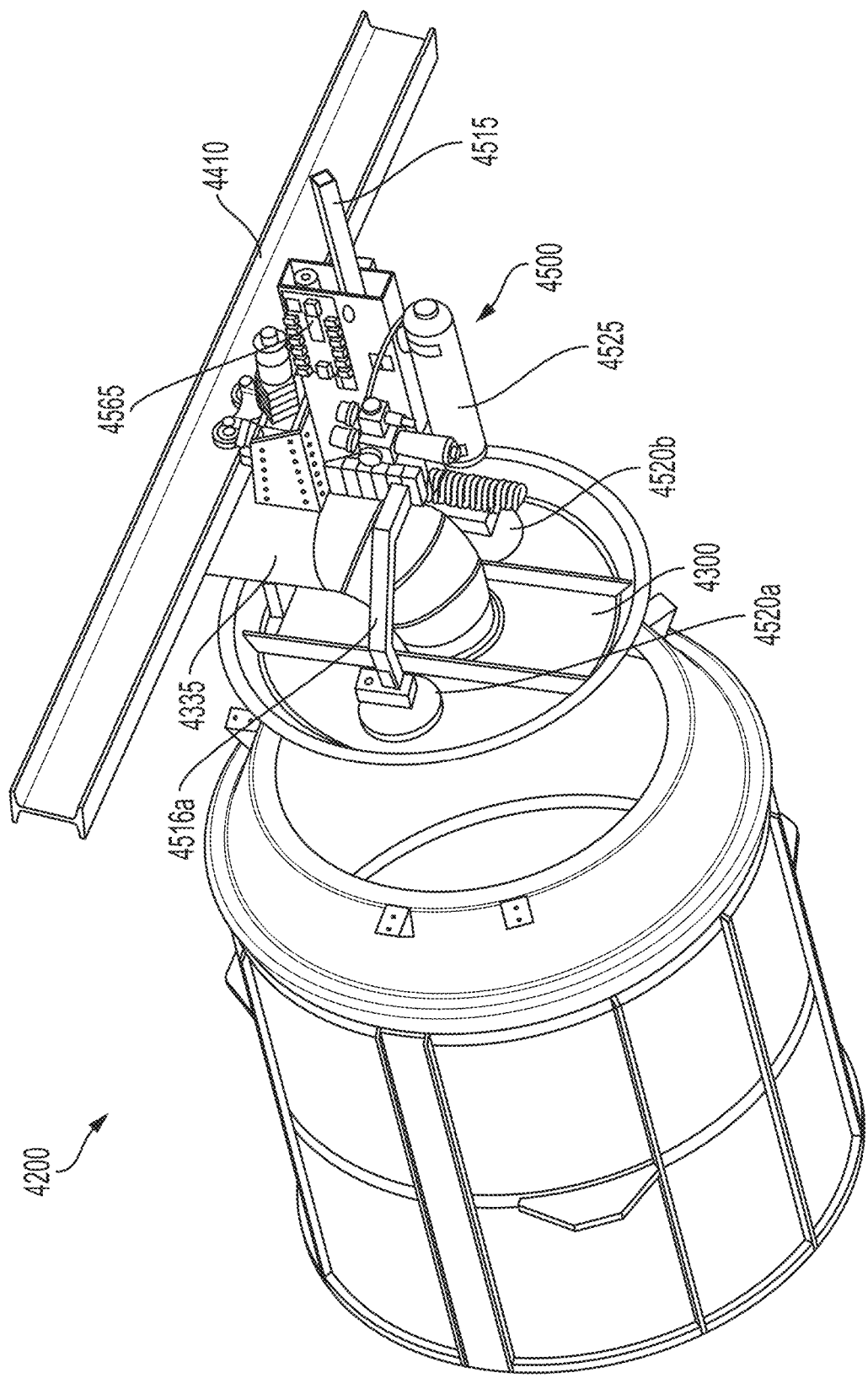
FIG. 34 depicts a front bottom perspective view of FIG. 33B.
Figure 35A:
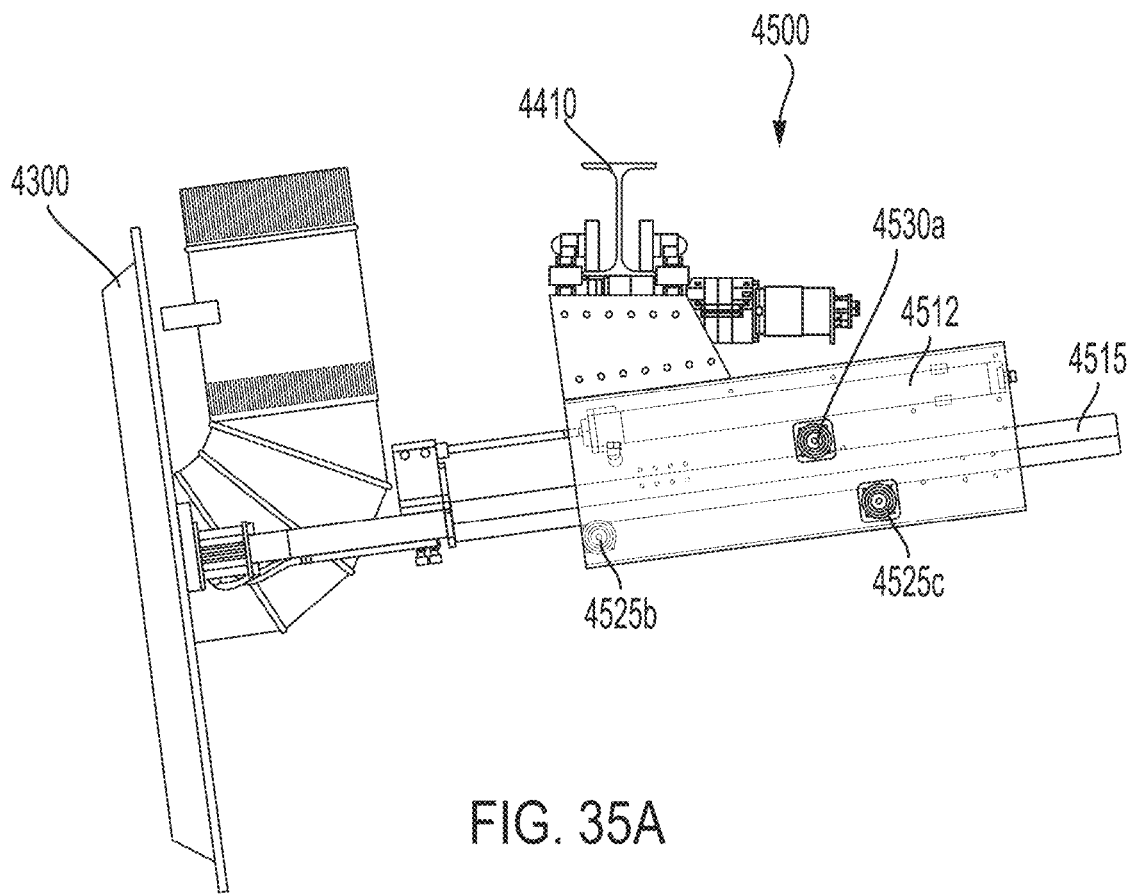
FIG. 35A depicts the door removal and replacement system holding a door detached from a washing and drying device.
Figure 35B:
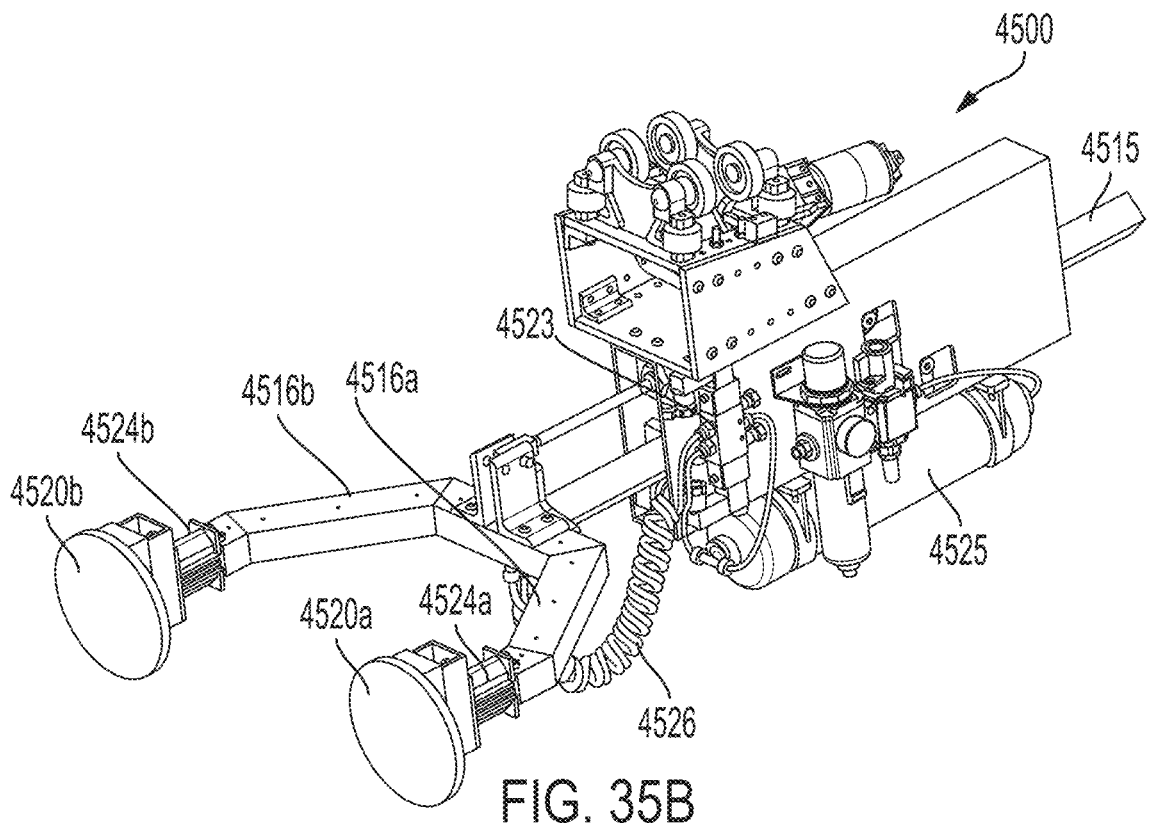
FIG. 35B depicts a front perspective view of the door removal and replacement system of FIG. 35A.

The door removal and replacement system 4500 engages the door 4300 using end effectors including, for example, one or more of grippers, hooks, electromagnets, and suctions (e.g., suction cups), and pulls the door 4300 far enough away from the tub and drum assembly 4200 to provide clearance for the tub and drum assembly 4200 and frame 4100 to pivot up or down. For example, as shown in FIGS. 32A-36, in implementations, the door removal and replacement system 4500 comprises one or more actuatable suctions 4520, 4520a-b disposed on a door-facing terminal end of an extendable and retractable arm 4515 for holding the door 4300. In implementations, such as shown in FIGS. 30, 34, and 35B the arm 4515 comprises a bifurcated fork 4516 comprising two fork arms 4516a-b each terminating at one of the suctions (e.g., rubber suction cups) 4520, 4520a-b. In implementations, the bifurcated fork 4516 comprises clearance for accommodating flexible ducting 4325 and/or rigid vent duct 4335 attached to door 4300. Additionally, as shown in FIGS. 33A-B, in implementations, a flexible pneumatic hose 4526 allows the suctions 4520a-b to stay connected to the door and engage from the extended arm position within an inner clearance circle 4203.

Figure 33A:
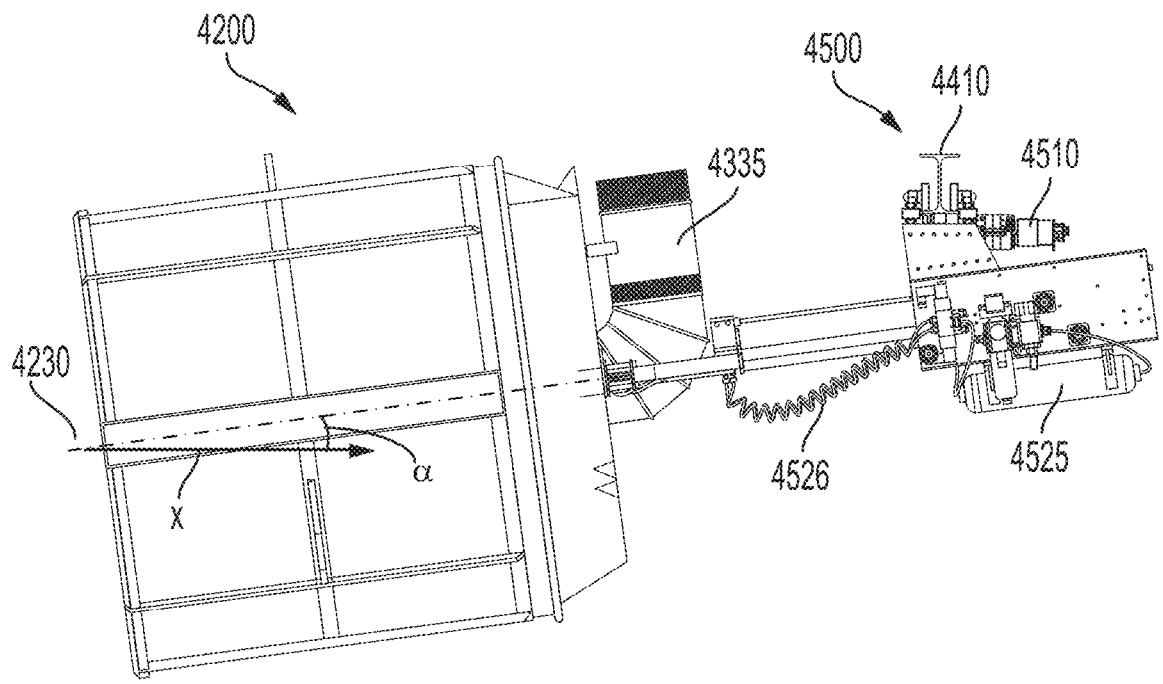
FIG. 33A depicts a side view of an autonomous washing and drying device and door removal and replacement system with a door seated on the tub and drum assembly during either removal or replacement by the door removal and replacement system.
Figure 33B:
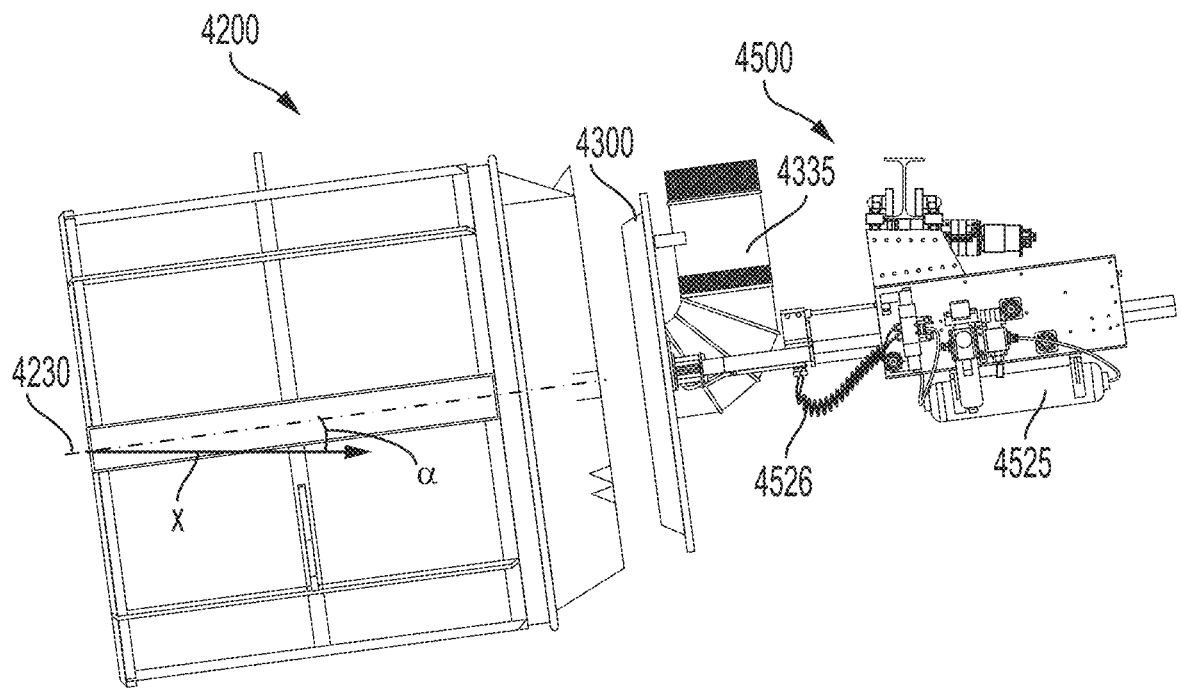
FIG. 33B depicts a side view of an autonomous washing and drying device and door removal and replacement system with a door removed from a tub and drum assembly.
Figure 37B:
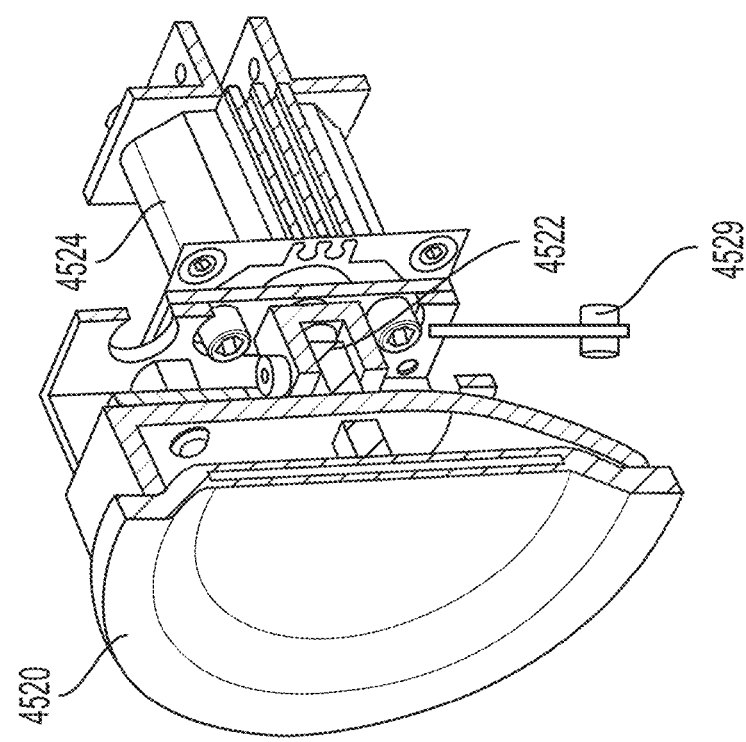
FIG. 37B depicts a partial cross section perspective view of the suction of FIG. 37A in an actuated, suction state.
Figure 37A:
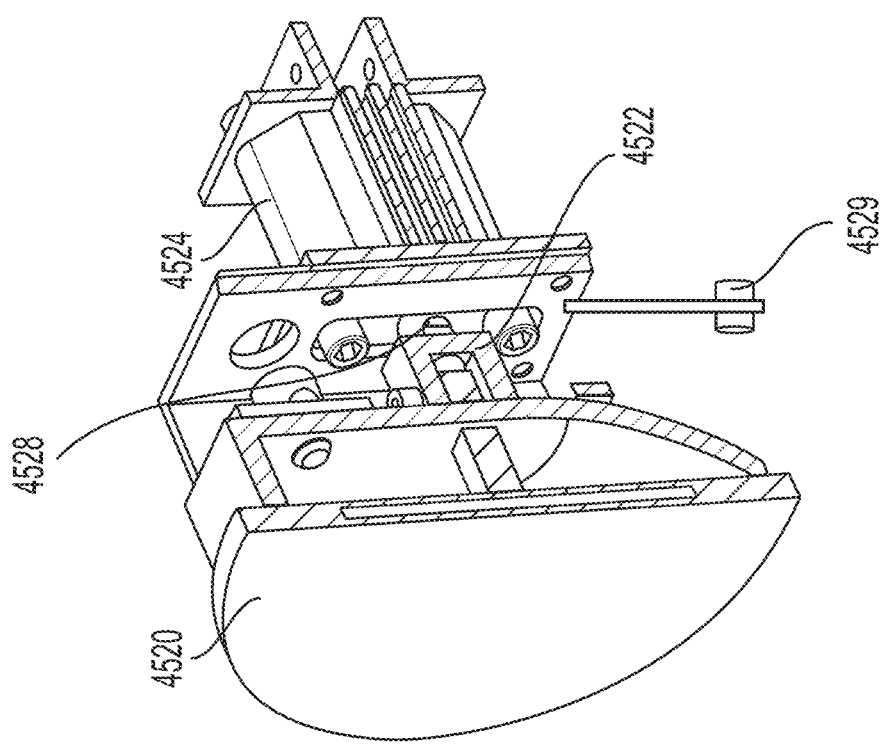
FIG. 37A depicts a partial cross section perspective view of the suction of FIG. 36 in a non-actuated state.

As shown in FIGS. 33A-B through 37B, the one or more actuatable suctions 4520, 4520a-b can be pneumatically actuated, for example. In implementations, a pneumatic cylinder 4524, 4524a-b controls each of the actuatable suctions 4520a-b. Each pneumatic cylinder 4524, 4524a-b pushes a corresponding piston rod 4528 in and out, which is then connected to the suction 4520, 4520a-b via a metal post and clevis 4522. In implementations, the flexible pneumatic hose 4626 is in operative communication with each of the pneumatic cylinders 4524, 4524a-b. In implementations, a control valve 4523 in operative communication with the controller 4005 is configured to simultaneously actuate the pneumatic cylinders 4524a-b so that the suctions 4520a-b are actuated together. In implementations, as shown in FIGS. 36 and 37A-B, an air reservoir 4525 provides locally supplied pressurized gas to the pneumatic cylinders 4524, 4524a-b to prevent any delays or pressure drops associated with a less proximate air handling system supplying the pneumatic cylinders 4524, 4524a-b with gas. Additionally, air conduits 4527, 4527a-b, a'-b' operatively connect to the pneumatic cylinders 4524a-b and to the control valve 4523 via the flexible pneumatic hose 4626 with one conduit supplying air to retract the piston rod 4528 for suction formation and the other for extending the piston rod 4528 to break the suction.

Each pneumatic cylinder thus mechanically pulls up the middle of the suction 4520, 4520a-b to increase the volume within the rubber cup of the suction 4520 and generate suction against the outer surface 4330 of the door 4300. Additionally or alternatively, the one or more actuatable suctions 4520, 4520a-b can be at least one of mechanically operated and air-operated with an actuatable valve for selectively controlling airflow to the suctions 4520, 4520a-b to create suction and break suction under control of the controller 4005. In implementations, the one or more actuatable suctions 4520, 4520a-b can be air-operated with an actuatable valve in communication with a vacuum generator (e.g., venturi vacuum generator with compressed air, factory level (e.g., process-line) dedicated vacuum generator). In implementations, each one of the one or more actuatable suctions 4520, 4520a-b includes a dedicated actuated piston disposed directly behind each suction 4520, 4520a-b.

In alternate implementations, the pair of suctions 4520a-b are configured to push-on-to-suction, and release (e.g., de-suction) under force of an actuated piston that pulls back to open a hole that allows an air path into the suction cup to release suction. The piston extends to re-close the air path so the suction can be re-attached.

Figure 39:
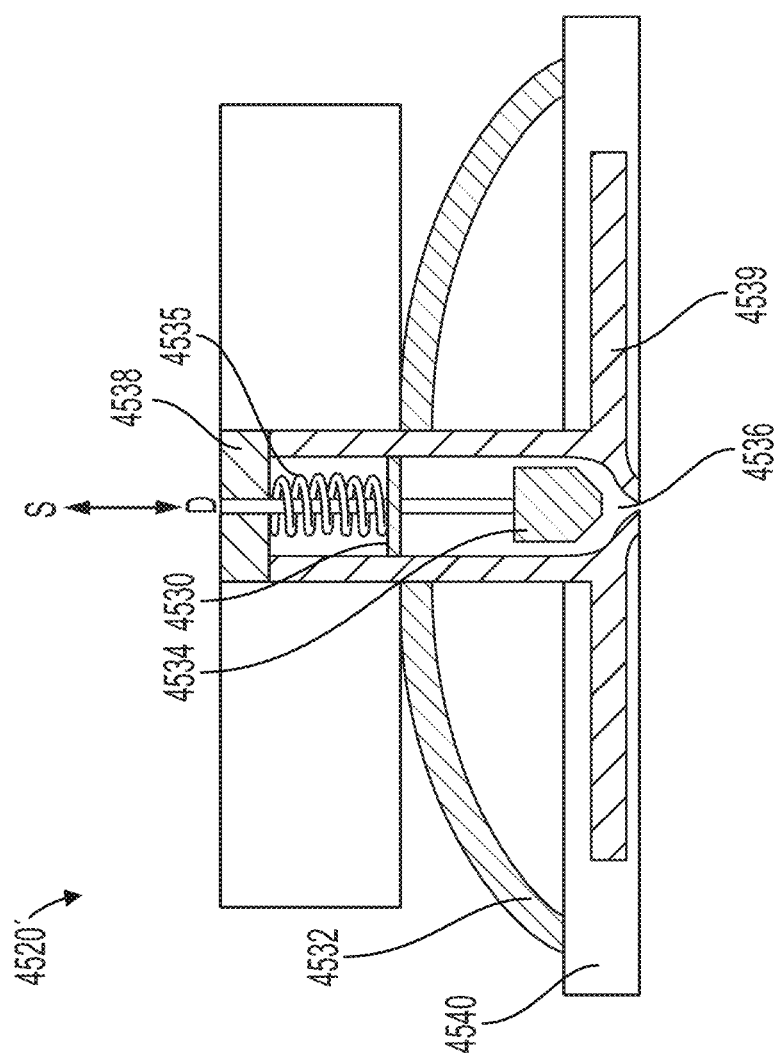
FIG. 39 depicts a cross section schematic of an alternate suction of the door removal and replacement system of FIG. 35B.

Additionally or alternatively, as shown in FIG. 39, each suction 4520' comprises a stop 4530 in a fixed base 4532 that, in the not suctioned state, prevents an inner plunger 4534 from fully seating in an air orifice 4536 through a suction rubber 4540 disposed beneath the fixed base 4532. The inner plunger 4534 is disposed within an air path of an outer plunger 4538 comprising a bottom flange 4539 molded into the suction rubber 4540. When the outer plunger 4538 is actuated by a piston (moving in the direction of suction arrow S), its bottom flange 4539 pulls into the spring-loaded inner plunger 4534 until the inner plunger 4534 is sprung against and closes the air orifice 4536 in the suction rubber 4540. The outer plunger 4538 then continues to pull the inner plunger 4534 away from the stop 4530 for the remainder of the piston stroke, keeping the air path closed while the suction is actuated. Thus, in implementations, the spring-loaded inner plunger 4534 does not immediately pull up from the stop 4530; when the outer plunger 4538 starts to pull past the stop 4530, a spring 4535 keeps pressing on the inner plunger 4534 so that it remains sprung against the stop 4530 until it is seated in the air orifice 4536 at the bottom of the outer plunger 4538. Once the inner plunger 4534 is pressed into the air orifice 4536 (closing the air path), the outer plunger 4538 then pulls the inner plunger 4534 out the rest of the way with it. This creates a stronger suction than a push-on-to-suction suction cup, while guaranteeing a release of suction at the end position, when the outer plunger 4538 is deactivated (not suctioned, in the direction of de-suction arrow D) and fully extended to release the suction. Additionally, when the inner piston 4534 pulls up on the outer plunger 4538, the overmolded bottom flange 4539 of the outer plunger 4538 pulls the middle of the suction rubber 4540 into the fixed base 4532 thereby forming a larger suctioned volume against an engaged door outer surface 4330.

Figure 40B:
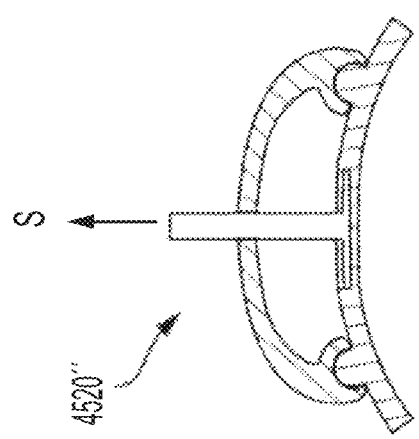
FIG. 40B depicts the suction of FIG. 40A in an actuated suction state.
Figure 40C:
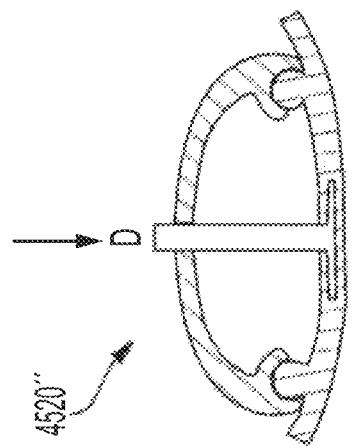
FIG. 40C depicts the suction of FIG. 40A in a suctioned-release state.
Figure 40A:
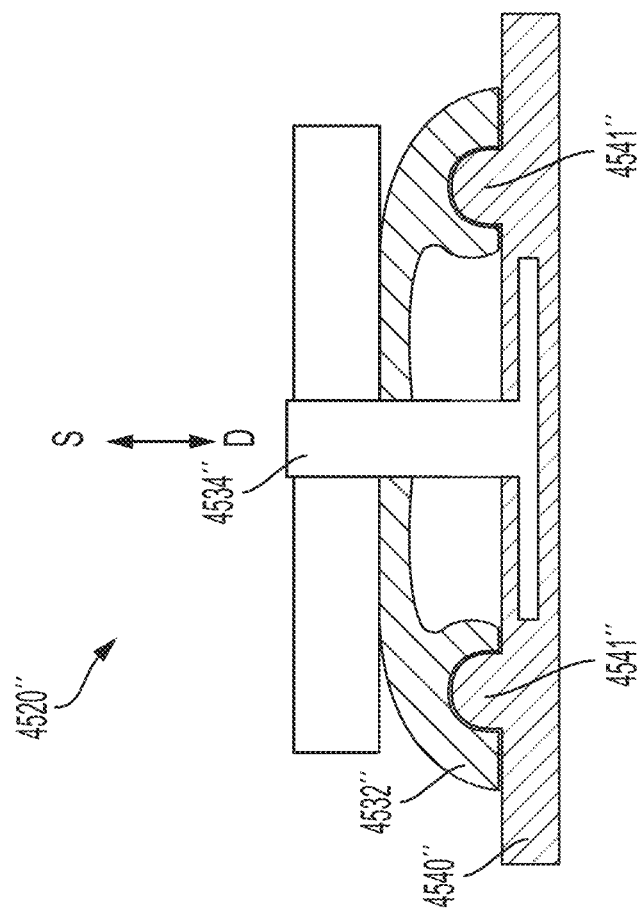
FIG. 40A depicts a cross section schematic of an alternate suction of the door removal and replacement system of FIG. 35B.
Figure 41B:
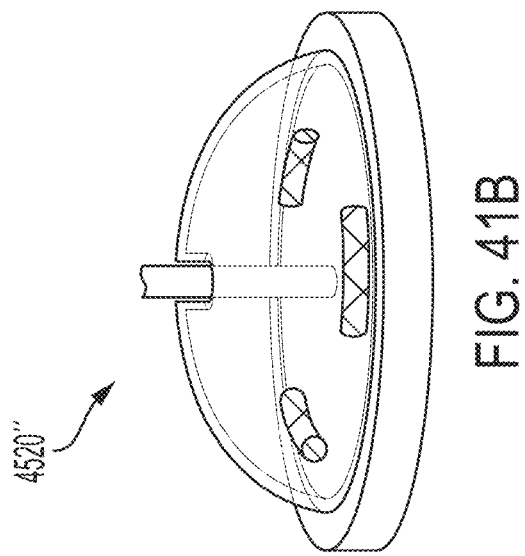
FIG. 41B depicts a side see through side perspective view of the suction of FIG. 40A.
Figure 41A:
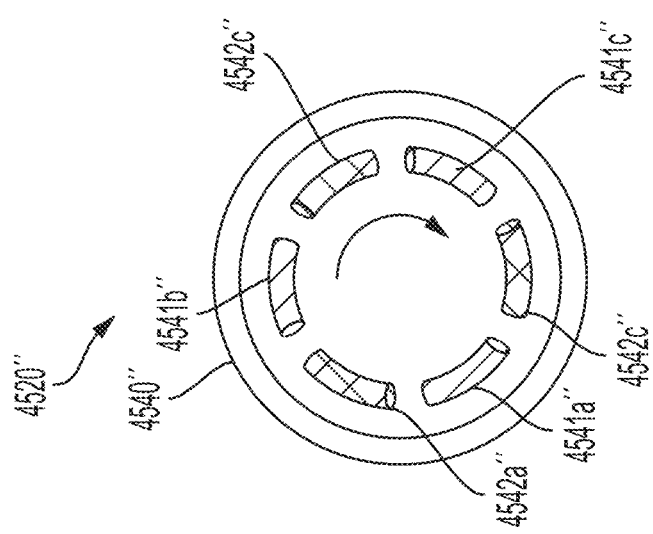
FIG. 41A depicts a top partial view of the suction of FIG. 40A.

In an alternate implementation, as shown in FIGS. 40A-C and 41A-B, a suction 4520" comprises a captive feature 4541" along the suction rubber 4540" that provides an inflection point for the concavity of the suction cup 4520", at the fixed base 4532". In the suction position, the captive feature 4541" creates a concave cup when the plunger 4534" is pulled up (moving in the direction of suction arrow S), as shown in FIG. 40B. In the de-suction position, the plunger 4534" overextends past the suction rubber 4540" of the fixed base 4532" (in the direction of de-suction arrow D) and the resultant inflection point in the suction rubber 4540 creates a convex suction surface that results in de-suctioning, as shown in FIG. 40C. In implementations, as shown in FIGS.

41A-B, in order to make this implementation easily manufactured and assembled, the captive feature 4541" comprises two or more captive rounds 4541a"-c" disposed on the back of the suction rubber 4540. The fixed base 4532" comprises a plurality of corresponding retaining channels 4542a"-c" configured to receive therein the captive rounds 4521a"-c" as the suction cup 4520" is twisted into place on the suction rubber 4540.

In implementations as previously described, a pair of suctions 4520a-b are configured to engage the outer surface 4330 of the door 4300 with force and retain the door 4300 securely under suction force while detached from the tub and drum assembly 4200. As shown in FIGS. 32A and 35A, an extend cylinder 4512 pushes the pair of suctions 4520a-b until they engage with the door 4300. In implementations, as shown in FIG. 33A, a full extend comprises a range of between about 10 to 15 inches (e.g., 10", 11", 12", 13", 14", 15", e.g., 25.4 cm to 38.1 cm) and extends less than a range of between about 8 to 14 inches (e.g., 8", 9", 10", 11", 12", 13", 14", e.g., 20.32 cm to 35.56 cm) to reach the door 4300 so that the door 4300 and O-ring 4305 disposed thereon are always compressed fully. Additionally, this extend travel ensures the suctions 4520a-b fully push into the outer surface 4330 of the door 4300 for reliable seating. In other words, the suctions 4120a-b reach the door 4300 before the arm 4515 is fully extended such that they are guaranteed to keep pushing into the tub 4215 under application of force from the extend piston 4512 pushing the extend arm 4515 toward the door 4300. The suctions 4520-ab therefore will fully engage the outer surface 4330 of the door 4300. Because there is some compliance in the tub 4515 (e.g., compliance provided by compressible bumpers 4153a-c as previously described with regard to implementations), the extra travel on the extend arm 4515 ensures that the tub 4515 and suctions 4520a-b push into each other and are thus more likely to fully engage the suction surface (e.g., the outer surface 4330 of the door 4300). Additionally, because the extend arm 4515 continually pushes into the door 4300 with the force of the extend piston 4512 the O-ring 4305 is fully compressed and the door 4300 isn't applying any outward force onto a plurality of door latches 4290a-c from a force of an uncompressed O-ring. This compressed O-ring state therefore facilitates latching and unlatching the door without additional forces impeding free movement of the latches.

In implementations, as shown in FIGS. 36-37B, the door removal and replacement system 4500 comprises at least one inductive sensor 4529 configured to detect the presence of the metal door 4300 in proximity with the suctions 4520a-b and transmits signal to the controller 4005. This signal is indicative of the suction cups being in position against the door and triggers subsequent suctioning and unlatching of the door 4300 and its removal by the extendable and retractable arm 4515 from the tub and drum assembly 4200, e.g., the tub cap 4207. The signal also indicates continuous engagement of the door 4300 with the suctions 4520a-b in their retracted stage outside the outer clearance circle 4202, and, upon receipt of a signal indicative of no door 4300 being detected proximate the retracted suctions 4520a-b, the controller 4005 can prevent the tub and drum assembly 4200 from pivoting to an inverted position or the arm from extending to re-engage the door 4300 prior to a washing and drying cycle if it has lost hold of the door 4300. In implementations, the inductive sensor 4529 can be disposed directly on at least one of the pair of suctions 4520a-b to detect close proximity of the door 4300 when contacted by the suctions 4520a-b.

Returning now to FIGS. 32A-B and 35A-B, in implementations, the door removal and replacement system 4500 further comprises a plurality of support rollers 4530a-c configured to support thereon the arm 4515. The arm 4515 extends and retracts on the plurality of rollers. In implementations, the plurality of rollers comprise v-groove rollers as shown in FIG. 32A and the extend cylinder 4512 is configured to push out the bifurcated fork 4516 with the arm 4515 guided in v-groove rollers 4530a-c. The arm 4515 and suctions 4520a-b thereon can be driven back and forth, toward and away from the opening 4210 of the drum 4205 by the extend cylinder 4512 pushing the arm 4515 through the support rollers 4525a-c. The door removal and replacement system 4500, therefore, is configured to retrieve and support the door 4300 when detached from the tub and drum assembly 4200. Additionally, the door removal and replacement system 4500 maintains alignment of the door 4300 to the door removal and replacement angle (e.g., an angle above horizontal that is at or within 10 degrees of the wash orientation angle α) so that the door 4300 can be remounted when the tub and drum assembly 4200 is again tilted to the door removal and replacement angle. In implementations, the door removal and replacement angles are not identical because removing the weight of the door 4300 (e.g., a weight in a range of approximately 5-15 kg, e.g., 5 kg, 6 kg, 7 kg, 8 kg, 9 kg, 10 kg, 11 kg, 12 kg, 13 kg, 14 kg, 15 kg) causes the tub and drum assembly 4200 to sit slightly higher when the door 4300 is removed and needs to be replaced. Additionally, in implementations, a tolerance can exist in the position of the door 4300 in the tub cap 4207; When the door removal and replacement system 4500 removes the door 4300, the door 4300 settles into the bottom-most position, which is where it is removed from, but the door removal and replacement system 4500 should replace the door 4300 targeting the center of the opening 4210 to leave the greatest tolerance for slight position errors. In practice, this means that, in implementations, the door replacement angle of the pivoted tub and drum assembly 4200 is lower than the door removal angle.

Figure 38:
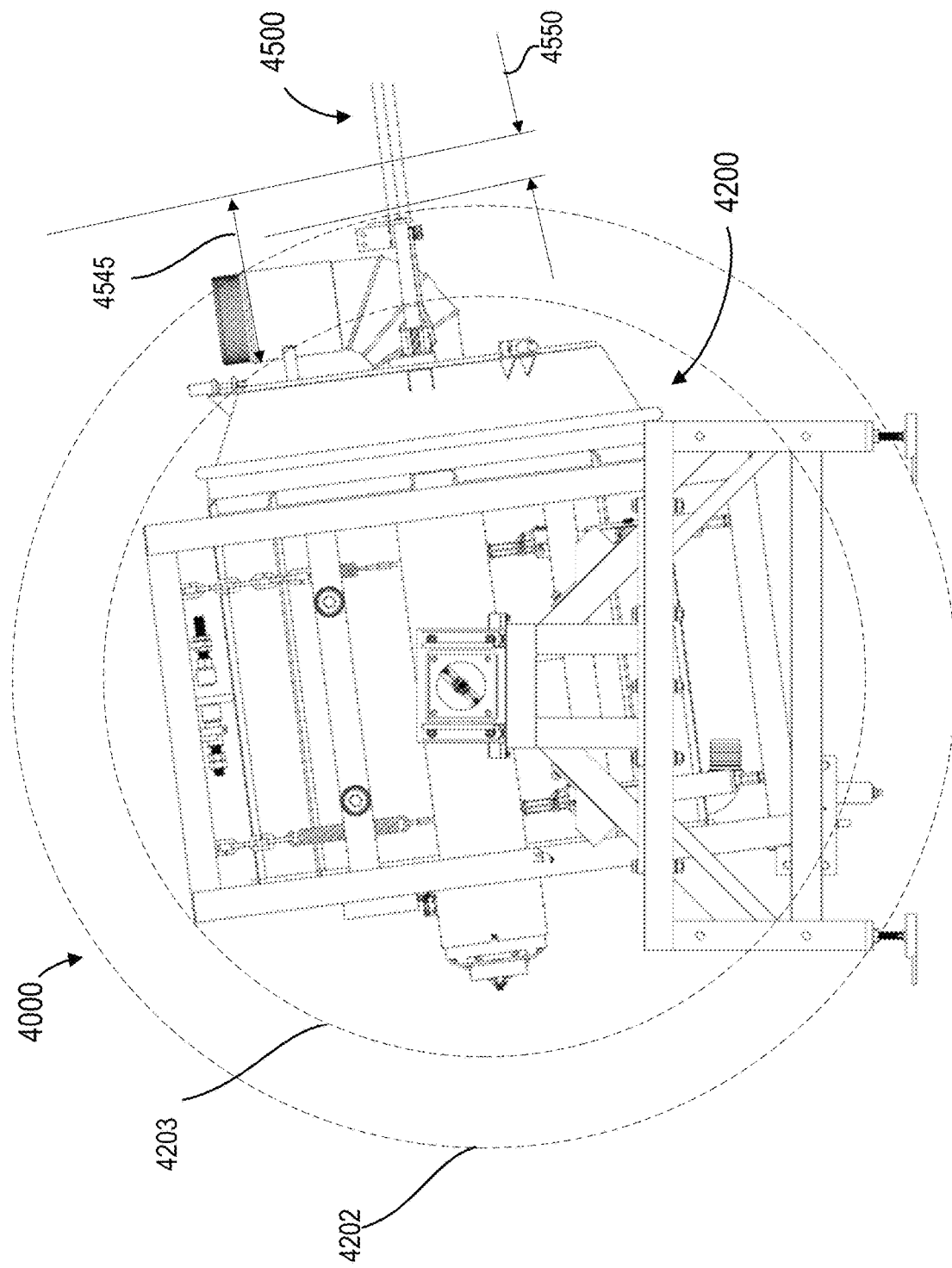
FIG. 38 depicts a side view of an autonomous washing and drying device and door loading system with a door seated on the tub and drum assembly and overlaid clearance areas.

As previously described with regard to implementations, the door removal and replacement system 4500 engages the door 4300 and pulls the door 4300 far enough away from the tub and drum assembly 4200 to provide clearance for the tub and drum assembly 4200 and frame 4100 to rotate up or down. In implementations, as shown in FIGS. 17 and 38, the upper corners of the rigid frame 4100 rotate along an inner clearance circle 4203 during pivoting of the frame 4100 and the lower corners of the rigid frame 4100 rotate along an outer clearance circle 4202. As shown in FIGS. 33B and 38, the door removal and replacement system 4500 holds the detached door 4300 in a retracted position that is outside of the outer clearance circle 4202 and as shown in FIGS. 33A and 38, the door removal and replacement system 4500 holds the door 4300 inside the inner clearance circle 4203 when the door 4300 is attached to the tub and drum assembly 4200. As shown in FIG. 38, the door removal and replacement system 4500 advances the door by a travel distance 4545 that is greater than a door thickness 4550 (also FIG. 28) to engage the tub and drum assembly 4200 inside the inner clearance circle 4203. The door removal and replacement system 4500 thus engages the door 4300 and pulls the door 4300 (including its full thickness) outside the outer clearance circle 4202 of death. Additionally, in implementations in which the door removal and replacement system 4500 transits on a rail 4410 between a plurality of devices 4300, the maximum travel distance 4545 is predetermined so as to prevent the suctions 4520a-b from contacting other structures or ducting in a cluster 4002 when the door removal and replacement system 4500 is moving in between washers.

Mounting the door 4300 in the opening 4210 of the drum 4205 requires aligning the door 4300 with the opening 4210 when the tub and drum assembly 4200 is under load and the spin axis 4230 potentially shifts downward under gravitational force. In implementations, as shown in FIG. 28, the inner surface 4310 of the door 4300 comprises a bevel 4350 configured to protrude into the opening 4210 of the drum 4205. The bevel 4350 (e.g., beveled edge) and interior door face 4310 plus the tilt from the wash angle α will prevent the one or more small deformable articles 12 (e.g., baby socks) in the drum 4205 from reaching a gap 4209 (FIG. 14) between the tub 4215 and the drum 4205 around the opening 4210. The bevel 4350 comprises a depth 4351 (FIG. 28) in a range of between about 30 to 45 mm as measured from the inner surface 4310 of the removable door 4300 to an inner surface of a mating flange 4355 of the removable door 4300. For example, the door thickness 4550 can be approximately 45 mm and a bevel depth can be approximately 35 mm. Additionally or alternatively, in implementation, the bevel 4350 comprises a depth in a range of between about 5 to 10 percent of a diameter of the removable door 4300. Additionally or alternatively the depth that the door 4300 extends into the tub cap 4207 (e.g. depth measured from an inner surface of the mating flange 4355 to an inner surface 4310 of the door 4300) is approximately 35 mm, and the depth 4551 (FIG. 14) that the door 4300 extends inside the front lip 4216 of the drum 4205 is approximately 25 mm. The portion of the door 4300 that extends into the drum 4205 keeps the at least one deformable laundry article away from away from the gap 4209 by the depth 4551. In implementations, the inner surface 4310 of the door 4300 protrudes into the drum 4205 at a depth 4551 in a range of between about 5 mm to 45 mm past the drum lip 4216 (FIG. 13).

In implementations, the bevel 4350 is sloped at an angle ψ in a range of between about 40 degrees to 65 degrees (e.g., 40 degrees, 45 degrees, 50 degrees, 55 degrees, 60 degrees, 65 degrees). The bevel 4350 is configured to accommodate a vertical shift of the opening of the drum in a range of about 5 to 10 mm (e.g., 5 mm, 6 mm, 7 mm, 8 mm, 9 mm, 10 mm) in at least one of an upward and downward displacement. Additionally, the bevel 4350 works in concert with the suspension system for the tub and drum 4200 to accommodate any misalignment and enable self-centering the door 4300 during seating by the door removal and replacement system 4500. As the door removal and replacement system 4500 pushes the door 4300 into the opening 4210, the springs suspending the tub and drum assembly 4200 from the frame 4100 allow some rotational movement (e.g., vertical shifting of the opening 4210) of the tub and drum assembly 4200 as the door removal and replacement system 4500 applies force on the door 4300 being seated.

In implementations, as shown in FIGS. 14 and 28, the O-ring comprises a hollow silicone O-ring with a pressure sensitive adhesive (PSA) backing that creates a face seal. The hollow O-ring requires only minimal closure force to achieve a seal compared to a solid O-ring. In implementations, the removal and replacement system 4500 will compress an engaged door 4300 and O-ring thereon until the base of the O-ring flange (e.g., mating flange 4355) bottoms out on the tub cap 4207. The removable door 4300 is lightweight but does not deflect during seating in the opening 4210 because the required compression force to seal the engaged door 4300 to the tub cap 4207 is minimal. For example, in one implementation, the compression force required to fully compress the O-ring is approximately 89N, which is minimal compared to the capability of the door removal and replacement system to apply the door up to 356N. As shown in FIG. 34, the removal and replacement system 4500 engages the suctions 4520a-b (e.g., rubber suction cups) with a flat front surface 4330 of the door 4300. The front surface 4330 of the door 4300 comprises sufficient flat surface to allow for alignment tolerance of the bifurcated suction fork arms 4516a-b. The width of the bifurcated fork 4516 (side to side across the front plane of the door) and use of suctions 4120, 4120a-b enables the removal and replacement system 4500 to engage the suctions 4120, 4120a-b anywhere on the flat front surface 4330 of the door 4300 which provides for a large alignment tolerance. For example, in implementations, the removal and replacement system 4500 can engage the door 4300 with a side-to-side a tolerance of plus or minus 1 inch (e.g., 2.54 cm) from a target position aligned with the center of the door 4300. As shown in FIGS. 30, 32A, and 33A, with the suctions 4520a-b engaged, the extend arm 4515 pushes the door 4300 into the opening and against the tub cap 4207 to compress the O-ring seal and release pressure on the plurality of latches 4290a-c during the initiation of a door removal sequence. Deflection of the door front surface 4330 due to the force from the extend arm 4515 is small enough to allow suction to occur, e.g., a deflection in a range of between about 0-0.5 mm under application of approximately 71 lbf (e.g. 316N).

In implementations, the alignment and seating of the door 4300 in the opening 4200 is further directed by signals from one or more sensors deposed on the opening 4210 of the drum 4205. In implementations, as shown in FIGS. 29A-B, the door 4300 and tub cap 4207 each comprised thereon respectively at least one pairing of a magnet 4360 and a reed switch 4295 configured to detect the presence of the adjacent magnet 4360 when the door 4300 is seated in the opening 4210 and output a signal to the controller 4005 indicative of alignment and full contact of the removable door 4300 to the opening 4210 during seating. In implementations, the device 4000 comprises at least two magnet and reed switch pairs with each pair being disposed apart from the other pair about the circumference of the tub cap 4207 and door 4300 to provide signals that the controller 4005 can process to determine any misalignment of the door 4300 within the opening 4210 of the tub and drum assembly 4200. Additionally or alternatively, in implementations, the one or more sensors can include one or more proximity sensors configured to output a signal to the controller 4005 indicative of alignment and full contact of the removable door 4300 to the opening 4210 during seating. Additionally or alternatively, the device 4000 comprises at least one of a camera, an optical break beam, a hall sensor, and an IR sensor for detecting proximity and alignment of the door 4300 to the opening 4210 while the door 4300 advances toward and seats within the opening 4210. In all implementations, the one or more sensors are configured to provide feedback to the controller 4005 to control the motion of the approaching door 4300 and/or control the pivot motor 4115 to pivot the spin axis 4300 upward or downward to better align the opening 4200 with the advancing door 4300. Additionally or alternatively, in all implementations, the one or more sensors are configured to provide feedback to the controller to determine whether the door 4300 is seated in place on the tub and drum assembly 4200 before actuating any drives for at least one of drum spinning, door latching and unlatching, and door removal and seating operations. For example, once the door 4300 is extended into the tub 4205 during a door replacing operation, the controller 4005 will receive a signal that the reed switch and magnet pair is engaged before latching the door 4300 and disengaging the suctions 4520*a-b* holding the door 4300.

In addition to comprising a door bevel 4350 and, optionally, at least one door alignment sensor, the device 4000 further comprises one or more latches 4290*a-c* configured to retain the removable door 4300 in a sealed mating with the opening 4210 of the drum 4205. Because the door 4300 is completely separable from the tub and drum assembly 4200, no hinge exists to partially support the door 4300 on the assembly 4200. In implementations, therefore, securing the door 4300 to the tub and drum assembly 4300 comprises autonomously selectively actuating the one or more latches 4290*a-c* disposed about the circumference of the door 4300. In implementations, the one or more latches comprises a plurality of latches comprising at least one of passive latches and actuated latches, such as those shown in FIGS. 29A-B. For example, in implementations, one or more latches comprise at least one of a bistable latch, a pneumatic latch, a servo latch, an electromagnet, and a solenoid latch. For example, in implementations the one or more latches comprise at least one of a pneumatic-powered latch, a rotational servo-powered latch (e.g., a latch that rotates into place over a lip of the door 4300), an electromagnet holding a ferrous door in place, and a linear solenoid latch. In implementations, a rotational servo-powered latch comprises a cam with increasing thickness during rotation such that the rotating motion of the latch helps to slowly compress the door and thus O-ring seal as the latch is engaged.

In implementations, a plurality of electromagnets (not shown) can be disposed on the tub and drum assembly 4200 about the opening 4210. The plurality of electromagnets can be momentary release electromagnets configured to retain the door 4300 in fixed engagement until energized during removal of the door. Additionally or alternatively, in implementations as shown in FIGS. 29A-B, the device 4000 can include two or more linear solenoid latches 4290*a-c* for entrapping and retaining the mating flange 4355 of the door 4300 against the tub cap 4207. Springs extend a linear solenoid plunger over the mating flange 4355 of the door 4300 to hold it in place against the tub cap 4207, and the linear solenoids are energized to draw back the plunger and unlatch the door 4300 upon command from the controller 4005. In implementations, the two or more linear solenoid latches 4290*a-c* comprise three linear solenoid latches 4290*a-c* that are configured to withstand a side load from the door 4300 and that each comprise a DELRIN cover on the end that slides in contact with the door 4300 and through the latch housing to reduce friction.

Additionally or alternatively, in implementations, the device 4000 comprises at least one of solenoid latches, a T-seal or other or other edge seal (rather than an O-ring) combined with latches, and a face seal combined with passive latches or solenoids (as shown in FIGS. 29A-B). In implementations comprising a face seal (e.g., an O-ring), because the face seal pushes out against the door 4300, the latches need to be sized to withstand that force. In contrast, a piston seal or a T-seal requires an application of force to remove and attach the door, but the seal does not push out against the door, thereby requiring latches that do not need to withstand as much outward force as those operating in conjunction with a face seal. In these embodiments, each seal minimizes spaces where water can get trapped out of reach of the drying cycle and subsequently drip out onto clean deformable articles 12 being unloaded into a clean bin when the tub and drum assembly 4200 is inverted. The O-ring seal on the door 4300 allows the door 4300 to seal against the front face (e.g., front end flange 4208 (FIG. 14)) of the tub cap 4207, which eliminates gaps where water might otherwise collect.

Returning now to FIGS. 33A through 24, as previously described with regard to implementations, the door removal and replacement system 4500 can be a stand-alone system paired with a single device 4000. Alternatively, in implementations, the system 4500 comprises a drive 4570 in operable communication with the controller 4005 for operating a drive motor 4510 of the movable stage 4505 to move the door removal and replacement system 4500 along one or more rails 4410 and into alignment with a door 4300 of one of a cluster 4002 of devices 4000.

Figure 42:
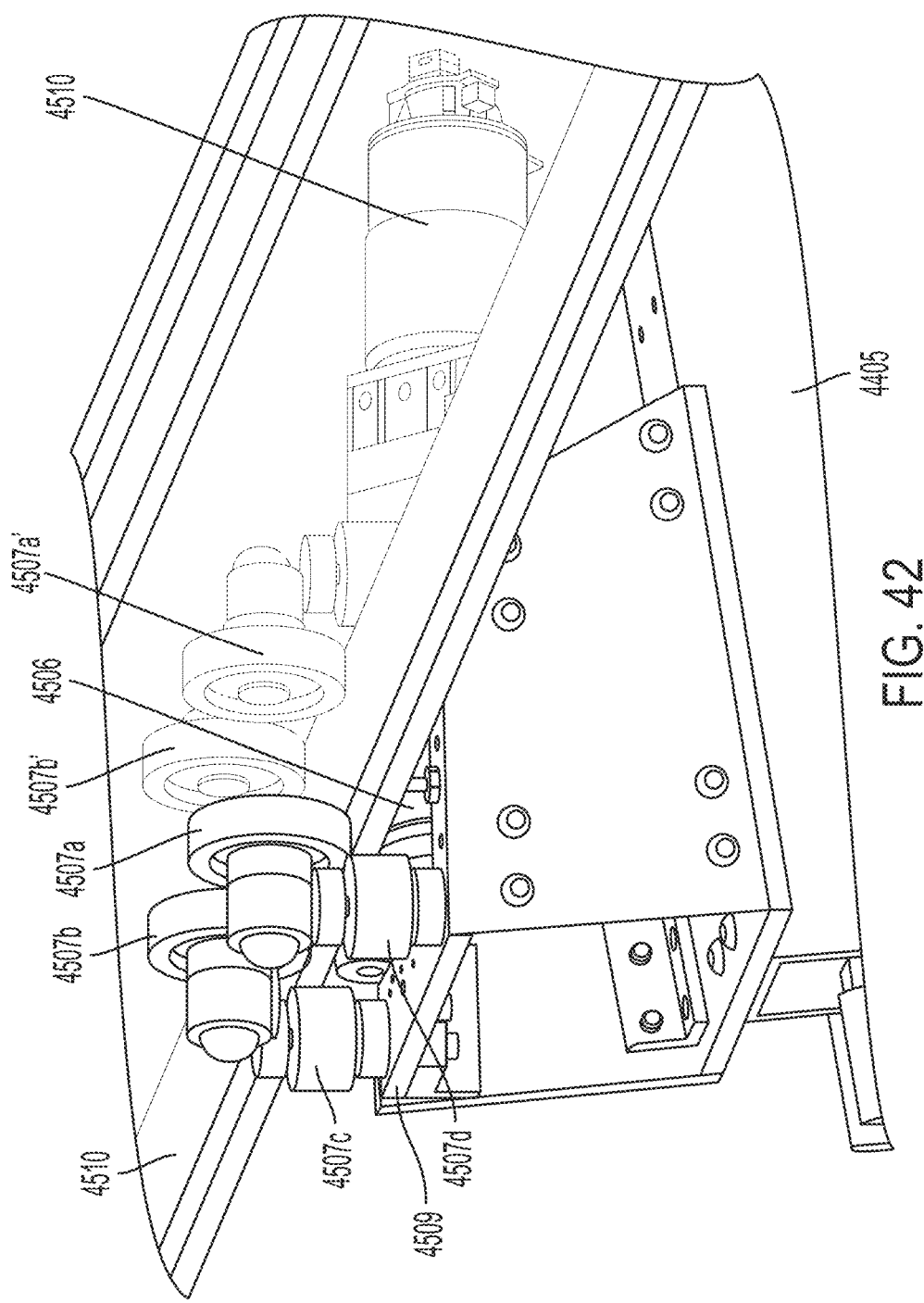
FIG. 42 depicts a perspective view of a portion of a movable stage engaged with a rail with a portion of the rail shown as transparent for viewing the wheeled connection portions of the movable stage disposed about both sides of the rail.
Figure 43B:
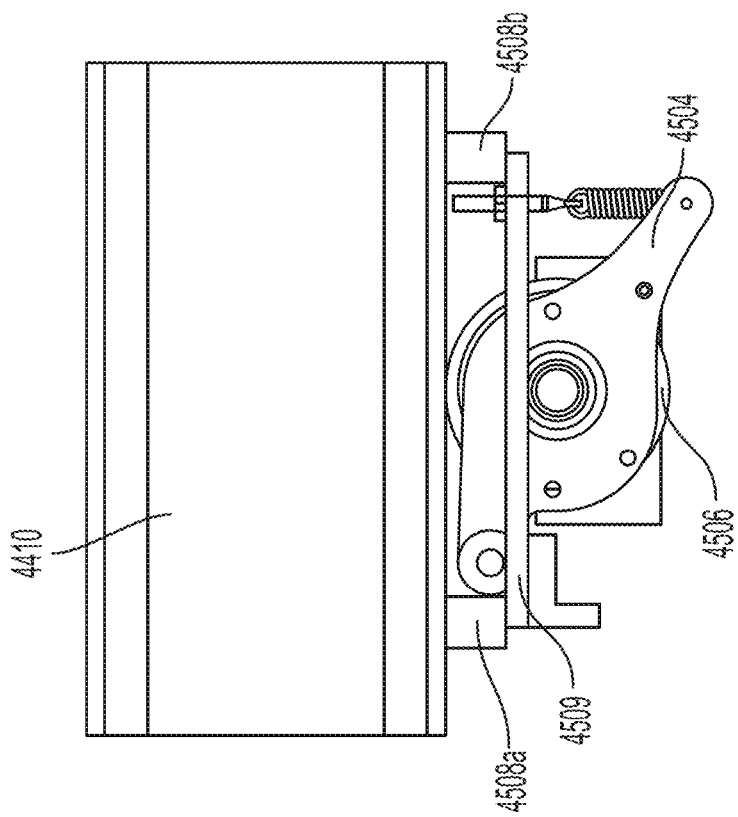
FIG. 43B depicts an exposed view of the portion of the movable stage and rail of FIG. 43A.
Figure 43A:
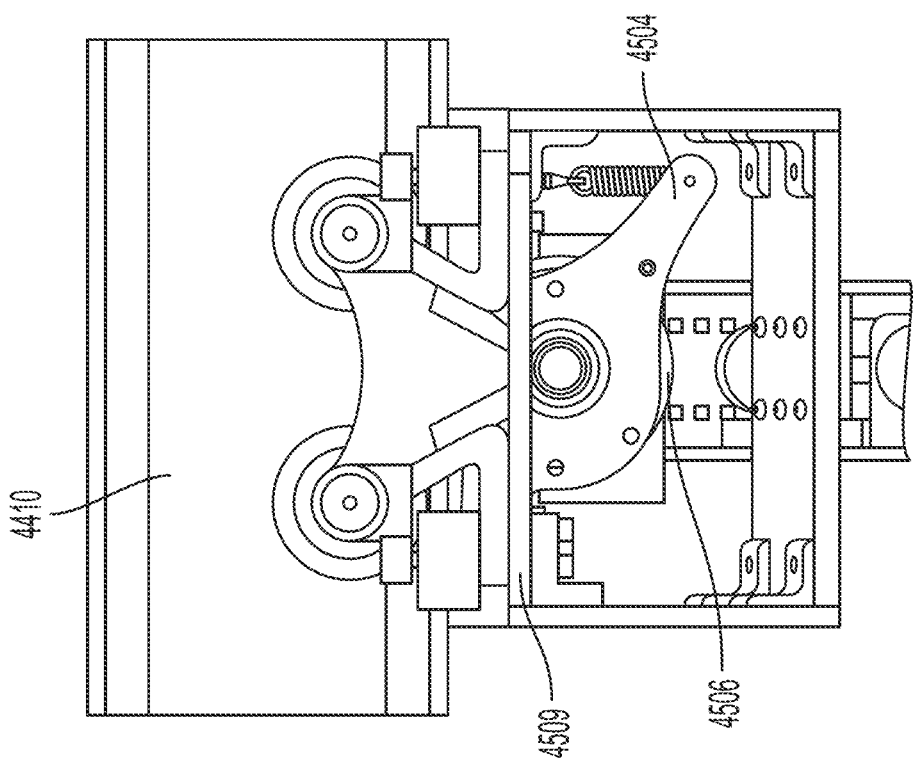
FIG. 43A depicts a front view of the portion of the movable stage and rail of FIG. 42.

As shown in particular in FIGS. 34, and 42 through 44, a friction drive arm 4504 is sprung up into the bottom of the rail 4410 (e.g., an I-beam), keeping a plurality of wheels 4507*a-d*, 4507*a'-d'* the movable stage 4505 fully seated on bottom flanges of the rail 4410. (FIG. 42 shows the I-beam with the center member as transparent for viewing the portions of the movable stage 4505 disposed about both sides of the center of the I-beam.) The friction drive arm 4504 also provides force for a friction drive wheel 4506 to engage the rail 4410 and move the movable stage 4505 back and forth along the rail 4410 between stopping positions aligned with each individual device in a cluster 4002 adjacent the rail 4410. In implementations the drive motor 4510 is configured to rotate the friction drive wheel 4506, and the drive motor 4510 and friction drive wheel are mounted on to an assembly comprising the friction drive arm 4504. The friction drive arm is configured to be tensioned with springs against a top plate 4509 of the assembly. In implementations, during travel, when the door 4300 is not engaged with the movable stage 4505, friction drive arm 4504 pulls the plurality of wheels 4507*a-d*, 4507*a'-d'* down into the rail 4410 flange, and the weight of the movable stage 4505 is centered beneath the rail 4410. In implementations, two spacer blocks 4508*a-b* are disposed between the top plate 4509 and the bottom of the rail 4410 such that when a door 4300 is engaged with the movable stage 4505 and an arm 4515 of the door removal and replacement system 4500 extends and pushes against the door 4300 of the device 4300, the spacer blocks 4508*a-b* are pushed up into the bottom of the rail 4410, preventing the movable stage 4505 from dislodging from the rail 4410 and providing a hard stop to help prevent lateral motion of the movable stage 4505.

As shown in the system schematic of FIG. 5, in implementations, the autonomous door removal and replacement system 4500 comprises an incremental encoder 4588 disposed on a drive motor 4510, the incremental encoder 4588 being configured to output a signal to the controller 4005 indicative of an absolute of position of the driven door removal and replacement system 4500 on the rail 4410. Additionally or alternatively, the autonomous door removal and replacement system 4500 comprises one or more position sensors 4585 disposed on the rail 4410, the one or more position sensors 4585 being configured to output a signal to the controller 4005 indicative of alignment of the door removal and replacement system 4500 with one of the plurality of autonomous combination washing and drying devices 4000, 4000*a-n*. In implementations, the one or more position sensors 4585 disposed on the rail 4410, comprise one or more limit switch sensors 4585 configured to output a signal to the controller to stop the door removal and replacement system 4500 above a selected one at a time of the plurality of autonomous combination washing and drying devices 4000, 4000*a-n*. Additionally or alternatively, the controller 4005 can receive a signal from the one or more position sensors 4585 and re-zero the position of the movable stage 4505 along the rail 4410. In implementations the one or more position sensors comprise a Hall effect magnet and sensor pairing. In implementations, magnets are disposed at each location along the rail 4410 that aligns with a device 4000 therebeneath and the movable stage 4505 comprises thereon a Hall effect sensor configured to detect each of the plurality of magnets and check its position at each location. Additionally or alternatively, in implementations, the movable stage 4505 comprises a cable or chain drive or a timing belt that enables the controller 4005 to track a position of the autonomous door removal and replacement system along the length of the rail 4410.

With the door 4300 sealed in place in the opening of the drum, an airflow A is established. As shown in FIGS. 26-28 and 46, the sealed door 4300 includes the air vent hose 4325 extending therefrom. As described previously, in implementations, the air vent hose 4325 is flexible to accommodate movement of the door 4300 during attachment and removal to the drum 4205 and to accommodate motion and vibration during the washing and drying cycle. In implementations, the air outlet orifice 4315 and a rigid conduit 4335 to which the air vent hose 4325 attaches are disposed therein at or around the center of the door 4300. In implementations, the air outlet orifice 4315 and rigid conduit 4335 to which the air vent hose 4325 attaches are disposed on a lower half of the door 4300 (e.g., below the spin axis 4230). An air inlet orifice 4260 is disposed through the drive end 4217 of the tub 4215 such that air flows through the drum from the air inlet orifice 4260 to the air outlet orifice 4315 as indicated by the arrows FIG. 45 (e.g., airflow A). Because the air inlet orifice 4260 is positioned adjacent the top of the tub 4215 and the air outlet orifice 4315 is positioned adjacent the bottom of the tub 4215, the flow of air (e.g., airflow A) travels diagonally downward through the drum 4205 from the drive end 4217 to the front end 4212. Alternatively, the air inlet orifice 4260 could be positioned adjacent the bottom of the tub 4215 and the air outlet orifice 4315 is positioned adjacent the top of the tub 4215 to achieve an alternate diagonal airflow upward through the drum 4205. Alternatively, the air inlet orifice 4260 can be positioned adjacent either the top or the bottom of the tub and the air outlet orifice 4315 can be centered around the center of the door 4300 such to achieve an alternate diagonal airflow through the drum 4205. A diagonal airflow A ensures effective mixing of the air in the drum 4205 so that the load of one or more deformable articles 12 therein dries uniformly, with no hot spots or cold spots. By avoiding a narrow, direct air path through the drum 4205, deformable articles 12 throughout the drum can be heated and therefore dried efficiently, avoiding longer drying cycles associated with less distributed heating throughout the drum 4205. Avoiding a narrow, direct air path through the drum 4205 also prevents overheating those articles more exposed to the air path while articles less exposed to the air path take longer to dry. This diagonal airflow A thus serves the additional purpose of making a sensor-detected determination of the "dry" condition of the load of at least one deformable laundry article more reliable because the load will be more evenly dried throughout.

Figure 45:
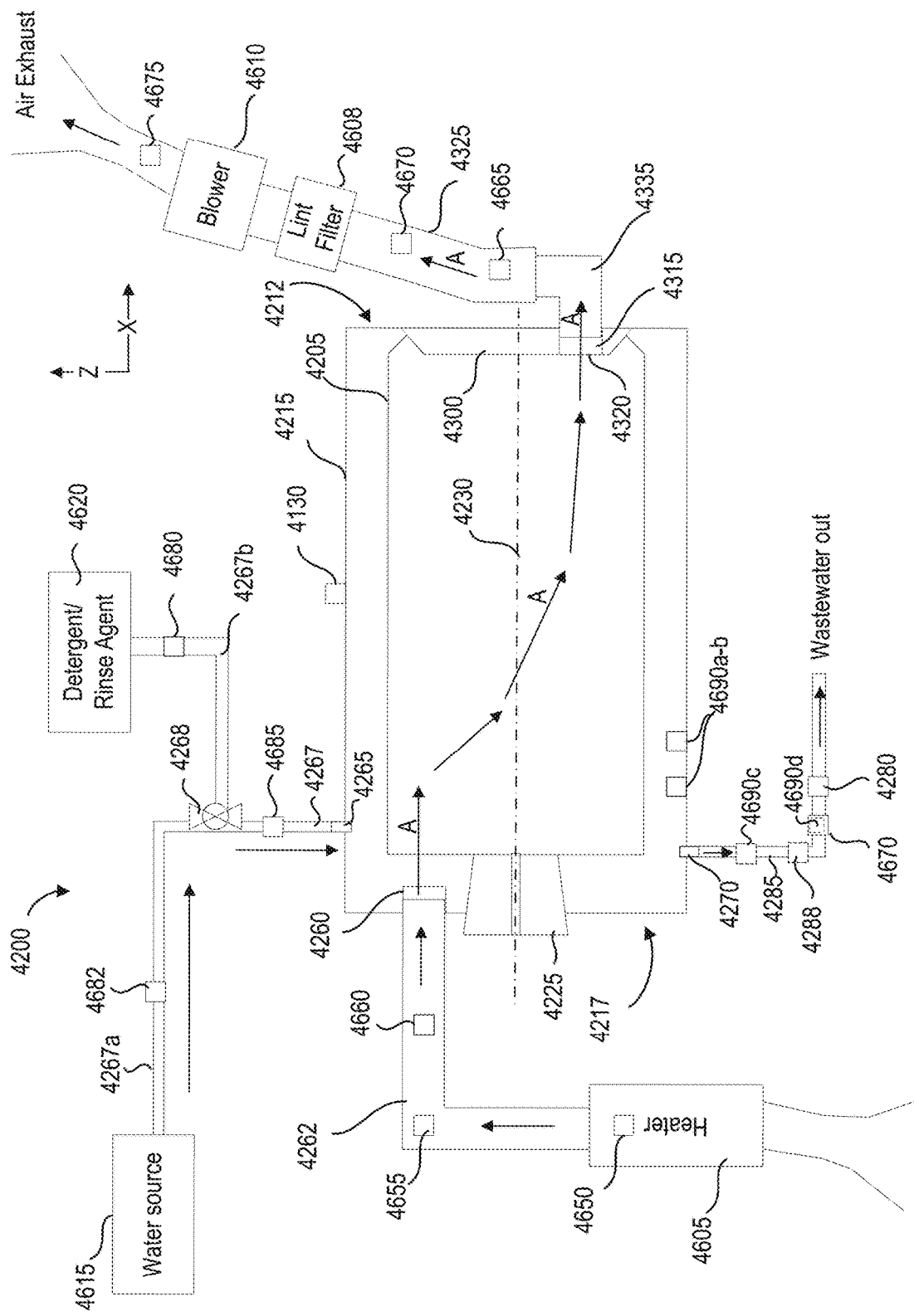
FIG. 45 depicts a side cross section schematic of an implementation of the inputs and outputs and sensors of an autonomous washing and drying device.

As shown in FIG. 45, a heater 4605 introduces warm, dry air into the tub 4215 through the inlet orifice 4260 in drive end 4217 of the tub 4215. A central axis of the inlet orifice 4260 is parallel to the drum spin axis 4230 and located outside the diameter of the drive motor 4225 (e.g., for direct drive) or drive motor pulley (e.g., for belt drive). In implementations, the heated dry air passes through a mesh or perforations in the end wall of the drum 4205, and then passes through the volume occupied by one or more tumbling deformable articles 12. A downstream blower 4610 pulls the air through this volume where it absorbs moisture from the at least one deformable article 12. The moist air is vented through a meshed opening (e.g., the air outlet orifice 4315) at the front of the tub 4215. In implementations, the airflow comprises a closed loop system including at least one of a heat pump and an auxiliary heater 4605.

In addition to the air inlet orifice and air outlet orifice, the tub 4215 comprises a cleaning water inlet and a wastewater outlet 4270, as shown in FIG. 45. The cleaning water inlet 4265 is disposed on an upper half of the tub 4215 (e.g., above the spin axis 4230 when the tub and drum assembly 4200 is pivoted to the wash angle α) and is configured to receive at least one of water from a water source 4615 and detergent and/or rinse agent or other laundry chemical from a detergent source 4620. The detergent and/or laundry chemical can comprise a chemical including at least one of a chemical detergent, bleach, water softener, souring agent, booster, bluing, and rinse agent. Additionally or alternatively, the detergent/rinse agent conduit can comprise a plurality of conduits in fluid communication with a plurality of chemical sources or mixing chambers each containing at least one of a laundry chemical comprising at least one of detergent, bleach, water softener, souring agent, booster, bluing, and rinse agent. The wastewater outlet 4270 is configured to be disposed on a bottom half of the tub 4215 (e.g., below the spin axis 4230 when the tub and drum assembly 4200 is pivoted to the wash orientation angle α). In implementations, the wastewater outlet 4270 is configured to be disposed at the lowest point of the tub 4125 during draining. In implementations, the wastewater outlet 4270 is gravity drained, and the controller is configured to pivot the tub and drum assembly 4200 to a drain angle so that the wastewater outlet 4270 is at the lowest point of the tub and drum assembly 4200. In implementations, the drain angle is in a range of between about 3 degrees to 89 degrees up from horizontal.

The device 4000 further comprises conduits 4262, 4267, and 4285 configured to mate respectively with each of the air inlet orifice 4260, the cleaning water inlet 4265, and the wastewater outlet 4270. In implementations, the clean water conduit 4267 can branch at a valve 4268 to each of a water source conduit 4267a and one or more detergent/rinse agent conduits 4267b. The valve 4268 can be actuated by the controller 4005 during the washing and drying cycle to introduce a wash chemical including at least one of detergent, bleach, water softener, and rinse agent to the drum 4205 via the clean water inlet 4265 in the tub 4215. In implementations, each of the conduits 4262, 4267, 4267a-b, and 4285 are configured to mate respectively with each of the air inlet orifice 4260, the cleaning water inlet 4265 and the wasterwater outlet 4270. Additionally, in implementations, the inlet conduits 4267a-b and valve 4268 are configured to be disposed apart from and off of the rigid frame 4100 so that they are not dislodged or otherwise disturbed by movement of the frame 4100 during pivoting. In implementations, the wastewater outlet 4270 is a flexible conduit configured to be routed along the rigid frame 4100 for moving with the frame 4100 during pivoting. In implementations, at least some of the flexible conduits 4262, 4267, 4267a-b, 4285 are expandable to accommodate movement of the frame 4100 without any mating joints detaching or loosening and thereby potentially causing leaks.

In implementations, the heated air conduit 4262 configured to connect to the air inlet orifice 4260 comprises a flexible air conduit at least between the air inlet orifice 4250 and an attachment point outside the rigid frame 4100 and disposed on or at a structural element such as scaffolding, a wall, or a framing support adjacent the device 4000. The heated air conduit 4262 comprises sufficient length and flexibility to accommodate the up to 180 degree pivot motion of the tub and drum assembly 4200 and the rigid frame 4100 about the pivot axis 4110. In order to avoid damage and/or wear on the outer surface of the conduit 4262, the conduit is constrained such that it does not contact the floor 10 or platform in a neutral, non-extended position. Additionally, the flexible conduit 4262 is constrained such that it does not contact the floor 10 while pivoting through a full 180 degree rotation. This can be achieved by locating the end of the conduit attached outside the rigid frame 4100 so that the distance between that end of the conduit 4262 and the tub air inlet 4260 is minimized when the tub 4215 is pivoted to an angle which is midway through its range of motion (or is slightly below this). In implementations, the length of flexible conduit between the inlet 4260 and the attachment point outside the rigid frame forms a "U" shape when the tub and drum assembly 4200 is horizontally oriented. The distance from the center of the inlet orifice 4260 to the bottom of the "U" is greater than the diameter of the tub and the distance from the bottom of the U to the surface of the floor 10 or platform is at least half the diameter of the tub. This enables the conduit to expand and bend with the pivoting tub and drum assembly in the upright and inverted orientations without touching the floor 10 or being overly tensioned at the extreme ends (e.g., 0 degrees and 180 degrees) of the pivot range.

In implementations, the tub and drum assembly 4200 is drained by gravity pulling the wastewater through the wastewater outlet. Eliminating a pump on the tub 4215 for draining and relying on gravity lessens the weight of the device 4000. The pivot motor 4115 can more easily pivot the rigid frame 4100 and tub and drum assembly without needing to move the mass of a pump also. This prolongs the life of the motor 4115 and enables more efficient movement of the total mass. In implementations, the wastewater conduit 4285 comprises a flexible hose routed away from the wastewater outlet 4270 so that any residual water in the conduit 4285 flows down the conduit, away from the tub 4215, the drum 4205, and a clean and dry at least one deformable article 12 in the drum 4205. Following washing, rinsing, and spin extraction portions of the washing and drying cycle, wastewater can be drained through the wastewater outlet 4270 in the bottom of the tub 4215 while the tub and drum assembly 4200 is oriented at the wash angle α, as shown in FIG. 13. The wastewater will flow downhill in the wash orientation angle α. In implementations, as previously described, the controller 4005 is configured to pivot the tub and drum assembly 4200 to a drain angle so that the wastewater outlet 4270 is at the lowest point of the tub and drum assembly 4200. In implementations, the drain angle is in a range of between about 3 degrees and 15 degrees of the pivot axis being tilted up from horizontal. In implementations, the controller 4005 will receive sensor signals indicative of remaining fluid in the tub 4215 and adjust the drain angle to steeper angles to completely drain the tub and drum assembly 4200. Additionally or alternatively, the tub 4215 comprises a wastewater outlet in the drive end 4217, and the controller 4205 raises the opening 4210 above the drive end to gravity drain the wastewater from the tub and drum assembly 4200.

In implementations, the device 4000 comprises an actuatable valve 4280 that, when open, enables the wastewater to drain completely from the tub 4215. In implementations, the actuatable valve 4280 is in operable communication with the controller 4005 for timing the opening and closing of the valve 4280. In implementations, the valve 4280 is a solenoid pinch valve anchored to the frame 4100 forward of the wastewater outlet 4270 in the direction of the front 4212 of the tub and drum assembly 4200. In implementations, the valve 4280 is an air operated pinch valve comprising an inner elastomer sleeve that deforms around any potentially trapped solids. In implementations, the air operated pinch valve is anchored to the frame 4100 forward of the wastewater outlet 4270 in the direction of the front 4212 of the tub and drum assembly 4200. In implementations, the valve 4280 comprises a vacuum release valve. In implementations, the vacuum release valve is an active valve that opens to ambient air to release the vacuum. In implementations, the vacuum release valve is a passive valve that does not allow a vacuum to form.

In implementations, wastewater is gravity drained from the tub and drum assembly 4200, and the device 4000 comprises a sump disposed outside the rigid frame and in communication with the wastewater outlet 4270 via the wastewater conduit 4285. Additionally or alternatively, in implementations, the device 4000 can include a backflow preventer valve upstream of the wastewater outlet 4270. Additionally or alternatively, the device 4000 can include a pump in communication with the wastewater conduit 4285 and in operable communication with the controller 4005 for actuating the pump to draw water from the tub 4215. In implementations comprising a pump, the device can include a shutoff valve disposed between the pump and the tub 4215 to prevent backflow of any wastewater from the pump back into the tub.

In implementations, as shown in FIGS. 13, 15, and 45 the device 4000 can include a strainer 4275 disposed between the wastewater outlet 4270 and the valve 4280. The strainer 4275 comprises a removable mesh or perforated basket located in the wastewater flow path. Perforations in this mesh or basket are sized so that any object which may obstruct or become entrapped in the valve 4280 and/or the wastewater conduit 4285 is captured. In implementations, the strainer 4275 is a molded plastic basket with circular perforations of about 5 mm diameter. Examples of objects which the strainer 4275 captures comprises buttons, collar stays, coins, marbles, small tchotchkes, and other items which may become detached from deformable laundry articles or fall out of pockets during a washing and drying cycle.

As shown in FIG. 13, with the tub and drum assembly 4200 tilted at the wash angle α, in implementations, the wastewater conduit 4285 can be routed away from the tub 4215 in a configuration comprising extra slack for accommodating an increased routing distance when the tub and drum assembly is pivoted to upright and inverted orientations. Additionally, the conduit routing configuration comprises a downhill path so no water is trapped within the tub or conduit 4285. In implementations, the conduit routing configuration comprises at least one of an S-curve configuration or a coiled configuration comprising an overall downhill routing path. For example, as the frame 4100 and tub and drum assembly 4200 pivot to an inverted orientation, as shown in FIG. 15, an S-curve configuration allows the wastewater conduit 4285 to extend to a drain and/or sump. As shown in FIG. 15, the wastewater outlet 4270 is above the wastewater conduit 4285 in the inverted position by a distance indicated by H2. This prevents any residual wastewater in the wastewater conduit 4285 from flowing back into the tub 4215 and drum 4205 and onto any clean, dry deformable article(s) therein. This configuration prevents even small amounts of wastewater remaining in the wastewater conduit 4285 upstream of the valve 4280 from re-entering the tub 4215 (and thereby rewetting garments) as the tub 4215 pivots down to empty the clean load of deformable article(s) 12 from the drum 4205. In implementations, such as those shown in FIGS. 8 and 46, the wastewater outlet 4270 comprises a segment of rigid drain pipe immediately below the tub 4215 that is oriented forward along the spin axis 4230 so that residual wastewater flows down this pipe and away from the tub 4215. Additionally or alternatively, in implementations as shown in schematically in FIG. 15, one or more means of backflow prevention exist in line with the wastewater conduit 4285 between the tub wastewater outlet 4270 and the wastewater sump or facility drainage system. These means can include one or more of air vents 4286, vacuum release vents 4287, valves, or expansion chambers. Alternatively, in implementations, H2 extends between the wastewater outlet 4270 and an operating portion of valve 4280. Water downstream from this is prevented from flowing back into the tub 4215 by closing the valve 4280 before tilting the tub and drum assembly 4200 to an upright orientation.

In addition to the air and liquid inlets and outlets to the tub 4215, in implementations, the washing and drying device 4000 additionally comprises one or more of temperature, humidity, water level (e.g., air pressure), and flow sensors configured to detect measured characteristics of the air and liquid flowing into and out of the tub and drum assembly 4200 and communicate these measured characteristics to the controller 4005. For example, as depicted in the schematic of FIG. 45, the device 4000 can include, in implementations, one or more of a temperature sensor disposed at or on an optional auxiliary heater 4605, and one or both of a temperature and humidity sensor 4655 and airflow sensor 4660 disposed in the heated air conduit 4262 mated to the air inlet orifice 4260 of the tub 4215. The controller 4005 receiving signals from one or more of these sensors can then control temperature and/or fan speed of the heater 4605 for adjusting the air to maintain values within one or more temperature, humidity, and flow rate thresholds. In implementations, the controller is configured to adjust system heat control elements such as airflow dampers (not shown) and/or power level of the auxiliary heater 4605 for adjusting one or more temperature, humidity, and flow rate thresholds.

For example, in implementations, the controller 4005 can adjust the inlet air temperature based at least in part on the ambient humidity. The controller 4005 can control the air flow rate (e.g., fan speed and/or damper position) based on detected temperature and humidity of the exhaust air. In implementations, one or more of an airflow sensor 4665 and one or more of temperature and humidity sensors 4670, 4675 can be disposed in the air vent hose 4325, before and after the blower 4610 sucking cooled, humid air from the drum 4205. For example, the one or more sensors can be in close proximity to the door 4300 and within the stream of cooled, humid air exhausted from the drum 4205. The controller 4005 receiving signals from one or more of these sensors can then adjust the temperature (e.g., control dampers) and/or fan speed of the auxiliary heater 4605 for adjusting the air flow A to maintain values within one or more temperature, humidity, and flow rate thresholds. Additionally or alternatively, in implementations, the controller 4005 receiving signals from one or more of these controls the temperature, the damper positions for intake heated process air and intake fresh air, and/or power level of the auxiliary heater 4605 to maintain values within one or more temperature, humidity, and flow rate thresholds. Additionally, the controller 4005 receiving signals from one or more of these sensors can determine the end of the drying cycle.

In implementations, one or more flow sensors 4680, 4682, 4685 can be disposed in the cleaning water conduits 4267, 4267a-b. For example, one or more flow sensors 4680 can be disposed downstream of the detergent/rinse agent source 4620 and provide feedback to the controller 4005 actuating the valve 4268 to introduce a measurable amount of detergent/rinse agent to the tub 4215 and drum 4205. Similarly, one or more flow sensors 4682 can be disposed downstream of the water source 4615 and provide a signal to the controller 4005 to control the rate of flow of water to the tub 4215 and drum 4205, and a one or more flow sensors 4685 can be disposed downstream of the valve 4268 introducing detergent/rinse agent to the water from the water source 4615 and provide a signal to the controller 4005 to control the rate of flow of wash water (e.g., water and detergent and/or rinse agent) to the tub 4215 and drum 4205.

In implementations, a surface tension measurement sensor 4288 provides a signal to the controller 4005 for determining the number and length of one or more rinse cycles for rinsing chemicals from the one or more deformable articles 12. In implementations the surface tension measurement sensor 4288 is disposed on or adjacent to the wastewater conduit 4285 between the tub 4215 and the strainer 4275. Alternatively, in implementations the surface tension measurement sensor 4288 is disposed on or adjacent to the wastewater conduit 4285 after the pinch valve 4280 so surface tension measurement sensor 4288 can be off the frame 4100 and isolated from movement and vibration associated with pivoting and washing and drying cycles. In implementations, the surface tension measurement sensor 4288 can include a capillary bypass with a pinch valve for allowing a drop of fluid from the wastewater conduit 4285 to drip from a small aperture so that the surface tension measurement sensor 4288 can measure its size and shape. Additionally or alternatively, the drop can be received onto a grid and a camera in operable communication with the controller 4005 can visualize the edges to measure the magnification and determine surface tension. Additional or alternative implementations can include at least one of optical and chemical measurement sensors to measure concentration of surfactant and/or a tracer introduced to the wash water at the cleaning water inlet 4265.

For example, as depicted in the schematic of FIG. 5, each washing and drying robot 4000a-n in the cluster 4002 is in operable communication with at least one of their respective processors 4015a-n and the at least one controller (e.g., controller 4005, CPU 205) via a wired or wireless network (e.g., network 230). In implementations, each one of the plurality of washing and drying robots 4000a-n comprises a heater drive 4047, a pivot drive 4117, and a motor drive 4427 configured to operate, respectively, an air heater, a pivot motor 4115 for tipping the drum 4205 from a vertical laundry loading position to a substantially horizontal washing and drying cycle position to an inverted clean laundry dumping position. Each one of the plurality of washing and drying robots 4000a-n comprises a network interface 4020a-n configured to communicate data and sensor signals to at least one of the respective processors 4015a-n and the at least one controller 4005a-n, 205 of the cluster 4002 (via a wireless or wired communication network 230) for processing. The sensor signals comprise output signals from at least one of one or more air flow sensors 4660a-n, 4665a-n, one or more temperature sensors 4650a-n, 4655a-n, 4670a- n, 4675a-n, one or more pressure sensors 4690a-n, one or more encoders 4125a-n, and one or more accelerometers 4130a-n. The sensor signals are routed to the at least one of the respective processors 4015a-n and the at least one controller 4005a-n, 205 of the cluster 4002 via the sensor interface 4025a-n of each one of the plurality of washing and drying robots 4000a-n.

Additionally or alternatively, based on one or more output signals of a plurality of sensors (e.g., airflow, temp, and humidity sensors 4650, 4655, 4660, 4665, 4670, 4675 of FIG. 35) the controller 4005 or a GPU 205 in communication with the cluster of washing and drying robots 4002a-n can pre-determine at least one of the temperature of the intake air, the moisture content of the intake air, and the air flow rate through the drum 4205 so as to minimize the drying time, minimize the total energy consumed, and/or to minimize damage to the fiber items of a load of laundry articles. To enable determining at least one of the pre-programmed values, one or more characteristics of the load of laundry articles can be provided by a preceding robot (e.g., automated intake robot 2000 and/or separating and sorting robot 3000) in communication with at least one of the controller 4005 and GPU 205 over the communication network 230. The one or more characteristics can include at least one of load size, fabric type, fabric finishes, wash cycle temperature, and article type (e.g., thick, water retaining items such as towels and jeans and thinner fabric items such as t-shirts and underwear). In implementations, a small load size comprises a dry weight (or mass) of up to about 3 kg, a medium size load comprises a weight in a range of between about 3-10 kg, and a large size load comprises a weight in a range of between about 10-12 kg.

In implementations, faster drying time is associated with high air flow rates and higher temperature, for example, airflow rates between 400 and 1000 m3/hr and temperatures in a range of between about 70 C and 90 C for a drum 4205 comprising a volume 0.2 m3 (cubic meters). Energy conservation is associated with lower air flow rates and lower temperatures, for example, airflow rates between 150 and 300 m3/hr (cubic meters per hour) and temperatures in a range of between about 45 C and 60 C. Energy efficiency calls for a low temperature and an optimized air flow. Slower airflows allow air to absorb more moisture per cubic meter of supplied air and require less fan power but drying takes longer so all the fans and motors run longer. Additionally, minimizing damage to fibers and fabric finishes such as printing, embossing, embellishments, elastic, or other elements of fabric items requires balancing the tradeoff between lower temperatures and shorter drying times. While high temperatures are known to contribute to damaging fiber items, for example by promoting shrinking and matting, longer tumbling times may also cause damage through rubbing or removal of material in the form of lint. In implementations, therefore, at least one of the controller 4005 and GPU 205 determines optimum conditions airflow, air temperature and drying duration based on two or more of the following load characteristics: the size of the load of laundry relative to a size of a drum of a washing and drying robot 4000a-n, the fiber composition and fabric type (e.g., weave/knit type and looseness, length of fibers (staple) from which the fiber/yarn is spun, spin quality of the fiber/yarn, fuzziness, etc.) of one or more articles in the load, fabric finishes of one or more articles in the load, wash cycle temperature, and article type and thickness. The two or more load characteristics can be determined by a dirty laundry sorting and separating robot 3000 and communicated to the controller 4005 and/or GPU 205 by a controller of the dirty laundry sorting and separating robot 3000 via a wired or wireless network 230.

Additionally or alternatively, in implementations, at least one of the controller 4005 and GPU 205 makes a determination to reduce a total estimated duration of the drying cycle by selecting moderate or high temperatures for some or all of the cycle, for example moderate temperatures in a range of between about 45 C to 55 and high temperatures in a range of between about 65 to 85 C.

In addition to controlling water, detergent, and air introduced to and removed from the tub and drum assembly 4200, in implementations, the controller 4005 is in operable communication with an autonomous loader 4800 disposed above the frame 4100 and a conveyor 600 configured to deliver a clean bin 20 beneath the frame 4100 for receiving washed and dried deformable laundry articles 12. In implementations, the autonomous loader 4800 comprises a delivery system for autonomously providing the at least one dirty deformable article 12 to the device 4000 for washing and drying. In implementations, the autonomous loader comprises at least one of a hopper and chute, a hanging bag, a movable panel, a coal dumper, a conveyor, a placer, and a robotic pick and place gripper. As shown in FIGS. 17 and 31, in implementations, the autonomous loader 4800 comprises a funnel 4805 and downspout 4807 disposed above the tub and drum assembly 4200. The controller 4005 is configured to instruct the autonomous loader 4800 to release the deformable article through the funnel 4805 and downspout 4807 to the drum 4205 while the rigid frame 4100 and tub and drum assembly 4200 are in the upturned orientation. Additionally or alternatively, in implementations, the device 4000 comprises an autonomous bin tipper 4700 in operable communication with the controller 4005. As will be described with regard to implementations, the autonomous bin tipper 4700 is configured to operate in coordination with a motorized loader 4800 configured to ride rails above a cluster 4200 to deliver a load of dirty laundry articles 12 to a specific device 4000 within the cluster 4002. The controller 4005 is configured to actuate the bin tipper 4700 to release the one or more deformable articles 12 into the motorized autonomous loader 4800, which then drives to a detectable location aligned above a particular device 4000 for delivering the one or more deformable laundry articles 12 held therein to the upturned drum 4205 of the particular device 4000.

In implementations, such as those of FIGS. 46A-B and 48A-D, the funnel 4805 comprises a holding volume 4810 adjacent a downspout 4807, and a movable wall 4820 is configured to create the bottom surface of the holding volume 4810 in a closed position. The movable wall 4820 can comprise an actuator (e.g., FIG. 5, movable wall actuator 4845) in operable communication with the controller 4005 for selectively removing and/or moving the movable wall 4820 and releasing the at least one deformable article 12 through the downspout 4807 into the opening 4210 of the drum 4205 positioned therebeneath. For example, in implementations such as in FIGS. 47A-B and 48A-D, the movable wall 4820 (e.g., a flap) can be hingedly attached to a funnel frame by at least one hinge. In implementations, the at least one hinge comprises a pair of pins 4821a-b configured to be mounted to opposite sides 4801a-b of a frame of the autonomous loader 4800 and extend through corresponding orifices in the sides of the funnel 4805.

As will be subsequently described with reference to the implementation of FIGS. 48A-D, the movable wall 4820 is configured to be at least one of pushed and released from holding pegs 4822*a-b*, or latches, by a pneumatic air cylinder 4823 to swing away, pivoting about the pins 4821*a-b* and allowing the at least one deformable article 12 to drop from the holding volume 4810 through the downspout 4807 in the direction of arrow E. The pneumatic cylinder 4823 is configured to be selectively actuated by, for example, a solenoid. Alternatively, in implementations, the movable wall can be slidably attached to an inside surface of the funnel and at least one of pushed and pulled to remove the bottom of the holding volume and allow the at least one deformable article to drop from the holding volume to the downspout.

Figure 48A:
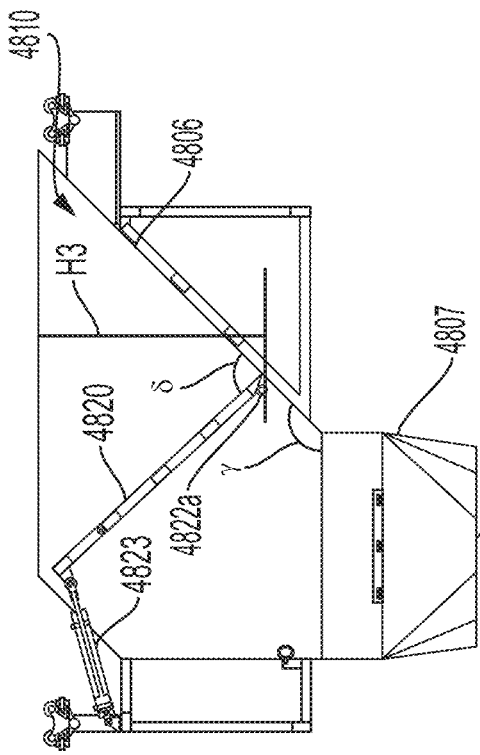
FIG. 48A depicts a side cross section view of the autonomous loader of FIG. 46A with a movable wall in a closed state.

As shown in FIG. 48A, a funnel wall 4806 can be inclined at an angle γ to assist in directing the at least one deformable article 12 as gravity pulls the at least one deformable article 12 from the funnel 4805*a* to drop into the drum 4205. In implementations, the funnel wall 4806 forming a backstop of the holding volume comprises an angle γ relative to the plane of the opening of the downspout 4807. In implementations, the angle γ can be in a range of between about 35 to 55 degrees (e.g., 35 degrees, 40 degrees, 45 degrees, 50 degrees, 55 degrees). Angling the funnel wall 4806 assists with enabling the at least one deformable article to move down through the downspout 4807 under the pull of gravity when the movable wall 4820 moves to reveal the downspout. In implementations, the movable wall 4820 is angled to the funnel wall 4806 at an angle δ in a range of between about 80 to 100 degrees (e.g., 80 degrees, 85 degrees, 90 degrees, 95 degrees, 100 degrees). In implementations, the movable wall 4820 can rest on the funnel wall 4822*c* at a distance H3 in a range of between about 5 to 15 inches (e.g., 5 inches, 10 inches, 15 inches) from the top of the funnel 4805 to the point of intersection between the movable wall 4820*c* and the funnel wall 4806. In implementations, a lower opening 4808 of the downspout 4807 comprises shape identical or nearly identical to that of the opening 4210 of the drum 4205 and an area slightly smaller or identical to the area of the opening 4210 so that the one or more deformable articles 12 flows directly from the downspout into the upright drum 4205 therebelow without constriction. The lower opening 4808 of the downspout 4807 can be positioned such that a minimal gap (e.g., a gap in a range of between about 10 mm to 55 mm) exists between the opening 4808 of the downspout and the front end 4212 of the drum 4205, thus preventing any of the one or more deformable articles 12 from missing the opening 4210 of the drum 4205. This ensures that all of the one or more deformable articles 12 delivered from the autonomous loader 4800 enter the drum 4205 automatically and without human intervention.

Figure 47A:
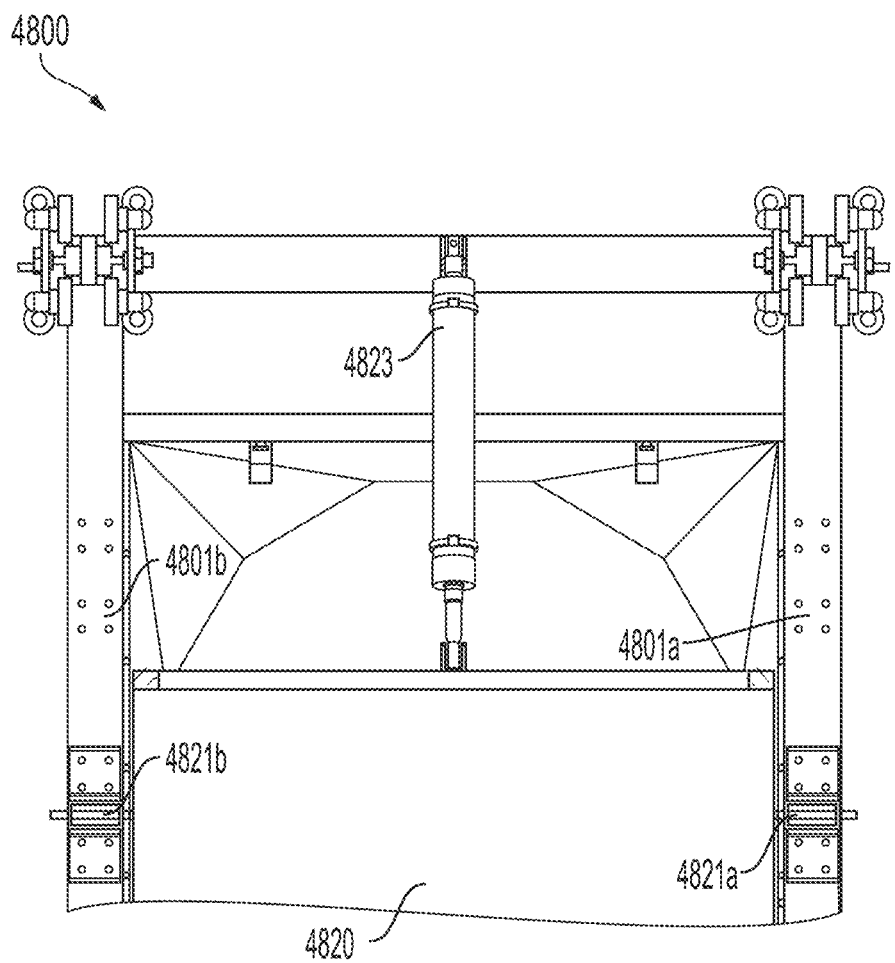
FIG. 47A depicts a top down partial view of the autonomous loader of FIG. 46A.
Figure 47B:
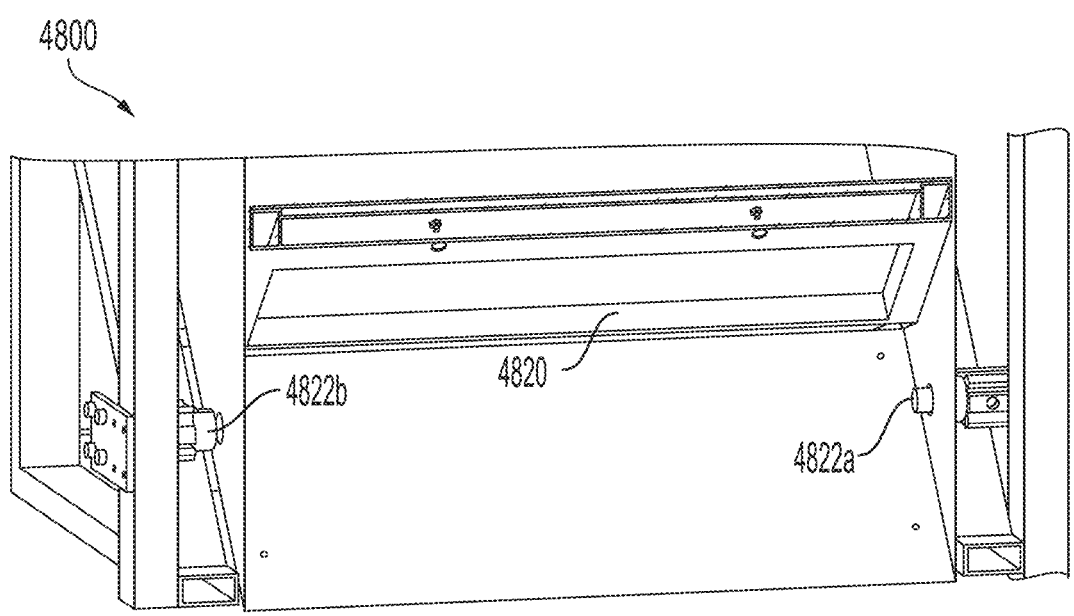
FIG. 47B depicts a partial front perspective view of a lower portion of the autonomous loader of FIG. 46A.

As previously described with regard to implementations, as shown in the partial rear perspective view of FIG. 47B, a pair of movable pegs 4822*a-b*, or latches, extend into the funnel 4805 to hold the movable wall 4820 resting thereon in a closed position. In implementations, the pair of movable pegs 4822*a-b* are each a shaft of a pneumatically actuated load stopping air cylinder configured to withstand high side loads (e.g., MCMASTER-CARR Load Stopping Air Cylinder, 32 mm Bore Size). FIG. 48A depicts a side cross sectional view of the autonomous loader 4800 with the movable wall 4820 in a closed position, contacting the pair of movable pegs 4822*a-b*. As shown in the system schematic of FIG. 5, in implementations, the controller 4005 is in operable communication with a processor 4835 of the autonomous loader 4800 to signal an actuator 4840 (e.g., a pneumatic solenoid valve) to simultaneously trigger retraction of the pair of movable pegs 4822*a-b* from contacting the movable wall 4820. Additionally, the controller 4005 is in operable communication with the processor 4835 to signal an actuator 4845 (e.g., a pneumatic solenoid valve) to actuate the pneumatic cylinder 4823 shown in the perspective side view of FIG. 46A, the cross-sectional side view of FIG. 46B, and the partial top-down view of FIG. 47A. In implementations, pneumatic lines to the actuators 4840, 4845 include one or more control valves, and the actuators are operably connected via pneumatic lines to the pneumatically actuated load stopping cylinders comprising the pegs 4822*a-b* and the pneumatic cylinder 4823 configured to move the movable wall 4820. Additionally or alternatively, in implementations, upon receipt by the processor of a control signal from the controller 4005, air can be supplied from at least one of a compressor and a locally mounted accumulator affixed to the movable autonomous loader 4800 for instantaneous provision or compressed gas to the pneumatically actuated load stopping cylinders comprising the pegs 4822*a-b* and the pneumatic cylinder 4823.

As depicted in FIGS. 48A-D, the pneumatic cylinder 4823 comprises a gas inlet line and outlet line for actuating the cylinder with compressed gas and releasing air in response to a control signal. Working in conjunction with the movable pegs, the pneumatic cylinder 4823 moves its piston through a range of distances to open and close the movable wall 4820 to release the one or more deformable articles from the holding volume 4810 into the downspout 4807 for delivery to a drum 4205, and then return to a closed position, resting on the pair of movable pegs 4822*a-b* to receive one or more deformable articles thereon in the holding volume 4810 above the closed movable wall 4820. As previously described, FIG. 48A depicts a side cross section view of the autonomous loader 4800 with the movable wall 4820 in a closed position, resting on the pair of extended pegs 4822*a-b*.

Figure 48B:
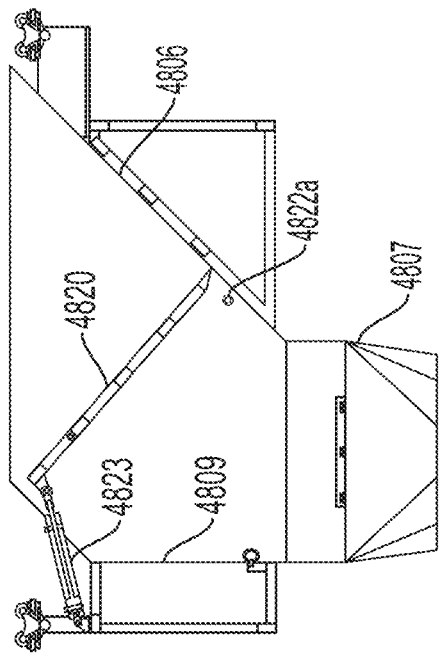
FIG. 48B depicts the side cross section view of FIG. 48A with a movable wall in a partially open state.
Figure 48C:
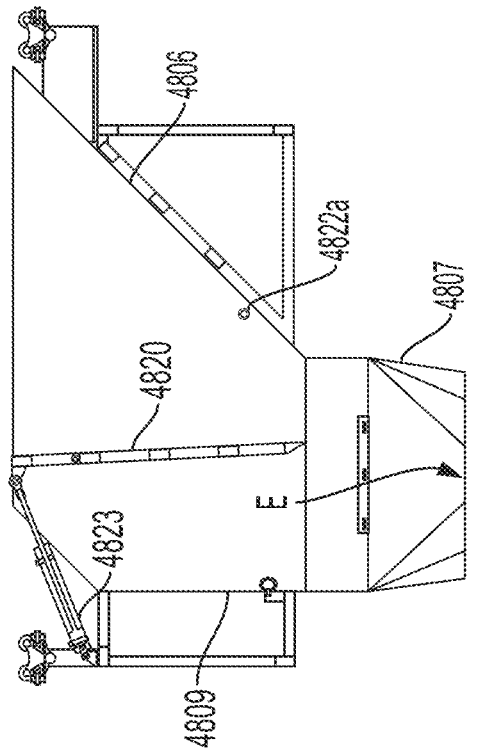
FIG. 48C depicts the side cross section view of FIG. 48A with a movable wall in a fully open state.
Figure 48D:
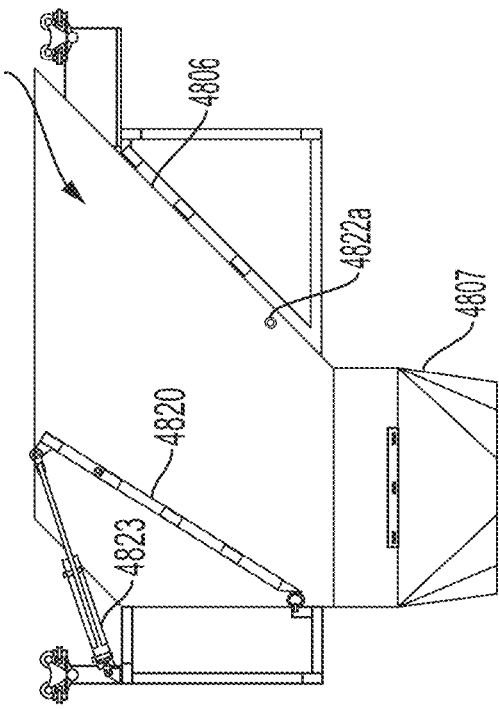
FIG. 48D depicts the side cross section view of FIG. 48A with a movable wall in a partially closed state.
Figure 50:
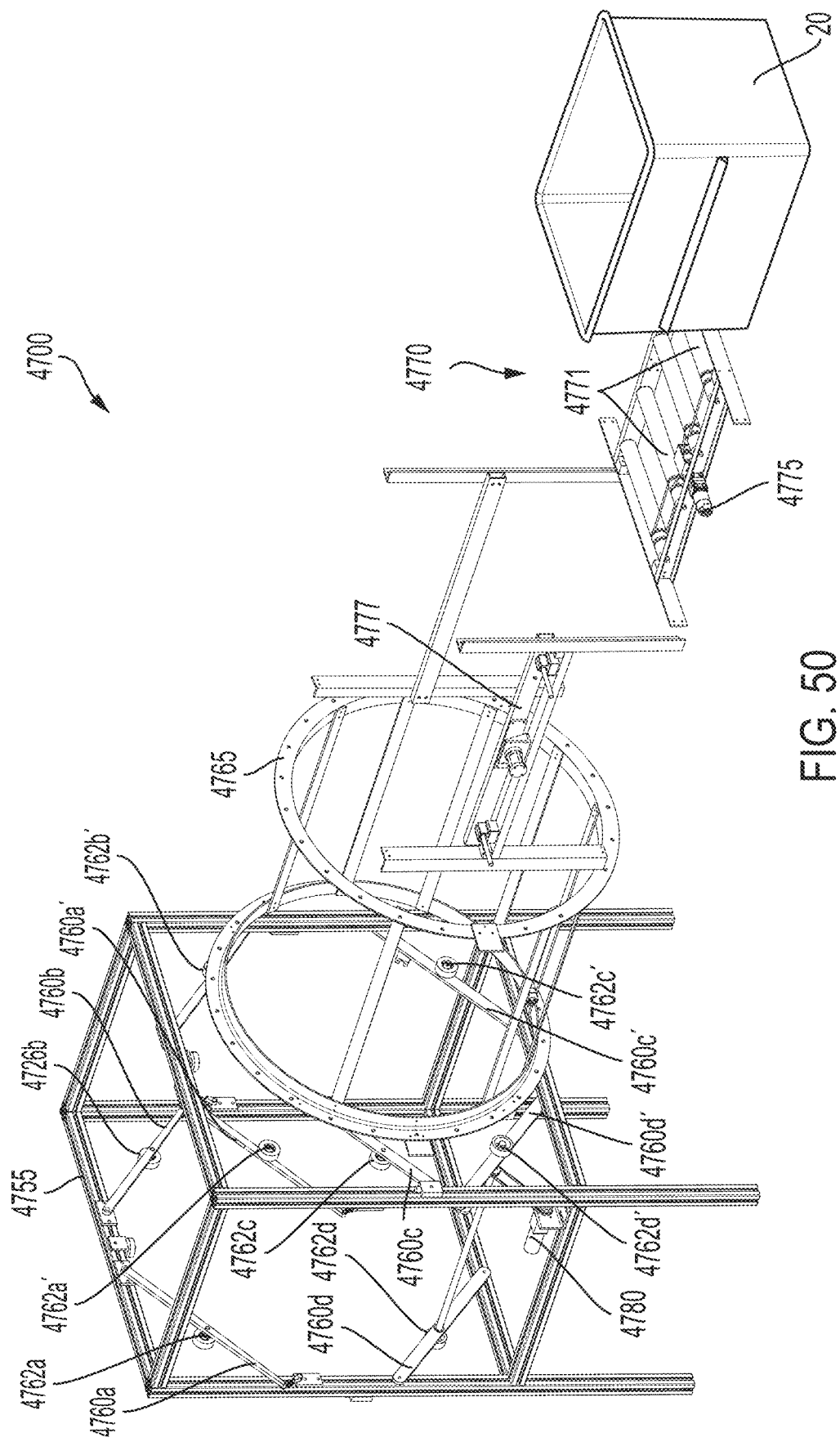
FIG. 50 depicts an exploded view of the autonomous dirty laundry bin tipper of FIG. 49A relative to a bin.
Figure 51:
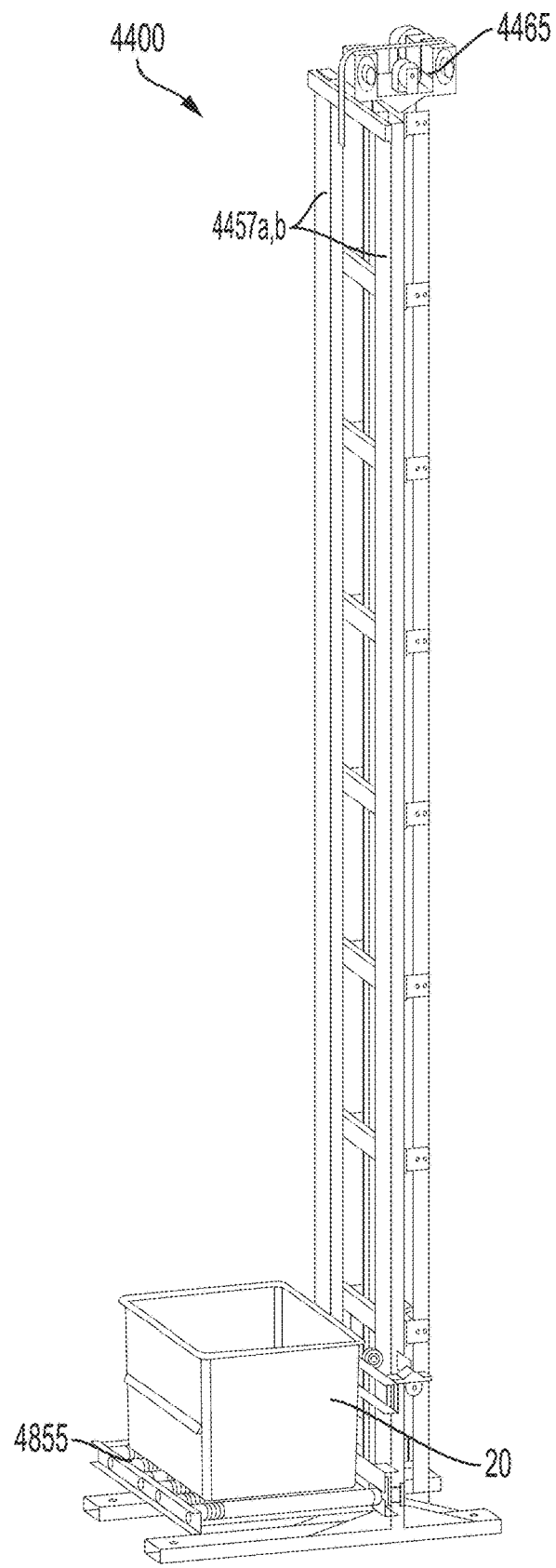
FIG. 51 depicts an elevator configured to raise a bin of sorted and batched dirty laundry for transfer to an autonomous dirty laundry bin tipper disposed above a washing and drying device.
Figure 52B:
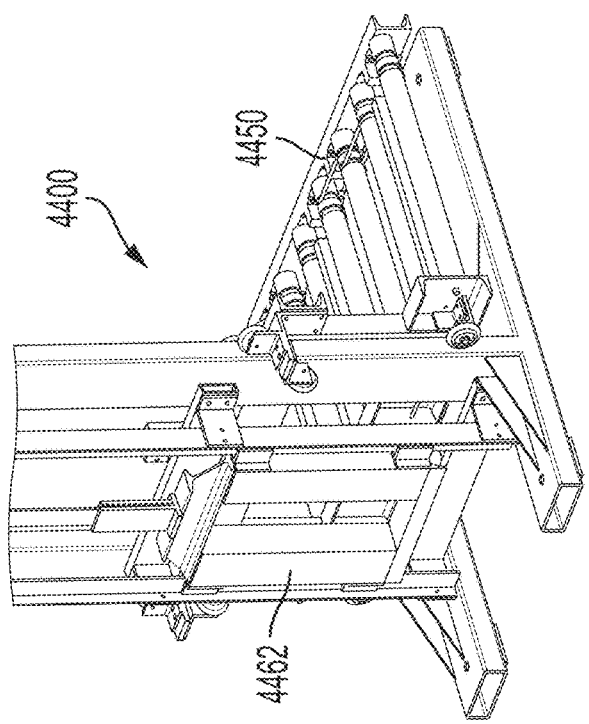
FIG. 52B depicts a rear perspective view of a lower portion of the elevator of FIG. 51.
Figure 52C:
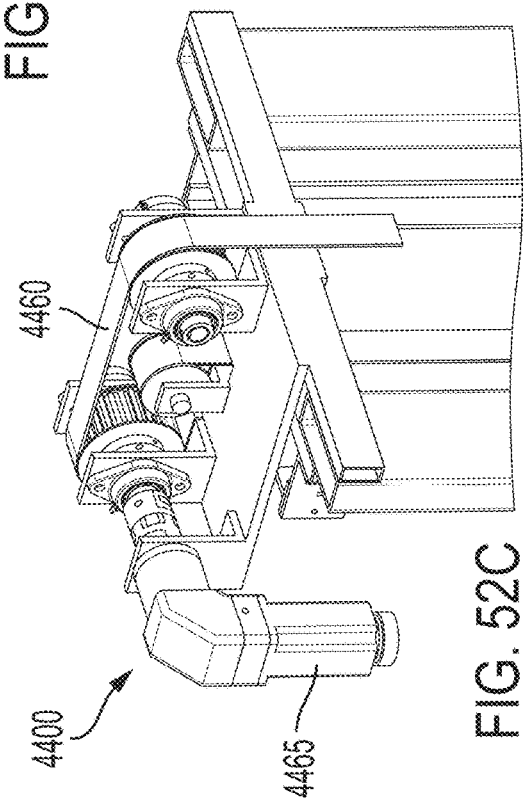
FIG. 52C depicts a rear perspective view of a drive motor and pulley system disposed on a top portion of the elevator of FIG. 51.
Figure 52A:
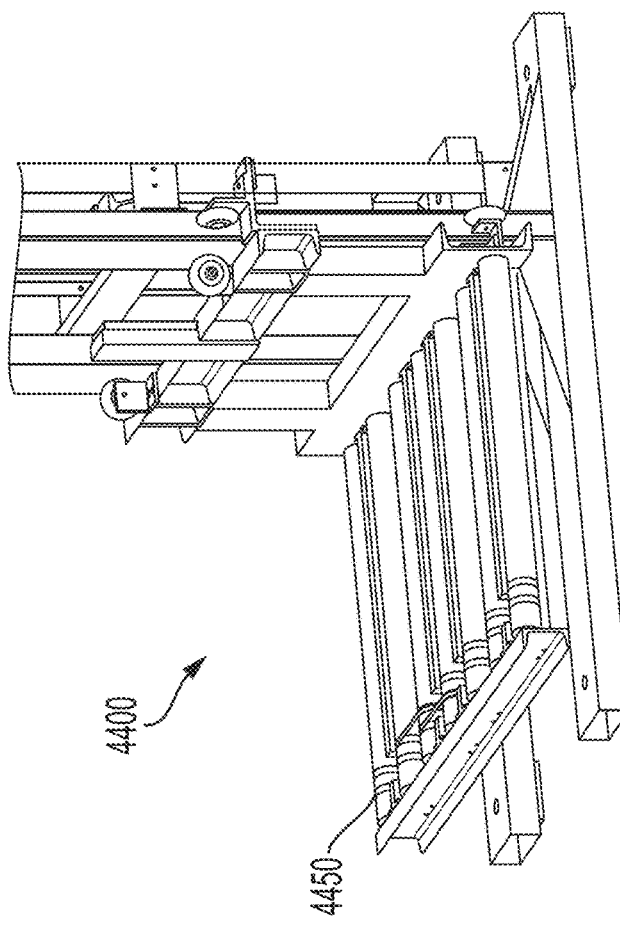
FIG. 52A depicts a front perspective view of a conveyor portion of the elevator of FIG. 51.

FIGS. 48B-C depict the movable wall in partially and fully opened positions with the pneumatic cylinder extending out and the bottom of the movable wall 4820 falling past the retracted pair of pegs 4822*a-b* and reaching a back wall 4809 of the funnel 4805 in a fully open position, leaving the downspout 4807 exposed for the one or more deformable articles 12 to pass through unimpeded. In implementations, the autonomous loader 4800 further comprises one or more sensors, e.g., a downwardly-looking camera, in communication with at least one of the processor 4853 and the controller 4005 for detecting that the at least one deformable article has exited the autonomous loader and outputting a signal to the controller that the movable wall 4820 can close. Additionally or alternatively, the movable wall 4820 can close after a predetermined maximum wait time, for example 10-30 seconds, required for the largest loads of deformable articles 12 to exit the autonomous loader 4800 completely. FIG. 48D depicts a position of the movable wall 4820 and pneumatic cylinder piston in a position past closed. In implementations, the piston thus retracts past the closed position to at least one of enable the pair of movable pegs 4822*a-b* to extend into the funnel 4805 without potential interference with the movable wall 4820. Additionally, retracting past the closed position provides the controller 4005 with extra time to signal the pair of movable pegs 4822*a-b* to extend into the funnel 4805 before signaling the release of gas into the pneumatic cylinder 4823 so that the movable wall 4820 drops down to rest on the pair of extended pegs 4822*a-b* in the closed position of 48A.

Figure 56:
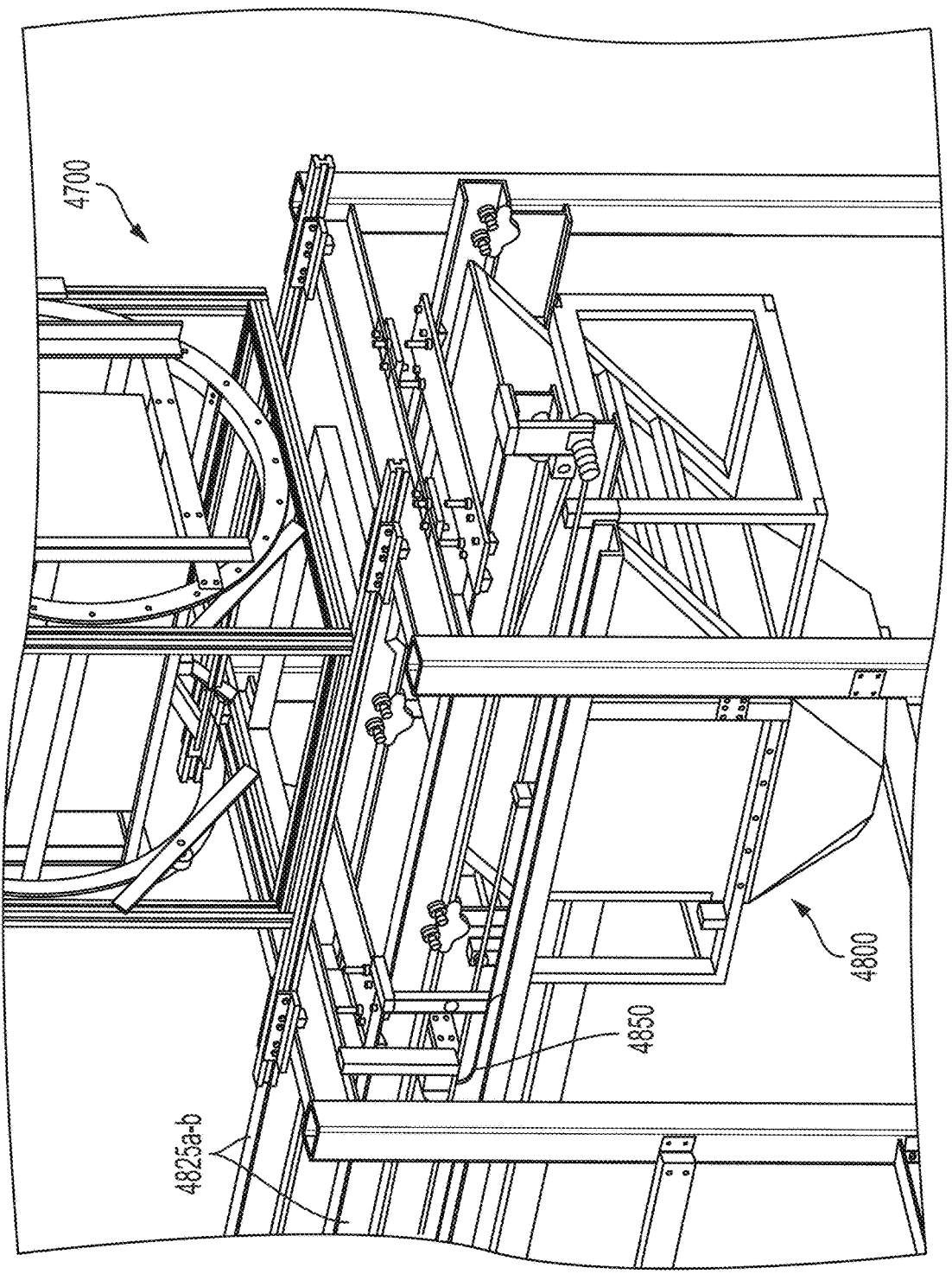
FIG. 56 depicts a side perspective view of a railed structure supporting an autonomous dirty laundry delivery system configured to service a plurality of washing and drying devices.

As previously described, in implementations, the mobile autonomous loader 4800 services a cluster 4002 of washing and drying devices 4000*a-n* as shown in FIG. 31, and the autonomous loader 4800 transits along at least one rail 4825 above the cluster 4200. In implementations, as shown in FIG. 56, the at least one rail comprises a pair of rails 4825*a-b* and as shown in FIG. 46A, the loader 4800 comprises a plurality of sets of wheels 4830*a-d*, for rolling in secured engagement with the rails. For example, each of the pair of rails 4825*a-b* can comprise an I-beam, and each set of wheels 4830*a-d* comprises one or more wheels configured to engage the lower horizontal portion of the I-beam on each side of the vertical strut. The mobile autonomous loader 4800 thus securely engages each of the pair of rails 4825*a-b* and will not shift to one side or another under shifting forces associated with one or more deformable articles being received or discharged from the loader 4800. The autonomous loader 4800 thereby remains engaged in alignment with the pair of rails 4825*a-b* along their lengths.

In implementations, as shown in FIG. 56, the mobile autonomous loader 4800 further comprises a cable carrier 4850 (e.g., IGUS cable carrier) that rolls and unrolls along the length of travel for housing and routing electronic and pneumatic lines concealed therein to the mobile autonomous loader 4800 during transit without kinking or damaging the lines. As shown in the system schematic of FIG. 5, in implementations, each autonomous loader 4800 comprises a rail drive 4855 configured to operate a drive motor for operating the sets of wheels 4830*a-d* to transit the mobile autonomous loader 4800 along the pair of rails 4825*a-b*. Additionally, in implementations, as shown in the system schematic of FIG. 5, each loader 4800 comprises a sensor interface 4860 and at least one sensor 4865 for detecting a position of the autonomous loader 4800 along the pair of rails 4825*a-b*. In implementations, the at least one position sensor 4865 comprises at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors configured to output a signal to the controller to stop the driven autonomous loader above and in alignment with one of the plurality of autonomous combination washing and drying devices 4000*a-n* in a cluster 4002. In implementations, the switches comprise at least one of a reed switch and Hall effect sensor. Additionally or alternatively, the autonomous loader 4800 comprises a rotary encoder 4870 disposed on the drive motor. The rotary is configured to output a signal to at least one of the processor 4835 and the controller 4005 indicative of an absolute of position of the mobile autonomous loader 4800 along the pair of rails 4825*a-b* for aligning the autonomous loader 4800 above a device 4000 in the cluster 4002.

Turning now to the introduction of the at least one deformable article 12 into the autonomous loader 4800, in implementations, in FIGS. 49A-C the autonomous loader 4800 is fed by an autonomous bin tipper 4700 disposed above the holding volume 4810 of the autonomous loader 4800. The controller 4005 is configured to actuate the bin tipper 4700 to release the one or more deformable articles 12 into the holding volume 4810. In implementations, the bin tipper 4700 comprises a frame 4755 and suspension elements 4760*a-d*, 4760*a'-d'* disposed thereon configured to rotatably engage a tumbler 4765 configured to receive a bin 20 of sorted, soiled deformable articles 12. In implementations, the device 4000 comprises an autonomous conveyor (not shown) configured to transit the bin 20 from an autonomous separating and sorting robot 3000 to at least one of the bin tipper 4700 and, as shown in FIGS. 31, 51, and 52A-C, an elevator 4400 configured to receive the bin 20 and raise the bin 20 to a height of the bin tipper 4700 for conveyance into the tumbler 4765.

The tumbler 4765 further comprises a conveyor 4770 on which the bin 20 slides into the tumbler 4765 to be held by one or more selectively actuated clamps 4777. In implementations the one or more selectively actuated clamps comprise a pneumatically operated clamp 4777 in operable communication with the controller 4005. In implementations, the conveyor 4770 comprises a plurality of driven rollers 4771. As shown in sequential depiction in FIGS. 49A-C, with the bin 20 clamped into the tumbler 4765, the controller 4005 rotates the tumbler 4765 seated on a plurality of guide wheels 4762*a-d*, 4762*a'-d'* affixed to the suspension elements 4760*a-d*, 4760*a'-d'* thereby flipping the bin 20 upside down with its opening facing the funnel 4805 of the autonomous loader 4800 therebeneath. Once the controller 4005 receives a signal that the tub and drum assembly 4200 is in the upturned position, the controller 4005 signals the funnel 4805 to dump the at least one deformable article 12 through the opening 4210 of the drum 4205 for washing and drying, as shown in FIG. 12. The tumbler 4765, frame 4755, and suspension elements 4760*a-d*, 4760*a'-d'* are designed so that deformable articles 12 being tipped from the bin do not touch any of the tumbler 4765, frame 4755, and suspension elements 4760*a-d*, 4760*a'-d'* thereby avoiding being caught in theses structural and moving components and avoiding potential contamination and subsequent cleaning requirements.

Turning to the system schematic of FIG. 5, the bin tipper 4700 comprises a processor 4705 in wired or wireless communication with the controller 4005 via a network interface 4735. The bin tipper 4700 comprises a conveyor drive 4710 in operable communication with a reversible conveyor motor 4775 configured to receive a full bin 20 into the tumbler 4765 and eject the bin 20 once emptied. In implementations, the conveyor 4770 further comprises an incremental shaft encoder 4730 on the conveyor motor 4775 configured to rotate the conveyor rollers by a measurable amount to move a bin 20 into a clamping positioning within the tumbler 4765. Additionally or alternatively, the conveyor comprises at least one position sensor 4725 configured to detect a position of a bin 20 within the tumbler 4765 and transmit a signal to the processor 4705 of the bin tipper 4700 to actuate the clamp 4777 to retain the bin 20 for tipping. In implementations, the position sensor 4725 comprises at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors configured to detect the presence of the movable stage 4505 at a particular position along the rail 4410 and output a signal to the drive motor 4510 to stop moving the stage 4505 The bin tipper 4700 further comprises a tumbler drive 4715 in operable communication with a tumbler motor 4780 configured to rotate the tumbler 4765 to invert a bin 20 clamped therein. In implementations an incremental shaft encoder 4731 is disposed on the drive motor shaft of the tumbler motor 4780 for detecting a rotational position of the tumbler 4765. Additionally, in implementations, the bin tipper comprises one or more limit switches 4726 configured to detect at least one of the tumbler being upturned and the tumbler being inverted.

As previously described, in implementations, such as that of FIGS. 31 and 51-52C, the raised bin tipper 4700 receives a bin from an elevator 4400 configured to receive and elevate a bin 20 containing the soiled at least one deformable article for washing and drying. In implementations, the elevator 4400 comprises a roller conveyor 4450 for receiving the bin 20 thereon from the separating and sorting robot 3000. The roller conveyor 4450 is movably attached to one or more vertical risers 4457a-b and driven up and down the vertical risers by a drive motor 4465 and puller system 4460 that includes a counterweight 4462. As shown in the system schematic of FIG. 5, in implementations, the elevator 4400 comprises a processor 4405 in wired or wireless communication with the controller 4005 via a network interface 4425. The elevator 4400 comprises an elevator drive 4415 in operable communication with a pulley system drive motor 4465 and a conveyor drive 4417 in operable communication with a reversible conveyor motor configured to receive a full bin 20 for elevating and an emptied bin 20 for lowering. In implementations, the elevator 4400 further comprises a load sensor 4409 for detecting the presence of a bin 20 on the conveyor 4450 and a position sensor configured to detect alignment of the conveyor 4450 with the plurality of driven rollers 4771 of the conveyor 4770 of the bin tipper 4700.

Although implementations herein describe raised structures for loading the device 4000 with the at least one deformable article 12 for washing and drying, in other implementations, the device 4000 is loaded from a mezzanine level comprising one or more conveyors and trap doors. For example, containers of dirty deformable articles can be conveyed around a top mezzanine level without the need for additional elevators at each cluster of washing and drying devices.

Figure 55:
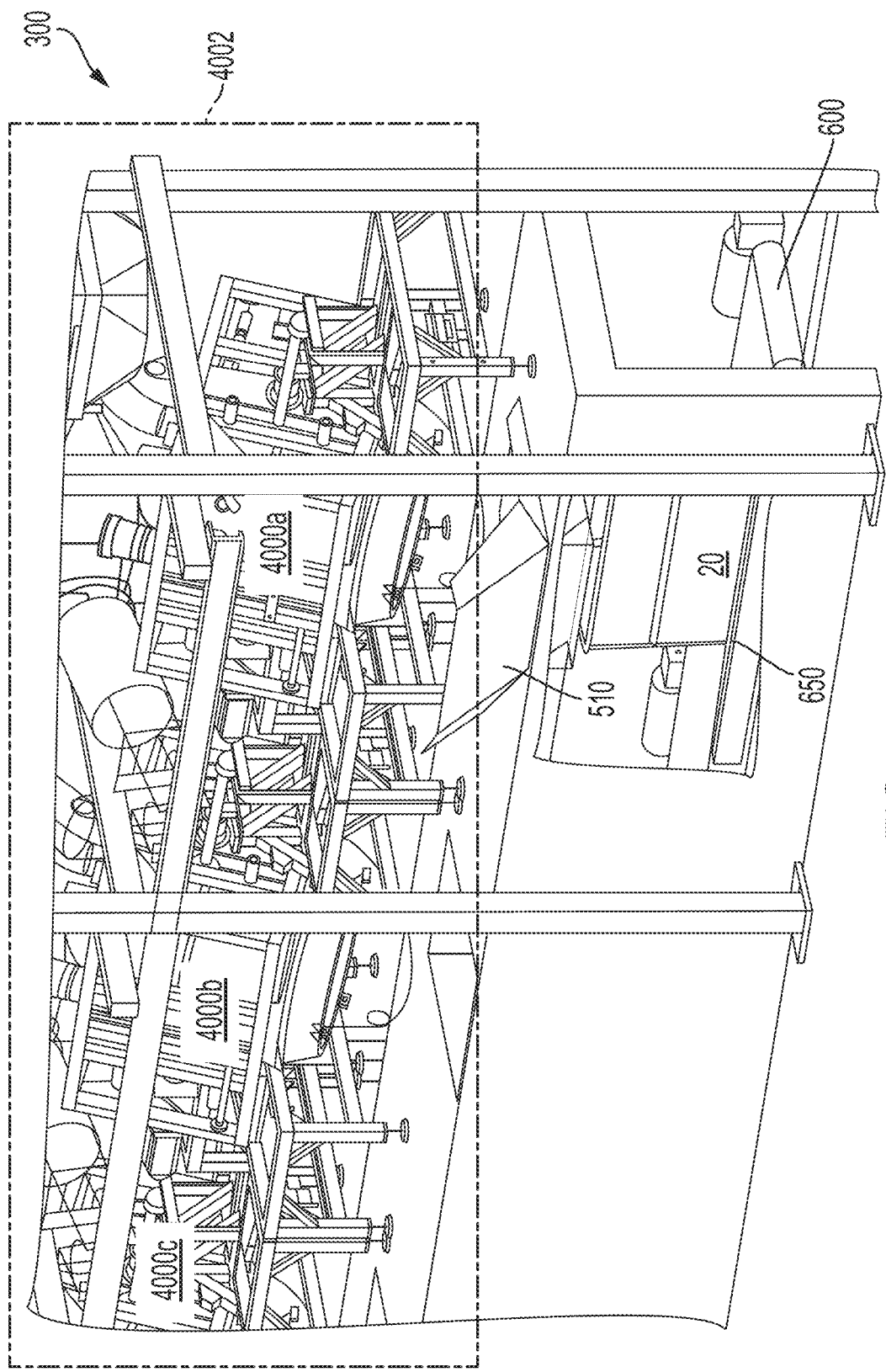
FIG. 55 depicts an implementation of a clean laundry collection system serving a plurality of washing and drying devices with a partial cut away view showing a conveyor and bin inside a clean bin tunnel disposed beneath a plurality of washing and drying devices.

Once the at least one deformable article 12 is washed and dried, the controller 4005 instructs removal of the door 4300, and, with the door 4300 removed and held out of the way, instructs the pivot motor 4115 to rotate the frame 4100 to an upturned orientation, as described previously with regard to FIG. 15. In implementations, such as that of FIGS. 17 and 31, a clean bin 20 is positioned beneath the tub and drum assembly 4200 for receiving the clean and dried at least one deformable article 12 as it drops from the drum 4205. In implementations, the clean bin 20 is disposed beneath a movable cover or door in operable communication with the controller 4005. The controller 4005 is configured to instruct moving or opening the movable cover before rotating the tub and drum assembly 4200 to the inverted position for dropping the at least one deformable article from the drum. Additionally or alternatively, as shown in FIGS. 17, 31, and 55, the clean bin 20 is positioned within an enclosed tunnel comprising the platform 500 and walled sides 502a-b, and each opening 505a-n beneath a corresponding one of each of the washing and drying devices 4000 in a cluster 4002 comprises a clean chute 510, 510a-n disposed adjacent the opening 505, 505a-n for guiding falling clean deformable articles 12 through the opening 505, 505a-n into a clean bin 20 therebeneath. Each clean chute 510, 510a-n directs the clean articles 12 so that they do not eject from the drum 4205 and land beyond the opening 505, 505a-n. In implementations, the clean chute 510, 510a-n comprises at least one sloped, raised wall disposed outside a clearance circle 4202 traced by the outer corners of the pivoting device 4000 and adjacent a front end 4212 of the tub and drum assembly 4200 as it rotates to an inverted position to deposit clothes in the clean bin 20.

As shown in FIG. 17, the clearance circle 4202 indicates the path swept by the corners of the rigid frame 4100 such that the frame 4100 rotates to the inverted position without colliding with the platform 500 and/or clean bin 20 therebeneath. As previously described, the clean bin 20 can be aligned with an opening 505 in the platform 500 and, in some implementations, covered by a selectively movable cover (not shown). The movable cover can shield the clean bin 20 from dust and debris so that the clean and dried at least one deformable article 12 is maintained in a clean state.

Additionally or alternatively, as shown in FIGS. 17 and 31, the clean bin 20 can be autonomously positioned beneath one of a plurality of washing and drying devices 4000a-d in a cluster 4200. In implementations, the clean bin 20 can be autonomously positioned beneath a washing and drying device 4000 by an autonomously operated conveyor 600 in operable communication with the controller 4005. In implementations, the clean bin 20 and autonomously operated conveyor 600 can operate within a sealed clean tunnel disposed beneath the cluster 4200 of washing and drying devices 4000a-d aligned with a corresponding plurality of selectively sealed openings 505, 505a-n for exposing the clean bin 20 only when the at least one deformable article 12 is cleaned and dried and ready for dropping from the drum 4205. Additionally, in implementations, the system comprises an upwardly aimed camera for detecting whether the drum 4205 is empty. Additionally, in implementation, the controller 4005 instructs a drive motor 4225 to spin the drum 4205 in the inverted position to discharge any remaining items from drum 4205 into the clean container 20.

As shown in the system schematic of FIG. 5, the conveyor 600 comprises a processor 610 in wired or wireless communication with the controller 4005 via a network interface 620. The conveyor 600 comprises a conveyor drive 605 in operable communication with a drive motor configured to rotate the conveyor belt and transit the clean bins 20 beneath a washing and drying device 4000 for filling. In implementations, the conveyor comprises at least one position sensor 615 for detecting alignment of each clean bin 20 with an opening 505 beneath a washing and drying device 4000. In implementations, the conveyor 600 comprises an optical sensor (e.g., a camera) configured to detect a state of the inverted drum 4205 and any remaining deformable items there, and communicate a signal to the drive motor 4200 of the device 4000 to rotate the drum 4205 until all remaining deformable articles 12 therein are discharged into the clean bin 20.

Figure 53:
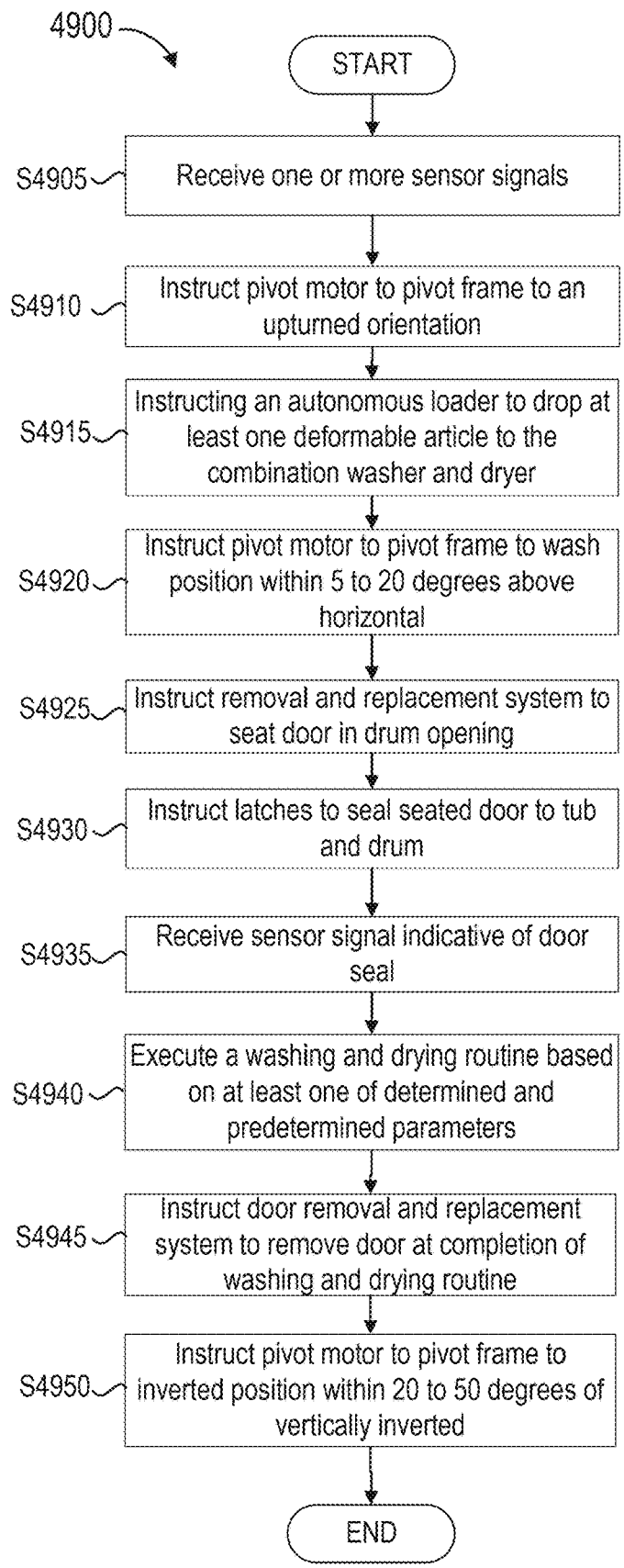
FIG. 53 is an implementation of a method of washing and drying laundry with an autonomous washing and drying device.

The controller 4005 is configured to receive signals from the washing and drying devices 4000 and orchestrate the autonomous loading, washing and drying, and unloading of at least one deformable article 12. In implementations, as shown in FIG. 53, a method 4900 of autonomously washing and drying at least one deformable article 12 with a combination washing and drying device 4000 comprises receiving, at a controller 4005 in communication with the combination device 4000 a request to begin a washing and drying cycle. In implementations, the request can be a query from at least one of an autonomous separating and sorting robot 3000, a bin tipper 4700, and an autonomous loader 4800. Additionally or alternatively, the request can comprise receiving S4905 one or more sensor signals from at least one of an autonomous separating and sorting robot 3000, a bin tipper 4700, and an autonomous loader 4800, the one or more sensor signals being indicative of at least one soiled, sorted deformable garment 12 that is ready for washing and drying.

The method comprises instructing S4910, in response to the request, the pivot motor 4115 to rotate the combination washer and dryer 4000 (hereinafter referred to as "combination washing and drying device 4000") upward such that an opening 4210 of the combination washer and dryer 4000 faces upward to receive the at least one soiled deformable 12 article therein. The controller 4005 can be configured to determine, based on an output signal of a position sensor in communication with the pivot motor 4115, that the opening 4210 of the combination washer and dryer 4000 is in the upturned orientation. The method comprises instructing 54915 an autonomous loader 4800 disposed above the combination washing and drying device 4000 and in operable communication with the controller 4005 to release the at least one deformable article 12 into the combination washing and drying device 4000. The method comprises instructing 54920 the pivot motor 4115 to pivot the combination washing and drying device 4000 to a washing and drying angle α in a range of between about 0 degrees to 20 degrees above horizontal. The method comprises instructing S4925, in response to the output signal indicating the combination washing and drying device 4000 being pivoted to the washing and drying angle α, an autonomous door removal and replacement system 4500 to seat a removable door 4300 in the opening 4210. The method comprises actuating 54930 one or more latches to a locked position attaching the door 4300 to the combination washing and drying device 4000 in a watertight mating and receiving S4935 a sensor signal indicative of the removable door 4300 being seated and latched.

Similarly, at the completion of a washing and drying cycle, the washing and drying device is pivoted to a door removal angle if not already within a tolerance range for door removal, and the autonomous door removal and replacement system 4500 removes the door. In implementations, the suctions 4520*a*-*b* push into the front surface 4330 of the door 4300 when the bifurcated fork 4516 extends, at which point the door O-ring seal is compressed into a front surface of the tub cap 4207 and side pressure is relieved from the plurality of latches 4290*a*-*c*. The suctions 4520*a*-*b* are then actuated to hold the door 4300, the tub latches 4290*a*-*c* are unlatched, and the arm 4515 retracts with the door 4300 engaged on the suctions 4520*a*-*b*. An inductive sensor 4529 can be used to make sure that the metal (e.g., stainless steel) door 4300 is captured by the suctions 4520*a*-*b* before releasing the latches 4290*a*-*c* and also before returning the door 4300 to the tub and drum assembly 4200.

Returning now to FIG. 53, the method comprises executing S4940, in response to detecting the removable door 4300 being seated and latched, a washing and drying routine based on at least one of determined and predetermined parameters. In implementations, the washing and drying routine comprises one or more cycles of drawing water and one or more laundry chemicals into the combination washer and dryer 4000 (with the same or different chemical mix between cycles of a routine comprising more than one wash cycle), spinning the combination washing and drying device 4000 about a spin axis 4230 substantially perpendicular to the opening 4210, rapid spinning for extracting residual water, draining wastewater out of the combination washing and drying device 4000, and drawing air into an interior volume of the combination washing and drying device 4000. The one or more laundry chemicals can include at least one of detergent, bleach, water softener, and rinse agent. In implementations, the controller 4005 adjusts one or more process parameters in response to signals from one or more sensors disposed on or in the tub 4215. For example, the controller 4005 is configured to close the water inlet valve 4268 when the water level in the tub 4215 is reached, start extraction when the tub 4215 is drained as detected by one or more hygrometers and pressure sensors, and stop the drying fan wan the one or more deformable articles are determined to be dry based on at least one of temperature and humidity sensor signals in the exhaust air as measured in the air vent hose 4325.

In implementations, the method comprises, upon detecting completion of the washing and drying routine, actuating the one or more latches to an unlocked position. The method comprises instructing S4945 the door removal and replacement system 4500 to remove the removable door 4300 from the opening 4210, and instructing S4950 the pivot motor 4115 to invert the combination washer and dryer 4000 with the opening angled downward for dropping the washed and dried at least one deformable article 12 from the combination washer and dryer 4000.

In implementations, the method further comprises receiving a signal from a least one of a hygrometer, one or more humidity sensors, and one or more pressure sensors 4690 disposed on or in the tub 4215 prior to instructing the washing and drying device 4000 to advance to the next stage in the washing and drying cycle, the signal indicating the absence of water remaining in the tub and drum assembly 4200 of the washing and drying device 4000. Additionally or alternatively, in implementations, the method further includes receiving a signal from a temperature sensor disposed within the air outlet conduit for measuring a temperature of the exhaust air prior to instructing the pivot motor to rotate the washer and dryer to an inverted position, the signal indicating that the at least one deformable article disposed within the drum is dry. Additionally or alternatively, one or more pressure sensors 4690 are disposed on or in the wastewater conduit 4285 or the strainer 4275. The one or more pressure sensors 4690 are configured to provide a signal indicative of water level in at least one of the tub 4215 and wastewater conduit 4285. In implementations, completion of a water drain cycle is detected by a water level sensor, for example an air pressure sensor in a separate, sealed chamber connected by a capillary to the bottom of the tub 4215. In implementation, additionally or alternatively, completion of the extraction cycle is timed and comprises a fixed duration after the maximum drum speed is achieved. The maximum drum spin speed can be a preset speed set by the controller 4005 that can be modified by the controller 4005 if excessive vibration signals are output by the one or more accelerometers 4130.

In implementations, the method further comprises receiving a signal from at least one camera comprising a field of view aimed through the opening 4210 of the combination washer and dryer 4000 during emptying. The controller 4005 can process a camera signal from one or more cameras to determine whether the combination washer and dryer 4000 is empty. Alternatively, the controller 4005 can process the camera signal to determine the combination washer and dryer 4000 retains at least one deformable article 12, and subsequently instruct the drive motor 4225 to rotate the drum 4205 of the combination washing and drying device 4000 about the spin axis 4230 to shake the at least one deformable article 12 from the combination washing and drying device 4000. The rotation can comprise alternating, bi-directional rotation (e.g., spinning in alternating opposite directions—clockwise and counterclockwise—about the spin axis 4230) to shake loose the at least one deformable article.

As shown in FIG. 17, in implementations, the at least one camera 16 is mounted below a transparent window (not shown) formed in or disposed within the clean chute 510. The at least one camera has a field of view encompassing the tub interior while deformable laundry articles are being dumped in the inverted orientation. The at least one camera 16 signal can be output to the controller 4005 for processing the image to determine whether the drum 4205 is empty during and immediately upon completion of the dumping action.

Additionally or alternatively, in implementations a camera 18 can be mounted at the top of the clean shoot such that a window is not required. The camera 18 field of view cannot image the drum interior when the assembly 4200 is inverted. Following emptying the drum 4205, the tub and drum assembly tilts up to an intermediate angle between inverted and upturned to where the field of view of the camera 18 encompasses the drum interior. If the camera 18 detects one or more deformable articles 12 in the interior of the drum 4205, the controller 4005 tilts the drum 4205 to the inverted orientation again to attempt emptying the one or more deformable articles 12 into a clean bin 20.

As previously described, one or more process lines 100, 100a-c can include a cluster 4002 of washing and drying robots 4000, 4000a-n, which intake process water, output grey water after washing loads of laundry, and output cool, humid air after drying loads of laundry with heated intake process air. In all implementations described herein, each washing and drying robot 4000, 4000a-n can be an electric washing and drying device with a single tub and drum assembly 4200 for sequential washing and drying of a single load of laundry. As shown in FIG. 55, in implementations, an autonomous system (e.g., a process line 100 or portion of a process line 100) for washing and drying household laundry comprises a one or more clusters 4002, 4002a-b of combination washer and dryers 4000a-n.

Each one 4000 of the plurality of autonomous combination washing and drying devices 4000 in a cluster 4002 comprises, as previously described with regard to implementations, a rigid frame 4100 comprising a pair of pivot shafts 4105a-b coaligned with a pivot axis 4110, the pivot axis being configured to be driven by a pivot motor 4115 through a rotational arc of between about 0 to 180 degrees for receiving household laundry into the washer and dryer in an upright orientation and dropping household laundry from the washer and dryer in an inverted orientation. Each one 4000 of the plurality of autonomous combination washing and drying devices 4000 comprises, as previously described with regard to implementations, a perforated drum 4205 disposed within a watertight tub 4215 and configured to be mated thereto at a drive end 4217 opposite an opening 4210. The drive end comprises a drive motor 4225 configured to spin the drum about a spin axis 4230 extending between the drive end and the opening.

Each one 4000 of the plurality of autonomous combination washing and drying devices comprises, as previously described with regard to implementations, a heated air orifice 4260 disposed in the drive end of the tub, a detachable door 4300 comprising an air outlet orifice 4315 configured to receive an air vent conduit 4335 such that air flows from the heated air orifice to the air vent orifice during a drying cycle while the detachable door seals the opening. In implementations, as previously described with regard to the preceding figures, the spin axis is perpendicular to the pivot axis, and the pivot axis is configured to be substantially aligned with the center of gravity of the combination washer and dryer.

Figure 54:
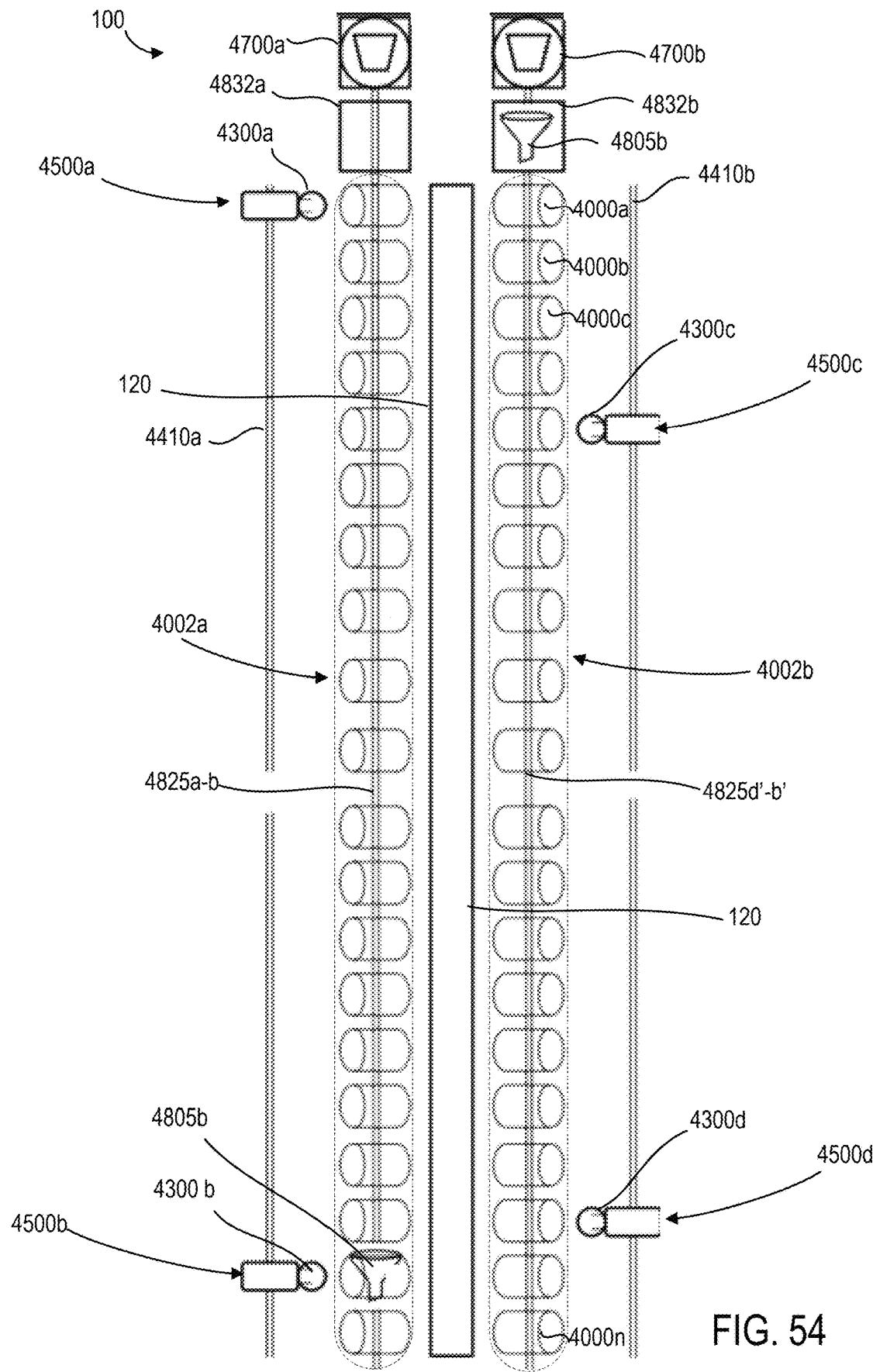
FIG. 54 depicts a schematic example of an autonomous system for washing and drying laundry in accordance with the process lines of FIGS. 1-3 and system of FIGS. 4-5.

As shown in FIG. 54, in implementations, the system 100 comprises a raised rail 4410 disposed adjacent the plurality autonomous combination washer and dryers 4000a-n. The raised rail is configured to support thereon a driven carrier (e.g., door removal and replacement system 4500) in operable communication with the controller 4005. The door removable and replacement system 4500 is configured to retrieve, hold, and reseat a removable door 4300 in an opening 4110 of one of the plurality of autonomous combination washing and drying devices 4000a-n. In implementations, such as that of FIG. 54, a process line 100 can include one or more clusters 4002, 4002s-b of a plurality of washer and dryers 4000a-n, and each of the one or more clusters 4002, 4002s-b each comprise a raised rails 4410a-b and one or more driven carriers (e.g., door removal and replacement system 4500) disposed thereon.

As previously described with regard to implementations of the washing and drying device 4000, the autonomous door removal and replacement system 4500 comprises an incremental shaft encoder 4588 disposed on a drive motor 4510, the incremental encoder 4588 being configured to output a signal to the controller 4005 indicative of an absolute of position of the driven door removal and replacement system 4500 on the raised rail 4410, 4410a-b. Additionally or alternatively, the autonomous door removal and replacement system 4500 comprises one or more position sensors 4585 disposed on the raised rail 4410, 4410a-b, the one or more position sensors 4585 being configured to output a signal to the controller 4005 indicative of alignment of the door removal and replacement system 4500 with one of the plurality of autonomous combination washing and drying devices 4000, 4000a-n. In implementations, the one or more position sensors 4585 disposed on the raised rail 4410, 4410a-b, comprise one or more limit switch sensors 4585 configured to output a signal to the controller to stop the door removal and replacement system 4500 above a selected one at a time of the plurality of autonomous combination washing and drying devices 4000, 4000a-n. Additionally or alternatively, the controller 4005 can receive a signal from the one or more position sensors 4585 and re-zero the position of the movable stage 4505 along the rail 4410. In implementations the one or more position sensors comprise a Hall effect magnet and sensor pairing. In implementations, magnets are disposed at each location along the rail 4410 that aligns with a device 4000 therebeneath and the movable stage 4505 comprises thereon a Hall effect sensor configured to detect each of the plurality of magnets and check its position at each location. Additionally or alternatively, in implementations, the movable stage 4505 comprises a cable or chain drive or a timing belt that enables the controller 4005 to track a position of the autonomous door removal and replacement system along the length of the rail 4410. Additionally or alternatively, the one or more position sensors comprise at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors configured to detect the presence of the movable stage 4505 at a particular position along the rail 4410 and output a signal to the drive motor 4510 to stop moving the stage 4505.

In implementations, the system 100 comprises a plurality of autonomous loaders 4800 each configured to be disposed above a corresponding one of the plurality of autonomous combination washer and dryers 4000a-n. As previously described with regard to implementations, each of the plurality of autonomous loaders can be is configured to drop dirty household laundry (e.g. at least one deformable article 12) into the opening of the corresponding one of the plurality of autonomous combination washer and dryers 4000a-n. Additionally or alternatively, as shown in FIGS. 54 and 56, the system can comprise a movable autonomous loader 4800 configured to be slidably disposed on a pair of rails 4825a-b above a corresponding one of the one or more clusters 4002a-b of a plurality of washing and drying devices 4000a-n.

As shown for example in FIG. 56, the movable autonomous loader 4800 can be movably disposed on a pair of rails 4825a-b straddling the opening 4210 of the drum 4205 configured to center the downspout of the autonomous loader 4800 over the opening 4210 of an upturned combination washing and drying device 4000, 4000a-n. As shown in FIG. 55, in implementations, a stationary bin tipper 4700 can be disposed at an end of the one or more rails 4825 or pairs of rails 4825a-b such that the bin tipper 4700 does not block access by the loader 4800 to any of the plurality of washing and drying devices 4000a-n. The autonomous loader 4800 comprises a motor configured to drive the autonomous loader 4800 along the one or more rails 4825 or pairs of rails 4825a-b. The motor can be in operable communication with a controller (e.g., controller 4005) configured to communicate where along the one or more rails 4825 or pairs of rails 4825a-b to stop the autonomous loader 4800, 4800a-b for unloading one or more soiled deformable articles 12 from the autonomous loader 4800 4800a-b into an empty drum 4205 of one of the plurality of washer and dryers 4000a-n. In implementations, the system 100 can include a stationary sanitization chamber 4832, 4832a-b adjacent the bin tipper 4700, 4700a-b. Prior to the controller 4005 actuating the bin tipper 4700, 4700a-b to drop one or more soiled deformable articles 12 into the autonomous loader 4800, 4800a-b, the sanitization chamber 4832, 4832a-b can clean and/or rinse the autonomous loader 4800, 4800a-b shared between the plurality of autonomous washing and drying devices 4000a-n in a cluster 4002, 4002a-b and therefore shared between sequential loads of laundry from one or more households (e.g., one or more customers).

In implementations, as shown in FIG. 45, the system 100 further comprises one or more centralized services in fluid communication with the plurality of washing and drying devices 4000a-n in a cluster. The one or more centralized services can comprise at least one of heated air, water, and one or more laundry chemicals supplied to each of the plurality of washer and dryers 4000a-n on demand. The one or more laundry chemicals can include at least one of detergent, bleach, water softener, and rinse agent. The one or more centralized services are in operable communication with the controller 4005 for supplying the required services to one or more of the plurality of washing and drying devices 4000 on demand.

In implementations, as previously described with regard to implementations of the device 4000, the shared services can further include one or more heat pumps in fluid communication with the plurality of washing and drying devices 4000a-n in a closed loop air system and in operable communication with a remote controller (e.g., CPU 205) or local controller (e.g., controller 4005). The one or more heat pumps are configured for energy reclamation across one or more clusters 4002. 4002a-n of a laundry facility and are configured to load balance temperature, humidity, water use, and water treatment and recycling across a plurality of washing and drying devices 4000, 4000a-n in a closed loop system. In implementations, one or more process lines 100, 100a-c can include an active heat pump. Heat pumps operate most efficiently in a narrow range of air flow, air temperature, and humidity conditions. In implementations, efficiency gains and energy recapture can be optimized across a plurality of electrical washing and drying machines 4000, 4000a-n of two or more clusters 4002, 4002a-n under computer control for system load balancing at optimum heat pump operational parameters. In implementations, load balancing can include balancing at least one of wash and dry temperatures, air flow rates, wash and dry cycle start times, washing order of batched loads of laundry, and size of individual loads of deformable laundry articles divided from each customer household's laundry. In addition to the load balancing of active heat pump operation, implementations of one or more process lines 100, 100a-c can further comprise a co-located water treatment and recycling system for claiming condensed water from the active heat pump back into the one or more associated clusters 4002, 4002a-n.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. An autonomously operated washing and drying device, comprising:
   a pair of pivot shafts affixed to opposite sides of a rigid frame in axial alignment with a pivot axis, the pair of pivot shafts being configured to suspend the rigid frame from a support structure, the suspended rigid frame rotating about the pivot axis through a range of rotational angles from an upturned orientation to an inverted orientation;
   a drum configured to receive therein at least one deformable article for washing and drying, the drum comprising
      a plurality of perforations for air and liquid ingress into the drum, and an opening at a front end configured for receiving the at least one deformable article therethrough in the upturned orientation and a drive end opposite the front end configured to operably couple to a drive shaft;

a tub configured to receive the drum therein and connect to a motor housing disposed about the drive shaft at the drive end opposite the front end;

two or more springs configured to extend between an outer surface of the tub and the rigid frame and suspend the connected tub and drum within the rigid frame;

a bidirectional drive motor configured to operably engage the drive shaft for spinning the drum about a spin axis extending from the drive end to the front end, the spin axis being substantially orthogonal to the pivot axis;

a pivot motor configured to operably engage one of the pair of pivot shafts to rotate the rigid frame about the pivot axis such that the opening of the drum suspended therein moves bidirectionally through the range of rotational angles from the upturned orientation to the inverted orientation;

at least one rigid flange protruding from the outer surface of the tub, the at least one rigid flange configured to be received in a gap between a pair of bumpers disposed on the rigid frame, the at least one rigid flange being configured to contact a front bumper of the pair of bumpers in the inverted orientation and a rear bumper of the pair of bumpers in the upturned orientation, and a controller in operable communication with the pivot motor and drive motor, the controller configured to instruct the pivot motor to rotate the rigid frame to the upturned orientation for receiving the at least one deformable article into the opening of the suspended drum, instruct the pivot motor to rotate the rigid frame to a wash orientation between the upturned orientation and the inverted orientation, instruct the pivot motor to rotate the rigid frame to the inverted orientation, and execute a washing routine and a drying routine based on wash and dry parameters, the wash and dry parameters comprising instructing the drive motor to spin the drum about the spin axis at the wash orientation.

2. The device of claim 1, wherein the controller is further configured to receive a signal from an encoder disposed on at least one of the pair of pivot shafts, the signal indicative of a detected rotational angle of the at least one of the pair of pivot shafts while the pivot motor is rotating the rigid frame about the pivot axis, and execute one or more instructions of the washing and drying routine based at least in part on receiving the signal from the encoder.

3. The device of claim 1, further comprising at least one accelerometer disposed on the tub, the at least one accelerometer being in wired or wireless communication with the controller and being configured to detect a degree of rotation of the tub and drum about the pivot axis and an angular position of the spin axis relative to horizontal and output a signal indicative of the angular position to the controller.

4. The device of claim 1, further comprising a removable door configured to selectively seal the opening.

5. The device of claim 4, further comprising a movable stage configured to hold and release the removable door for selective engagement with the opening, wherein a drive of the movable stage is in operable communication with the controller and the controller is further configured to instruct sealing and unsealing the opening with the removable door.

6. The device of claim 5, wherein the movable stage is configured to at least one of remove and seat the removable door within the opening with the spin axis being tilted at a door removal and seating angle.

7. The device of claim 6, wherein the door removal and seating angle is at least one of at the wash orientation and at an angle above horizontal that is within 1 to 10 degrees of the wash orientation angle.

8. The device of claim 6, wherein the movable stage is configured to seat the removable door in the opening prior to the controller executing the washing routine and remove the removable door from the opening following completion of the drying routine.

9. The device of claim 6, wherein the movable stage comprises one or more actuatable suctions for holding the removable door, the one or more actuatable suctions being in operable communication with an actuatable piston in operable communication with the controller, the actuatable piston configured to mechanically pull up a middle of the one or more actuatable suctions to generate suction against the removable door.

10. The device of claim 4, wherein the removable door comprises an air outlet orifice through which air is drawn from the drum during the drying routine, the air outlet orifice is configured to receive an external air vent hose.

11. The device of claim 10, wherein the tub further comprises an air inlet orifice at the drive end of the tub such that heated air flows through the drum from the air inlet orifice to the air outlet orifice.

12. The device of claim 11, wherein the air inlet orifice is positioned adjacent one of a top or a bottom of the tub and the air outlet orifice is positioned at least one of at the center of the removable door and adjacent another of the top or the bottom of the tub and wherein the flow of heated air travels diagonally through the drum from the drive end to the front end.

13. The device of claim 4, further comprising one or more actuatable latches in operable communication with the controller, the one or more actuatable latches being configured to retain the removable door sealed with the opening of the drum.

14. The device of claim 1, wherein the pair of coaxially aligned pivot shafts engage two opposing sides of the rigid frame that extend between a front end of the rigid frame substantially parallel to the front end of the tub and a back end of the rigid frame substantially parallel to the drive end of the tub.

15. The device of claim 14, wherein each one of the pair of coaxially aligned pivot shafts is configured to be supported by radial bearings disposed on a corresponding support positioned astride the rigid frame, and wherein the pivot motor is disposed on a corresponding support pillar of the engaged one of the pair of coaxially aligned pivot shafts.

16. The device of claim 15, wherein the pair of coaxially aligned pivot shafts is configured to suspend the rigid frame above at least one of a support surface and a receiving container by a height greater than a distance from the pivot axis to either of a front end and a back end of the rigid frame, and wherein the pivot axis is substantially aligned with a center of gravity of the washing and drying device.

17. The device of claim 1, wherein the controller is further configured to rotate the drum about the pivot axis to the inverted orientation to drop the at least one deformable article from the drum, and the drum is substantially cylindrical and comprises a conical taper adjacent the front end for guiding the at least one deformable article out of the drum in the inverted orientation.

18. The device of claim 1, wherein the upturned orientation comprises a range of angles between 45 and 90 degrees up from horizontal and the inverted orientation comprises a range of angles of between about 40 to 90 degrees down from horizontal.

19. The device of claim 1, wherein the spin axis is substantially horizontal at the wash orientation.

20. The device of claim 1, wherein the spin axis is inclined at an angle in a range of between about 1 to 20 degrees above horizontal at the wash orientation.

21. The device of claim 1, wherein the controller is in at least one of wired and wireless communication with a communication network and is further configured to receive the wash and dry parameters via the communication network.

22. The device of claim 1, wherein
an autonomous separating and sorting robot in communication with a communication network is configured to provide the at least one deformable article to the washing and drying device,
the autonomous separating and sorting robot determines one or more characteristics of the at least one deformable article,
the autonomous separating and sorting robot communicates the one or more characteristics of the at least one deformable article to the controller of the washing and drying device via the communication network, and
the controller is further configured to determine the wash and dry parameters based on the communicated one or more characteristics.

23. The device of claim 22, wherein the wash and dry parameters are stored in a look up table cross referenced with the one or more characteristics, and
wherein the communicated one or more characteristics is at least one of a material composition, weight, color, and size of the at least one deformable article.

24. The device of claim 1, wherein
the tub comprises a cleaning water inlet, a wastewater outlet, and an air inlet orifice configured to receive a heated air conduit,
the heated air inlet orifice is disposed in a wall at the drive end of the tub, and
the cleaning water inlet is disposed on an upper half of the tub and is configured to receive at least one of water and one or more laundry chemicals.

25. The device of claim 1, wherein the controller is further in operable communication with an autonomously operated loader disposed above the rigid frame and configured to instruct the autonomous loader to release the deformable article into the drum while the rigid frame is in the upturned orientation.

26. The device of claim 25, wherein the autonomously operated loader is configured to drive on one or more rails to a stopping position above one of a plurality of washing and drying devices.

27. The device of claim 25, wherein the autonomously operated loader comprises a holding volume adjacent a downspout and an actuated wall disposed between the holding volume and the downspout for selectively releasing the at least one deformable article through the downspout into the opening of the upturned drum positioned therebeneath.

28. The device of claim 27, further comprising an autonomously operated bin tipper in operable communication with the controller, the controller being configured to actuate at least one of a clamp for retaining an open topped bin received within the bin tipper and a spin motor configured to rotate the open topped bin above the loader to release the one or more deformable articles into the holding volume while retaining the clamped open topped bin.

29. The device of claim 1, wherein both faces of the at least one rigid flange are substantially parallel to the front end of the tub.

* * * * *

UNITED STATES PATENT AND TRADEMARK OFFICE
CERTIFICATE OF CORRECTION

PATENT NO. : 11,535,977 B2
APPLICATION NO. : 17/490670
DATED : December 27, 2022
INVENTOR(S) : Coney et al.

It is certified that error appears in the above-identified patent and that said Letters Patent is hereby corrected as shown below:

In the Specification

Column 26, Line 44: Please correct "orientation a" to read --orientation α--

Column 63, Line 6: Please correct "54915" to read --S4915--

Column 63, Line 11: Please correct "54915" to read --S4915--

Column 63, Line 20: Please correct "54915" to read --S4915--

Signed and Sealed this
Ninth Day of May, 2023

Katherine Kelly Vidal
*Director of the United States Patent and Trademark Office*